(12) United States Patent

McCombe et al.

(10) Patent No.: US 12,560,995 B2

(45) Date of Patent: Feb. 24, 2026

(54) ASYMMETRIC COMMUNICATION SYSTEM WITH VIEWER POSITION INDICATIONS

(71) Applicant: MINE ONE GmbH, Berlin (DE)

(72) Inventors: James A. McCombe, San Francisco, CA (US); Christoph Birkhold, San Francisco, CA (US)

(73) Assignee: MINE ONE GmbH, Berlin (DE)

( * ) Notice: Subject to any disclaimer, the term of this patent is extended or adjusted under 35 U.S.C. 154(b) by 788 days.

(21) Appl. No.: 17/858,954

(22) Filed: Jul. 6, 2022

(65) Prior Publication Data

US 2023/0122149 A1 Apr. 20, 2023

Related U.S. Application Data

(63) Continuation-in-part of application No. 17/460,246, filed on Aug. 29, 2021, now Pat. No. 11,960,639, (Continued)

(51) Int. Cl.
*G06F 3/01* (2006.01)
*G06F 3/04815* (2022.01)
(Continued)

(52) U.S. Cl.
CPC .............. *G06F 3/012* (2013.01); *G06F 3/013* (2013.01); *G06F 3/04815* (2013.01); *G06T 7/50* (2017.01);
(Continued)

(58) Field of Classification Search
CPC .......... A61M 2205/3334; F04D 13/064; F04D 13/0646; F04D 13/0666; F04D 29/047;

F04D 29/048; G06F 3/012; G06F 3/013; G06F 3/04815; G06K 9/0063; G06K 9/46; G06T 11/00; G06T 2207/10048; G06T 7/50; H04N 13/117; H04N 13/239; (Continued)

(56) References Cited

U.S. PATENT DOCUMENTS

| | | | |
|---|---|---|---|
| 5,867,591 A | 2/1999 | Onda | |
| 5,973,732 A | 10/1999 | Guthrie | |

(Continued)

FOREIGN PATENT DOCUMENTS

| | | |
|---|---|---|
| CN | 110230983 A | 9/2019 |
| CN | 111028155 A | 4/2020 |
| EP | 1235439 A2 | 8/2002 |
| EP | 1418766 A2 | 5/2004 |
| EP | 3057317 A1 | 8/2016 |
| EP | 2847738 B1 | 7/2017 |
| GB | 2449738 A | 12/2008 |

(Continued)

OTHER PUBLICATIONS

Avci et al., Efficient Disparity Vector Prediction Schemes, Jrnl. of Visual Communication and Image Representation, Academic Press vol. 23, No. 2, Oct. 27, 2011, pp. 287-292.

(Continued)

*Primary Examiner* — Bobbak Safaipour

(74) *Attorney, Agent, or Firm* — Gesmer Updegrove LLP

(57) ABSTRACT

Communication methods, systems and computer program products ("software") (1) facilitate virtual immersion of one or more remote viewing participants into a captured scene which may include any number of physically present participants, and (2) provide indications of the remote viewing participants that can be seen or discerned by the physically present participants.

20 Claims, 71 Drawing Sheets

Related U.S. Application Data which is a continuation of application No. 16/749,989, filed on Jan. 22, 2020, now Pat. No. 11,106,275, which is a continuation of application No. 15/560,019, filed as application No. PCT/US2016/023433 on Mar. 21, 2016, now Pat. No. 10,551,913.

(60) Provisional application No. 63/219,261, filed on Jul. 7, 2021, provisional application No. 62/136,494, filed on Mar. 21, 2015.

(51) Int. Cl.

| | |
|---|---|
| *G06T 7/50* | (2017.01) |
| *G06T 11/00* | (2006.01) |
| *G06V 10/40* | (2022.01) |
| *G06V 20/13* | (2022.01) |
| *H04N 7/14* | (2006.01) |
| *H04N 7/18* | (2006.01) |
| *H04N 13/117* | (2018.01) |
| *H04N 13/239* | (2018.01) |
| *H04N 13/243* | (2018.01) |
| *H04N 13/254* | (2018.01) |
| *H04N 13/344* | (2018.01) |
| *H04N 23/80* | (2023.01) |
| *H04N 5/33* | (2023.01) |
| *H04N 13/00* | (2018.01) |
| *H04N 13/271* | (2018.01) |

(52) U.S. Cl.
CPC .............. *G06T 11/00* (2013.01); *G06V 10/40* (2022.01); *G06V 20/13* (2022.01); *H04N 7/147* (2013.01); *H04N 7/18* (2013.01); *H04N 13/117* (2018.05); *H04N 13/239* (2018.05); *H04N 13/243* (2018.05); *H04N 13/254* (2018.05); *H04N 13/344* (2018.05); *H04N 23/80* (2023.01); *G06T 2207/10048* (2013.01); *H04N 5/33* (2013.01); *H04N 2013/0081* (2013.01); *H04N 13/271* (2018.05)

(58) Field of Classification Search
CPC .. H04N 13/243; H04N 13/254; H04N 13/271; H04N 13/344; H04N 2013/0081; H04N 5/23229; H04N 5/33; H04N 7/147; H04N 7/18
See application file for complete search history.

(56) References Cited

U.S. PATENT DOCUMENTS

| | | | |
|---|---|---|---|
| 5,991,464 A | | 11/1999 | Hsu et al. |
| 6,184,847 B1 * | | 2/2001 | Fateh ...................... G06F 3/012 |
| | | | 715/729 |
| 6,297,844 B1 | | 10/2001 | Shatz et al. |
| 6,751,340 B2 | | 6/2004 | Prokoski |
| 7,372,981 B2 | | 5/2008 | Lai et al. |
| 7,689,043 B2 | | 3/2010 | Austin et al. |
| 8,395,629 B1 | | 3/2013 | Kilpatrick et al. |
| 8,547,374 B1 | | 10/2013 | Sadjadi et al. |
| 8,639,024 B2 * | | 1/2014 | Woodfill ................... G06T 1/20 |
| | | | 348/46 |
| 9,047,504 B1 | | 6/2015 | Ramaswamy et al. |
| 9,280,821 B1 | | 3/2016 | Choe et al. |
| 9,298,974 B1 | | 3/2016 | Kuo et al. |
| 9,332,285 B1 | | 5/2016 | Grant et al. |
| 9,538,160 B1 * | | 1/2017 | Cole .................. H04N 13/243 |
| 9,609,305 B1 | | 3/2017 | Ramaswamy |
| 10,154,243 B2 * | | 12/2018 | He ...................... H04N 13/128 |
| 10,509,821 B2 | | 12/2019 | Boncyk et al. |
| 10,551,913 B2 * | | 2/2020 | McCombe ........... H04N 23/958 |
| 10,853,625 B2 * | | 12/2020 | McCombe ........... G06V 20/647 |

| | | | |
|---|---|---|---|
| 11,106,275 B2 * | | 8/2021 | McCombe .......... G06F 3/04815 |
| 11,189,043 B2 | | 11/2021 | McCombe et al. |
| 11,238,564 B2 | | 2/2022 | McCombe et al. |
| 2004/0027358 A1 | | 2/2004 | Nakao |
| 2004/0223630 A1 | | 11/2004 | Waupotitsch et al. |
| 2004/0240711 A1 | | 12/2004 | Hamza et al. |
| 2005/0063566 A1 | | 3/2005 | Beek et al. |
| 2005/0078866 A1 | | 4/2005 | Criminisi et al. |
| 2005/0083248 A1 | | 4/2005 | Biocca et al. |
| 2005/0122549 A1 | | 6/2005 | Goulanian et al. |
| 2005/0129325 A1 | | 6/2005 | Wu |
| 2005/0185054 A1 | | 8/2005 | Edwards et al. |
| 2006/0056727 A1 | | 3/2006 | Jones et al. |
| 2006/0083421 A1 | | 4/2006 | Weiguo et al. |
| 2006/0152609 A1 | | 7/2006 | Prentice et al. |
| 2006/0193179 A1 | | 8/2006 | England et al. |
| 2006/0193509 A1 | | 8/2006 | Criminisi et al. |
| 2007/0126921 A1 | | 6/2007 | Gallagher et al. |
| 2007/0167702 A1 | | 7/2007 | Hasser et al. |
| 2007/0183653 A1 | | 8/2007 | Medioni et al. |
| 2007/0254640 A1 | | 11/2007 | Bliss |
| 2008/0077596 A1 | | 3/2008 | Patton et al. |
| 2009/0116695 A1 | | 5/2009 | Anchyshkin et al. |
| 2009/0210491 A1 | | 8/2009 | Thakkar et al. |
| 2009/0278961 A1 | | 11/2009 | Mohanty et al. |
| 2010/0094800 A1 | | 4/2010 | Sharp |
| 2010/0103249 A1 | | 4/2010 | Lipton et al. |
| 2010/0158387 A1 | | 6/2010 | Choi et al. |
| 2010/0165155 A1 | | 7/2010 | Chang |
| 2010/0165206 A1 | | 7/2010 | Nestares et al. |
| 2010/0238264 A1 | | 9/2010 | Liu et al. |
| 2011/0018903 A1 | | 1/2011 | Lapstun et al. |
| 2011/0064299 A1 | | 3/2011 | Zhang et al. |
| 2011/0075025 A1 | | 3/2011 | Cho et al. |
| 2011/0102440 A1 | | 5/2011 | Yuen et al. |
| 2011/0115921 A1 | | 5/2011 | Wang et al. |
| 2011/0187922 A1 | | 8/2011 | Hwang et al. |
| 2011/0292227 A1 | | 12/2011 | Nakazawa |
| 2011/0306422 A1 | | 12/2011 | Nishimoto et al. |
| 2012/0045091 A1 | | 2/2012 | Kaganovich |
| 2012/0069005 A1 | | 3/2012 | Seen et al. |
| 2012/0099005 A1 | | 4/2012 | Kali et al. |
| 2012/0106785 A1 | | 5/2012 | Karafin et al. |
| 2012/0121142 A1 | | 5/2012 | Nagesh |
| 2012/0133779 A1 | | 5/2012 | Ma et al. |
| 2012/0200669 A1 | | 8/2012 | Lai et al. |
| 2012/0209514 A1 | | 8/2012 | Chrysanthakopoulos |
| 2012/0249750 A1 | | 10/2012 | Izzat et al. |
| 2012/0262493 A1 | | 10/2012 | Tsai et al. |
| 2012/0262553 A1 | | 10/2012 | Chen et al. |
| 2012/0293608 A1 | | 11/2012 | Doepke et al. |
| 2013/0021490 A1 | | 1/2013 | James et al. |
| 2013/0070116 A1 | | 3/2013 | Suzuki et al. |
| 2013/0077880 A1 | | 3/2013 | Venkataraman et al. |
| 2013/0101160 A1 | | 4/2013 | Woodfill et al. |
| 2013/0169764 A1 | | 7/2013 | Lu et al. |
| 2013/0201301 A1 | | 8/2013 | Huang et al. |
| 2013/0215107 A1 | | 8/2013 | Kimura et al. |
| 2013/0258067 A1 | | 10/2013 | Zhang et al. |
| 2013/0278633 A1 | | 10/2013 | Ahn et al. |
| 2013/0287291 A1 * | | 10/2013 | Cho ........................ G06F 18/22 |
| | | | 382/154 |
| 2013/0293669 A1 | | 11/2013 | Lucey |
| 2013/0321564 A1 | | 12/2013 | Smith et al. |
| 2014/0038708 A1 | | 2/2014 | Davison et al. |
| 2014/0050372 A1 | | 2/2014 | Qi et al. |
| 2014/0071313 A1 | | 3/2014 | Hiasa |
| 2014/0104143 A1 * | | 4/2014 | Benson ................ G02B 27/017 |
| | | | 345/8 |
| 2014/0200953 A1 | | 7/2014 | Mun |
| 2014/0219551 A1 | | 8/2014 | Tang |
| 2014/0226900 A1 | | 8/2014 | Saban et al. |
| 2014/0240587 A1 | | 8/2014 | Cote et al. |
| 2014/0267243 A1 | | 9/2014 | Venkataraman et al. |
| 2014/0270480 A1 | | 9/2014 | Boardman et al. |
| 2014/0337949 A1 | | 11/2014 | Hoyos |
| 2014/0341290 A1 | | 11/2014 | Merkle et al. |
| 2014/0375775 A1 | | 12/2014 | Yeatman, Jr. et al. |
| 2015/0049169 A1 | | 2/2015 | Krig et al. |

(56) References Cited

U.S. PATENT DOCUMENTS

| | | | |
|---|---|---|---|
| 2015/0055821 A1 | 2/2015 | Fotland | |
| 2015/0066764 A1 | 3/2015 | Crowell et al. | |
| 2015/0098645 A1 | 4/2015 | Leung | |
| 2015/0110349 A1 | 4/2015 | Feng et al. | |
| 2015/0116317 A1 | 4/2015 | Chen et al. | |
| 2015/0229901 A1 | 8/2015 | Doba et al. | |
| 2015/0253573 A1* | 9/2015 | Sako | H04N 13/398 |
| | | | 345/207 |
| 2015/0288856 A1 | 10/2015 | Vanam et al. | |
| 2015/0302592 A1 | 10/2015 | Bruls et al. | |
| 2015/0373316 A1 | 12/2015 | Meng et al. | |
| 2016/0005154 A1 | 1/2016 | Meyers et al. | |
| 2016/0027218 A1* | 1/2016 | Salter | G02B 27/0093 |
| | | | 345/633 |
| 2016/0037059 A1 | 2/2016 | Lim et al. | |
| 2016/0037060 A1 | 2/2016 | Lim et al. | |
| 2016/0042250 A1 | 2/2016 | Cordova-Dida et al. | |
| 2016/0065795 A1 | 3/2016 | Bagai et al. | |
| 2016/0088278 A1 | 3/2016 | Sadi et al. | |
| 2016/0103900 A1 | 4/2016 | Angelov et al. | |
| 2016/0132021 A1 | 5/2016 | Zschau | |
| 2016/0188995 A1 | 6/2016 | Somanath et al. | |
| 2016/0189387 A1 | 6/2016 | Kannan et al. | |
| 2016/0203579 A1 | 7/2016 | Griffin et al. | |
| 2016/0219267 A1 | 7/2016 | Chu et al. | |
| 2016/0295195 A1 | 10/2016 | Thorn et al. | |
| 2016/0337557 A1 | 11/2016 | Kong et al. | |
| 2016/0337628 A1 | 11/2016 | Kong et al. | |
| 2016/0342832 A1 | 11/2016 | Bud et al. | |
| 2017/0017302 A1 | 1/2017 | Libal et al. | |
| 2017/0046025 A1 | 2/2017 | Dascola et al. | |
| 2017/0085733 A1 | 3/2017 | Ilic et al. | |
| 2017/0094243 A1 | 3/2017 | Venkataraman et al. | |
| 2017/0176532 A1 | 6/2017 | Bhamidipati | |
| 2017/0244960 A1 | 8/2017 | Ciurea et al. | |
| 2018/0189550 A1 | 7/2018 | McCombe et al. | |
| 2018/0204307 A1 | 7/2018 | Schied et al. | |
| 2018/0239136 A1* | 8/2018 | Ishikawa | G06F 3/013 |
| 2018/0307310 A1 | 10/2018 | McCombe et al. | |
| 2018/0315232 A1 | 11/2018 | Jones et al. | |
| 2018/0322623 A1 | 11/2018 | Memo et al. | |
| 2019/0304112 A1 | 10/2019 | Hota et al. | |
| 2020/0285309 A1 | 9/2020 | McCombe et al. | |
| 2020/0302682 A1 | 9/2020 | Askoy et al. | |
| 2020/0320777 A1 | 10/2020 | Meshry et al. | |
| 2020/0357128 A1 | 11/2020 | McCombe et al. | |
| 2021/0072822 A1 | 3/2021 | Smith et al. | |
| 2021/0192188 A1 | 6/2021 | Mccombe et al. | |
| 2021/0217132 A1 | 7/2021 | Mccombe et al. | |
| 2021/0232215 A1 | 7/2021 | Mccombe et al. | |
| 2022/0091665 A1 | 3/2022 | McCombe et al. | |
| 2022/0222842 A1 | 7/2022 | McCombe et al. | |
| 2022/0230280 A1 | 7/2022 | Mccombe et al. | |
| 2022/0337744 A1 | 10/2022 | McCombe et al. | |
| 2023/0152883 A1 | 5/2023 | McCombe et al. | |
| 2025/0139871 A1* | 5/2025 | Ive | G06F 3/017 |

FOREIGN PATENT DOCUMENTS

| | | |
|---|---|---|
| WO | 200054181 A1 | 9/2000 |
| WO | WO/2016/154123 | 9/2016 |
| WO | 2018146558 A2 | 8/2018 |
| WO | WO/2018/164852 | 9/2018 |

OTHER PUBLICATIONS

Berge et al., Real-time Uncertainty Visualization for B-mode Ultrasound, 2015 IEEE Scientific Visualization Conf., Oct. 25, 2015, pp. 33-40.
Bhat D N et al., Stereo in the presence of specular reflection, Computer Vision, 1995, Proceedings, Fifth International Conference on Cambridge, MA, USA Jun. 20-23, Los Alamitos, CA, USA, IEEE, Comput. Soc. US, Jun. 20, 1995, pp. 1086-1092, XP010146946, DOI: 10.1109/ICCV.1995.466813, ISBN: 978-0-8186-7042-8.
Brown, Decentering Distortion of Lenses, Photogrammetric Engineering, 32 (3), 1966, pp. 444-462.
Carranza et al., Free-Viewpoint Video of Human Actors, ACM Transactions on Graphics, vol. 22, No. 3, pp. 569-577, Jul. 2003.
Choi et al., Implementation of Real-Time Post-Processing for High-Quality Stereo Vision, ETRI Journal, vol. 37, No. 4, Aug. 1, 2015, pp. 752-765.
Chu et al., OpenCV and TYZK: Video Surveillance for Tracking, Aug. 2008, Sandia Report SAND2008-5776.
Gordon et al., Person and Gesture Tracking with Smart Stereo Cameras, Proc. SPIE, vol. 6805, Jan. 2008.
Hannah, Computer Matching of Areas in Stereo Images, Jul. 1974 Thesis, Stanford University Computer Science Department Report STAN-CS-75-438.
Hoppe et al., Online Feedback for Structure-from-Motion Image Acquisition, Proceedings of the British Machine Vision Conference, Jan. 1, 2012, pp. 70.1-70.12, XP055123585, DOI: 10.5244/C.26.70, ISBN: 978-1-90-172546-9.
Hu et al., A region-based video de-noising algorithm based on temporal and spatial correlations, Neurocomputing 266 (2017), pp. 361-374.
Husken et al., Strategies and Benefits of Fusion of 2D and 3D Face Recognition, Proceedings / 2005 IEEE Computer Society Conference on Computer Vision and Pattern Recognition, CVPR 2005: Jun. 20-25, 2005, San Diego, CA, vol. 3, Jun. 20, 2005, pp. 174-174, XP055539324, Piscataway, NJ, USA, DOI: 10.1109/CVPR.2005. 584, ISBN: 978-0-7695-2372-9.
Klein et al., Parallel Tracking and Mapping for Small AR Workspaces, 2007 IEEE ACM Internat. Sympos. on Mixed and Augmented Reality, Nov. 2007, 10 pages.
Luo et al., Hierarchical Genetic Disparity Estimation Algorithm for Multiview Image Synthesis, 2000 IEEE Int. conf. on Image Processing, vol. 2, pp. 768-771.
Mark et al., Post-Rendering 3D Warping, Proc. of 1997 Sympos. on Interactive 3D Graphics, Apr. 1997, pp. 7-16 (10 pages).
MacCormick, How Does the Kinect Work?, http://users.dickinson. edu/-jmac/selected-talks/kinect.pdf, Dec. 2011.
Melexis NV, MLX75023 Time-of-Flight Sensor Array, Product Datasheet, http://www.melexis.com/General/General/MLX75023-832.aspx, copyright 2016.
Newcombe et al., DTAM: Dense Tracking and Mapping in Real-Time, 2011 International Conf. on Computer Vision, Nov. 2011, 8 pages.
OpenCV (Open Source Computer Vision library of programming functions), released Aug. 29, 2018, https://docs.opencv.org/3.4.3/.
Puetter et al., Digital Image Reconstruction: Deblurring and denoising, In: Annu. Rev. Astron. Astrophys. Jun. 16, 2005, retrieved on Feb. 11, 2019, from http://fcaglp.fcaglp.unlp.edu.ar/-observacional/papers/PDFs/image_puetter2005araa43.pdf.
Sakamoto et al., A multiple-baseline stereo for precise human face acquisition, In: Serious Games, Jan. 1, 1997, Springer International Publishing, Cham, XP055538389, ISSN: 0302-9743, ISBN: 978-3-642-15171-2, vol. 1206, pp. 419-428, DOI: 10.1007/BFb0016023.
Shin, in-Yong, and Yo-Sung Ho. "Virutal view-point disoarily estimation and convergence check for real-time view synthesis." Pacific-Rim Symposium on Image and Video Technology Berlin, Heidelberg: Springer Berlin Heidelberg, 2011.
Sluijter et al. Ray-Optics Analysis of Switchable Auto-Stereoscopic Lenticular-Based 2D / 3D Displays, Eindhoven Univ. of Tech., thesis project, Dec. 2005, pp i-iv and 1-78.
Spring et al., Olympus lifescience.com: Image Averaging and Noise Removal, May 14, 2017, URL: https://www.olympus-lifescience. com/en/microscope-resource/primer/jav/digitalim.
Tsung et al., Cache-Based Integer Motion-Disparity Estimation, 2009 IEEE Conf. on Acoustics, Speed and Signal Processing, Apr. 19, 2009, pp. 2013-2016.
Viola et al., Rapid Object Detection using a Boosted Cascade of Simple Features, Proc. of 2001 IEEE Comput. Soc. Conf. on Comput, Vision and Pattern Recog., pp. 1-9.
Viola et al., Robust Real-time Face Detection, Proc. of 8th IEEE International Conf. on Computer Vision, 2001, 1 page.

(56)                References Cited

OTHER PUBLICATIONS

Wagner et al., Liveness Assurance in Face Authentication, In: Encyclopedia of Biometrics, Jan. 1, 2009, Springer US, Boston, MA, XP055296704, ISBN: 978-0-387-73003-5, pp. 908-916, DOI: 10.1007/978-0-387-73003-5_67.

Wikipedia Article "Bayer Filter", retrieved May 2023 from: https://en.wikipedia.org/wiki/Bayer_filter, 9 pages.

Wikipedia Article "Shot Noise", retrieved May 2023 from https://en.wikipedia.org/wiki/Shot_noise, 5 pages.

Wikipedia Article "Variable-gain Amplifier", retrieved May 2023 from: https://en.wikipedia.org/wiki/Variable-gain_amplifier, 3 pages.

Wikipedia Article, Simultaneous Localization & Mapping, retrieved Apr. 2023 from https://en.wikipedia.org/wiki/Simultaneous_localization_and_mapping, 10 pages.

Wikipedia Article, Viola-Jones Object Detection Framework, retrieved Apr. 2023 from https://en.wikipedia.org/w/index.php?title=Viola-Jones_object_detection_framework, 7 pages.

Wikipedia.org, Article re: OpenCV, last edited Aug. 29, 2018; https://en.wikipedia.org/wiki/OpenCV.

Wikipedia.org, Article re: Time-of-Flight Camera, http://en.wikipedia.org/wiki/Time-of-flight_camera, last edited Jun. 21, 2019.

Zabih et al., Non-parametric Local Transforms for Computing Visual Correspondence, Proc. European Conf. on Computer Vision, May 1994, pp. 151-158.

Zhang et al., A saliency based noise reduction method for Digital TV, Consumer Electronics (ICCE), 2011 IEEE International Conference on, IEEE, Jan. 9, 2011, pp. 743-744, XP031921487, DOI: 10.1109/ICCE.2011.5722840, ISBN; 978-1-4244-8711-0.

Zhu et al., Pre-Processing of X-Ray Medical Image Based on Improved Temporal Recursive Self-Adaptive Filter, Young Computer Scientists, 2008, ICYCS 2008, The 9th International Conference for, IEEE, Piscataway, NJ, USA, Nov. 18, 2008, pp. 758-763, XP031373266, ISBN: 978-0-7695-3398-8.

Olson, "How a Stealth Startup Hopes to Change Video Calls and VR", published on website TheInformation.com, Jul. 7, 2021, https://www.theinformation.com/articles/how-a-stealth-startup-hopes-to-change-video-calls-and-vr.

* cited by examiner

Eye Contact
V3D Corrected
*FIG. 2B*
Typical
*FIG. 2A*

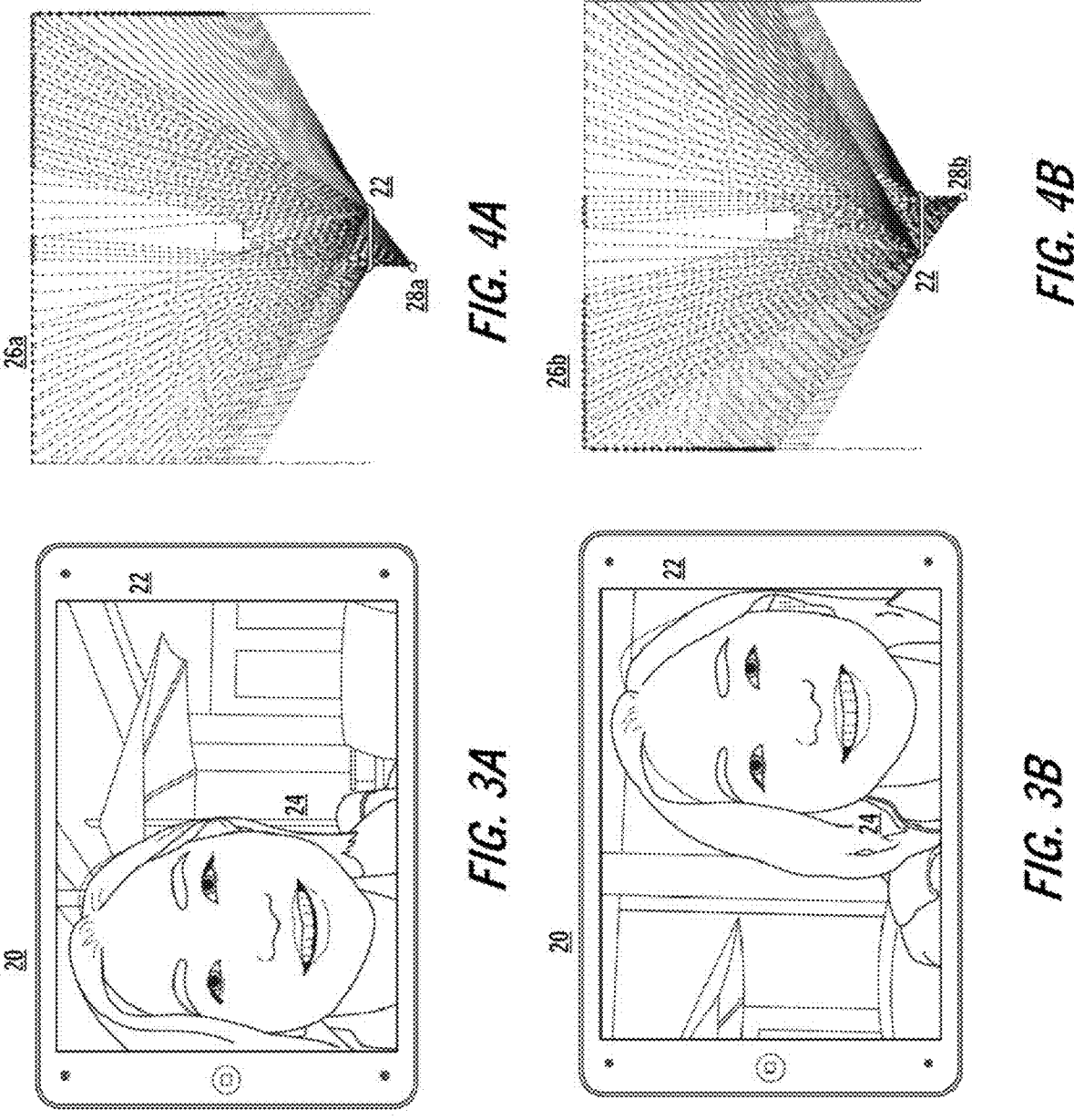

*FIG. 12A*                     *FIG. 12D*
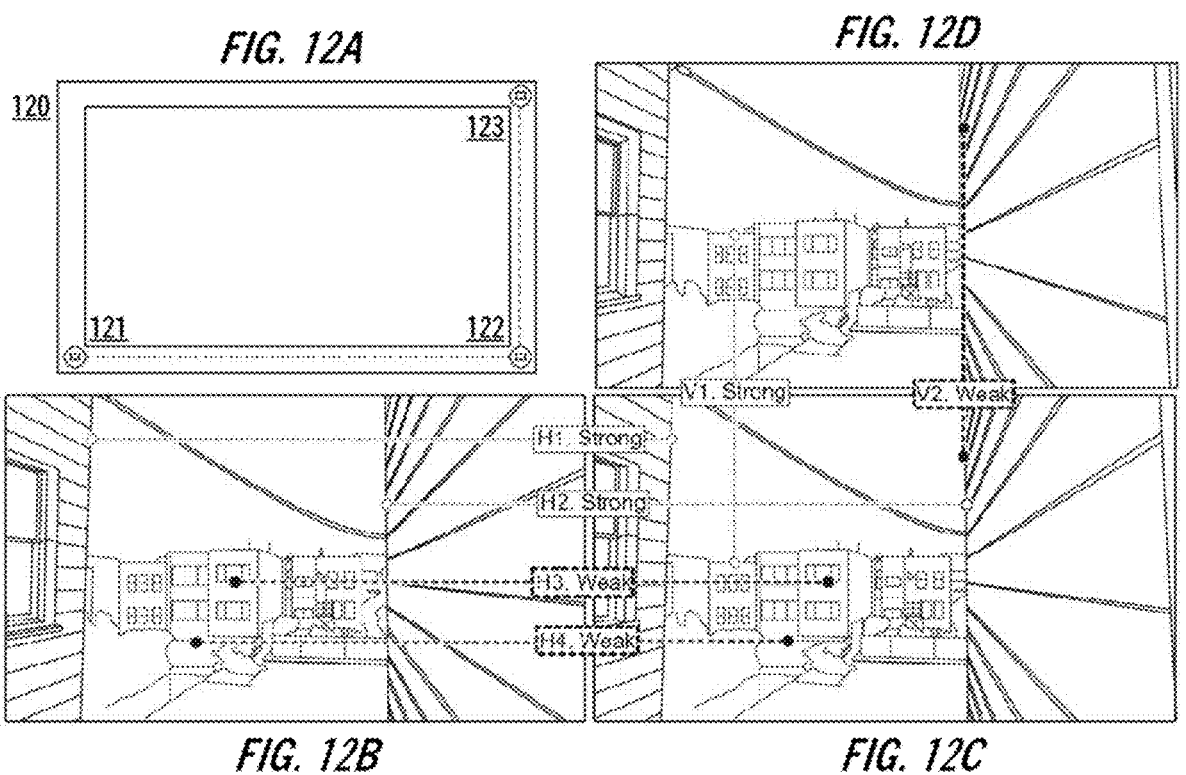
*FIG. 12B*                     *FIG. 12C*
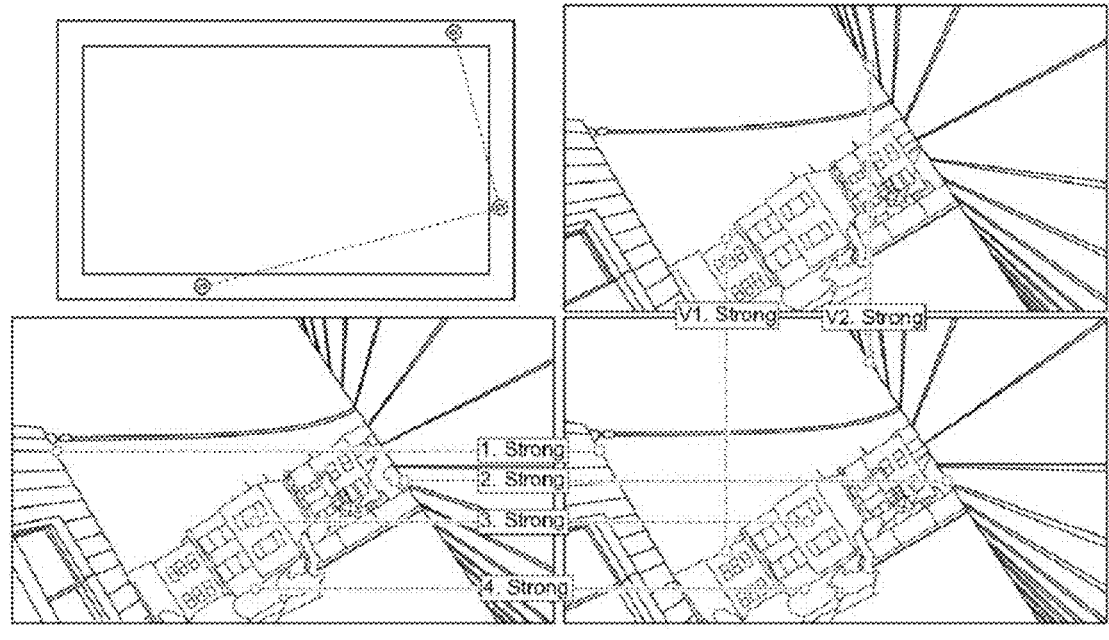
*FIG. 13*

FIG. 17C (uninvertible) (uninvertible)

Figures 16, 17A, 17B, 17C:
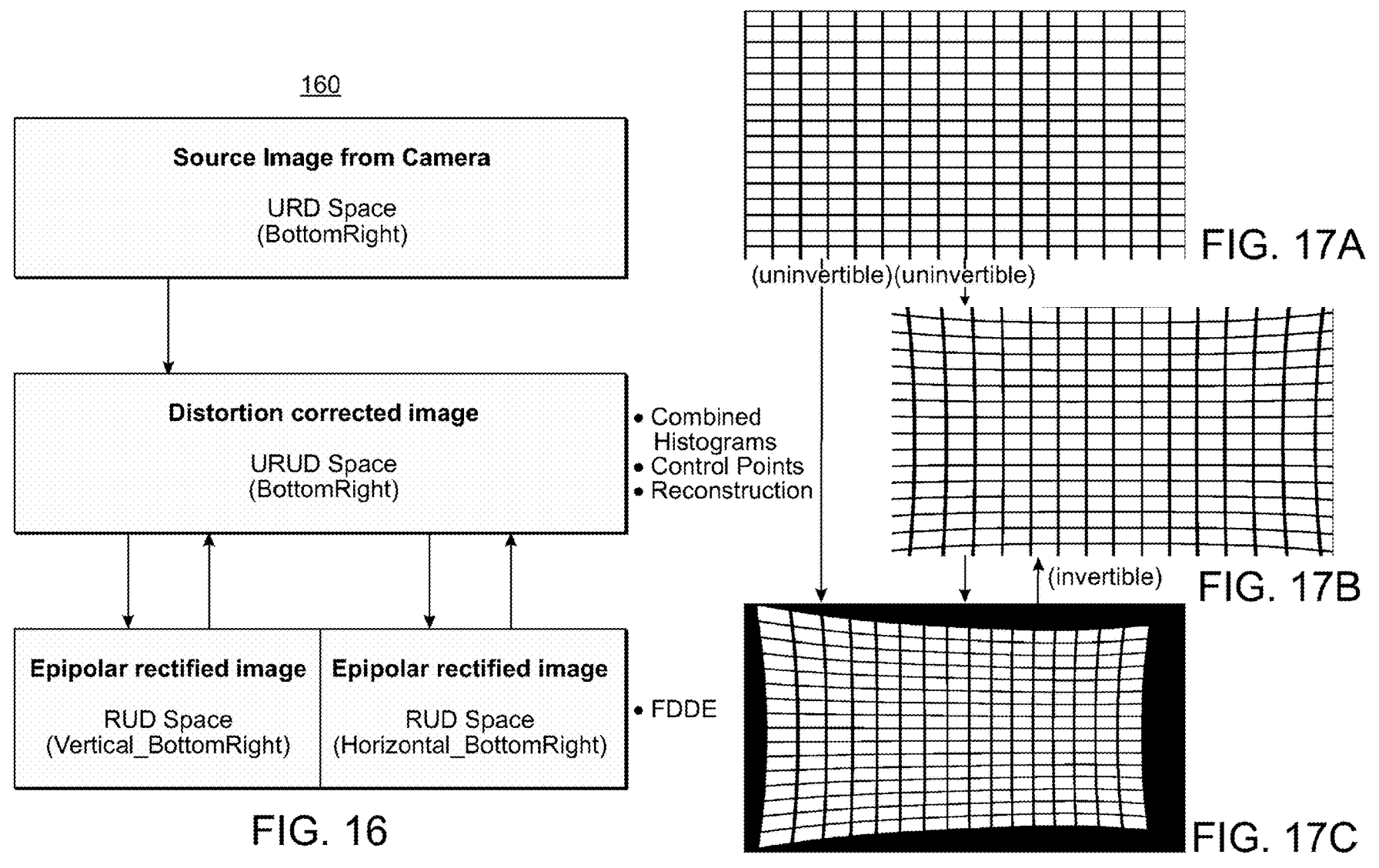

(uninvertible)

(invertible)

(invertible)

Source Image from Camera

URD Space
(BottomRight)

Distortion corrected image

URUD Space
(BottomRight)

- Combined
- Histograms
- Control Points
- Reconstruction

Epipolar rectified image

RUD Space
(Vertical_BottomRight)

Epipolar rectified image

RUD Space
(Horizontal_BottomRight)

- FDDE

Kernel

Epipolar line

Solution Point

Zoom in of kernel

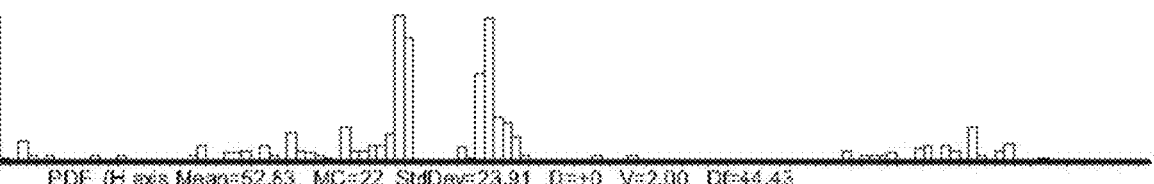
PDF (H axis Mean=52.63  MC=22  StdDev=23.91  D=-0  V=2.00  DF=44.43
FIG. 25
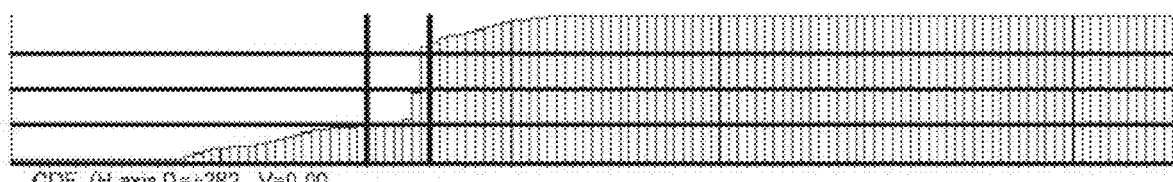
CDF (H axis D=-282  V=0.00
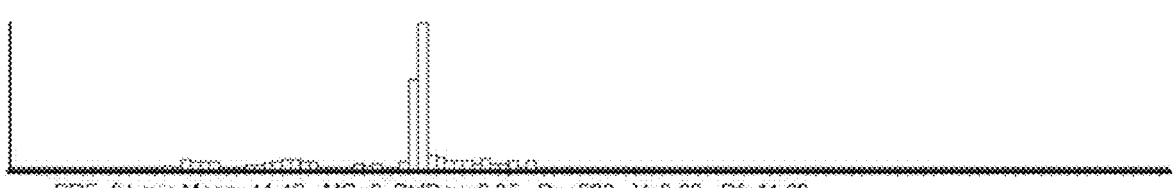
PDF (H axis Mean=41.49  MC=9  StdDev=9.38  D=-282  V=0.00  DF=44.69
FIG. 26
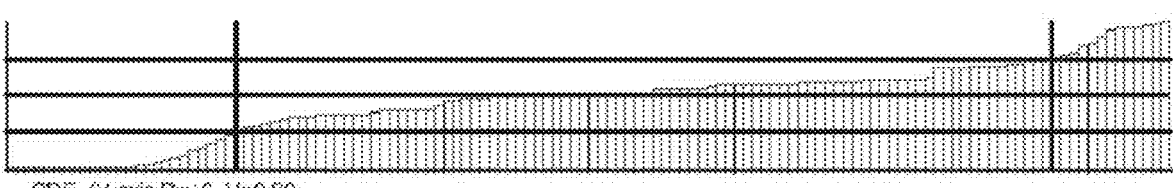
CDF (H axis D=-0  V=0.00
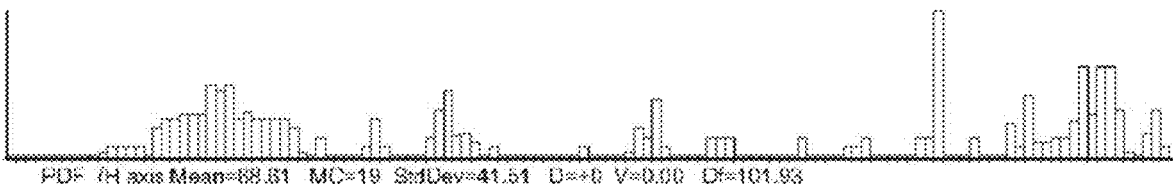
PDF (H axis Mean=88.81  MC=19  StdDev=41.51  D=-0  V=0.00  DF=101.93
FIG. 27

Level 0

Level 1

Level 2

Level 3

Level n

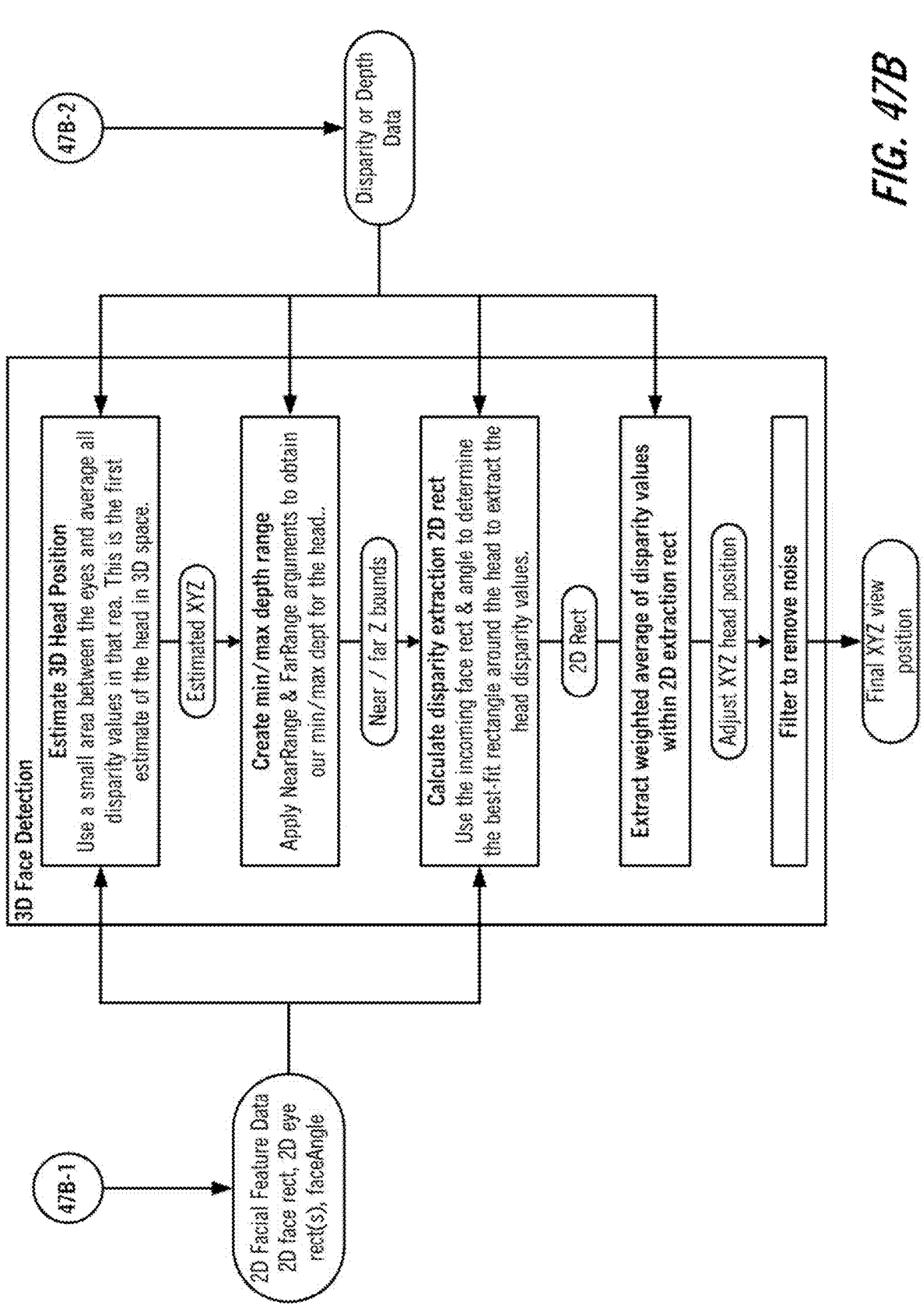

47B-2

Disparity or Depth Data

3D Face Detection

Estimate 3D Head Position
Use a small area between the eyes and average all disparity values in that rea. This is the first estimate of the head in 3D space.

Estimated XYZ

Create min/max depth range
Apply NearRange & FarRange arguments to obtain our min/max dept for the head.

Near / far Z bounds

Calculate disparity extraction 2D rect
Use the incoming face rect & angle to determine the best-fit rectangle around the head to extract the head disparity values.

2D Rect

Extract weighted average of disparity values within 2D extraction rect

Adjust XYZ head position

Filter to remove noise

Final XYZ view position

47B-1

2D Facial Feature Data
2D face rect, 2D eye rect(s), faceAngle

*FIG. 47B*

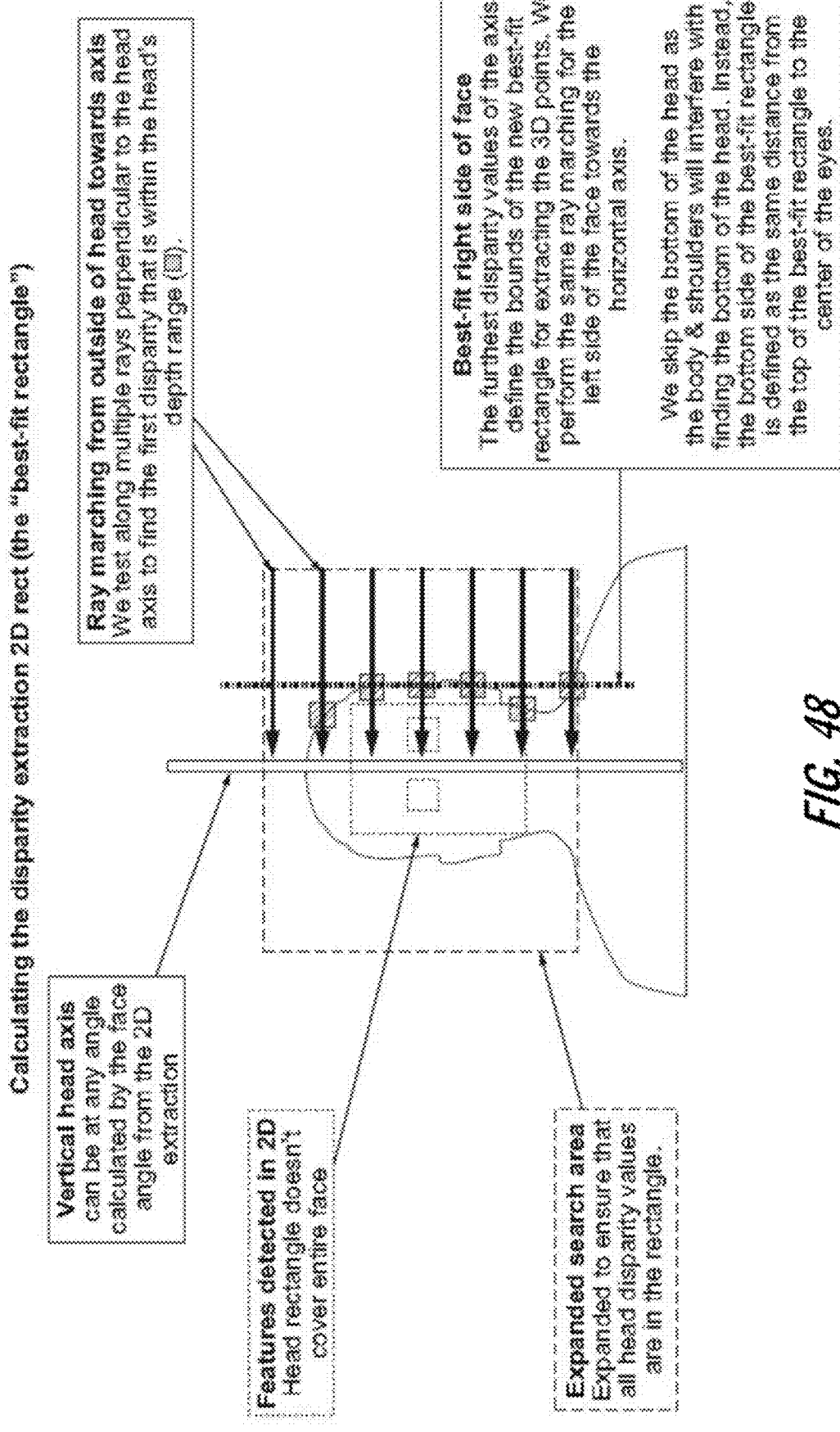

Calculating the disparity extraction 2D rect (the "best-fit rectangle")

Ray marching from outside of head towards axis
We test along multiple rays perpendicular to the head axis to find the first disparity that is within the head's depth range (▓▓).

Best-fit right side of face
The furthest disparity values of the axis define the bounds of the new best-fit rectangle for extracting the 3D points. We perform the same ray marching for the left side of the face towards the horizontal axis.

We skip the bottom of the head as the body & shoulders will interfere with finding the bottom of the head. Instead, the bottom side of the best-fit rectangle is defined as the same distance from the top of the best-fit rectangle to the center of the eyes.

Vertical head axis
can be at any angle calculated by the face angle from the 2D extraction

Features detected in 2D
Head rectangle doesn't cover entire face

Expanded search area
Expanded to ensure that all head disparity values are in the rectangle.

*FIG. 48*

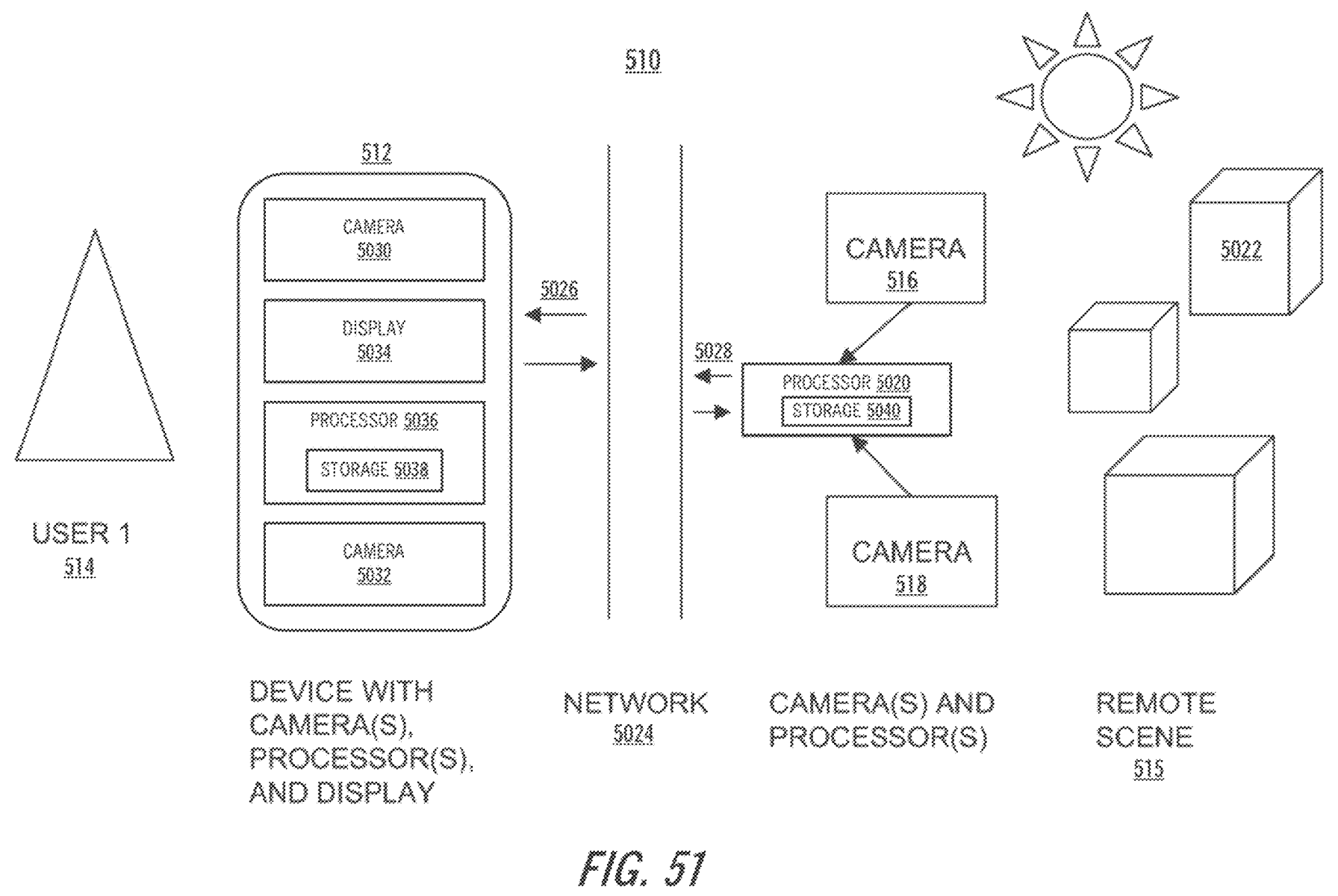

REMOTE SCENE 515

5022

CAMERA 516

CAMERA 518

PROCESSOR 5020
STORAGE 5040

CAMERA(S) AND PROCESSOR(S)

5028

510

NETWORK 5024

5026

512

CAMERA 5030

DISPLAY 5034

PROCESSOR 5036
STORAGE 5038

CAMERA 5032

DEVICE WITH CAMERA(S), PROCESSOR(S), AND DISPLAY

USER 1 514

FIG. 51

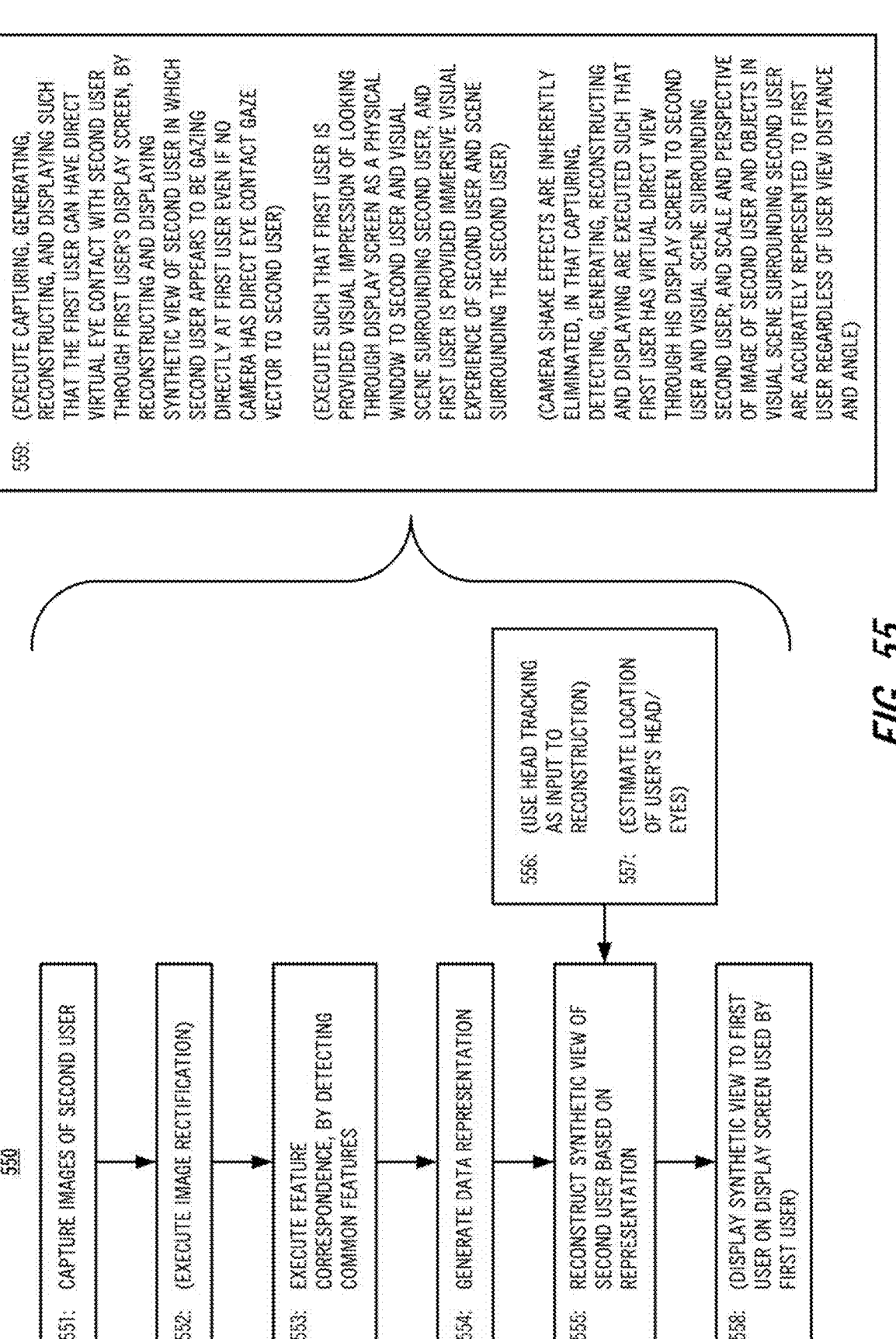

559: (EXECUTE CAPTURING, GENERATING, RECONSTRUCTING, AND DISPLAYING SUCH THAT THE FIRST USER CAN HAVE DIRECT VIRTUAL EYE CONTACT WITH SECOND USER THROUGH FIRST USER'S DISPLAY SCREEN, BY RECONSTRUCTING AND DISPLAYING SYNTHETIC VIEW OF SECOND USER IN WHICH SECOND USER APPEARS TO BE GAZING DIRECTLY AT FIRST USER EVEN IF NO CAMERA HAS DIRECT EYE CONTACT GAZE VECTOR TO SECOND USER)

(EXECUTE SUCH THAT FIRST USER IS PROVIDED VISUAL IMPRESSION OF LOOKING THROUGH DISPLAY SCREEN AS A PHYSICAL WINDOW TO SECOND USER AND VISUAL SCENE SURROUNDING SECOND USER, AND FIRST USER IS PROVIDED IMMERSIVE VISUAL EXPERIENCE OF SECOND USER AND SCENE SURROUNDING THE SECOND USER)

(CAMERA SHAKE EFFECTS ARE INHERENTLY ELIMINATED, IN THAT CAPTURING, DETECTING, GENERATING, RECONSTRUCTING AND DISPLAYING ARE EXECUTED SUCH THAT FIRST USER HAS VIRTUAL DIRECT VIEW THROUGH HIS DISPLAY SCREEN TO SECOND USER AND VISUAL SCENE SURROUNDING SECOND USER, AND SCALE AND PERSPECTIVE OF IMAGE OF SECOND USER AND OBJECTS IN VISUAL SCENE SURROUNDING SECOND USER ARE ACCURATELY REPRESENTED TO FIRST USER REGARDLESS OF USER VIEW DISTANCE AND ANGLE)

556: (USE HEAD TRACKING AS INPUT TO RECONSTRUCTION)

557: (ESTIMATE LOCATION OF USER'S HEAD/EYES)

550

551: CAPTURE IMAGES OF SECOND USER

552: (EXECUTE IMAGE RECTIFICATION)

553: EXECUTE FEATURE CORRESPONDENCE, BY DETECTING COMMON FEATURES

554: GENERATE DATA REPRESENTATION

555: RECONSTRUCT SYNTHETIC VIEW OF SECOND USER BASED ON REPRESENTATION

558: (DISPLAY SYNTHETIC VIEW TO FIRST USER ON DISPLAY SCREEN USED BY FIRST USER)

FIG. 55

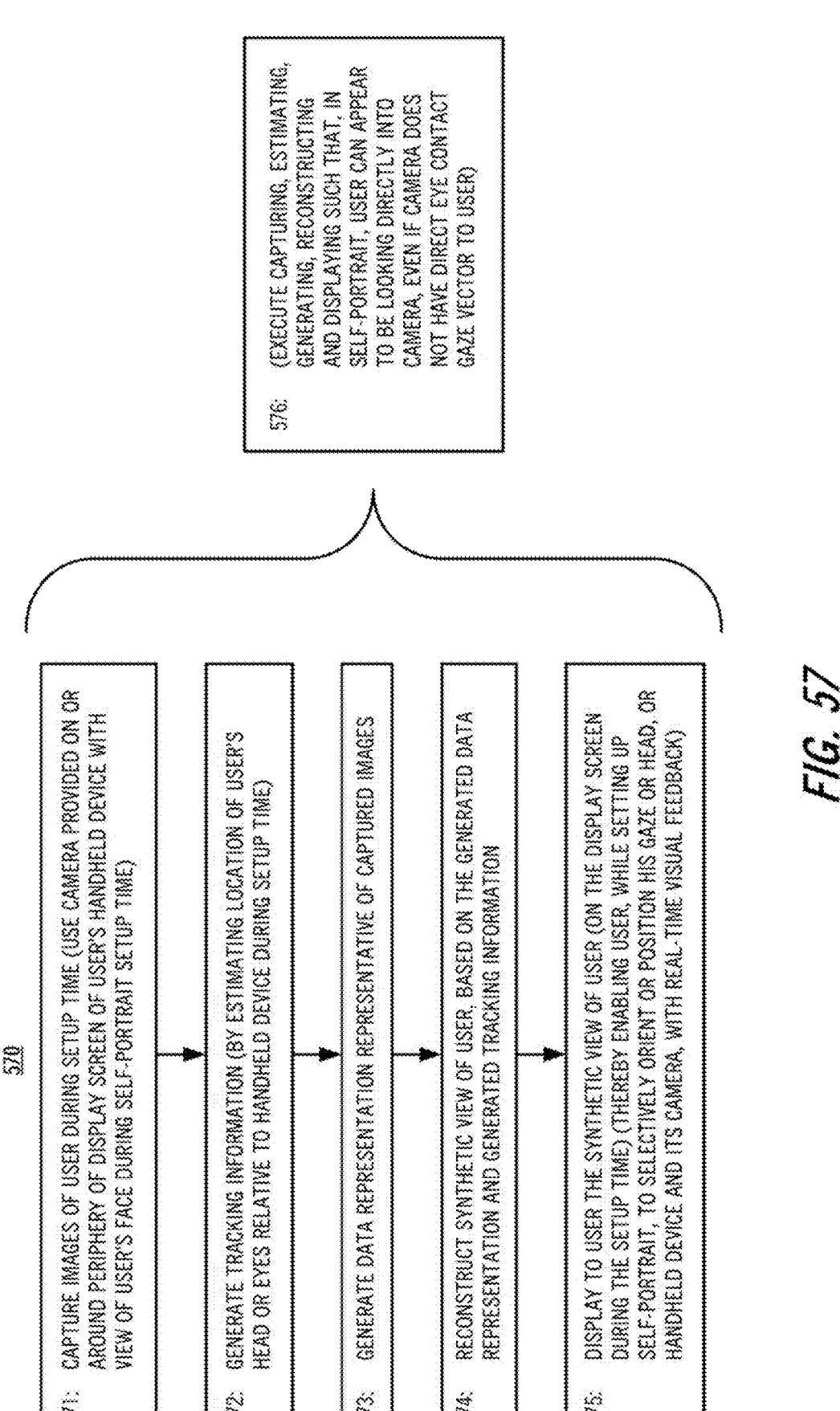

576: (EXECUTE CAPTURING, ESTIMATING, GENERATING, RECONSTRUCTING AND DISPLAYING SUCH THAT, IN SELF-PORTRAIT, USER CAN APPEAR TO BE LOOKING DIRECTLY INTO CAMERA, EVEN IF CAMERA DOES NOT HAVE DIRECT EYE CONTACT GAZE VECTOR TO USER)

570

571: CAPTURE IMAGES OF USER DURING SETUP TIME (USE CAMERA PROVIDED ON OR AROUND PERIPHERY OF DISPLAY SCREEN OF USER'S HANDHELD DEVICE WITH VIEW OF USER'S FACE DURING SELF-PORTRAIT SETUP TIME)

572: GENERATE TRACKING INFORMATION (BY ESTIMATING LOCATION OF USER'S HEAD OR EYES RELATIVE TO HANDHELD DEVICE DURING SETUP TIME)

573: GENERATE DATA REPRESENTATION REPRESENTATIVE OF CAPTURED IMAGES

574: RECONSTRUCT SYNTHETIC VIEW OF USER, BASED ON THE GENERATED DATA REPRESENTATION AND GENERATED TRACKING INFORMATION

575: DISPLAY TO USER THE SYNTHETIC VIEW OF USER (ON THE DISPLAY SCREEN DURING THE SETUP TIME) (THEREBY ENABLING USER, WHILE SETTING UP SELF-PORTRAIT, TO SELECTIVELY ORIENT OR POSITION HIS GAZE OR HEAD, OR HANDHELD DEVICE AND ITS CAMERA, WITH REAL-TIME VISUAL FEEDBACK)

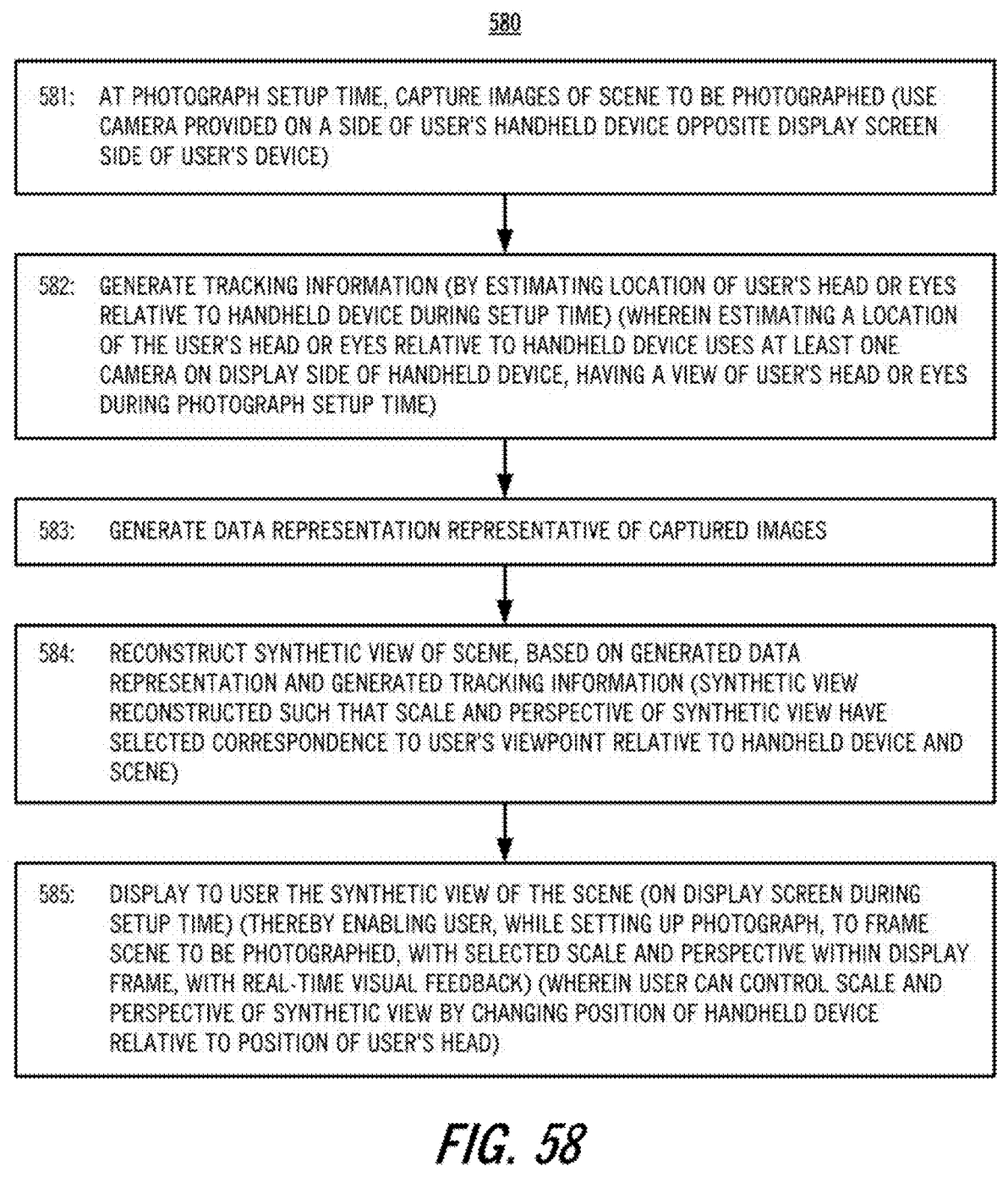

581:    AT PHOTOGRAPH SETUP TIME, CAPTURE IMAGES OF SCENE TO BE PHOTOGRAPHED (USE
CAMERA PROVIDED ON A SIDE OF USER'S HANDHELD DEVICE OPPOSITE DISPLAY SCREEN
SIDE OF USER'S DEVICE)

582:    GENERATE TRACKING INFORMATION (BY ESTIMATING LOCATION OF USER'S HEAD OR EYES
RELATIVE TO HANDHELD DEVICE DURING SETUP TIME) (WHEREIN ESTIMATING A LOCATION
OF THE USER'S HEAD OR EYES RELATIVE TO HANDHELD DEVICE USES AT LEAST ONE
CAMERA ON DISPLAY SIDE OF HANDHELD DEVICE, HAVING A VIEW OF USER'S HEAD OR EYES
DURING PHOTOGRAPH SETUP TIME)

583:    GENERATE DATA REPRESENTATION REPRESENTATIVE OF CAPTURED IMAGES

584:    RECONSTRUCT SYNTHETIC VIEW OF SCENE, BASED ON GENERATED DATA
REPRESENTATION AND GENERATED TRACKING INFORMATION (SYNTHETIC VIEW
RECONSTRUCTED SUCH THAT SCALE AND PERSPECTIVE OF SYNTHETIC VIEW HAVE
SELECTED CORRESPONDENCE TO USER'S VIEWPOINT RELATIVE TO HANDHELD DEVICE AND
SCENE)

585:    DISPLAY TO USER THE SYNTHETIC VIEW OF THE SCENE (ON DISPLAY SCREEN DURING
SETUP TIME) (THEREBY ENABLING USER, WHILE SETTING UP PHOTOGRAPH, TO FRAME
SCENE TO BE PHOTOGRAPHED, WITH SELECTED SCALE AND PERSPECTIVE WITHIN DISPLAY
FRAME, WITH REAL-TIME VISUAL FEEDBACK) (WHEREIN USER CAN CONTROL SCALE AND
PERSPECTIVE OF SYNTHETIC VIEW BY CHANGING POSITION OF HANDHELD DEVICE
RELATIVE TO POSITION OF USER'S HEAD)

FIG. 58

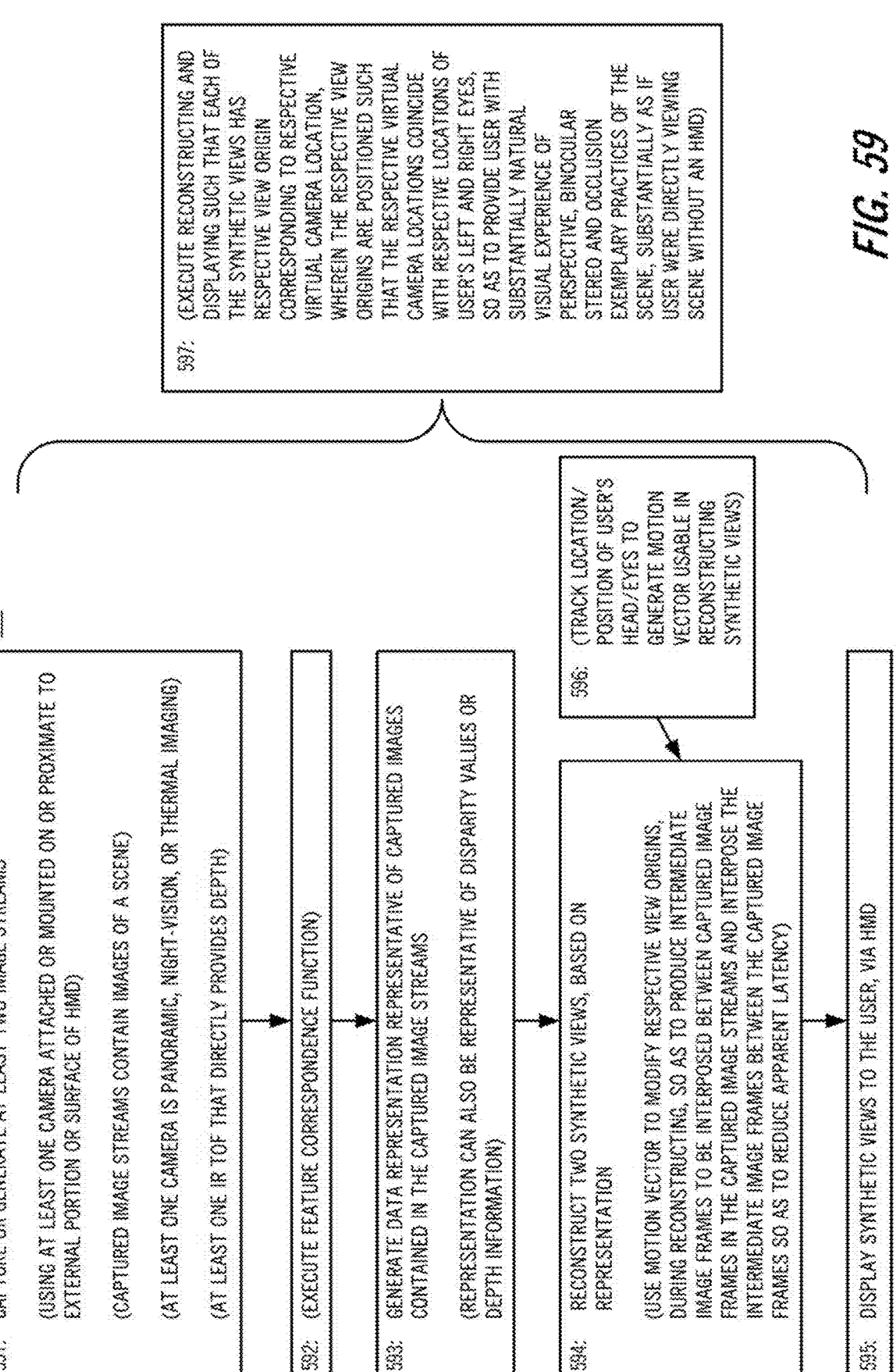

591: CAPTURE OR GENERATE AT LEAST TWO IMAGE STREAMS (USING AT LEAST ONE CAMERA ATTACHED OR MOUNTED ON OR PROXIMATE TO EXTERNAL PORTION OR SURFACE OF HMD)

(CAPTURED IMAGE STREAMS CONTAIN IMAGES OF A SCENE)

(AT LEAST ONE CAMERA IS PANORAMIC, NIGHT-VISION, OR THERMAL IMAGING)

(AT LEAST ONE IR TOF THAT DIRECTLY PROVIDES DEPTH)

592: (EXECUTE FEATURE CORRESPONDENCE FUNCTION)

593: GENERATE DATA REPRESENTATION REPRESENTATIVE OF CAPTURED IMAGES CONTAINED IN THE CAPTURED IMAGE STREAMS (REPRESENTATION CAN ALSO BE REPRESENTATIVE OF DISPARITY VALUES OR DEPTH INFORMATION)

596: (TRACK LOCATION/ POSITION OF USER'S HEAD/EYES TO GENERATE MOTION VECTOR USABLE IN RECONSTRUCTING SYNTHETIC VIEWS)

594: RECONSTRUCT TWO SYNTHETIC VIEWS, BASED ON REPRESENTATION (USE MOTION VECTOR TO MODIFY RESPECTIVE VIEW ORIGINS, DURING RECONSTRUCTING, SO AS TO PRODUCE INTERMEDIATE IMAGE FRAMES TO BE INTERPOSED BETWEEN CAPTURED IMAGE FRAMES IN THE CAPTURED IMAGE STREAMS AND INTERPOSE THE INTERMEDIATE IMAGE FRAMES BETWEEN THE CAPTURED IMAGE FRAMES SO AS TO REDUCE APPARENT LATENCY)

595: DISPLAY SYNTHETIC VIEWS TO THE USER, VIA HMD

597: (EXECUTE RECONSTRUCTING AND DISPLAYING SUCH THAT EACH OF THE SYNTHETIC VIEWS HAS RESPECTIVE VIEW ORIGIN CORRESPONDING TO RESPECTIVE VIRTUAL CAMERA LOCATION, WHEREIN THE RESPECTIVE VIEW ORIGINS ARE POSITIONED SUCH THAT THE RESPECTIVE VIRTUAL CAMERA LOCATIONS COINCIDE WITH RESPECTIVE LOCATIONS OF USER'S LEFT AND RIGHT EYES, SO AS TO PROVIDE USER WITH SUBSTANTIALLY NATURAL VISUAL EXPERIENCE OF PERSPECTIVE, BINOCULAR STEREO AND OCCLUSION EXEMPLARY PRACTICES OF THE SCENE, SUBSTANTIALLY AS IF USER WERE DIRECTLY VIEWING SCENE WITHOUT AN HMD)

610

611:   CAPTURE IMAGES OF SCENE AROUND AT LEAST A PORTION OF VEHICLE (USING AT LEAST ONE CAMERA HAVING A VIEW OF SCENE)

612:   (EXECUTE IMAGE RECTIFICATION)

613:   EXECUTE FEATURE CORRESPONDENCE FUNCTION (BY DETECTING COMMON FEATURES BETWEEN CORRESPONDING IMAGES CAPTURED BY THE AT LEAST ONE CAMERA AND MEASURING A RELATIVE DISTANCE IN IMAGE SPACE BETWEEN COMMON FEATURES, TO GENERATE DISPARITY VALUES)

(DETECT COMMON FEATURES BETWEEN IMAGES CAPTURED BY SINGLE CAMERA OVER TIME)

(DETECT COMMON FEATURES BETWEEN CORRESPONDING IMAGES CAPTURED BY TWO OR MORE CAMERAS)

614:   CALCULATE CORRESPONDING DEPTH INFORMATION BASED ON DISPARITY VALUES (OR OBTAIN DEPTH INFORMATION USING IR TOF CAMERA)

615:   GENERATE FROM THE IMAGES AND CORRESPONDING DEPTH INFORMATION AN IMAGE DATA STREAM FOR USE BY THE VEHICLE CONTROL SYSTEM

Figure 62:
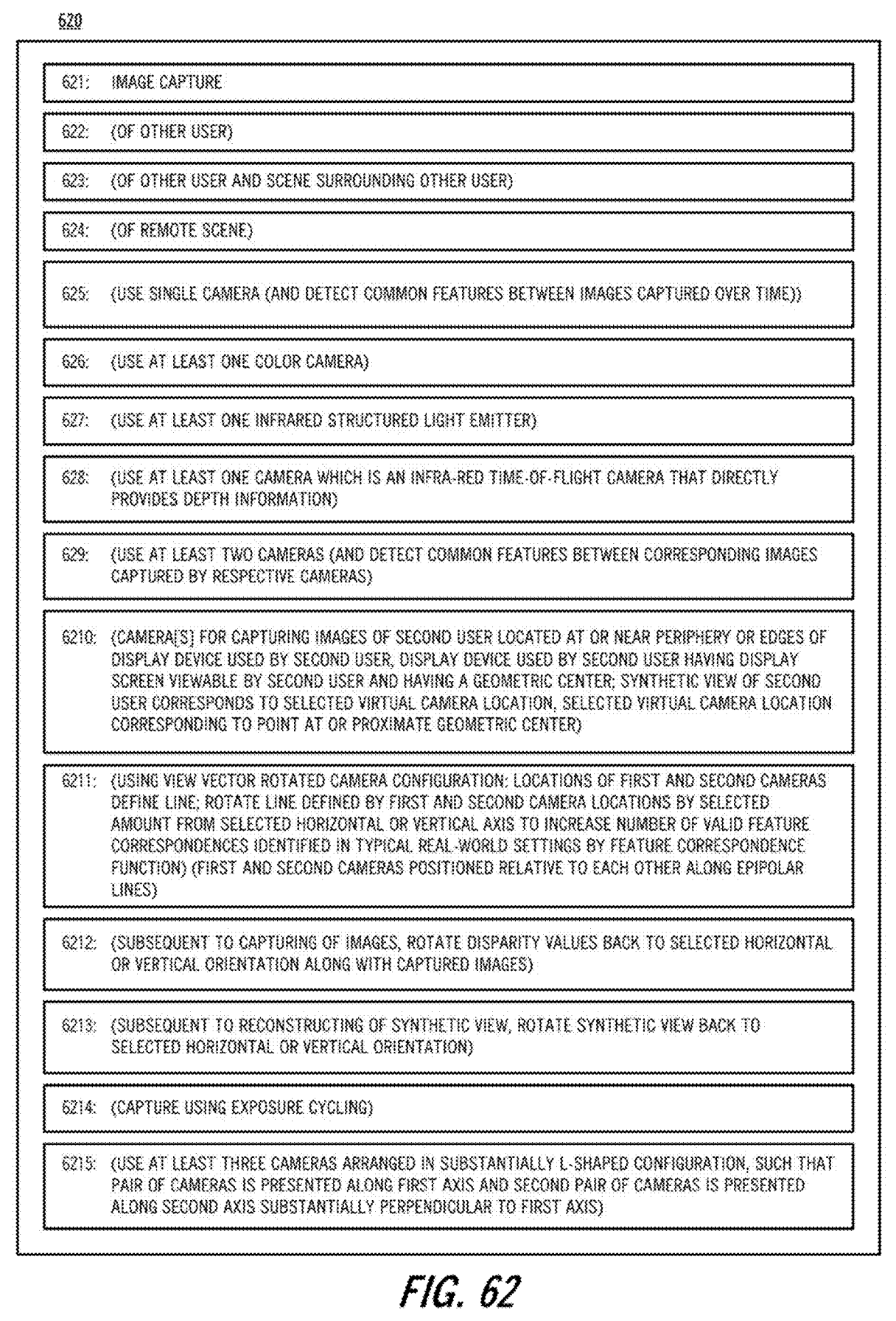

621:  IMAGE CAPTURE

622:  (OF OTHER USER)

623:  (OF OTHER USER AND SCENE SURROUNDING OTHER USER)

624:  (OF REMOTE SCENE)

625:  (USE SINGLE CAMERA (AND DETECT COMMON FEATURES BETWEEN IMAGES CAPTURED OVER TIME))

626:  (USE AT LEAST ONE COLOR CAMERA)

627:  (USE AT LEAST ONE INFRARED STRUCTURED LIGHT EMITTER)

628:  (USE AT LEAST ONE CAMERA WHICH IS AN INFRA-RED TIME-OF-FLIGHT CAMERA THAT DIRECTLY PROVIDES DEPTH INFORMATION)

629:  (USE AT LEAST TWO CAMERAS (AND DETECT COMMON FEATURES BETWEEN CORRESPONDING IMAGES CAPTURED BY RESPECTIVE CAMERAS)

6210:  (CAMERA[S] FOR CAPTURING IMAGES OF SECOND USER LOCATED AT OR NEAR PERIPHERY OR EDGES OF DISPLAY DEVICE USED BY SECOND USER, DISPLAY DEVICE USED BY SECOND USER HAVING DISPLAY SCREEN VIEWABLE BY SECOND USER AND HAVING A GEOMETRIC CENTER; SYNTHETIC VIEW OF SECOND USER CORRESPONDS TO SELECTED VIRTUAL CAMERA LOCATION, SELECTED VIRTUAL CAMERA LOCATION CORRESPONDING TO POINT AT OR PROXIMATE GEOMETRIC CENTER)

6211:  (USING VIEW VECTOR ROTATED CAMERA CONFIGURATION: LOCATIONS OF FIRST AND SECOND CAMERAS DEFINE LINE; ROTATE LINE DEFINED BY FIRST AND SECOND CAMERA LOCATIONS BY SELECTED AMOUNT FROM SELECTED HORIZONTAL OR VERTICAL AXIS TO INCREASE NUMBER OF VALID FEATURE CORRESPONDENCES IDENTIFIED IN TYPICAL REAL-WORLD SETTINGS BY FEATURE CORRESPONDENCE FUNCTION) (FIRST AND SECOND CAMERAS POSITIONED RELATIVE TO EACH OTHER ALONG EPIPOLAR LINES)

6212:  (SUBSEQUENT TO CAPTURING OF IMAGES, ROTATE DISPARITY VALUES BACK TO SELECTED HORIZONTAL OR VERTICAL ORIENTATION ALONG WITH CAPTURED IMAGES)

6213:  (SUBSEQUENT TO RECONSTRUCTING OF SYNTHETIC VIEW, ROTATE SYNTHETIC VIEW BACK TO SELECTED HORIZONTAL OR VERTICAL ORIENTATION)

6214:  (CAPTURE USING EXPOSURE CYCLING)

6215:  (USE AT LEAST THREE CAMERAS ARRANGED IN SUBSTANTIALLY L-SHAPED CONFIGURATION, SUCH THAT PAIR OF CAMERAS IS PRESENTED ALONG FIRST AXIS AND SECOND PAIR OF CAMERAS IS PRESENTED ALONG SECOND AXIS SUBSTANTIALLY PERPENDICULAR TO FIRST AXIS)

631:   (DYNAMICALLY ADJUST EXPOSURE OF CAMERA(S) ON FRAME-BY-FRAME BASIS TO IMPROVE DISPARITY ESTIMATION IN REGIONS OUTSIDE EXPOSED REGION: TAKE SERIES OF EXPOSURES, INCLUDING EXPOSURES LIGHTER THAN AND EXPOSURES DARKER THAN A VISIBILITY-OPTIMAL EXPOSURE; CALCULATE DISPARITY VALUES FOR EACH EXPOSURE; AND INTEGRATE DISPARITY VALUES INTO AN OVERALL DISPARITY SOLUTION OVER TIME, TO IMPROVE DISPARITY ESTIMATION)

632:   (OVERALL DISPARITY SOLUTION INCLUDES A DISPARITY HISTOGRAM INTO WHICH DISPARITY VALUES ARE INTEGRATED, THE DISPARITY HISTOGRAM BEING CONVERGED OVER TIME, SO AS TO IMPROVE DISPARITY ESTIMATION)

633:   (ANALYZE QUALITY OF OVERALL DISPARITY SOLUTION ON RESPECTIVE DARK, MID-RANGE AND LIGHT PIXELS TO GENERATE VARIANCE INFORMATION USED TO CONTROL EXPOSURE SETTINGS OF THE CAMERA(S), THEREBY TO FORM A CLOSED LOOP BETWEEN QUALITY OF THE DISPARITY ESTIMATE AND SET OF EXPOSURES REQUESTED FROM CAMERA(S))

634:   (OVERALL DISPARITY SOLUTION INCLUDES DISPARITY HISTOGRAM: ANALYZE VARIANCE OF DISPARITY HISTOGRAMS ON RESPECTIVE DARK, MID-RANGE AND LIGHT PIXELS TO GENERATE VARIANCE INFORMATION USED TO CONTROL EXPOSURE SETTINGS OF CAMERA(S), THEREBY TO FORM A CLOSED LOOP BETWEEN QUALITY OF DISPARITY ESTIMATE AND SET OF EXPOSURES REQUESTED FROM CAMERA(S))

641:   IMAGE RECTIFICATION

642:   (TO COMPENSATE FOR OPTICAL DISTORTION OF EACH CAMERA AND RELATIVE MISALIGNMENT OF THE CAMERAS)

643:   (EXECUTING IMAGE RECTIFICATION INCLUDES APPLYING 2D IMAGE SPACE TRANSFORM)

644:   (APPLYING 2D IMAGE SPACE TRANSFORM INCLUDES USING GPGPU PROCESSOR RUNNING SHADER PROGRAM)

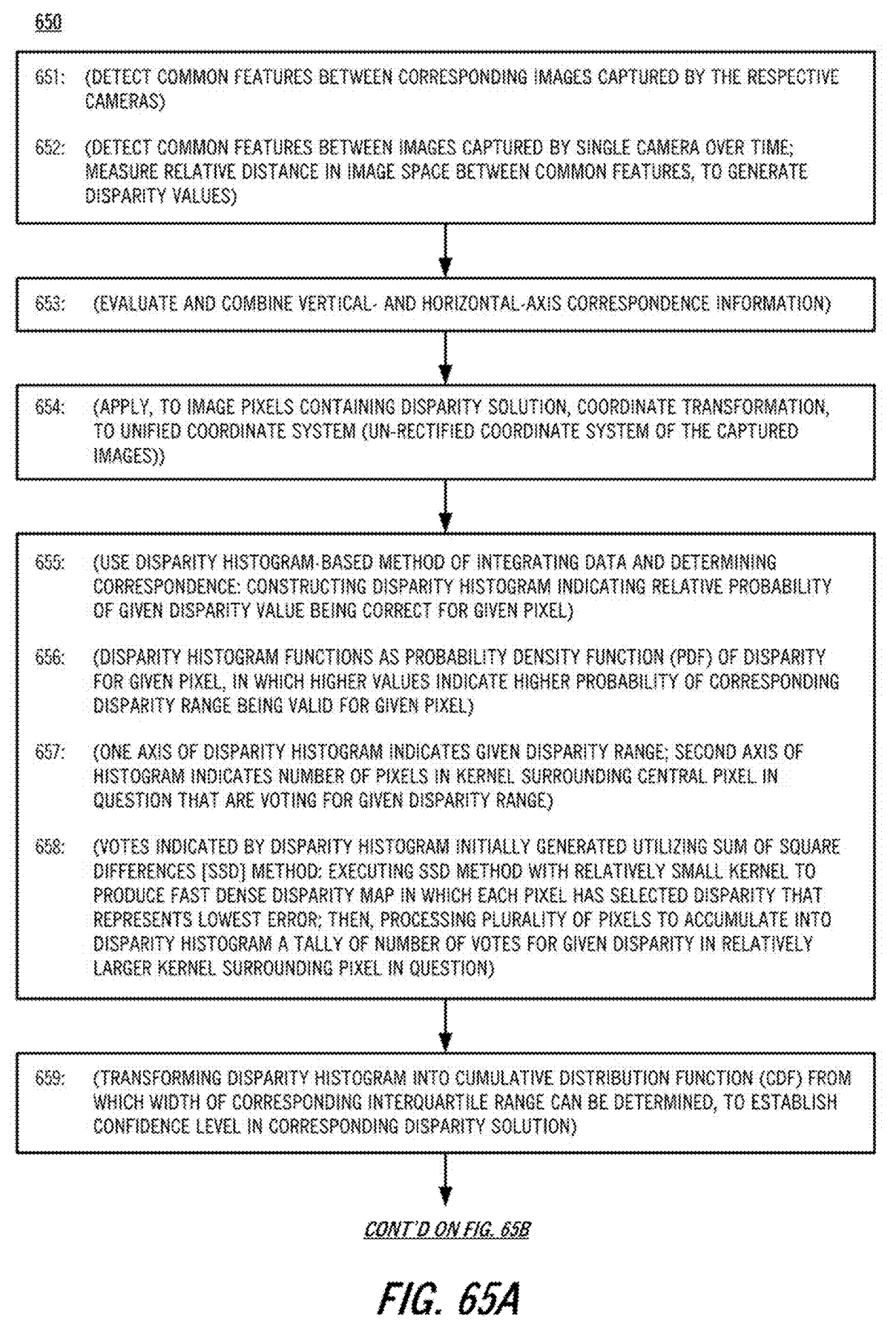

651:  (DETECT COMMON FEATURES BETWEEN CORRESPONDING IMAGES CAPTURED BY THE RESPECTIVE CAMERAS)

652:  (DETECT COMMON FEATURES BETWEEN IMAGES CAPTURED BY SINGLE CAMERA OVER TIME; MEASURE RELATIVE DISTANCE IN IMAGE SPACE BETWEEN COMMON FEATURES, TO GENERATE DISPARITY VALUES)

653:  (EVALUATE AND COMBINE VERTICAL- AND HORIZONTAL-AXIS CORRESPONDENCE INFORMATION)

654:  (APPLY, TO IMAGE PIXELS CONTAINING DISPARITY SOLUTION, COORDINATE TRANSFORMATION, TO UNIFIED COORDINATE SYSTEM (UN-RECTIFIED COORDINATE SYSTEM OF THE CAPTURED IMAGES))

655:  (USE DISPARITY HISTOGRAM-BASED METHOD OF INTEGRATING DATA AND DETERMINING CORRESPONDENCE: CONSTRUCTING DISPARITY HISTOGRAM INDICATING RELATIVE PROBABILITY OF GIVEN DISPARITY VALUE BEING CORRECT FOR GIVEN PIXEL)

656:  (DISPARITY HISTOGRAM FUNCTIONS AS PROBABILITY DENSITY FUNCTION (PDF) OF DISPARITY FOR GIVEN PIXEL, IN WHICH HIGHER VALUES INDICATE HIGHER PROBABILITY OF CORRESPONDING DISPARITY RANGE BEING VALID FOR GIVEN PIXEL)

657:  (ONE AXIS OF DISPARITY HISTOGRAM INDICATES GIVEN DISPARITY RANGE; SECOND AXIS OF HISTOGRAM INDICATES NUMBER OF PIXELS IN KERNEL SURROUNDING CENTRAL PIXEL IN QUESTION THAT ARE VOTING FOR GIVEN DISPARITY RANGE)

658:  (VOTES INDICATED BY DISPARITY HISTOGRAM INITIALLY GENERATED UTILIZING SUM OF SQUARE DIFFERENCES [SSD] METHOD: EXECUTING SSD METHOD WITH RELATIVELY SMALL KERNEL TO PRODUCE FAST DENSE DISPARITY MAP IN WHICH EACH PIXEL HAS SELECTED DISPARITY THAT REPRESENTS LOWEST ERROR; THEN, PROCESSING PLURALITY OF PIXELS TO ACCUMULATE INTO DISPARITY HISTOGRAM A TALLY OF NUMBER OF VOTES FOR GIVEN DISPARITY IN RELATIVELY LARGER KERNEL SURROUNDING PIXEL IN QUESTION)

659:  (TRANSFORMING DISPARITY HISTOGRAM INTO CUMULATIVE DISTRIBUTION FUNCTION (CDF) FROM WHICH WIDTH OF CORRESPONDING INTERQUARTILE RANGE CAN BE DETERMINED, TO ESTABLISH CONFIDENCE LEVEL IN CORRESPONDING DISPARITY SOLUTION)

*FIG. 65A*

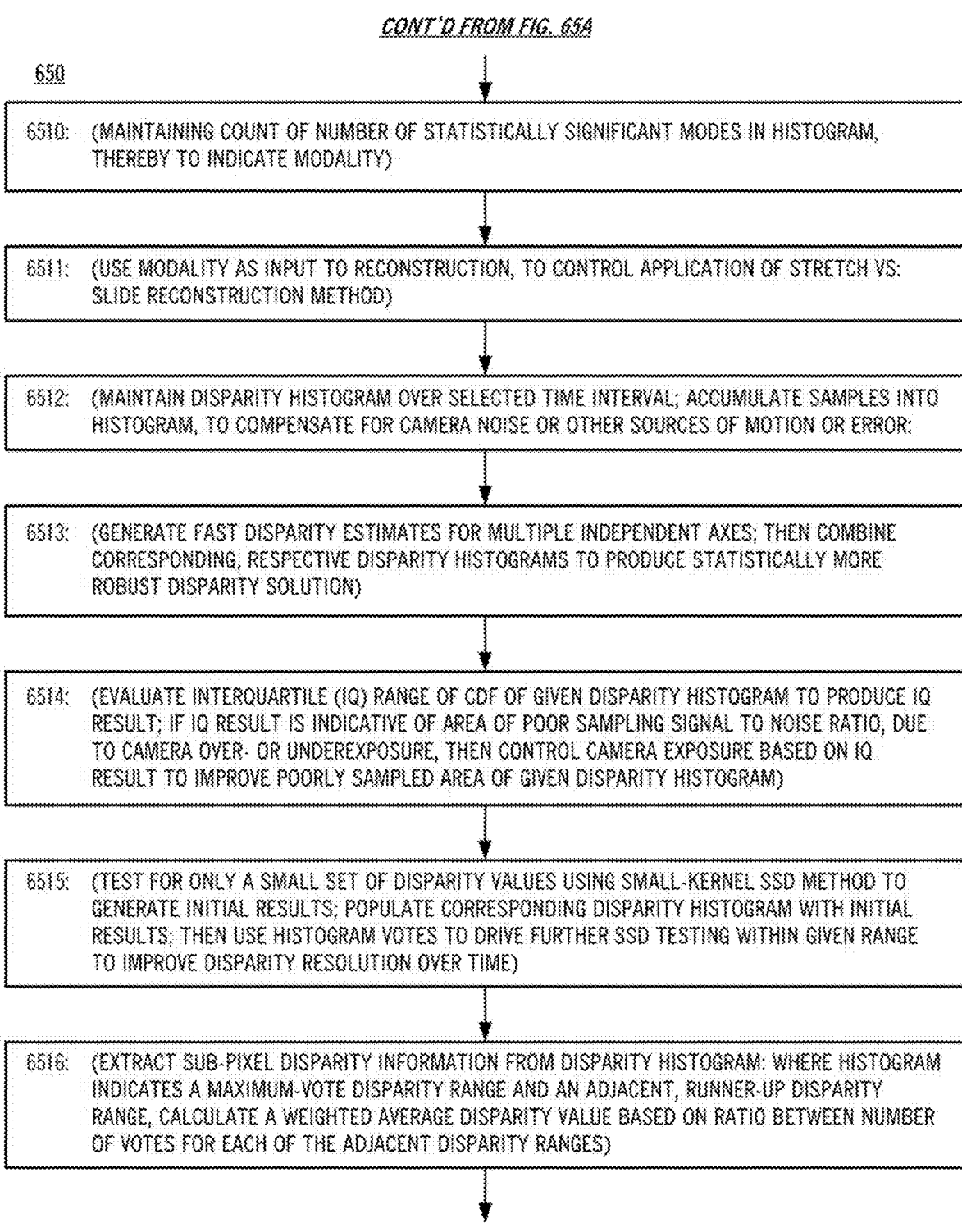

650

6510: (MAINTAINING COUNT OF NUMBER OF STATISTICALLY SIGNIFICANT MODES IN HISTOGRAM, THEREBY TO INDICATE MODALITY)

6511: (USE MODALITY AS INPUT TO RECONSTRUCTION, TO CONTROL APPLICATION OF STRETCH VS. SLIDE RECONSTRUCTION METHOD)

6512: (MAINTAIN DISPARITY HISTOGRAM OVER SELECTED TIME INTERVAL; ACCUMULATE SAMPLES INTO HISTOGRAM, TO COMPENSATE FOR CAMERA NOISE OR OTHER SOURCES OF MOTION OR ERROR:

6513: (GENERATE FAST DISPARITY ESTIMATES FOR MULTIPLE INDEPENDENT AXES; THEN COMBINE CORRESPONDING, RESPECTIVE DISPARITY HISTOGRAMS TO PRODUCE STATISTICALLY MORE ROBUST DISPARITY SOLUTION)

6514: (EVALUATE INTERQUARTILE (IQ) RANGE OF CDF OF GIVEN DISPARITY HISTOGRAM TO PRODUCE IQ RESULT; IF IQ RESULT IS INDICATIVE OF AREA OF POOR SAMPLING SIGNAL TO NOISE RATIO, DUE TO CAMERA OVER- OR UNDEREXPOSURE, THEN CONTROL CAMERA EXPOSURE BASED ON IQ RESULT TO IMPROVE POORLY SAMPLED AREA OF GIVEN DISPARITY HISTOGRAM)

6515: (TEST FOR ONLY A SMALL SET OF DISPARITY VALUES USING SMALL-KERNEL SSD METHOD TO GENERATE INITIAL RESULTS; POPULATE CORRESPONDING DISPARITY HISTOGRAM WITH INITIAL RESULTS; THEN USE HISTOGRAM VOTES TO DRIVE FURTHER SSD TESTING WITHIN GIVEN RANGE TO IMPROVE DISPARITY RESOLUTION OVER TIME)

6516: (EXTRACT SUB-PIXEL DISPARITY INFORMATION FROM DISPARITY HISTOGRAM: WHERE HISTOGRAM INDICATES A MAXIMUM-VOTE DISPARITY RANGE AND AN ADJACENT, RUNNER-UP DISPARITY RANGE, CALCULATE A WEIGHTED AVERAGE DISPARITY VALUE BASED ON RATIO BETWEEN NUMBER OF VOTES FOR EACH OF THE ADJACENT DISPARITY RANGES)

FIG. 65B

Figure 65C:
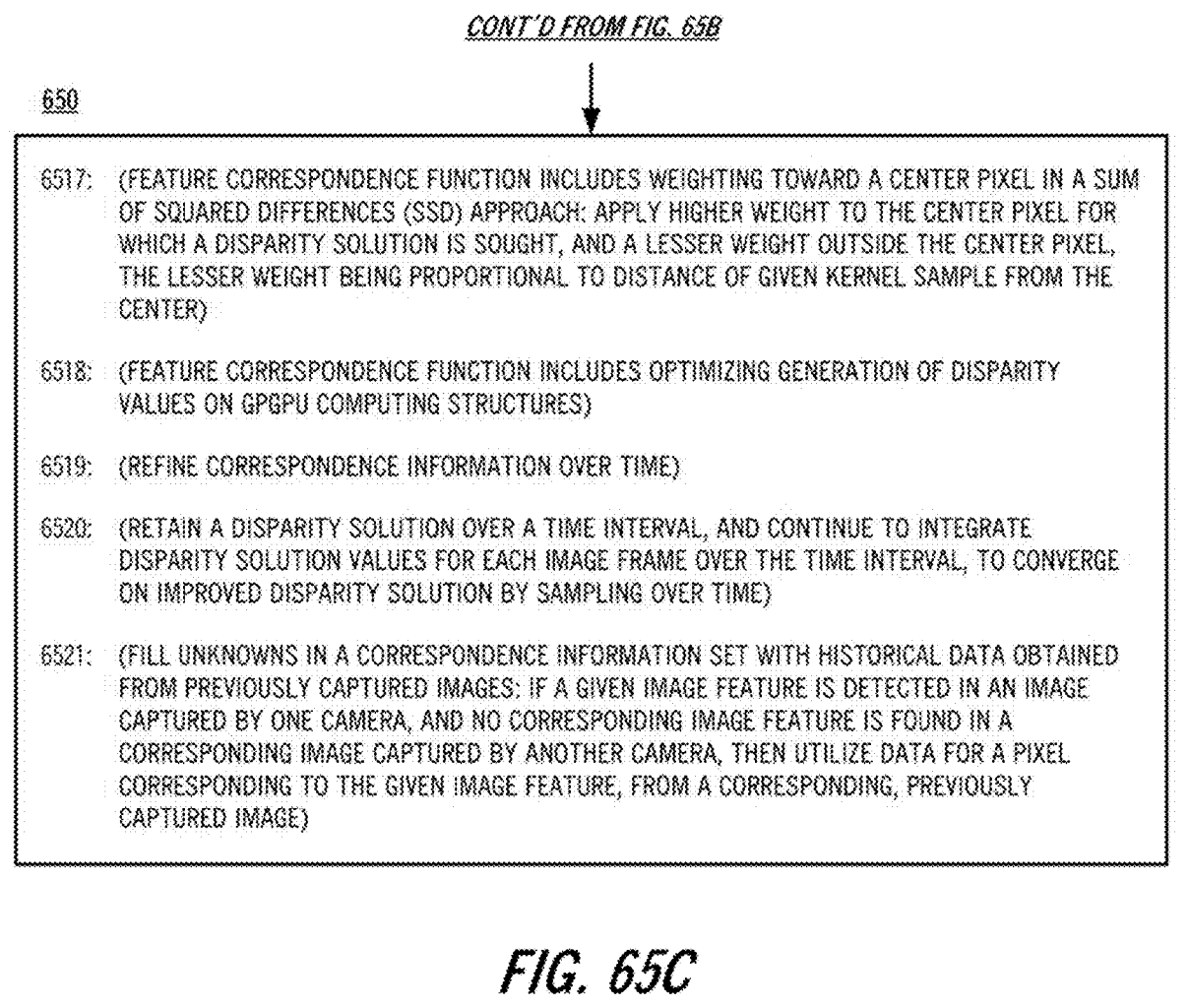

*CONT'D FROM FIG. 65B*

650

↓

6517:   (FEATURE CORRESPONDENCE FUNCTION INCLUDES WEIGHTING TOWARD A CENTER PIXEL IN A SUM
         OF SQUARED DIFFERENCES (SSD) APPROACH: APPLY HIGHER WEIGHT TO THE CENTER PIXEL FOR
         WHICH A DISPARITY SOLUTION IS SOUGHT, AND A LESSER WEIGHT OUTSIDE THE CENTER PIXEL,
         THE LESSER WEIGHT BEING PROPORTIONAL TO DISTANCE OF GIVEN KERNEL SAMPLE FROM THE
         CENTER)

6518:   (FEATURE CORRESPONDENCE FUNCTION INCLUDES OPTIMIZING GENERATION OF DISPARITY
         VALUES ON GPGPU COMPUTING STRUCTURES)

6519:   (REFINE CORRESPONDENCE INFORMATION OVER TIME)

6520:   (RETAIN A DISPARITY SOLUTION OVER A TIME INTERVAL, AND CONTINUE TO INTEGRATE
         DISPARITY SOLUTION VALUES FOR EACH IMAGE FRAME OVER THE TIME INTERVAL, TO CONVERGE
         ON IMPROVED DISPARITY SOLUTION BY SAMPLING OVER TIME)

6521:   (FILL UNKNOWNS IN A CORRESPONDENCE INFORMATION SET WITH HISTORICAL DATA OBTAINED
         FROM PREVIOUSLY CAPTURED IMAGES: IF A GIVEN IMAGE FEATURE IS DETECTED IN AN IMAGE
         CAPTURED BY ONE CAMERA, AND NO CORRESPONDING IMAGE FEATURE IS FOUND IN A
         CORRESPONDING IMAGE CAPTURED BY ANOTHER CAMERA, THEN UTILIZE DATA FOR A PIXEL
         CORRESPONDING TO THE GIVEN IMAGE FEATURE, FROM A CORRESPONDING, PREVIOUSLY
         CAPTURED IMAGE)

Figure 66:
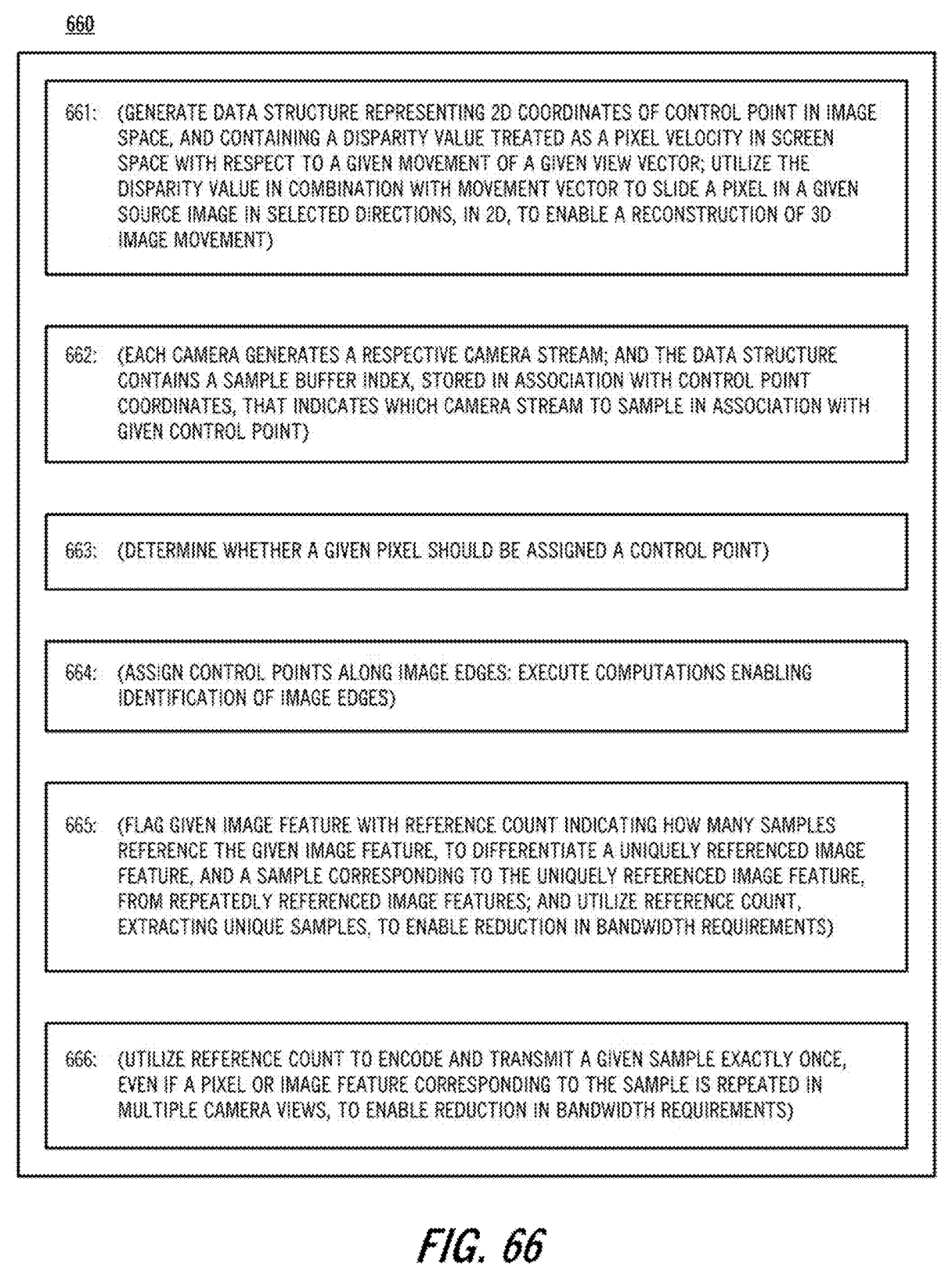

661:  (GENERATE DATA STRUCTURE REPRESENTING 2D COORDINATES OF CONTROL POINT IN IMAGE SPACE, AND CONTAINING A DISPARITY VALUE TREATED AS A PIXEL VELOCITY IN SCREEN SPACE WITH RESPECT TO A GIVEN MOVEMENT OF A GIVEN VIEW VECTOR; UTILIZE THE DISPARITY VALUE IN COMBINATION WITH MOVEMENT VECTOR TO SLIDE A PIXEL IN A GIVEN SOURCE IMAGE IN SELECTED DIRECTIONS, IN 2D, TO ENABLE A RECONSTRUCTION OF 3D IMAGE MOVEMENT)

662:  (EACH CAMERA GENERATES A RESPECTIVE CAMERA STREAM; AND THE DATA STRUCTURE CONTAINS A SAMPLE BUFFER INDEX, STORED IN ASSOCIATION WITH CONTROL POINT COORDINATES, THAT INDICATES WHICH CAMERA STREAM TO SAMPLE IN ASSOCIATION WITH GIVEN CONTROL POINT)

663:  (DETERMINE WHETHER A GIVEN PIXEL SHOULD BE ASSIGNED A CONTROL POINT)

664:  (ASSIGN CONTROL POINTS ALONG IMAGE EDGES; EXECUTE COMPUTATIONS ENABLING IDENTIFICATION OF IMAGE EDGES)

665:  (FLAG GIVEN IMAGE FEATURE WITH REFERENCE COUNT INDICATING HOW MANY SAMPLES REFERENCE THE GIVEN IMAGE FEATURE, TO DIFFERENTIATE A UNIQUELY REFERENCED IMAGE FEATURE, AND A SAMPLE CORRESPONDING TO THE UNIQUELY REFERENCED IMAGE FEATURE, FROM REPEATEDLY REFERENCED IMAGE FEATURES; AND UTILIZE REFERENCE COUNT, EXTRACTING UNIQUE SAMPLES, TO ENABLE REDUCTION IN BANDWIDTH REQUIREMENTS)

666:  (UTILIZE REFERENCE COUNT TO ENCODE AND TRANSMIT A GIVEN SAMPLE EXACTLY ONCE, EVEN IF A PIXEL OR IMAGE FEATURE CORRESPONDING TO THE SAMPLE IS REPEATED IN MULTIPLE CAMERA VIEWS, TO ENABLE REDUCTION IN BANDWIDTH REQUIREMENTS)

Figure 67A:
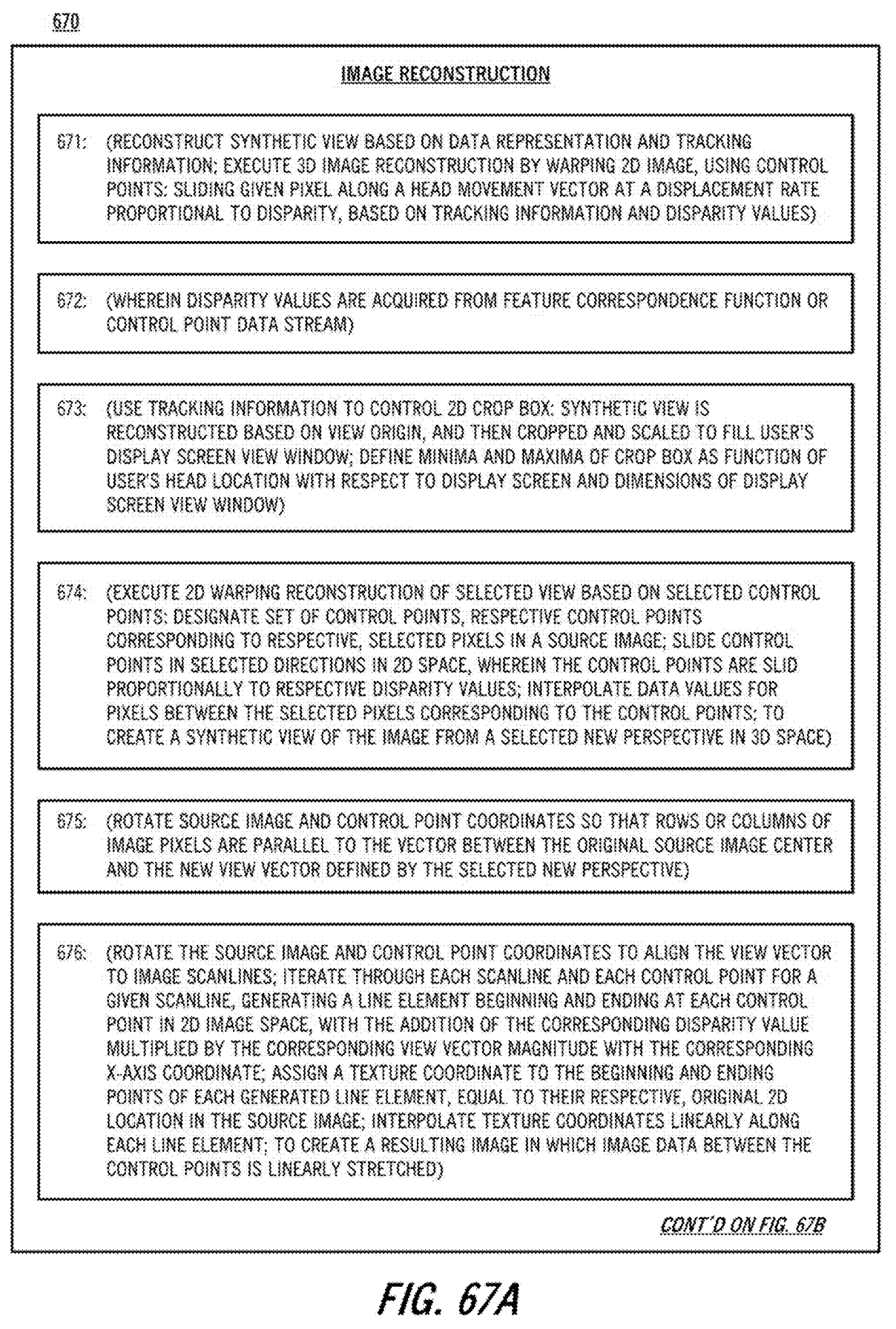

IMAGE RECONSTRUCTION

671:  (RECONSTRUCT SYNTHETIC VIEW BASED ON DATA REPRESENTATION AND TRACKING INFORMATION; EXECUTE 3D IMAGE RECONSTRUCTION BY WARPING 2D IMAGE, USING CONTROL POINTS; SLIDING GIVEN PIXEL ALONG A HEAD MOVEMENT VECTOR AT A DISPLACEMENT RATE PROPORTIONAL TO DISPARITY, BASED ON TRACKING INFORMATION AND DISPARITY VALUES)

672:  (WHEREIN DISPARITY VALUES ARE ACQUIRED FROM FEATURE CORRESPONDENCE FUNCTION OR CONTROL POINT DATA STREAM)

673:  (USE TRACKING INFORMATION TO CONTROL 2D CROP BOX; SYNTHETIC VIEW IS RECONSTRUCTED BASED ON VIEW ORIGIN, AND THEN CROPPED AND SCALED TO FILL USER'S DISPLAY SCREEN VIEW WINDOW; DEFINE MINIMA AND MAXIMA OF CROP BOX AS FUNCTION OF USER'S HEAD LOCATION WITH RESPECT TO DISPLAY SCREEN AND DIMENSIONS OF DISPLAY SCREEN VIEW WINDOW)

674:  (EXECUTE 2D WARPING RECONSTRUCTION OF SELECTED VIEW BASED ON SELECTED CONTROL POINTS; DESIGNATE SET OF CONTROL POINTS, RESPECTIVE CONTROL POINTS CORRESPONDING TO RESPECTIVE, SELECTED PIXELS IN A SOURCE IMAGE; SLIDE CONTROL POINTS IN SELECTED DIRECTIONS IN 2D SPACE, WHEREIN THE CONTROL POINTS ARE SLID PROPORTIONALLY TO RESPECTIVE DISPARITY VALUES; INTERPOLATE DATA VALUES FOR PIXELS BETWEEN THE SELECTED PIXELS CORRESPONDING TO THE CONTROL POINTS; TO CREATE A SYNTHETIC VIEW OF THE IMAGE FROM A SELECTED NEW PERSPECTIVE IN 3D SPACE)

675:  (ROTATE SOURCE IMAGE AND CONTROL POINT COORDINATES SO THAT ROWS OR COLUMNS OF IMAGE PIXELS ARE PARALLEL TO THE VECTOR BETWEEN THE ORIGINAL SOURCE IMAGE CENTER AND THE NEW VIEW VECTOR DEFINED BY THE SELECTED NEW PERSPECTIVE)

676:  (ROTATE THE SOURCE IMAGE AND CONTROL POINT COORDINATES TO ALIGN THE VIEW VECTOR TO IMAGE SCANLINES; ITERATE THROUGH EACH SCANLINE AND EACH CONTROL POINT FOR A GIVEN SCANLINE, GENERATING A LINE ELEMENT BEGINNING AND ENDING AT EACH CONTROL POINT IN 2D IMAGE SPACE, WITH THE ADDITION OF THE CORRESPONDING DISPARITY VALUE MULTIPLIED BY THE CORRESPONDING VIEW VECTOR MAGNITUDE WITH THE CORRESPONDING X-AXIS COORDINATE; ASSIGN A TEXTURE COORDINATE TO THE BEGINNING AND ENDING POINTS OF EACH GENERATED LINE ELEMENT, EQUAL TO THEIR RESPECTIVE, ORIGINAL 2D LOCATION IN THE SOURCE IMAGE; INTERPOLATE TEXTURE COORDINATES LINEARLY ALONG EACH LINE ELEMENT; TO CREATE A RESULTING IMAGE IN WHICH IMAGE DATA BETWEEN THE CONTROL POINTS IS LINEARLY STRETCHED)

Figure 67B:
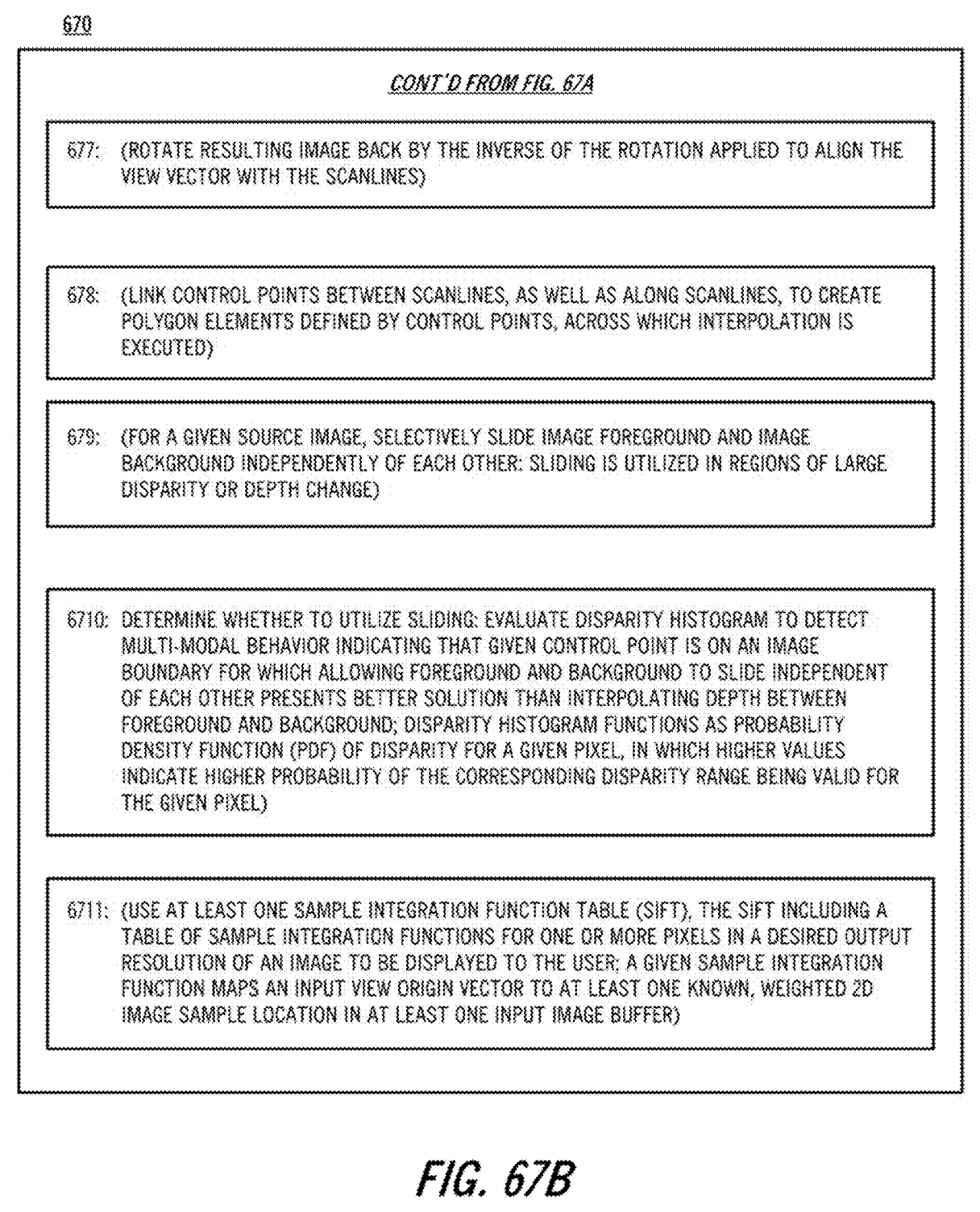

CONT'D FROM FIG. 67A

677:  (ROTATE RESULTING IMAGE BACK BY THE INVERSE OF THE ROTATION APPLIED TO ALIGN THE
VIEW VECTOR WITH THE SCANLINES)

678:  (LINK CONTROL POINTS BETWEEN SCANLINES, AS WELL AS ALONG SCANLINES, TO CREATE
POLYGON ELEMENTS DEFINED BY CONTROL POINTS, ACROSS WHICH INTERPOLATION IS
EXECUTED)

679:  (FOR A GIVEN SOURCE IMAGE, SELECTIVELY SLIDE IMAGE FOREGROUND AND IMAGE
BACKGROUND INDEPENDENTLY OF EACH OTHER; SLIDING IS UTILIZED IN REGIONS OF LARGE
DISPARITY OR DEPTH CHANGE)

6710:  DETERMINE WHETHER TO UTILIZE SLIDING; EVALUATE DISPARITY HISTOGRAM TO DETECT
MULTI-MODAL BEHAVIOR INDICATING THAT GIVEN CONTROL POINT IS ON AN IMAGE
BOUNDARY FOR WHICH ALLOWING FOREGROUND AND BACKGROUND TO SLIDE INDEPENDENT
OF EACH OTHER PRESENTS BETTER SOLUTION THAN INTERPOLATING DEPTH BETWEEN
FOREGROUND AND BACKGROUND; DISPARITY HISTOGRAM FUNCTIONS AS PROBABILITY
DENSITY FUNCTION (PDF) OF DISPARITY FOR A GIVEN PIXEL, IN WHICH HIGHER VALUES
INDICATE HIGHER PROBABILITY OF THE CORRESPONDING DISPARITY RANGE BEING VALID FOR
THE GIVEN PIXEL)

6711:  (USE AT LEAST ONE SAMPLE INTEGRATION FUNCTION TABLE (SIFT), THE SIFT INCLUDING A
TABLE OF SAMPLE INTEGRATION FUNCTIONS FOR ONE OR MORE PIXELS IN A DESIRED OUTPUT
RESOLUTION OF AN IMAGE TO BE DISPLAYED TO THE USER; A GIVEN SAMPLE INTEGRATION
FUNCTION MAPS AN INPUT VIEW ORIGIN VECTOR TO AT LEAST ONE KNOWN, WEIGHTED 2D
IMAGE SAMPLE LOCATION IN AT LEAST ONE INPUT IMAGE BUFFER)

Figure 68:
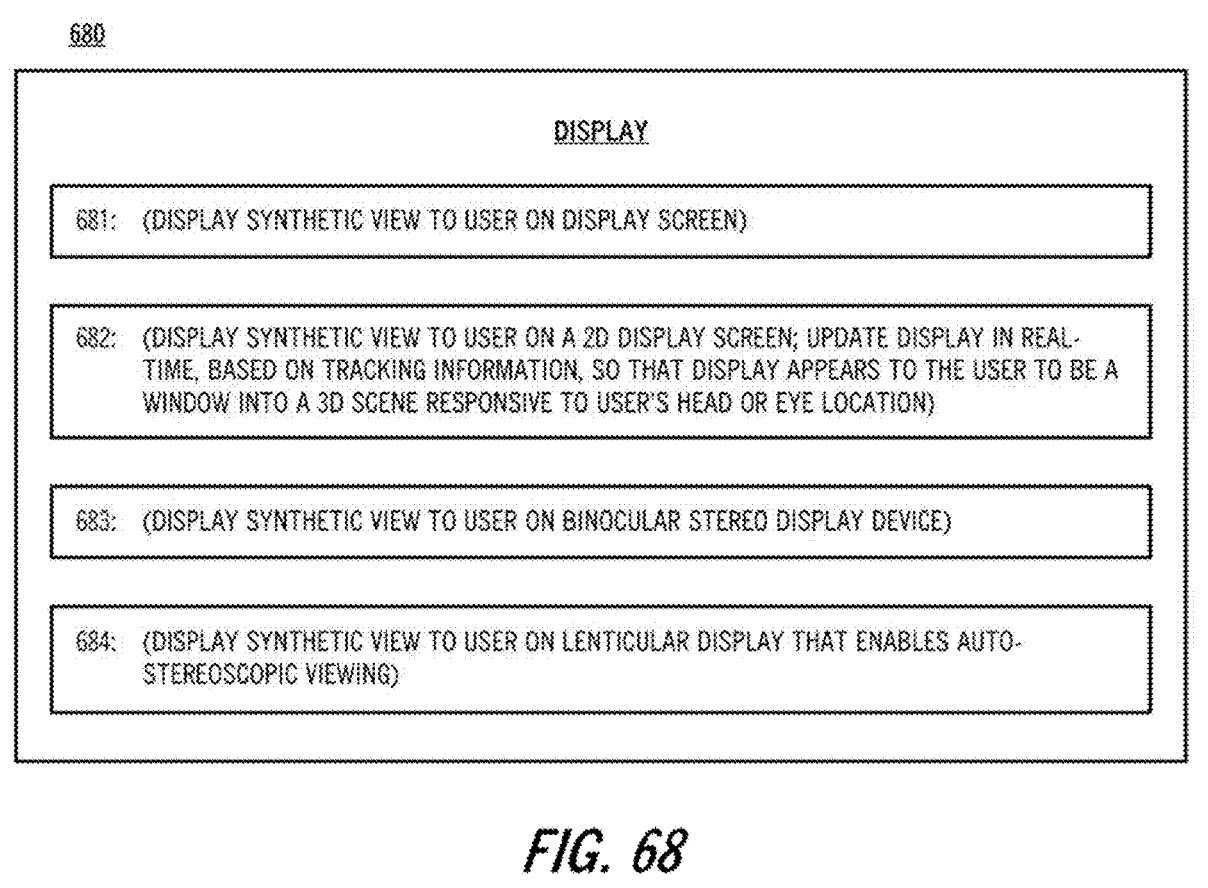

DISPLAY

681:   (DISPLAY SYNTHETIC VIEW TO USER ON DISPLAY SCREEN)

682:   (DISPLAY SYNTHETIC VIEW TO USER ON A 2D DISPLAY SCREEN; UPDATE DISPLAY IN REAL-
       TIME, BASED ON TRACKING INFORMATION, SO THAT DISPLAY APPEARS TO THE USER TO BE A
       WINDOW INTO A 3D SCENE RESPONSIVE TO USER'S HEAD OR EYE LOCATION)

683:   (DISPLAY SYNTHETIC VIEW TO USER ON BINOCULAR STEREO DISPLAY DEVICE)

684:   (DISPLAY SYNTHETIC VIEW TO USER ON LENTICULAR DISPLAY THAT ENABLES AUTO-
       STEREOSCOPIC VIEWING)

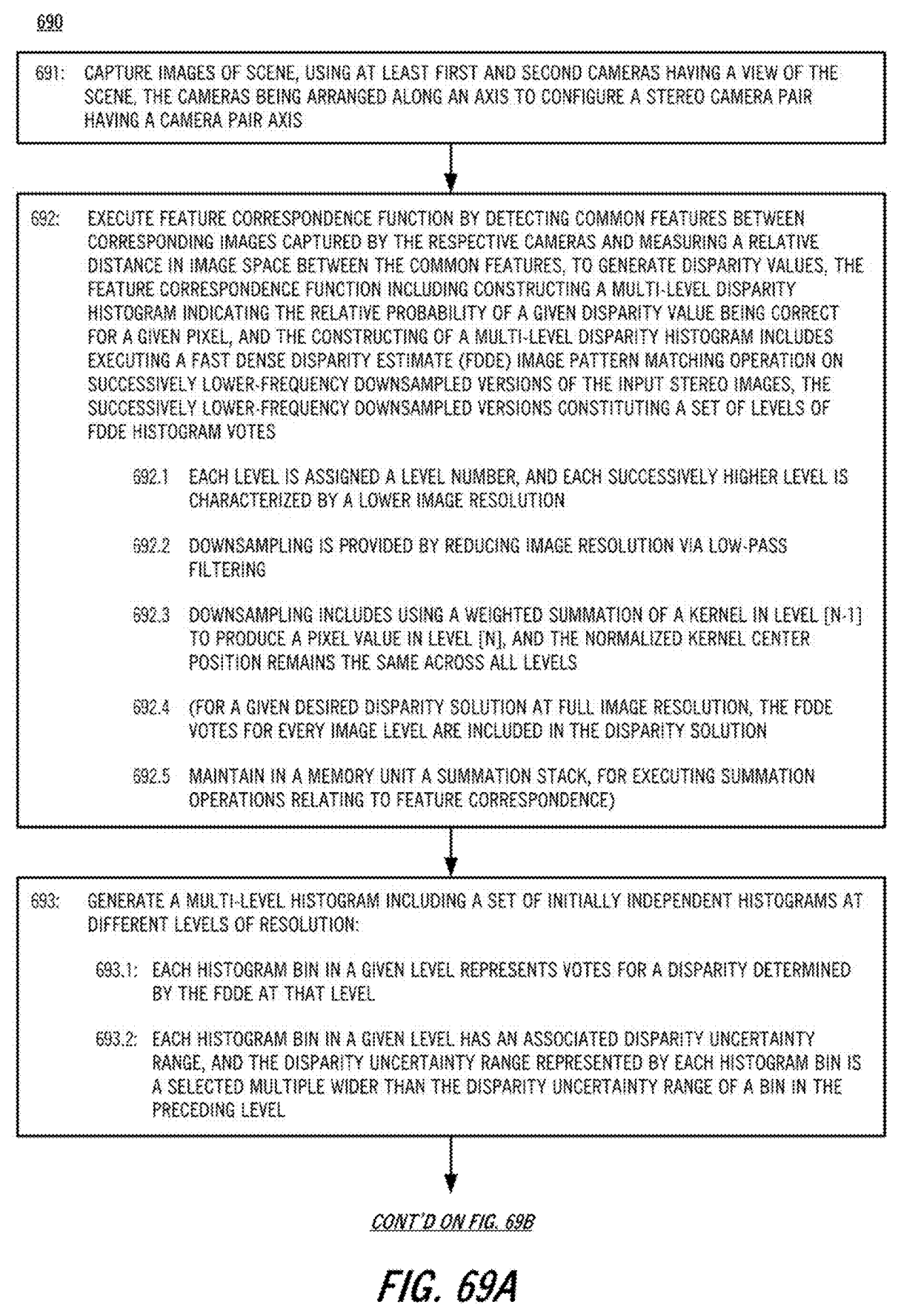

691: CAPTURE IMAGES OF SCENE, USING AT LEAST FIRST AND SECOND CAMERAS HAVING A VIEW OF THE SCENE, THE CAMERAS BEING ARRANGED ALONG AN AXIS TO CONFIGURE A STEREO CAMERA PAIR HAVING A CAMERA PAIR AXIS

692: EXECUTE FEATURE CORRESPONDENCE FUNCTION BY DETECTING COMMON FEATURES BETWEEN CORRESPONDING IMAGES CAPTURED BY THE RESPECTIVE CAMERAS AND MEASURING A RELATIVE DISTANCE IN IMAGE SPACE BETWEEN THE COMMON FEATURES, TO GENERATE DISPARITY VALUES, THE FEATURE CORRESPONDENCE FUNCTION INCLUDING CONSTRUCTING A MULTI-LEVEL DISPARITY HISTOGRAM INDICATING THE RELATIVE PROBABILITY OF A GIVEN DISPARITY VALUE BEING CORRECT FOR A GIVEN PIXEL, AND THE CONSTRUCTING OF A MULTI-LEVEL DISPARITY HISTOGRAM INCLUDES EXECUTING A FAST DENSE DISPARITY ESTIMATE (FDDE) IMAGE PATTERN MATCHING OPERATION ON SUCCESSIVELY LOWER-FREQUENCY DOWNSAMPLED VERSIONS OF THE INPUT STEREO IMAGES, THE SUCCESSIVELY LOWER-FREQUENCY DOWNSAMPLED VERSIONS CONSTITUTING A SET OF LEVELS OF FDDE HISTOGRAM VOTES 692.1    EACH LEVEL IS ASSIGNED A LEVEL NUMBER, AND EACH SUCCESSIVELY HIGHER LEVEL IS CHARACTERIZED BY A LOWER IMAGE RESOLUTION 692.2    DOWNSAMPLING IS PROVIDED BY REDUCING IMAGE RESOLUTION VIA LOW-PASS FILTERING 692.3    DOWNSAMPLING INCLUDES USING A WEIGHTED SUMMATION OF A KERNEL IN LEVEL [N-1] TO PRODUCE A PIXEL VALUE IN LEVEL [N], AND THE NORMALIZED KERNEL CENTER POSITION REMAINS THE SAME ACROSS ALL LEVELS 692.4    (FOR A GIVEN DESIRED DISPARITY SOLUTION AT FULL IMAGE RESOLUTION, THE FDDE VOTES FOR EVERY IMAGE LEVEL ARE INCLUDED IN THE DISPARITY SOLUTION 692.5    MAINTAIN IN A MEMORY UNIT A SUMMATION STACK, FOR EXECUTING SUMMATION OPERATIONS RELATING TO FEATURE CORRESPONDENCE)

693: GENERATE A MULTI-LEVEL HISTOGRAM INCLUDING A SET OF INITIALLY INDEPENDENT HISTOGRAMS AT DIFFERENT LEVELS OF RESOLUTION:

693.1:   EACH HISTOGRAM BIN IN A GIVEN LEVEL REPRESENTS VOTES FOR A DISPARITY DETERMINED BY THE FDDE AT THAT LEVEL 693.2:   EACH HISTOGRAM BIN IN A GIVEN LEVEL HAS AN ASSOCIATED DISPARITY UNCERTAINTY RANGE, AND THE DISPARITY UNCERTAINTY RANGE REPRESENTED BY EACH HISTOGRAM BIN IS A SELECTED MULTIPLE WIDER THAN THE DISPARITY UNCERTAINTY RANGE OF A BIN IN THE PRECEDING LEVEL

FIG. 69A

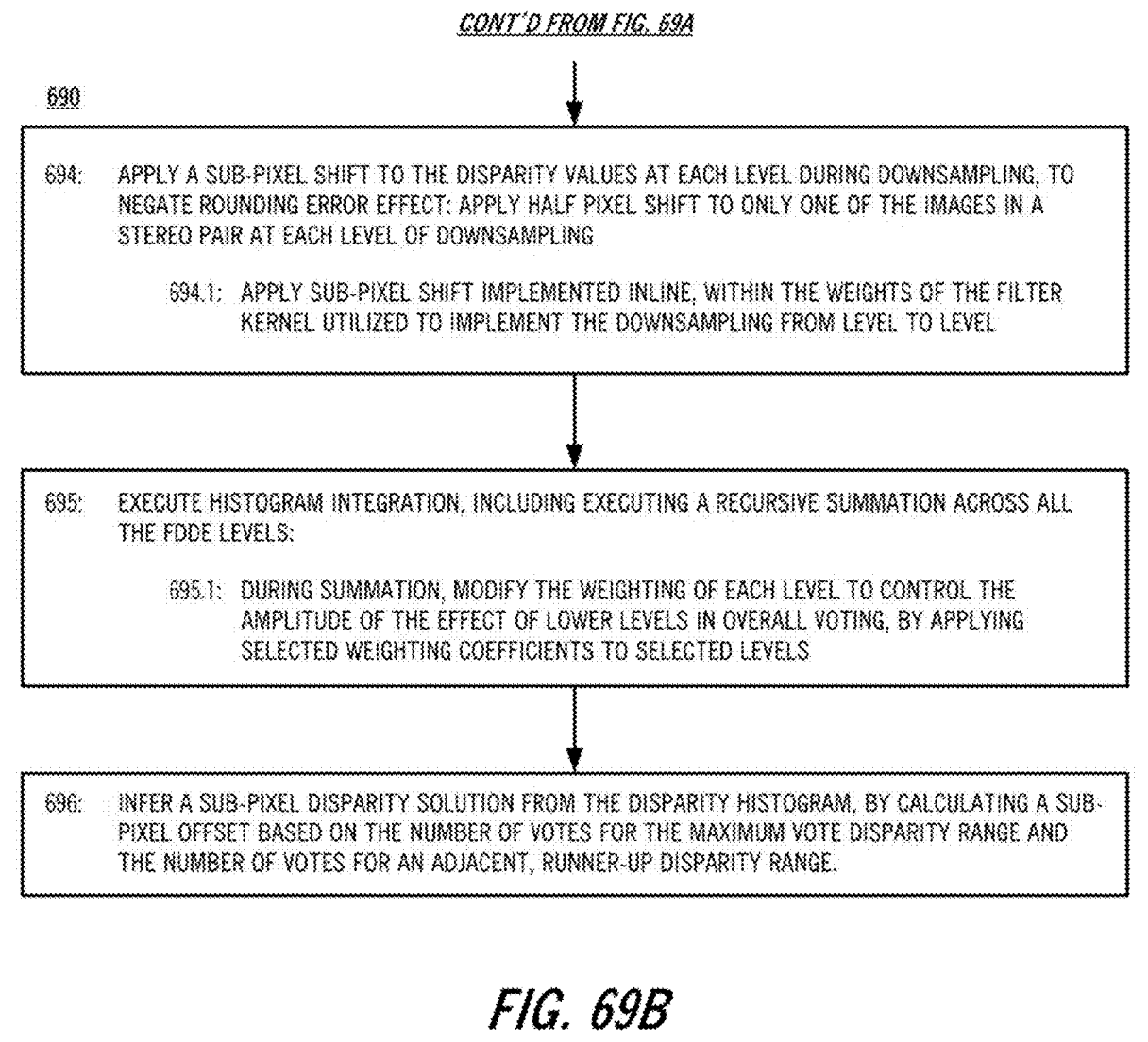

*CONT'D FROM FIG. 69A*

690

694: APPLY A SUB-PIXEL SHIFT TO THE DISPARITY VALUES AT EACH LEVEL DURING DOWNSAMPLING, TO NEGATE ROUNDING ERROR EFFECT: APPLY HALF PIXEL SHIFT TO ONLY ONE OF THE IMAGES IN A STEREO PAIR AT EACH LEVEL OF DOWNSAMPLING 694.1: APPLY SUB-PIXEL SHIFT IMPLEMENTED INLINE, WITHIN THE WEIGHTS OF THE FILTER KERNEL UTILIZED TO IMPLEMENT THE DOWNSAMPLING FROM LEVEL TO LEVEL

695: EXECUTE HISTOGRAM INTEGRATION, INCLUDING EXECUTING A RECURSIVE SUMMATION ACROSS ALL THE FDDE LEVELS:

695.1: DURING SUMMATION, MODIFY THE WEIGHTING OF EACH LEVEL TO CONTROL THE AMPLITUDE OF THE EFFECT OF LOWER LEVELS IN OVERALL VOTING, BY APPLYING SELECTED WEIGHTING COEFFICIENTS TO SELECTED LEVELS

696: INFER A SUB-PIXEL DISPARITY SOLUTION FROM THE DISPARITY HISTOGRAM, BY CALCULATING A SUB-PIXEL OFFSET BASED ON THE NUMBER OF VOTES FOR THE MAXIMUM VOTE DISPARITY RANGE AND THE NUMBER OF VOTES FOR AN ADJACENT, RUNNER-UP DISPARITY RANGE.

*FIG. 69B*

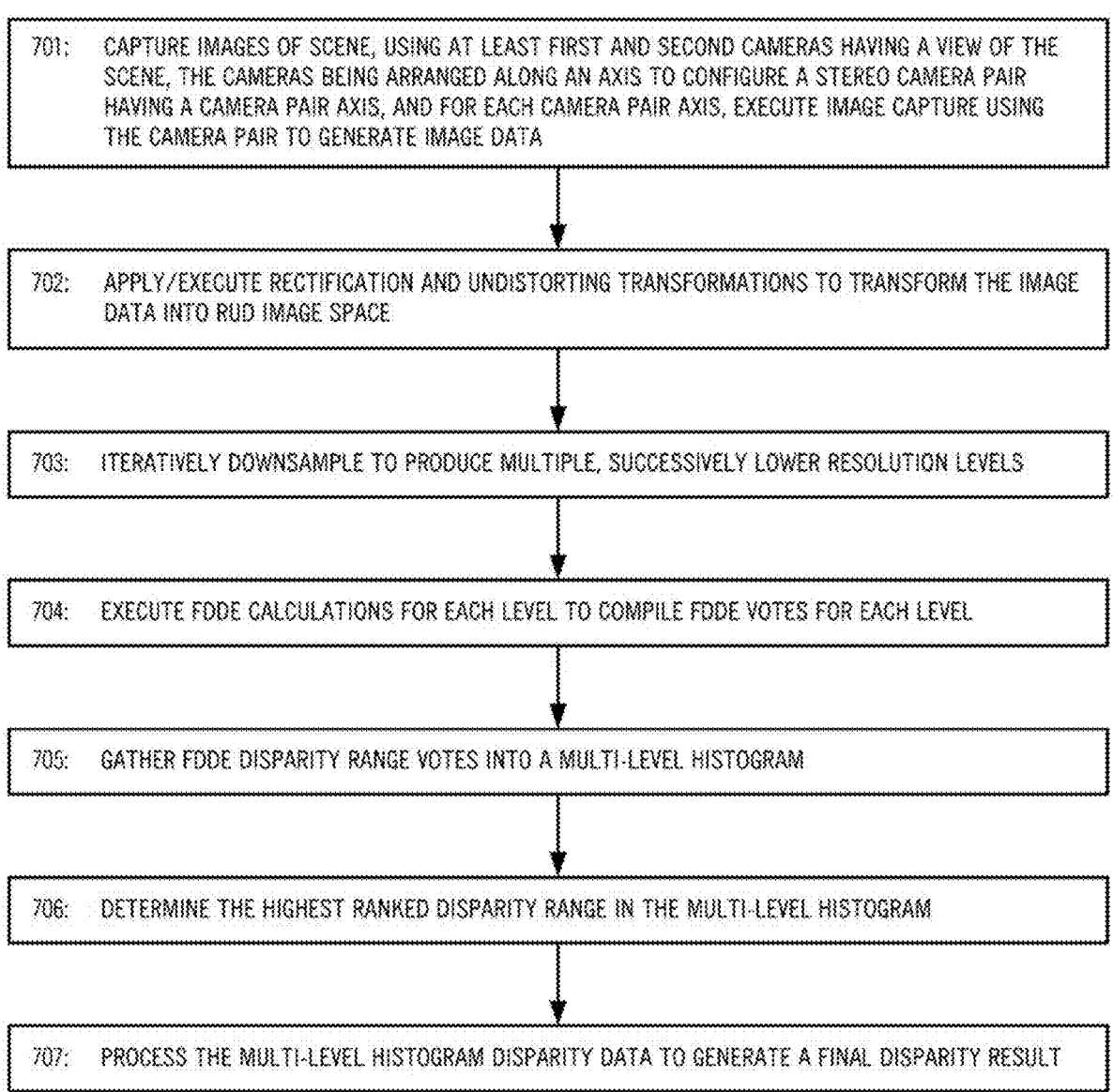

700

701:    CAPTURE IMAGES OF SCENE, USING AT LEAST FIRST AND SECOND CAMERAS HAVING A VIEW OF THE SCENE, THE CAMERAS BEING ARRANGED ALONG AN AXIS TO CONFIGURE A STEREO CAMERA PAIR HAVING A CAMERA PAIR AXIS, AND FOR EACH CAMERA PAIR AXIS, EXECUTE IMAGE CAPTURE USING THE CAMERA PAIR TO GENERATE IMAGE DATA

702:    APPLY/EXECUTE RECTIFICATION AND UNDISTORTING TRANSFORMATIONS TO TRANSFORM THE IMAGE DATA INTO RUD IMAGE SPACE

703:    ITERATIVELY DOWNSAMPLE TO PRODUCE MULTIPLE, SUCCESSIVELY LOWER RESOLUTION LEVELS

704:    EXECUTE FDDE CALCULATIONS FOR EACH LEVEL TO COMPILE FDDE VOTES FOR EACH LEVEL

705:    GATHER FDDE DISPARITY RANGE VOTES INTO A MULTI-LEVEL HISTOGRAM

706:    DETERMINE THE HIGHEST RANKED DISPARITY RANGE IN THE MULTI-LEVEL HISTOGRAM

707:    PROCESS THE MULTI-LEVEL HISTOGRAM DISPARITY DATA TO GENERATE A FINAL DISPARITY RESULT

711:    CAPTURE IMAGES OF A SCENE, USING AT LEAST FIRST AND SECOND CAMERAS HAVING A VIEW OF THE SCENE, THE CAMERAS BEING ARRANGED ALONG AN AXIS TO CONFIGURE A STEREO CAMERA PAIR

712:    EXECUTE A FEATURE CORRESPONDENCE FUNCTION BY DETECTING COMMON FEATURES BETWEEN CORRESPONDING IMAGES CAPTURED BY THE RESPECTIVE CAMERAS AND MEASURING A RELATIVE DISTANCE IN IMAGE SPACE BETWEEN THE COMMON FEATURES, TO GENERATE DISPARITY VALUES, THE FEATURE CORRESPONDENCE FUNCTION INCLUDING GENERATING A DISPARITY SOLUTION BASED ON THE DISPARITY VALUES, AND APPLYING AN INJECTIVE CONSTRAINT TO THE DISPARITY SOLUTION BASED ON DOMAIN AND CO-DOMAIN, WHEREIN THE DOMAIN COMPRISES PIXELS FOR A GIVEN IMAGE CAPTURED BY THE FIRST CAMERA AND THE CO-DOMAIN COMPRISES PIXELS FOR A CORRESPONDING IMAGE CAPTURED BY THE SECOND CAMERA, TO ENABLE CORRECTION OF ERROR IN THE DISPARITY SOLUTION IN RESPONSE TO VIOLATION OF THE INJECTIVE CONSTRAINT, AND WHEREIN THE INJECTIVE CONSTRAINT IS THAT NO ELEMENT IN THE CO-DOMAIN IS REFERENCED MORE THAN ONCE BY ELEMENTS IN THE DOMAIN

*FIG. 71*

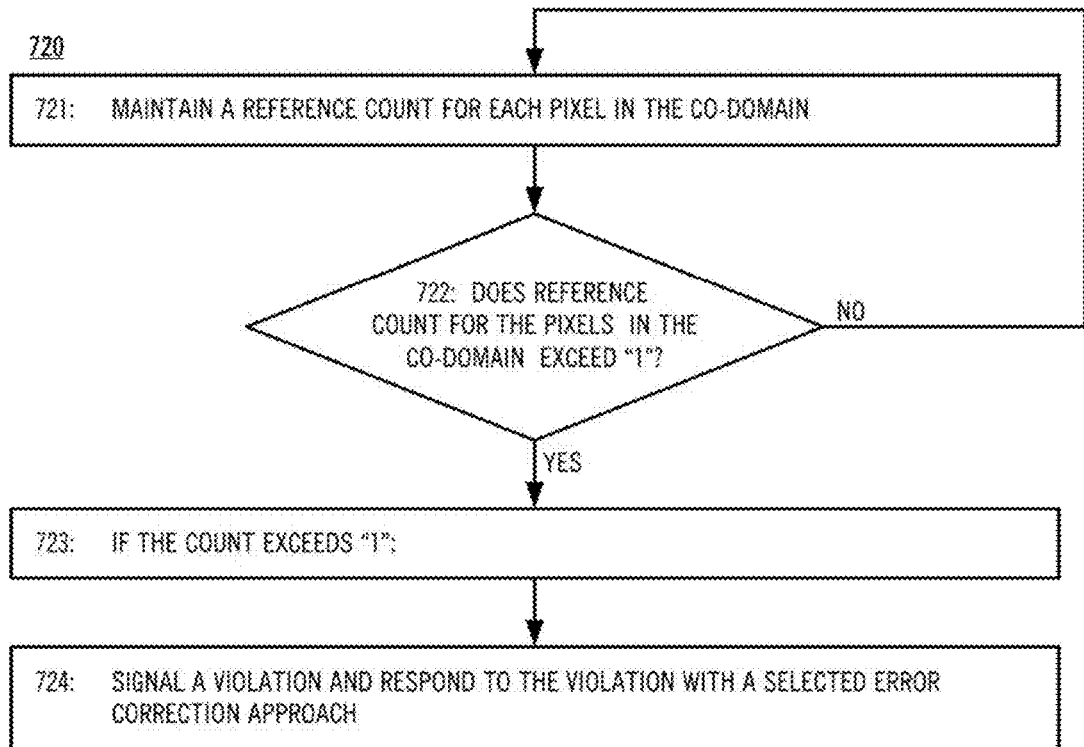

720

721:    MAINTAIN A REFERENCE COUNT FOR EACH PIXEL IN THE CO-DOMAIN

722:  DOES REFERENCE COUNT FOR THE PIXELS  IN THE CO-DOMAIN  EXCEED "1"?

NO

YES

723:    IF THE COUNT EXCEEDS "1";

724:    SIGNAL A VIOLATION AND RESPOND TO THE VIOLATION WITH A SELECTED ERROR CORRECTION APPROACH

Figure 73:
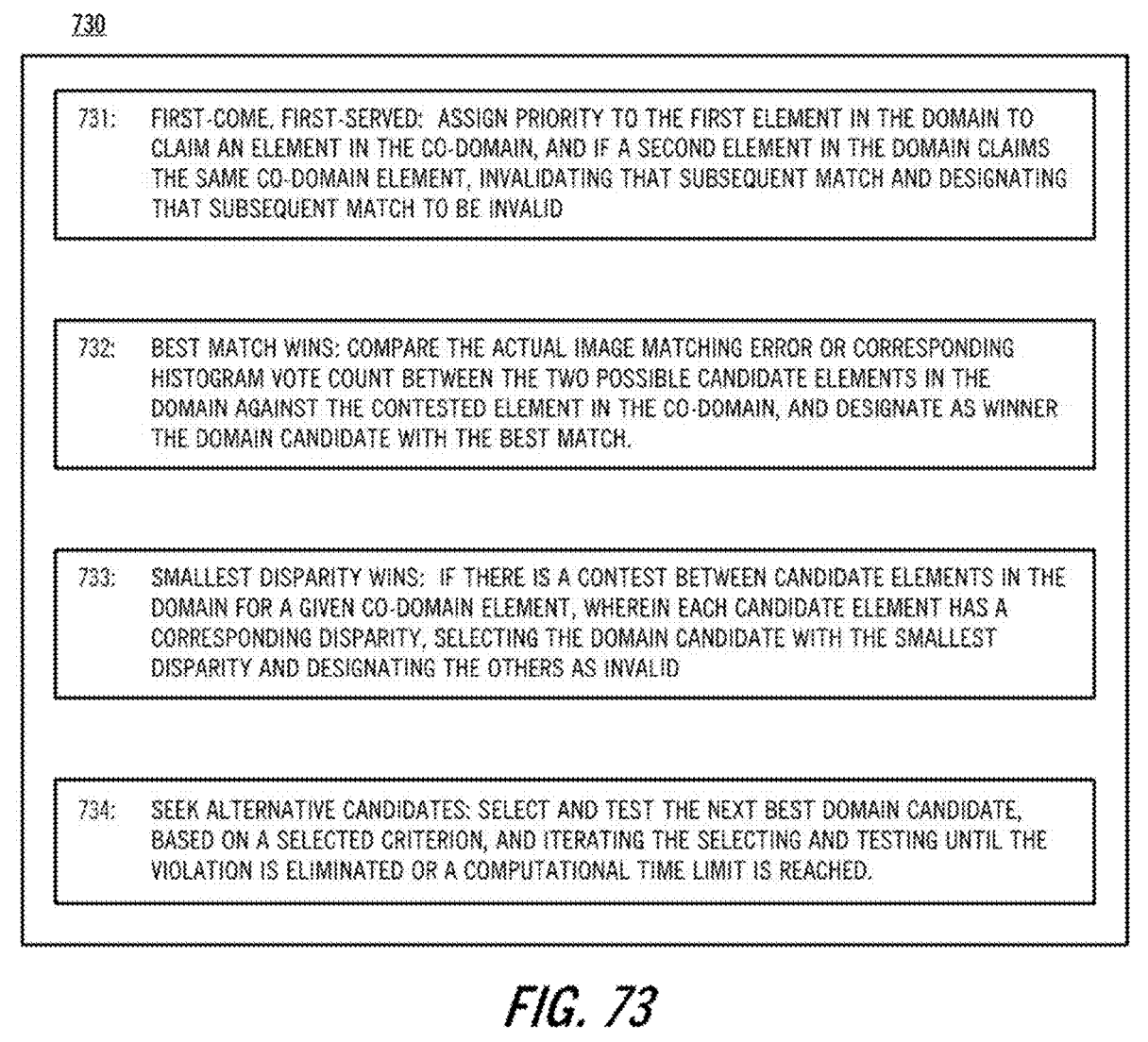

731: FIRST-COME, FIRST-SERVED: ASSIGN PRIORITY TO THE FIRST ELEMENT IN THE DOMAIN TO CLAIM AN ELEMENT IN THE CO-DOMAIN, AND IF A SECOND ELEMENT IN THE DOMAIN CLAIMS THE SAME CO-DOMAIN ELEMENT, INVALIDATING THAT SUBSEQUENT MATCH AND DESIGNATING THAT SUBSEQUENT MATCH TO BE INVALID

732: BEST MATCH WINS: COMPARE THE ACTUAL IMAGE MATCHING ERROR OR CORRESPONDING HISTOGRAM VOTE COUNT BETWEEN THE TWO POSSIBLE CANDIDATE ELEMENTS IN THE DOMAIN AGAINST THE CONTESTED ELEMENT IN THE CO-DOMAIN, AND DESIGNATE AS WINNER THE DOMAIN CANDIDATE WITH THE BEST MATCH.

733: SMALLEST DISPARITY WINS: IF THERE IS A CONTEST BETWEEN CANDIDATE ELEMENTS IN THE DOMAIN FOR A GIVEN CO-DOMAIN ELEMENT, WHEREIN EACH CANDIDATE ELEMENT HAS A CORRESPONDING DISPARITY, SELECTING THE DOMAIN CANDIDATE WITH THE SMALLEST DISPARITY AND DESIGNATING THE OTHERS AS INVALID

734: SEEK ALTERNATIVE CANDIDATES: SELECT AND TEST THE NEXT BEST DOMAIN CANDIDATE, BASED ON A SELECTED CRITERION, AND ITERATING THE SELECTING AND TESTING UNTIL THE VIOLATION IS ELIMINATED OR A COMPUTATIONAL TIME LIMIT IS REACHED.

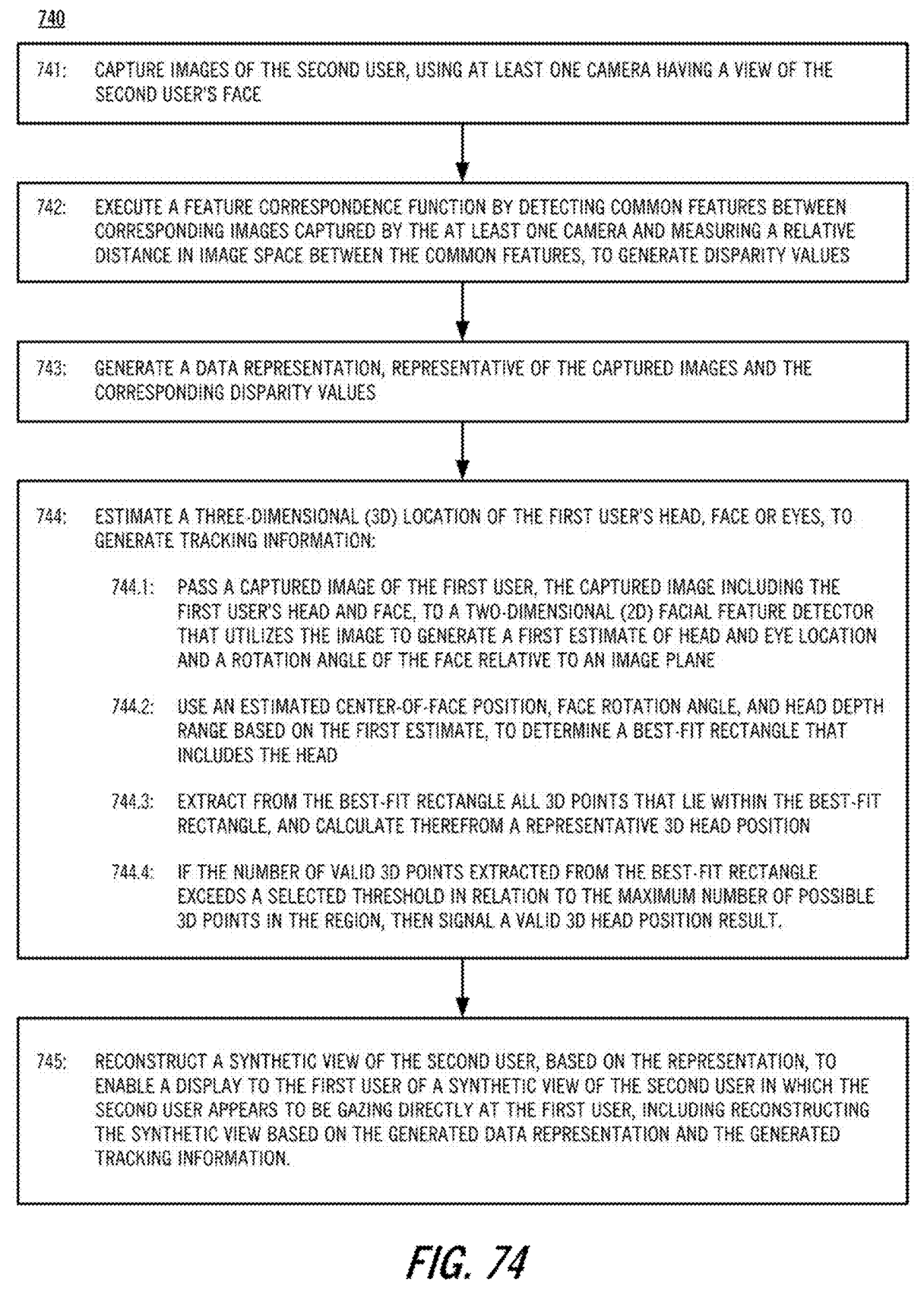

741:  CAPTURE IMAGES OF THE SECOND USER, USING AT LEAST ONE CAMERA HAVING A VIEW OF THE SECOND USER'S FACE

742:  EXECUTE A FEATURE CORRESPONDENCE FUNCTION BY DETECTING COMMON FEATURES BETWEEN CORRESPONDING IMAGES CAPTURED BY THE AT LEAST ONE CAMERA AND MEASURING A RELATIVE DISTANCE IN IMAGE SPACE BETWEEN THE COMMON FEATURES, TO GENERATE DISPARITY VALUES

743:  GENERATE A DATA REPRESENTATION, REPRESENTATIVE OF THE CAPTURED IMAGES AND THE CORRESPONDING DISPARITY VALUES

744:  ESTIMATE A THREE-DIMENSIONAL (3D) LOCATION OF THE FIRST USER'S HEAD, FACE OR EYES, TO GENERATE TRACKING INFORMATION:

744.1:  PASS A CAPTURED IMAGE OF THE FIRST USER, THE CAPTURED IMAGE INCLUDING THE FIRST USER'S HEAD AND FACE, TO A TWO-DIMENSIONAL (2D) FACIAL FEATURE DETECTOR THAT UTILIZES THE IMAGE TO GENERATE A FIRST ESTIMATE OF HEAD AND EYE LOCATION AND A ROTATION ANGLE OF THE FACE RELATIVE TO AN IMAGE PLANE 744.2:  USE AN ESTIMATED CENTER-OF-FACE POSITION, FACE ROTATION ANGLE, AND HEAD DEPTH RANGE BASED ON THE FIRST ESTIMATE, TO DETERMINE A BEST-FIT RECTANGLE THAT INCLUDES THE HEAD 744.3:  EXTRACT FROM THE BEST-FIT RECTANGLE ALL 3D POINTS THAT LIE WITHIN THE BEST-FIT RECTANGLE, AND CALCULATE THEREFROM A REPRESENTATIVE 3D HEAD POSITION 744.4:  IF THE NUMBER OF VALID 3D POINTS EXTRACTED FROM THE BEST-FIT RECTANGLE EXCEEDS A SELECTED THRESHOLD IN RELATION TO THE MAXIMUM NUMBER OF POSSIBLE 3D POINTS IN THE REGION, THEN SIGNAL A VALID 3D HEAD POSITION RESULT.

745:  RECONSTRUCT A SYNTHETIC VIEW OF THE SECOND USER, BASED ON THE REPRESENTATION, TO ENABLE A DISPLAY TO THE FIRST USER OF A SYNTHETIC VIEW OF THE SECOND USER IN WHICH THE SECOND USER APPEARS TO BE GAZING DIRECTLY AT THE FIRST USER, INCLUDING RECONSTRUCTING THE SYNTHETIC VIEW BASED ON THE GENERATED DATA REPRESENTATION AND THE GENERATED TRACKING INFORMATION.

*FIG. 74*

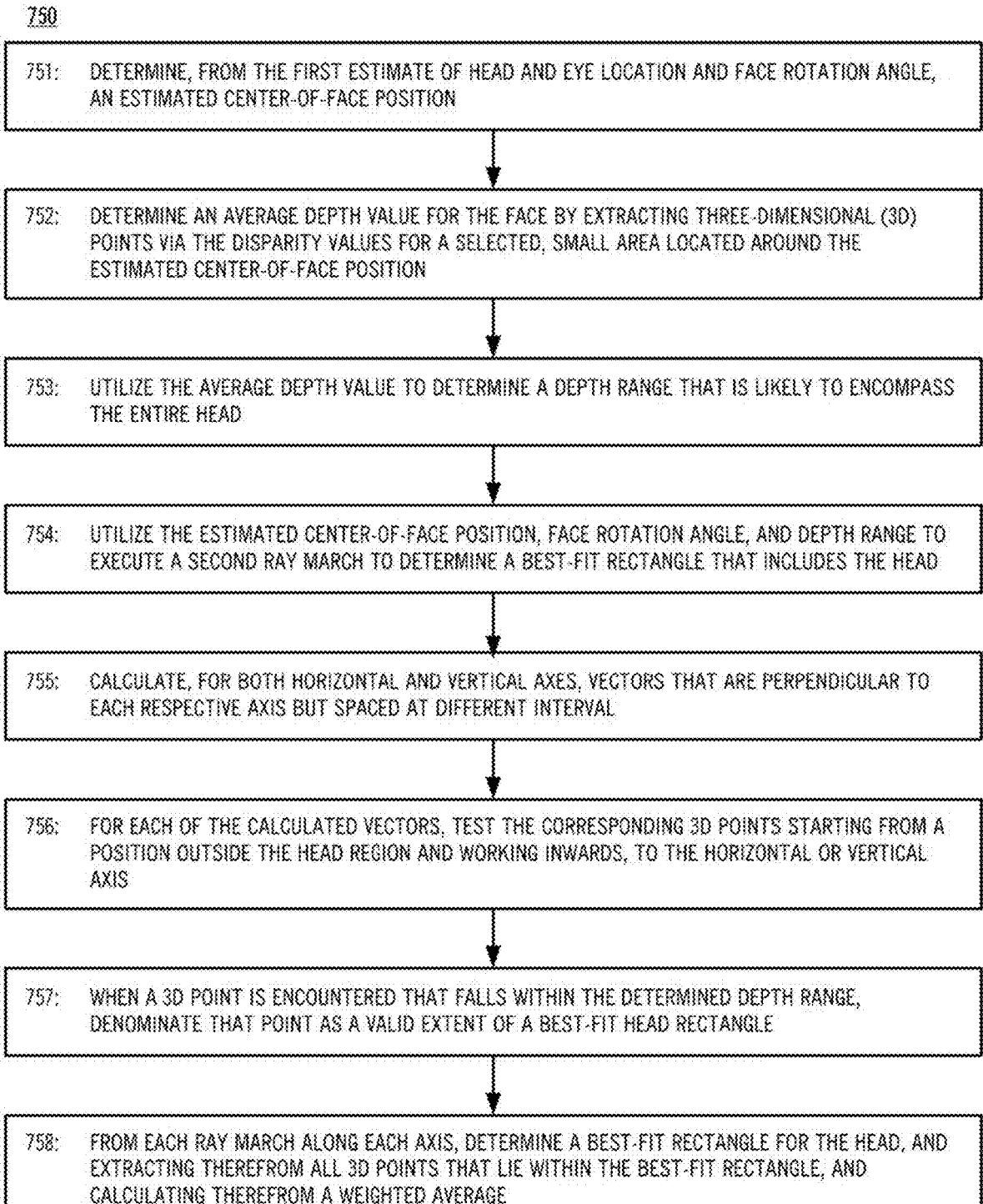

<u>750</u>

751: DETERMINE, FROM THE FIRST ESTIMATE OF HEAD AND EYE LOCATION AND FACE ROTATION ANGLE, AN ESTIMATED CENTER-OF-FACE POSITION

752: DETERMINE AN AVERAGE DEPTH VALUE FOR THE FACE BY EXTRACTING THREE-DIMENSIONAL (3D) POINTS VIA THE DISPARITY VALUES FOR A SELECTED, SMALL AREA LOCATED AROUND THE ESTIMATED CENTER-OF-FACE POSITION

753: UTILIZE THE AVERAGE DEPTH VALUE TO DETERMINE A DEPTH RANGE THAT IS LIKELY TO ENCOMPASS THE ENTIRE HEAD

754: UTILIZE THE ESTIMATED CENTER-OF-FACE POSITION, FACE ROTATION ANGLE, AND DEPTH RANGE TO EXECUTE A SECOND RAY MARCH TO DETERMINE A BEST-FIT RECTANGLE THAT INCLUDES THE HEAD

755: CALCULATE, FOR BOTH HORIZONTAL AND VERTICAL AXES, VECTORS THAT ARE PERPENDICULAR TO EACH RESPECTIVE AXIS BUT SPACED AT DIFFERENT INTERVAL

756: FOR EACH OF THE CALCULATED VECTORS, TEST THE CORRESPONDING 3D POINTS STARTING FROM A POSITION OUTSIDE THE HEAD REGION AND WORKING INWARDS, TO THE HORIZONTAL OR VERTICAL AXIS

757: WHEN A 3D POINT IS ENCOUNTERED THAT FALLS WITHIN THE DETERMINED DEPTH RANGE, DENOMINATE THAT POINT AS A VALID EXTENT OF A BEST-FIT HEAD RECTANGLE

758: FROM EACH RAY MARCH ALONG EACH AXIS, DETERMINE A BEST-FIT RECTANGLE FOR THE HEAD, AND EXTRACTING THEREFROM ALL 3D POINTS THAT LIE WITHIN THE BEST-FIT RECTANGLE, AND CALCULATING THEREFROM A WEIGHTED AVERAGE

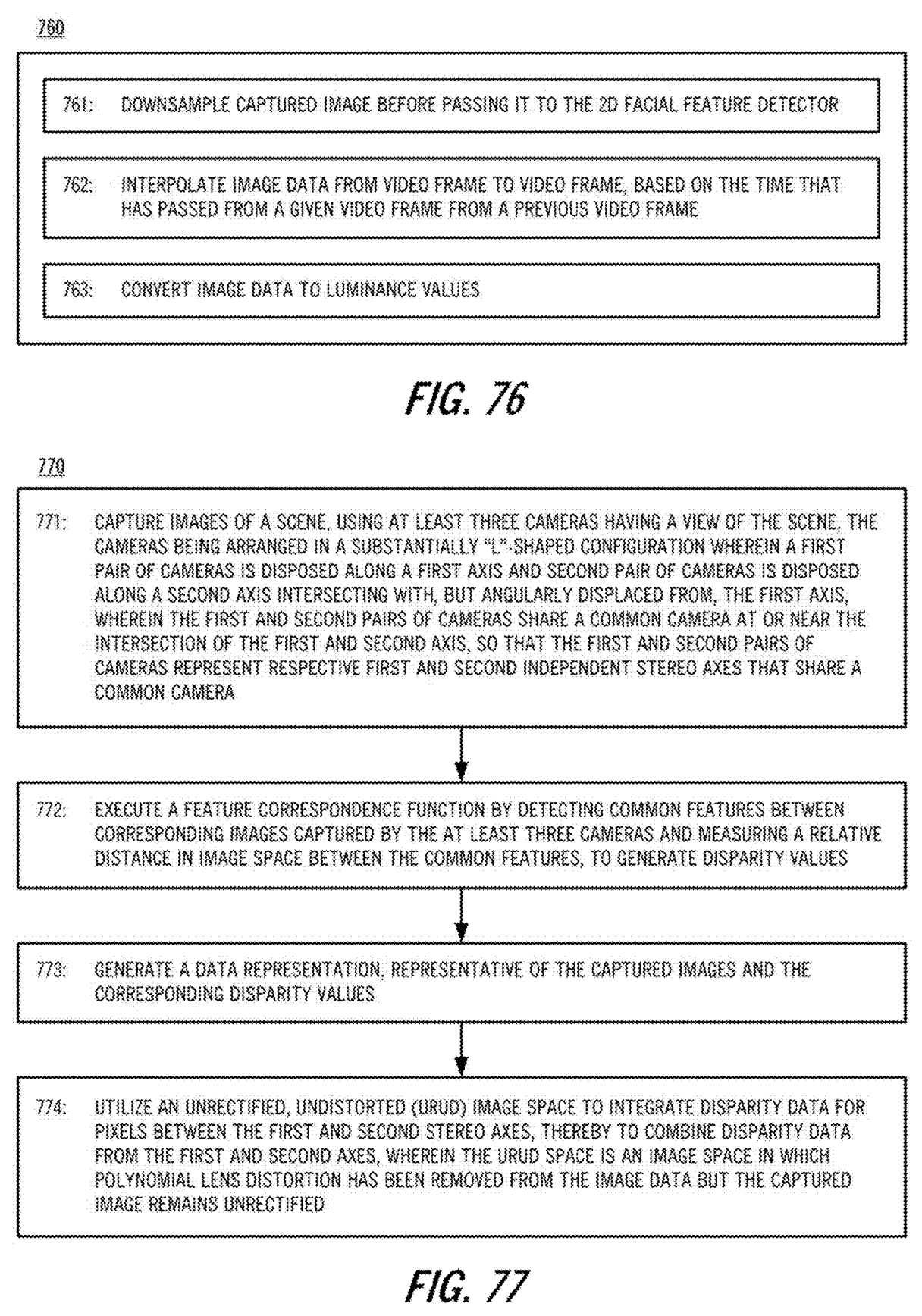

| 761: | DOWNSAMPLE CAPTURED IMAGE BEFORE PASSING IT TO THE 2D FACIAL FEATURE DETECTOR |
| --- | --- |
| 762: | INTERPOLATE IMAGE DATA FROM VIDEO FRAME TO VIDEO FRAME, BASED ON THE TIME THAT HAS PASSED FROM A GIVEN VIDEO FRAME FROM A PREVIOUS VIDEO FRAME |
| 763: | CONVERT IMAGE DATA TO LUMINANCE VALUES |

771: CAPTURE IMAGES OF A SCENE, USING AT LEAST THREE CAMERAS HAVING A VIEW OF THE SCENE, THE CAMERAS BEING ARRANGED IN A SUBSTANTIALLY "L"-SHAPED CONFIGURATION WHEREIN A FIRST PAIR OF CAMERAS IS DISPOSED ALONG A FIRST AXIS AND SECOND PAIR OF CAMERAS IS DISPOSED ALONG A SECOND AXIS INTERSECTING WITH, BUT ANGULARLY DISPLACED FROM, THE FIRST AXIS, WHEREIN THE FIRST AND SECOND PAIRS OF CAMERAS SHARE A COMMON CAMERA AT OR NEAR THE INTERSECTION OF THE FIRST AND SECOND AXIS, SO THAT THE FIRST AND SECOND PAIRS OF CAMERAS REPRESENT RESPECTIVE FIRST AND SECOND INDEPENDENT STEREO AXES THAT SHARE A COMMON CAMERA

772: EXECUTE A FEATURE CORRESPONDENCE FUNCTION BY DETECTING COMMON FEATURES BETWEEN CORRESPONDING IMAGES CAPTURED BY THE AT LEAST THREE CAMERAS AND MEASURING A RELATIVE DISTANCE IN IMAGE SPACE BETWEEN THE COMMON FEATURES, TO GENERATE DISPARITY VALUES

773: GENERATE A DATA REPRESENTATION, REPRESENTATIVE OF THE CAPTURED IMAGES AND THE CORRESPONDING DISPARITY VALUES

774: UTILIZE AN UNRECTIFIED, UNDISTORTED (URUD) IMAGE SPACE TO INTEGRATE DISPARITY DATA FOR PIXELS BETWEEN THE FIRST AND SECOND STEREO AXES, THEREBY TO COMBINE DISPARITY DATA FROM THE FIRST AND SECOND AXES, WHEREIN THE URUD SPACE IS AN IMAGE SPACE IN WHICH POLYNOMIAL LENS DISTORTION HAS BEEN REMOVED FROM THE IMAGE DATA BUT THE CAPTURED IMAGE REMAINS UNRECTIFIED

FIG. 77

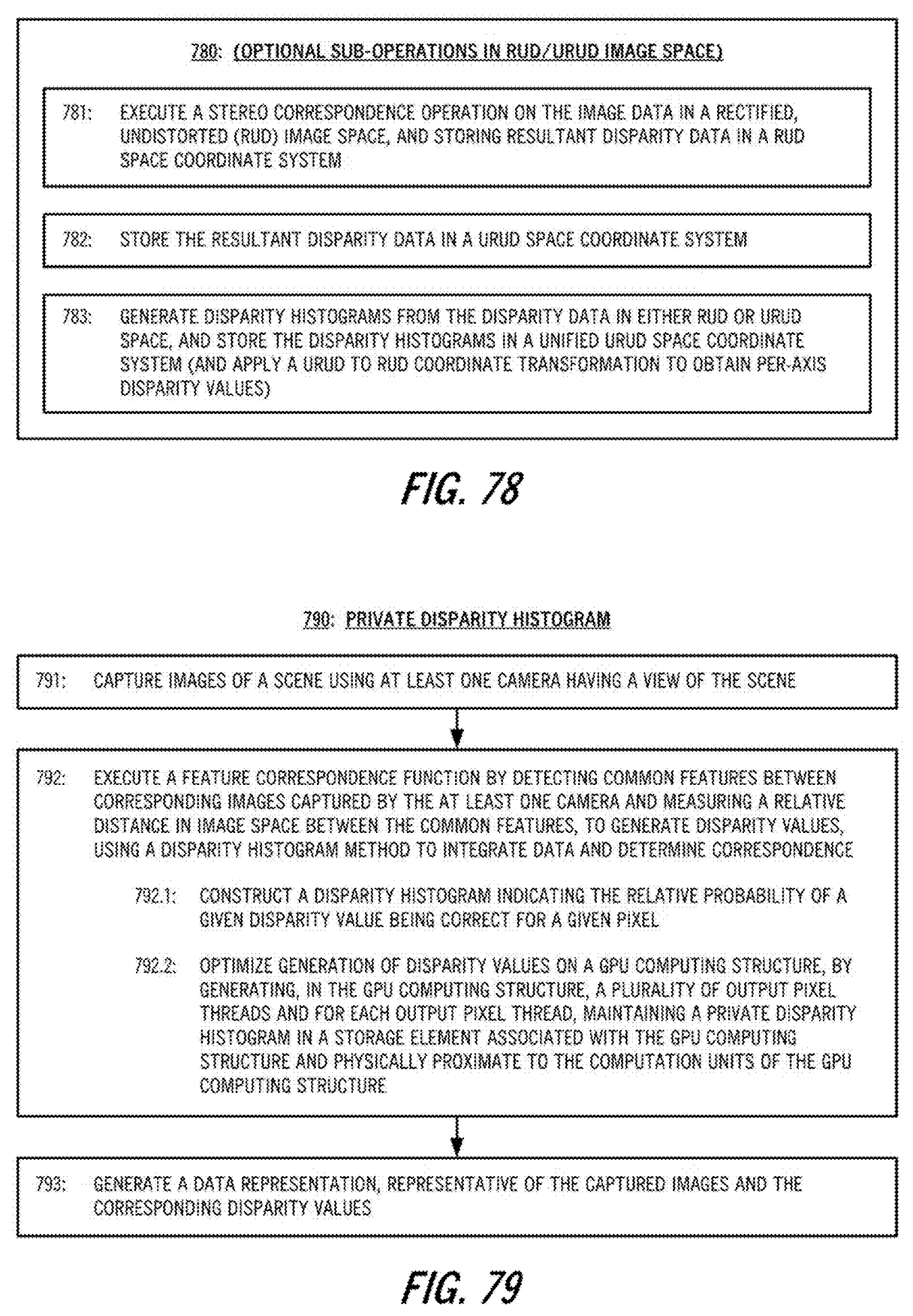

780: (OPTIONAL SUB-OPERATIONS IN RUD/URUD IMAGE SPACE)

781: EXECUTE A STEREO CORRESPONDENCE OPERATION ON THE IMAGE DATA IN A RECTIFIED, UNDISTORTED (RUD) IMAGE SPACE, AND STORING RESULTANT DISPARITY DATA IN A RUD SPACE COORDINATE SYSTEM

782: STORE THE RESULTANT DISPARITY DATA IN A URUD SPACE COORDINATE SYSTEM

783: GENERATE DISPARITY HISTOGRAMS FROM THE DISPARITY DATA IN EITHER RUD OR URUD SPACE, AND STORE THE DISPARITY HISTOGRAMS IN A UNIFIED URUD SPACE COORDINATE SYSTEM (AND APPLY A URUD TO RUD COORDINATE TRANSFORMATION TO OBTAIN PER-AXIS DISPARITY VALUES)

*FIG. 78*

790: PRIVATE DISPARITY HISTOGRAM

791: CAPTURE IMAGES OF A SCENE USING AT LEAST ONE CAMERA HAVING A VIEW OF THE SCENE

792: EXECUTE A FEATURE CORRESPONDENCE FUNCTION BY DETECTING COMMON FEATURES BETWEEN CORRESPONDING IMAGES CAPTURED BY THE AT LEAST ONE CAMERA AND MEASURING A RELATIVE DISTANCE IN IMAGE SPACE BETWEEN THE COMMON FEATURES, TO GENERATE DISPARITY VALUES, USING A DISPARITY HISTOGRAM METHOD TO INTEGRATE DATA AND DETERMINE CORRESPONDENCE 792.1: CONSTRUCT A DISPARITY HISTOGRAM INDICATING THE RELATIVE PROBABILITY OF A GIVEN DISPARITY VALUE BEING CORRECT FOR A GIVEN PIXEL 792.2: OPTIMIZE GENERATION OF DISPARITY VALUES ON A GPU COMPUTING STRUCTURE, BY GENERATING, IN THE GPU COMPUTING STRUCTURE, A PLURALITY OF OUTPUT PIXEL THREADS AND FOR EACH OUTPUT PIXEL THREAD, MAINTAINING A PRIVATE DISPARITY HISTOGRAM IN A STORAGE ELEMENT ASSOCIATED WITH THE GPU COMPUTING STRUCTURE AND PHYSICALLY PROXIMATE TO THE COMPUTATION UNITS OF THE GPU COMPUTING STRUCTURE

793: GENERATE A DATA REPRESENTATION, REPRESENTATIVE OF THE CAPTURED IMAGES AND THE CORRESPONDING DISPARITY VALUES

*FIG. 79*

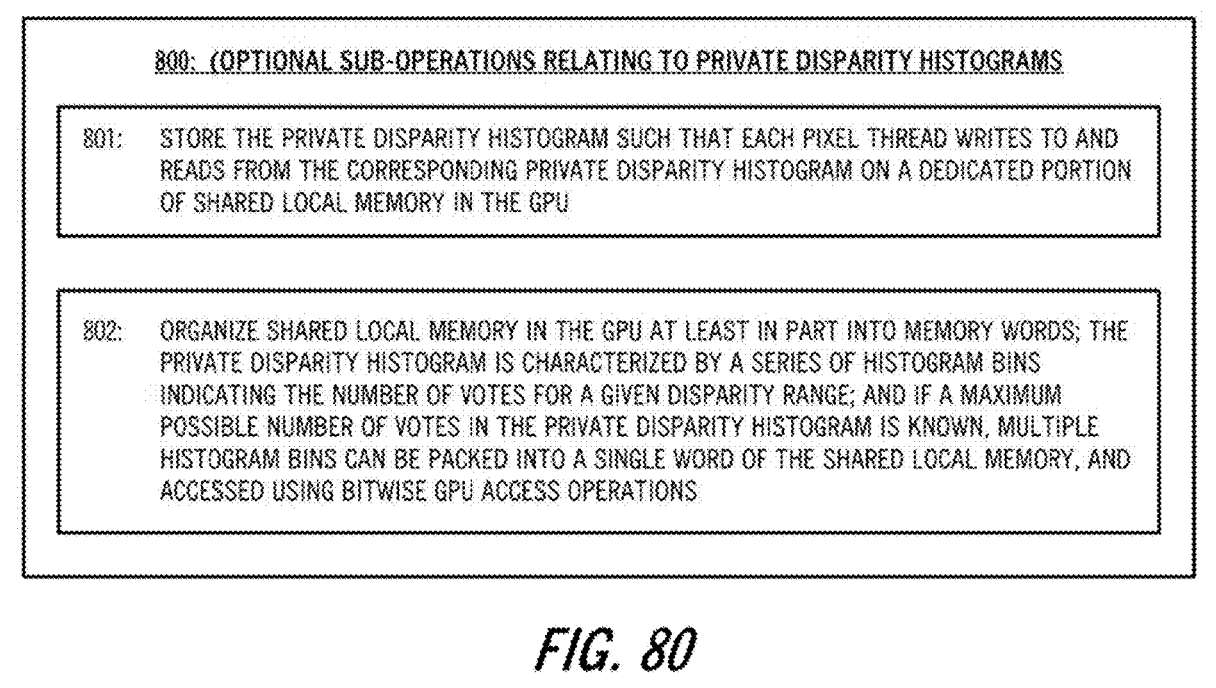

800: (OPTIONAL SUB-OPERATIONS RELATING TO PRIVATE DISPARITY HISTOGRAMS

801: STORE THE PRIVATE DISPARITY HISTOGRAM SUCH THAT EACH PIXEL THREAD WRITES TO AND READS FROM THE CORRESPONDING PRIVATE DISPARITY HISTOGRAM ON A DEDICATED PORTION OF SHARED LOCAL MEMORY IN THE GPU

802: ORGANIZE SHARED LOCAL MEMORY IN THE GPU AT LEAST IN PART INTO MEMORY WORDS; THE PRIVATE DISPARITY HISTOGRAM IS CHARACTERIZED BY A SERIES OF HISTOGRAM BINS INDICATING THE NUMBER OF VOTES FOR A GIVEN DISPARITY RANGE; AND IF A MAXIMUM POSSIBLE NUMBER OF VOTES IN THE PRIVATE DISPARITY HISTOGRAM IS KNOWN, MULTIPLE HISTOGRAM BINS CAN BE PACKED INTO A SINGLE WORD OF THE SHARED LOCAL MEMORY, AND ACCESSED USING BITWISE GPU ACCESS OPERATIONS

*FIG. 80*

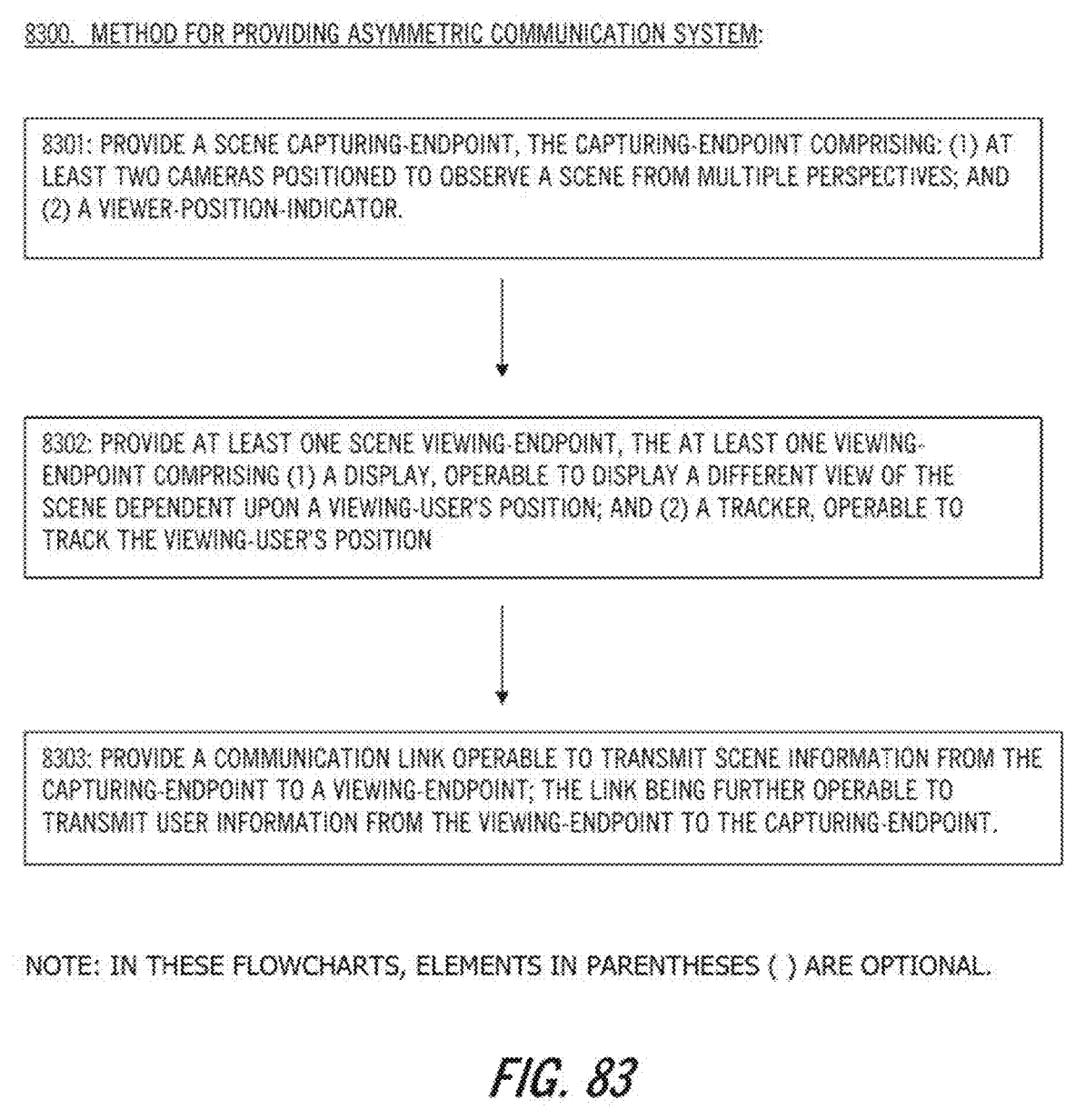

8300. METHOD FOR PROVIDING ASYMMETRIC COMMUNICATION SYSTEM:

8301: PROVIDE A SCENE CAPTURING-ENDPOINT, THE CAPTURING-ENDPOINT COMPRISING: (1) AT LEAST TWO CAMERAS POSITIONED TO OBSERVE A SCENE FROM MULTIPLE PERSPECTIVES; AND (2) A VIEWER-POSITION-INDICATOR.

8302: PROVIDE AT LEAST ONE SCENE VIEWING-ENDPOINT, THE AT LEAST ONE VIEWING-ENDPOINT COMPRISING (1) A DISPLAY, OPERABLE TO DISPLAY A DIFFERENT VIEW OF THE SCENE DEPENDENT UPON A VIEWING-USER'S POSITION; AND (2) A TRACKER, OPERABLE TO TRACK THE VIEWING-USER'S POSITION

8303: PROVIDE A COMMUNICATION LINK OPERABLE TO TRANSMIT SCENE INFORMATION FROM THE CAPTURING-ENDPOINT TO A VIEWING-ENDPOINT; THE LINK BEING FURTHER OPERABLE TO TRANSMIT USER INFORMATION FROM THE VIEWING-ENDPOINT TO THE CAPTURING-ENDPOINT.

NOTE: IN THESE FLOWCHARTS, ELEMENTS IN PARENTHESES ( ) ARE OPTIONAL.

FIG. 83

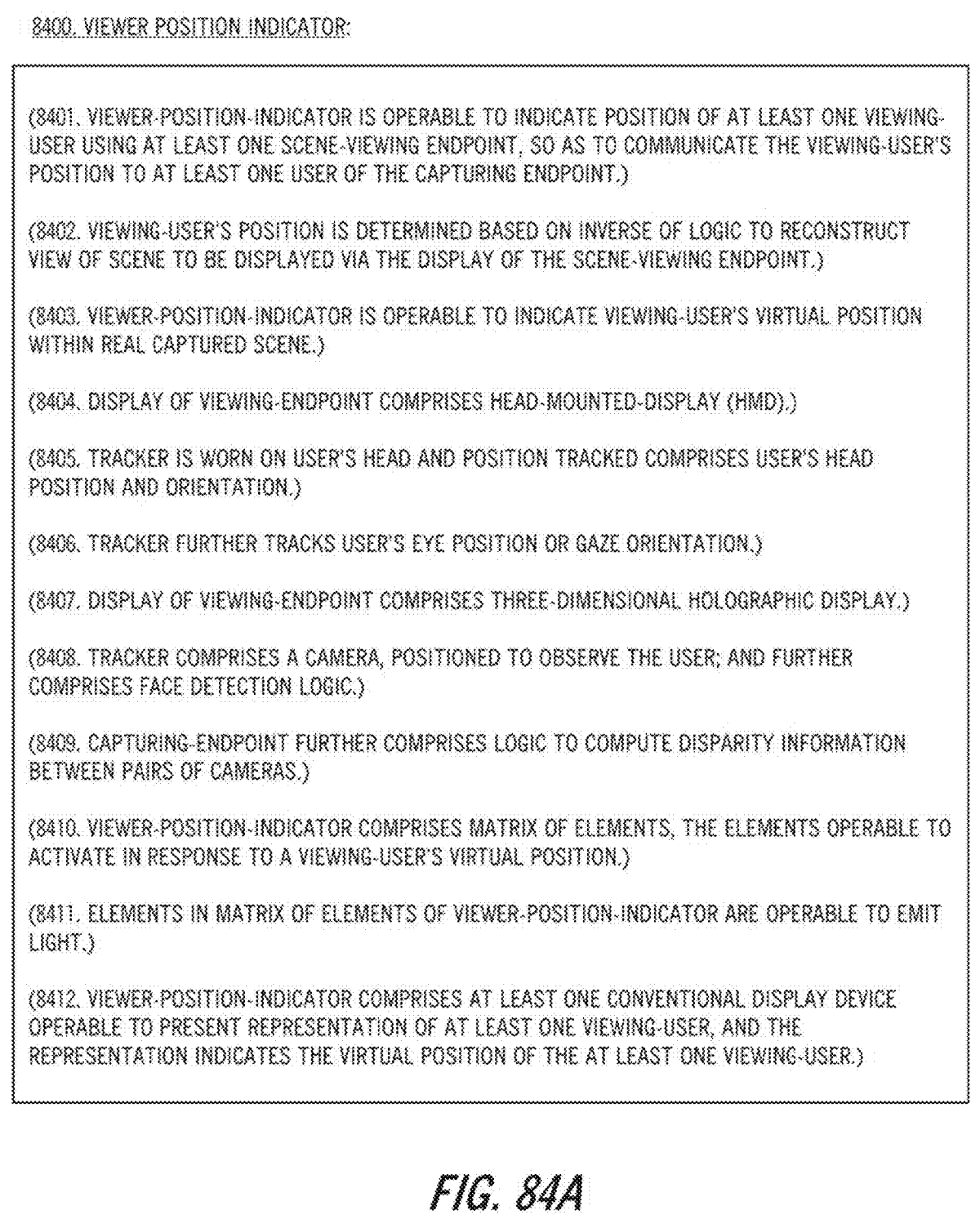

8400. VIEWER POSITION INDICATOR:

(8401. VIEWER-POSITION-INDICATOR IS OPERABLE TO INDICATE POSITION OF AT LEAST ONE VIEWING-USER USING AT LEAST ONE SCENE-VIEWING ENDPOINT, SO AS TO COMMUNICATE THE VIEWING-USER'S POSITION TO AT LEAST ONE USER OF THE CAPTURING ENDPOINT.)

(8402. VIEWING-USER'S POSITION IS DETERMINED BASED ON INVERSE OF LOGIC TO RECONSTRUCT VIEW OF SCENE TO BE DISPLAYED VIA THE DISPLAY OF THE SCENE-VIEWING ENDPOINT.)

(8403. VIEWER-POSITION-INDICATOR IS OPERABLE TO INDICATE VIEWING-USER'S VIRTUAL POSITION WITHIN REAL CAPTURED SCENE.)

(8404. DISPLAY OF VIEWING-ENDPOINT COMPRISES HEAD-MOUNTED-DISPLAY (HMD).)

(8405. TRACKER IS WORN ON USER'S HEAD AND POSITION TRACKED COMPRISES USER'S HEAD POSITION AND ORIENTATION.)

(8406. TRACKER FURTHER TRACKS USER'S EYE POSITION OR GAZE ORIENTATION.)

(8407. DISPLAY OF VIEWING-ENDPOINT COMPRISES THREE-DIMENSIONAL HOLOGRAPHIC DISPLAY.)

(8408. TRACKER COMPRISES A CAMERA, POSITIONED TO OBSERVE THE USER; AND FURTHER COMPRISES FACE DETECTION LOGIC.)

(8409. CAPTURING-ENDPOINT FURTHER COMPRISES LOGIC TO COMPUTE DISPARITY INFORMATION BETWEEN PAIRS OF CAMERAS.)

(8410. VIEWER-POSITION-INDICATOR COMPRISES MATRIX OF ELEMENTS, THE ELEMENTS OPERABLE TO ACTIVATE IN RESPONSE TO A VIEWING-USER'S VIRTUAL POSITION.)

(8411. ELEMENTS IN MATRIX OF ELEMENTS OF VIEWER-POSITION-INDICATOR ARE OPERABLE TO EMIT LIGHT.)

(8412. VIEWER-POSITION-INDICATOR COMPRISES AT LEAST ONE CONVENTIONAL DISPLAY DEVICE OPERABLE TO PRESENT REPRESENTATION OF AT LEAST ONE VIEWING-USER, AND THE REPRESENTATION INDICATES THE VIRTUAL POSITION OF THE AT LEAST ONE VIEWING-USER.)

*FIG. 84A*

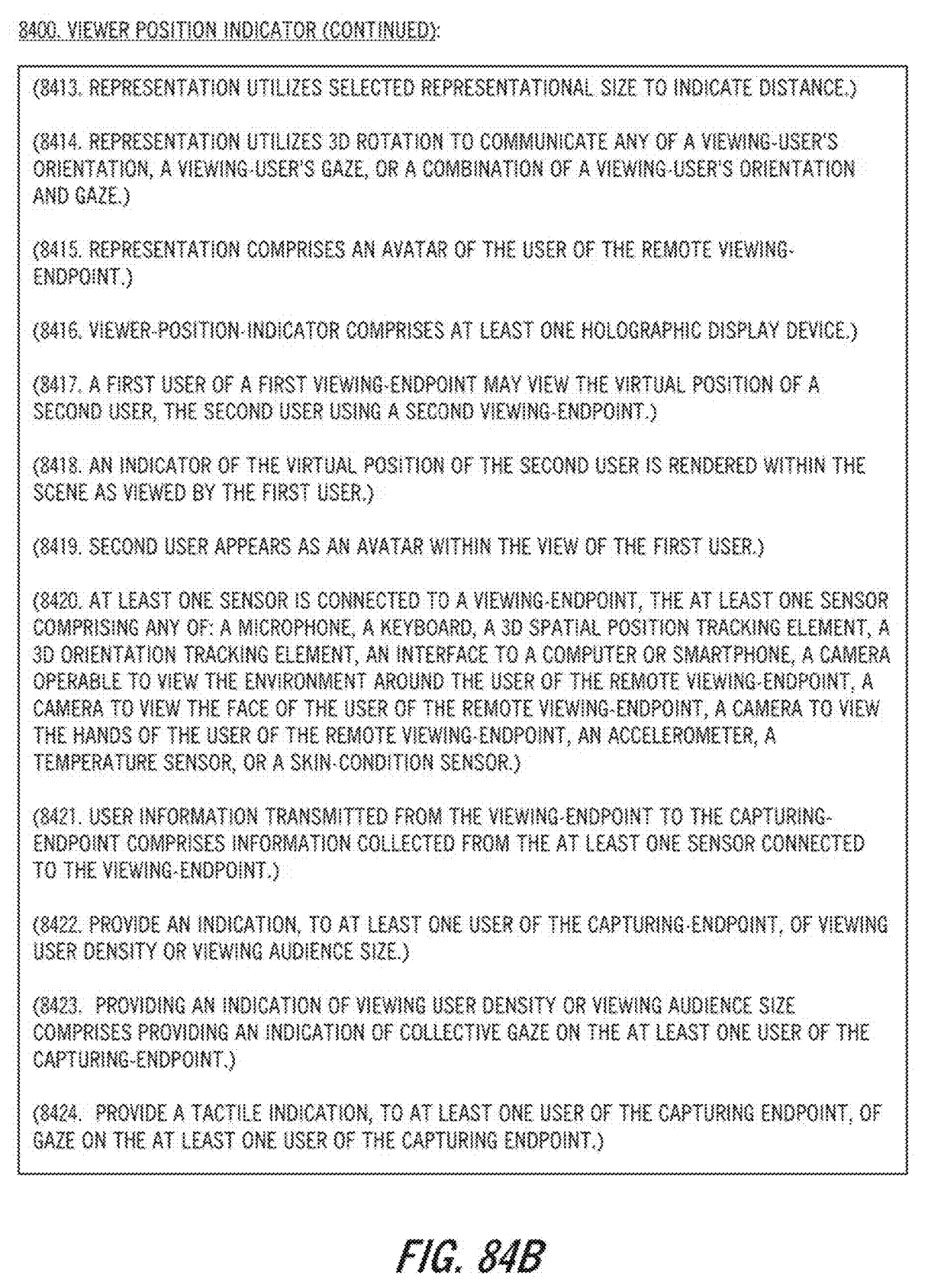

8400. VIEWER POSITION INDICATOR (CONTINUED):

(8413. REPRESENTATION UTILIZES SELECTED REPRESENTATIONAL SIZE TO INDICATE DISTANCE.)

(8414. REPRESENTATION UTILIZES 3D ROTATION TO COMMUNICATE ANY OF A VIEWING-USER'S ORIENTATION, A VIEWING-USER'S GAZE, OR A COMBINATION OF A VIEWING-USER'S ORIENTATION AND GAZE.)

(8415. REPRESENTATION COMPRISES AN AVATAR OF THE USER OF THE REMOTE VIEWING-ENDPOINT.)

(8416. VIEWER-POSITION-INDICATOR COMPRISES AT LEAST ONE HOLOGRAPHIC DISPLAY DEVICE.)

(8417. A FIRST USER OF A FIRST VIEWING-ENDPOINT MAY VIEW THE VIRTUAL POSITION OF A SECOND USER, THE SECOND USER USING A SECOND VIEWING-ENDPOINT.)

(8418. AN INDICATOR OF THE VIRTUAL POSITION OF THE SECOND USER IS RENDERED WITHIN THE SCENE AS VIEWED BY THE FIRST USER.)

(8419. SECOND USER APPEARS AS AN AVATAR WITHIN THE VIEW OF THE FIRST USER.)

(8420. AT LEAST ONE SENSOR IS CONNECTED TO A VIEWING-ENDPOINT, THE AT LEAST ONE SENSOR COMPRISING ANY OF: A MICROPHONE, A KEYBOARD, A 3D SPATIAL POSITION TRACKING ELEMENT, A 3D ORIENTATION TRACKING ELEMENT, AN INTERFACE TO A COMPUTER OR SMARTPHONE, A CAMERA OPERABLE TO VIEW THE ENVIRONMENT AROUND THE USER OF THE REMOTE VIEWING-ENDPOINT, A CAMERA TO VIEW THE FACE OF THE USER OF THE REMOTE VIEWING-ENDPOINT, A CAMERA TO VIEW THE HANDS OF THE USER OF THE REMOTE VIEWING-ENDPOINT, AN ACCELEROMETER, A TEMPERATURE SENSOR, OR A SKIN-CONDITION SENSOR.)

(8421. USER INFORMATION TRANSMITTED FROM THE VIEWING-ENDPOINT TO THE CAPTURING-ENDPOINT COMPRISES INFORMATION COLLECTED FROM THE AT LEAST ONE SENSOR CONNECTED TO THE VIEWING-ENDPOINT.)

(8422. PROVIDE AN INDICATION, TO AT LEAST ONE USER OF THE CAPTURING-ENDPOINT, OF VIEWING USER DENSITY OR VIEWING AUDIENCE SIZE.)

(8423. PROVIDING AN INDICATION OF VIEWING USER DENSITY OR VIEWING AUDIENCE SIZE COMPRISES PROVIDING AN INDICATION OF COLLECTIVE GAZE ON THE AT LEAST ONE USER OF THE CAPTURING-ENDPOINT.)

(8424. PROVIDE A TACTILE INDICATION, TO AT LEAST ONE USER OF THE CAPTURING ENDPOINT, OF GAZE ON THE AT LEAST ONE USER OF THE CAPTURING ENDPOINT.)

*FIG. 84B*

ASYMMETRIC COMMUNICATION SYSTEM WITH VIEWER POSITION INDICATIONS

CROSS-REFERENCE TO RELATED APPLICATIONS AND INCORPORATION BY REFERENCE

This patent application claims the priority benefit of U.S. Provisional Pat. App. 63/219,261 filed 7 Jul. 2021.

This patent application is a continuation-in-part (CIP) of commonly owned PCT Pat. App. PCT/US16/23433 entitled "Virtual 3D Methods, Systems And Software", published as WO/2016/154123, which claims the priority benefit of U.S. Provisional Pat. App. U.S. Ser. No. 62/136,494, both incorporated by reference herein.

This patent application is also a CIP of commonly owned U.S. patent application Ser. No. 17/460,246, which is a continuation of U.S. patent application Ser. No. 16/749,989 (now U.S. Pat. No. 11,106,275), both incorporated by reference herein.

U.S. patent application Ser. No. 16/749,989 is a continuation of U.S. patent application Ser. No. 15/560,019 (now U.S. Pat. No. 10,551,913), which is a U.S. national entry of above-noted PCT/US16/23433, both incorporated by reference herein.

This application is also related to the following commonly owned patent applications incorporated by reference herein:

PCT/US16/32213 entitled "Facial Signature Methods, Systems and Software", published as WO/2016/183380;

PCT/US18/19243 entitled "Image Reconstruction Methods, Systems And Software for Virtual 3D", published as WO 2018/164852;

PCT/US18/63699 entitled "Stereo Correspondence Search", published as WO/2019/109106;

PCT/US18/48197 entitled "Visual Communications Methods, Systems And Software", published as WO/2019/067134;

PCT/US18/63531 entitled "Temporal De-Noising", published as WO/2019/109061;

PCT/US18/64077 entitled "Disparity Cache", published as WO/2019/113215; and

PCT/US20/47276 entitled "Camera System Utilizing Auxiliary Image Sensors", published as WO/2021/035095.

Each of the above-listed applications is incorporated by reference herein as if set forth herein in its entirety, including all text and drawings thereof. In the event of an inconsistent description between this document and any of the documents incorporated by reference, the description in the incorporated document(s) shall be considered merely supplementary to the description set forth herein, and the description set forth herein shall control.

BACKGROUND OF THE INVENTION

Conventional video-conferencing systems make use of a camera located at a transmitting endpoint to present a view of a physical scene to a remote participant at a receiving endpoint. This view reflects the physical scene as it changes in realtime and typically includes images of participants who are present in the physical scene. Participants at the receiving endpoint may interact with participants at the transmitting endpoint through a number of modalities such as audio transmission, text communication, screen-sharing, file sharing, and often a reciprocal view to the physical scene at the receiving endpoint. This duplex view is not a requirement of video conferencing, however.

In a traditional video conferencing system, a viewer at the receiving endpoint cannot modify the viewpoint from which they observe the physical scene at the transmitting endpoint. However, commonly-owned U.S. Pat. No. 10,551,913 and related commonly-owned U.S./PCT Patent Applications present a system (referred to herein as "V3D") in which a viewer at a receiving endpoint may move the viewpoint within the physical scene at the transmitting endpoint. This movement of the viewpoint may be controlled in response to the physical movement of a viewing user, using sensors incorporated into a head-mounted display system, using a face tracking mechanism, or another means of control.

Broadcast presenters frequently make use of presentation aids, such as teleprompters, in order to receive information, such as the lines of a prepared speech, without glancing down or to the side and thus maintaining the impression of eye contact from the perspective of the camera.

Multi-player video games commonly create a shared virtual environment in which many remote participants may interact through avatars in virtual space. Each participant's avatar may move through the virtual space and another participant will perceive that motion from the perspective of the viewing participant's respective avatar. Within such video game virtual worlds, the position and movements of the avatar need not correlate with the physical position and movement of the participant. Likewise, the avatar need not resemble the physical appearance of the participant.

It would be desirable to provide methods, systems and computer program products ("software") that enable a virtual three-dimensional visual experience (referred to herein as "V3D") in videoconferencing and other applications, and that enable virtual immersion of one or remote viewing participants into a captured scene that may include any number of physically present participants.

Some embodiments and practices of the present invention can be implemented in conjunction with V3D aspects disclosed and claimed in the commonly-owned U.S. Pat. No. 10,551,913 and related commonly-owned U.S./PCT Patent Applications, and may utilize aspects of the V3D subject matter. However, it is noted that the present invention can also be practiced in environments other than those disclosed in the noted, commonly-owned U.S. patents and U.S./PCT Patent Applications.

Thus, although various embodiments and practices of the present invention discussed herein can be used in conjunction with practices and embodiments of the Virtual 3-D ("V3D") inventions described in the above-noted, commonly-owned patent applications incorporated herein by reference, they may also be useful in other systems and in connection with other technologies, and are not limited to application in connection with the V3D inventions described in the patent applications incorporated by reference herein.

Aspects, examples, embodiments and practices of the invention, whether in the form of methods, devices, systems or computer software/program code products, will next be described in greater detail in the following Summary of the Invention and Detailed Description of the Invention sections, in conjunction with the attached drawing figures.

The Detailed Description of the Invention section set forth below first discusses V3D aspects, and then discusses embodiments and practices of the invention relating to an asymmetric communications system with viewer position indications.

SUMMARY OF THE INVENTION

The following discussion, detailed description and accompanying drawing figures describe a novel communication system that facilitates virtual immersion of one or more remote viewing participants into a captured scene which may include any number of physically present participants. The system provides indications of the remote viewing participants which can be seen by the physically present participants.

Among other applications, this invention may be useful to facilitate remote meetings, conferences, live performances including musical performances, sporting events, and other applications that would be enhanced by real-time immersion in a remote location.

Where the word "connected" is used herein, it should be understood to include virtual connections, such as connections using a wireless communication link or a connection facilitated by a network, which may include some degree of virtualization.

Exemplary aspects, practices and embodiments of the present invention utilize two or more cameras integrated into a capturing endpoint, the cameras positioned such that they are able to capture multiple views of a physical scene, the scene typically containing one or more physically-present participants. Data derived from the camera images, and therefore containing information about the physical scene and physically-present participants, is transmitted by the capturing endpoint to at least one viewing endpoint, the viewing endpoint being used by at least one remote participant.

In an exemplary practice of the invention, a remote participant has a virtual location within the 3-dimensional space of the physical scene. A view of the physical scene, as it would be seen from the perspective of the virtual location of the remote participant, is reconstructed and displayed to the remote participant. A remote participant may move his/her/their virtual location as well as gaze orientation, thus altering the view of the physical scene that is reconstructed.

In an exemplary practice of the invention, if a remote participant is viewing the reconstructed view of the scene using a head-mounted display, at least two images of the scene will be reconstructed, corresponding to the viewpoint from each of the remote participant's eyes. Information from sensors associated with the head-mounted display, potentially including an accelerometer and/or a tracking system, may cause the virtual location or orientation of the remote participant to change in response to movements of the remote participant.

Additional information about the remote participant may also be available to the viewing endpoint; this information may include: a remote participant's speech in the form of audio, text or another modality; a remote participant's reactions or emotions, communicated deliberately as with an emoji or automatically as with a video feed of the participant's face or with a face-recognition algorithm; or any additional information the remote participant makes available deliberately (such as shared files) or automatically (such as biometric indication including pulse and/or body temperature).

Information about the remote participant, including the virtual location of a remote participant, and potentially also including the aforementioned types of information, is transmitted, by the viewing endpoint to the capturing endpoint, to be communicated to the physically present users.

In the case of a meeting with few remote participants (fewer than approximately one hundred), individualized information about each remote participant may be presented to physically-present participants on a display device connected to the capturing endpoint.

In one embodiment, the display device may comprise a matrix of lights, indicating the position of a remote participant, thereby allowing a physically-present participant to give the impression of eye-contact by looking at an illuminated light. Colored lights or blinking lights may be used to differentiate remote-participants, or to communicate additional information about the participant such as which participant is speaking, or the state of each participant.

In another embodiment, the display device may comprise one or more screens, which may display the remote-participants' face(s), or additional information the remote participants wish to share such as a computer screen or textual communication. The screens may also display indications of the positions and orientations of the remote participants.

In another embodiment, the display device may display avatars for each remote participant. The position and relative sizes of the avatars may communicate the remote participant's virtual position. The remote participant may choose to affect their avatar to communicate additional information, or the avatars may change in response to information gathered from the remote participant.

In such an example of a meeting-related practice of the invention, the audio captured by a microphone connected to the viewing endpoint may be transmitted and reproduced by a speaker connected to the capturing endpoint, or interpreted and presented as text on a display at the capturing endpoint. This aspect is substantially similar to teleconferencing systems already in broad use, and the solutions for audio arbitration such as a participant-controllable mute feature, and a feature to highlight the speaking user and make they appear prominently on a display, will also apply to this invention.

The invention may also be used to facilitate a performance with a multitude of remote participants, for example a live musical performance in which the physically-present participants are musicians or performers and the remote participants are audience members.

In such an example of a performance-related practice of the invention, a display device connected to the capturing endpoint may communicate aggregate information to the physically-present participants about the collective state of the remote participants. For example, the display device:

may indicate the density of the virtual crowd of remote participants;

may indicate objects in the physical scene that attract the gaze of large numbers of remote participants, such as a physically-present participant or performer;

may indicate the aggregate reactions or emotions of the remote participants, such as aggregate real-time distributions of approval vs. disapproval;

may indicate the average excitement level of remote participants, such as could be measured by heart rate, or by detecting applause or cheering via a viewing endpoint's microphone In addition to the foregoing, one aspect of the present invention relates to methods, systems and computer code products (software) for providing an asymmetric communications system, method aspects of which comprise: (A) providing a scene capturing-endpoint, the capturing-endpoint comprising (1) at least two cameras positioned to observe a scene from multiple perspectives; and (2) a viewer-position-indicator; (B) providing at least one scene viewing-endpoint, the at least one viewing-endpoint comprising (1) a display, operable to display a different view of the scene dependent upon a viewing-user's position; and (2) a tracker, operable to track the viewing-user's position; and (C) providing a communication link operable to transmit scene information from the capturing-endpoint to a viewing-endpoint; the link being further operable to transmit user information from the viewing-endpoint to the capturing-endpoint.

In another aspect of the invention, the viewer-position-indicator is operable to indicate the position of at least one viewing-user using at least one scene-viewing endpoint, so as to communicate the viewing-users position to the at least one user of the capturing endpoint.

In another aspect, a viewing-use's position is determined based on the inverse of the logic to reconstruct the view of the scene to be displayed via the display of the scene-viewing endpoint.

In a related aspect, the viewer-position-indicator is operable to indicate a viewing-user's virtual position within a real captured scene.

In one aspect of the invention, the display of the viewing-endpoint comprises a head-mounted-display (HMD).

In another aspect, the tracker is worn on a user's head and the position tracked comprises the user's head position and orientation.

In another aspect of the invention, the tracker further tracks the user's eye position or gaze orientation.

In another aspect, the display of the viewing-endpoint comprises a three-dimensional holographic display.

In yet another aspect of the present invention, the tracker comprises a camera, positioned to observe the user, and further comprising face detection logic.

In another aspect, the capturing-endpoint further comprises logic to compute disparity information between pairs of cameras.

In a further aspect of the invention, the viewer-position-indicator comprises a matrix of elements, the elements operable to activate in response to a viewing-user's virtual position.

In a related aspect, the elements are operable to emit light.

In another aspect of the invention, the viewer-position-indicator comprises at least one conventional display device operable to present a representation of at least one viewing-user, and wherein the representation indicates the virtual position of the at least one viewing-user.

In another aspect, the representation utilizes selected representational size to indicate distance.

In another aspect of the invention, the representation utilizes 3D rotation to communicate any of a viewing-users orientation, a viewing-user's gaze, or a combination of a viewing-user's orientation and gaze.

In another aspect, the representation comprises an avatar of the user of the remote viewing-endpoint.

In still another aspect of the invention, the viewer-posi-tion-indicator comprises at least one holographic display device.

In another aspect, a first user of a first viewing-endpoint may view the virtual position of a second user of a second viewing-endpoint. In still another aspect, an indicator of the virtual position of the second user is rendered within the scene as viewed by the first user. In yet another aspect of the invention, the second user appears as an avatar within the view of the first user.

In another aspect of the present invention, at least one sensor is connected to a viewing endpoint, the at least one sensor comprising any of: a microphone, a keyboard, a 3D spatial position tracking element, a 3D orientation tracking element, an interface to a computer or smartphone, a camera operable to view the environment around the user of the remote viewing-endpoint, a camera to view the face of the user of the remote viewing-endpoint, a camera to view the hands of the user of the remote viewing-endpoint, an accel-erometer, a temperature sensor, or a skin-condition sensor.

In a related aspect, user information transmitted from the viewing-endpoint to the capturing endpoint comprises infor-mation collected from the at least one sensor connected to a viewing endpoint.

Another aspect of the invention comprises providing an indication, to at least one user of the capturing endpoint, of viewing user density or viewing audience size.

In a related aspect, providing an indication of viewing user density or viewing audience size comprises providing an indication of collective gaze on the at least one user of the capturing endpoint.

Still another aspect of the invention comprises providing a tactile indication, to at least one user of the capturing endpoint, of gaze on the at least one user of the capturing endpoint.

Although embodiments and practices of the present invention discussed herein can be used in conjunction with practices and embodiments of the Virtual 3D ("V3D") inventions described in the above-noted, commonly-owned patent applications incorporated herein by reference (and described in the Detailed Description of the Invention sec-tion below), they may also be useful in other systems and in connection with other technologies, and are not limited to application in connection with the V3D inventions described in the patent applications incorporated by reference herein.

These and other aspects, examples, embodiments and practices of the invention, whether in the form of methods, devices, systems or computer software/program code prod-ucts, will next be described in greater detail in the following Detailed Description of the Invention, in conjunction with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 2A and 2B-6A and 6B are schematic diagrams illustrating exemplary V3D-related aspects in connection with which the present invention may be practiced.

FIGS. 9-18A, 18B, 18C and 18D are schematic diagrams illustrating exemplary V3D-related aspects in connection with which the present invention may be practiced.

FIGS. 20A and 20B-45 are schematic diagrams illustrat-ing exemplary V3D-related aspects in connection with which the present invention may be practiced.

FIGS. 47A and 47B-54 are schematic diagrams illustrating V3D-related aspects in connection with which the present invention may be practiced.

FIGS. 55-80 are flowcharts depicting exemplary practices of V3D-related aspects in connection with which the present invention may be practiced.

FIGS. 83, 84A and 84B are flowcharts depicting exemplary practices of the present invention, with viewer position indications.

DETAILED DESCRIPTION OF THE INVENTION

Figure 1:
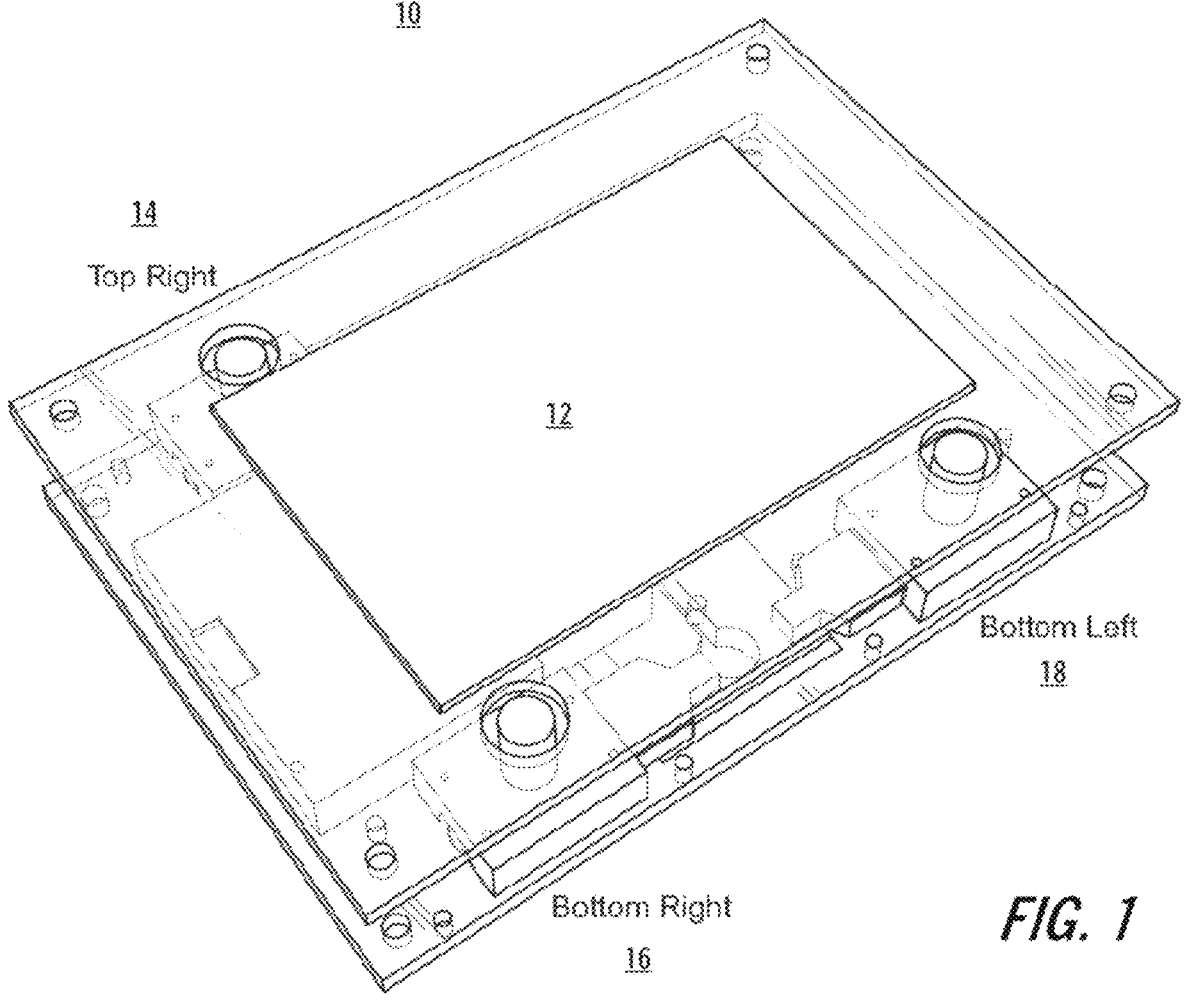
FIG. 1 shows a camera configuration useful in exemplary V3D-related aspects in connection with which the present invention may be practiced.

As noted above, various embodiments and practices of the present invention can be implemented in conjunction with V3D aspects disclosed and claimed in the commonly-owned U.S. Pat. No. 10,551,913 and related commonly-owned U.S./PCT Patent Applications, and may utilize aspects of the V3D subject matter. However, it is also noted that the present invention can also be practiced in environments other than those disclosed in the noted, commonly-owned U.S. patents and U.S./PCT Patent Applications.

Thus, although embodiments and practices of the present invention discussed herein can be used in conjunction with practices and embodiments of the Virtual 3D ("V3D") inventions described in the above-noted, commonly-owned patent applications incorporated herein by reference, they may also be useful in other systems and in connection with other technologies, and are not limited to application in connection with the V3D inventions described in the patent applications incorporated by reference herein.

The following discussion first addresses V3D aspects, and then discusses embodiments and practices of the invention relating to an asymmetric communications system with viewer position indications.

I. V3D Aspects

1. Overview of V3D Aspects
Introduction—V3D

Current video conferencing systems such as Apple's Facetime, Skype or Google Hangouts have a number of limitations which make the experience of each user's presence and environment significantly less engaging than being physically present on the other side. These limitations include (1) limited bandwidth between users, which typically results in poor video and audio quality; (2) higher than ideal latency between users (even if bandwidth is adequate, if latency is excessive, a first user's perception of the remote user's voice and visual actions will be delayed from when the remote user actually performed the action, resulting in difficult interaction between users; and (3) limited sensory engagement (of the five traditionally defined senses, even the senses of sight and sound are only partially served, and of course taste, smell and touch are unaccounted-for).

The first two issues can be addressed by using a higher performing network connection and will likely continue to improve as the underlying communications infrastructure improves. As for the third issue, the present invention, referred to herein as "V3D", aims to address and radically improve the visual aspect of sensory engagement in teleconferencing and other video capture settings, while doing so with low latency.

The visual aspect of conducting a video conference is conventionally achieved via a camera pointing at each user, transmitting the video stream captured by each camera, and then projecting the video stream(s) onto the two-dimensional (2D) display of the other user in a different location. Both users have a camera and display and thus is formed a full-duplex connection where both users can see each other and their respective environments.

The V3D of the present invention aims to deliver a significant enhancement to this particular aspect by creating a "portal" where each user would look "through" their respective displays as if there were a "magic" sheet of glass in a frame to the other side in the remote location. This approach enables a number of important improvements for the users (assuming a robust implementation:

1. Each user can form direct eye contact with the other.
2. Each user can move his or her head in any direction and look through the portal to the other side. They can even look "around" and see the environment as if looking through a window.
3. Device shaking is automatically corrected for since each user sees a view from their eye directly to the other side. Imagine if you looked through a window and shook the frame: there would be no change in the image seen through it.
4. Object size will be accurately represented regardless of view distance and angle.

The V3D aspects of the invention can be configured to deliver these advantages in a manner that fits within the highly optimized form factors of today's modern mobile devices, does not dramatically alter the economics of building such devices, and is viable within the current connectivity performance levels available to most users.

By way of example of the invention, FIG. 1 shows a perspective view of an exemplary prototype device 10, which includes a display 12 and three cameras: a top right camera 14, and bottom right camera 16, and a bottom left camera 18. In connection with this example, there will next be described various aspects of the invention relating to the unique user experience provided by the V3D invention.

Overall User Experience
Communication (Including Video Conferencing) with Eye Contact The V3D system of the invention enables immersive communication between people (and in various embodiments, between sites and places). In exemplary practices of the invention, each person can look "through" their screen and see the other place. Eye contact is greatly improved. Perspective and scale are matched to the viewer's natural view. Device shaking is inherently eliminated. As described herein, embodiments of the V3D system can be implemented in mobile configurations as well as traditional stationary devices.

FIGS. 2A-B, 3A-B, and 5A-B are images illustrating an aspect of the invention, in which the V3D system is used in conjunction with a smartphone 20, or like device. Smartphone 20 includes a display 22, on which is displayed an image of a face 24. The image may be, for example, part of video/telephone conversation, in which a video image and sound conversation is being conducted with someone in a remote location, who is looking into the camera of their own smartphone.

FIGS. 2A and 2B illustrate a feature of the V3D system for improving eye contact. FIG. 2A shows the face image prior to correction. It will be seen that the woman appears to be looking down, so that there can be no eye contact with the other user or participant. FIG. 1B shows the face image after correction. It will be seen that in the corrected image, the woman appears to be making eye contact with the smartphone user.

FIGS. 3A-3B are a pair of diagrams illustrating the V3D system's "move left" (FIG. 3A) and "move right" (FIG. 3B) corrections. FIGS. 4A-4B are a pair of diagrams of the light pathways 26*a*, 26*b* in the scene shown respectively on display 22 in FIGS. 3A-3B (shown from above, with the background at the top) leading from face 24 and surrounding objects to viewpoints 28*a*, 28*b* through the "window" defined by display 22.

Figures 5A, 5B, 6A, 6B:
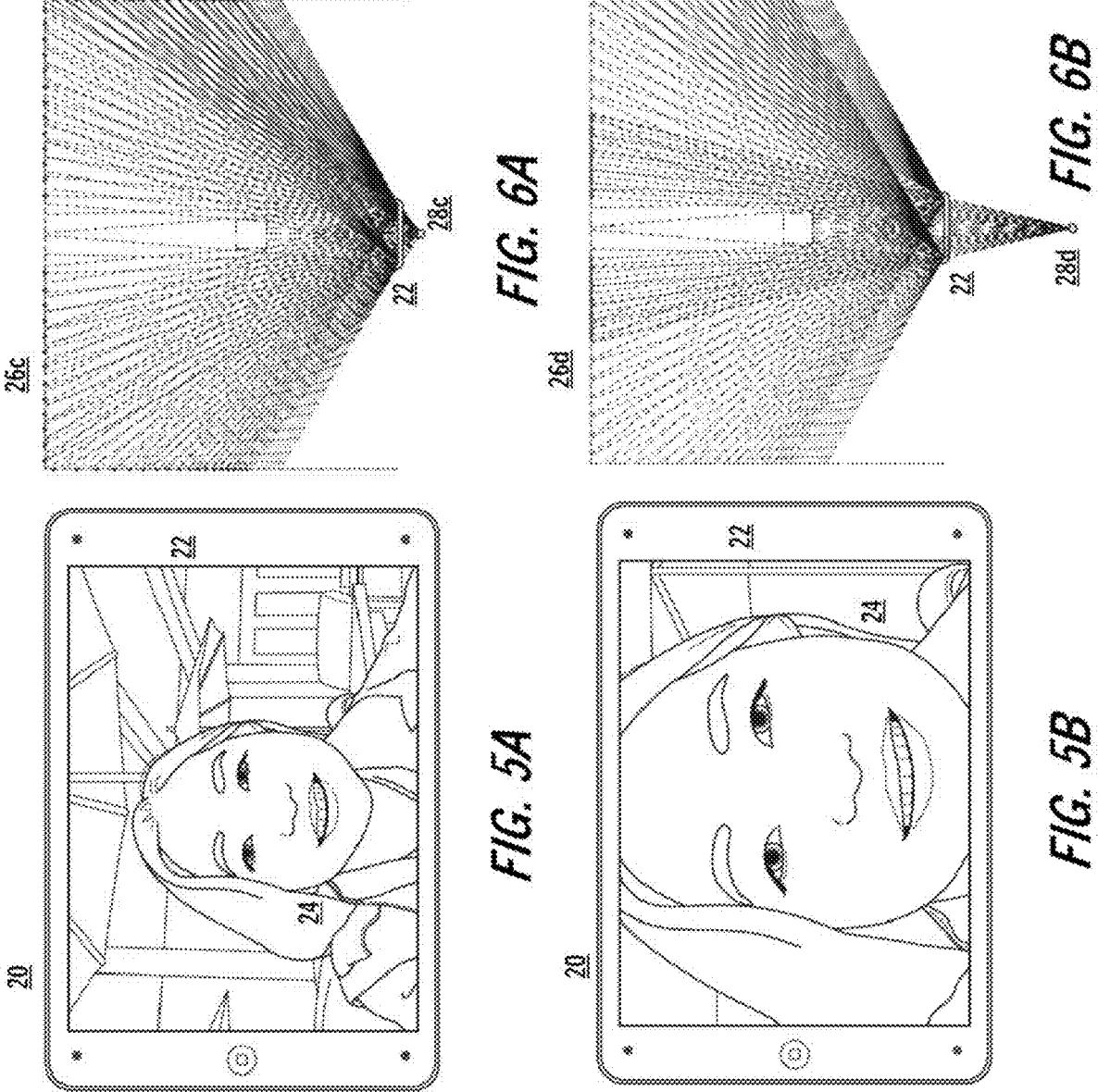

FIGS. 5A-5B are a pair of diagrams illustrating the V3D system's "move in" (FIG. 5A) and "move out" (FIG. 5B) corrections. FIGS. 6A-6B are a pair of diagrams of the light pathways 26*c*, 26*d* in the scene shown respectively on display 22 in FIGS. 3A-3B (shown from above, with the background at the top) leading from face 24 and surrounding objects to viewpoints 28*c*, 28*d* through the "window" defined by display 22.

Self Portraiture Example

Another embodiment of the invention utilizes the invention's ability to synthesize a virtual camera view of the user to aid in solving the problem of "where to look" when taking a self-portrait on a mobile device. This aspect of the invention operates by image-capturing the user per the overall V3D method of the invention described herein, tracking the position and orientation of the user's face, eyes or head, and by using a display, presenting an image of the user back to themselves with a synthesized virtual camera viewpoint, as if the user were looking in a mirror.

Photography Composition

Another embodiment of the invention makes it easier to compose a photograph using a rear-facing camera on a mobile device. It works like the overall V3D method of invention described herein, except that the scene is captured through the rear-facing camera(s) and then, using the user's head location, a view is constructed such that the scale and perspective of the image matches the view of the user, such that the device display frame becomes like a picture frame. This results in a user experience where the photographer does not have to manipulate zoom controls or perform cropping, since they can simply frame the subject as they like within the frame of the display, and take the photo.

Panoramic Photography

Another embodiment of the invention enables the creation of cylindrical or spherical panoramic photographs, by processing a series of photographs taken with a device using the camera(s) running the V3D system of the invention. The user can then enjoy viewing the panoramic view thus created, with an immersive sense of depth. The panorama can either be viewed on a 2D display with head tracking, a multi-view display or a binocular virtual reality (VR) headset with a unique perspective shown for each eye. If the binocular VR headset has a facility to track head location, the V3D system can re-project the view accurately.

2. Overall V3D Processing Pipeline

Figure 7:
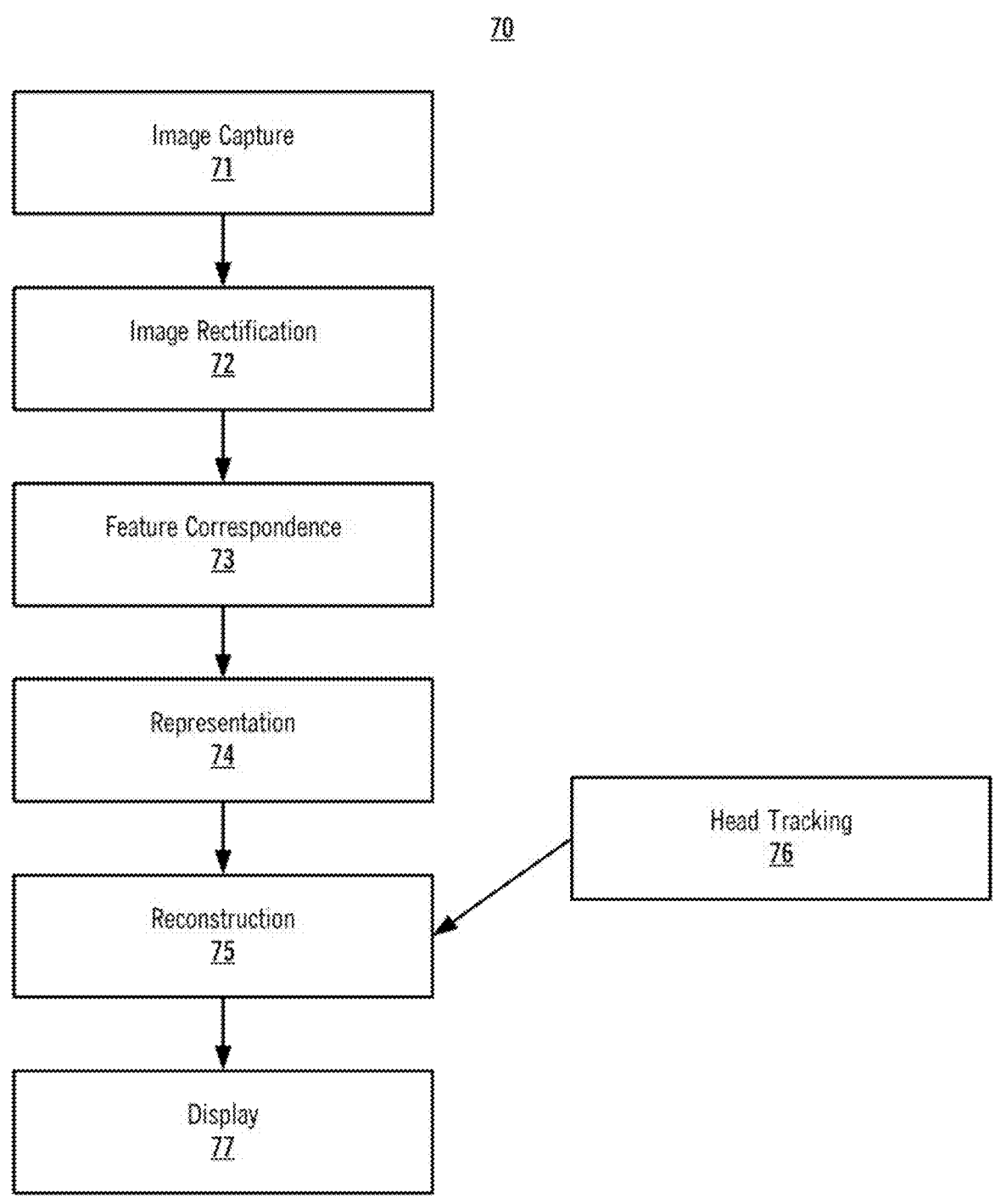
FIG. 7 is a flowchart showing exemplary V3D-related aspects in connection with which the present invention may be practiced.

FIG. 7 shows a general flow diagram illustrating the overall V3D pipeline 70, which incorporates the following aspects to deliver the user experience described above:

71: Image Capture: One or more images of a scene, which may include a human user, are collected instantaneously or over time via one or more cameras and fed into the system. Wide-angle lenses are generally preferred due to the ability to get greater stereo overlap between images, although this depends on the application and can in principle work with any focal length.

72: Image Rectification: In order to compensate for optical lens distortion from each camera and relative misalignment between the cameras in the multi-view system, image processing is performed to apply an inverse transform to eliminate distortion, and an affine transform to correct misalignment between the cameras. In order to perform efficiently and in real-time, this process can be performed using a custom imaging pipeline or implemented using the shading hardware present in many conventional graphical processing units (GPUs) today, including GPU hardware present in devices such as iPhones and other commercially available smartphones. Additional detail and other variations of these operations will be discussed in greater detail herein.

73: Feature Correspondence: With the exception of using time-of-flight type sensors in the Image Capture phase that provide depth information directly, this process is used in order to extract parallax information present in the stereo images from the camera views. This process involves detecting common features between multi-view images and measuring their relative distance in image space to produce a disparity measurement. This disparity measurement can either be used directly or converted to actual depth based on knowledge of the camera field-of-view, relative positioning, sensor size and image resolution. Additional detail and other variations of these operations will be discussed in greater detail herein.

74: Representation: Once disparity or depth information has been acquired, this information, combined with the original images must be represented and potentially transmitted over a network to another user or stored. This could take several forms as discussed in greater detail herein.

75: Reconstruction: Using the previously established representation, whether stored locally on the device or received over a network, a series of synthetic views into the originally captured scene can be generated. For example, in a video chat, the physical image inputs may have come from cameras surrounding the head of the user in which no one view has a direct eye contact gaze vector to the user. Using reconstruction, a synthetic camera view placed potentially within the bounds of the device display enabling the visual appearance of eye contact can be produced.

76: Head Tracking: Using the image capture data as an input, many different methods exist to establish an estimate of the viewer's head or eye location. This information can be used to drive the reconstruction and generate a synthetic view which looks valid from the user's established head location. Additional detail and various forms of these operations will be discussed in greater detail herein.

77: Display: Several types of display can be used with the V3D pipeline in different ways. The currently employed method involves a conventional 2D display combined with head tracking to update the display project in real-time so as to give the visual impression of being three-dimensional (3D) or a look into a 3D environment. However, binocular stereo displays (such as the commercially available Oculus Rift) can be employed used, or still further, a lenticular type display can be employed, to allow auto-stereoscopic viewing.

3. Pipeline Details

Figure 8:
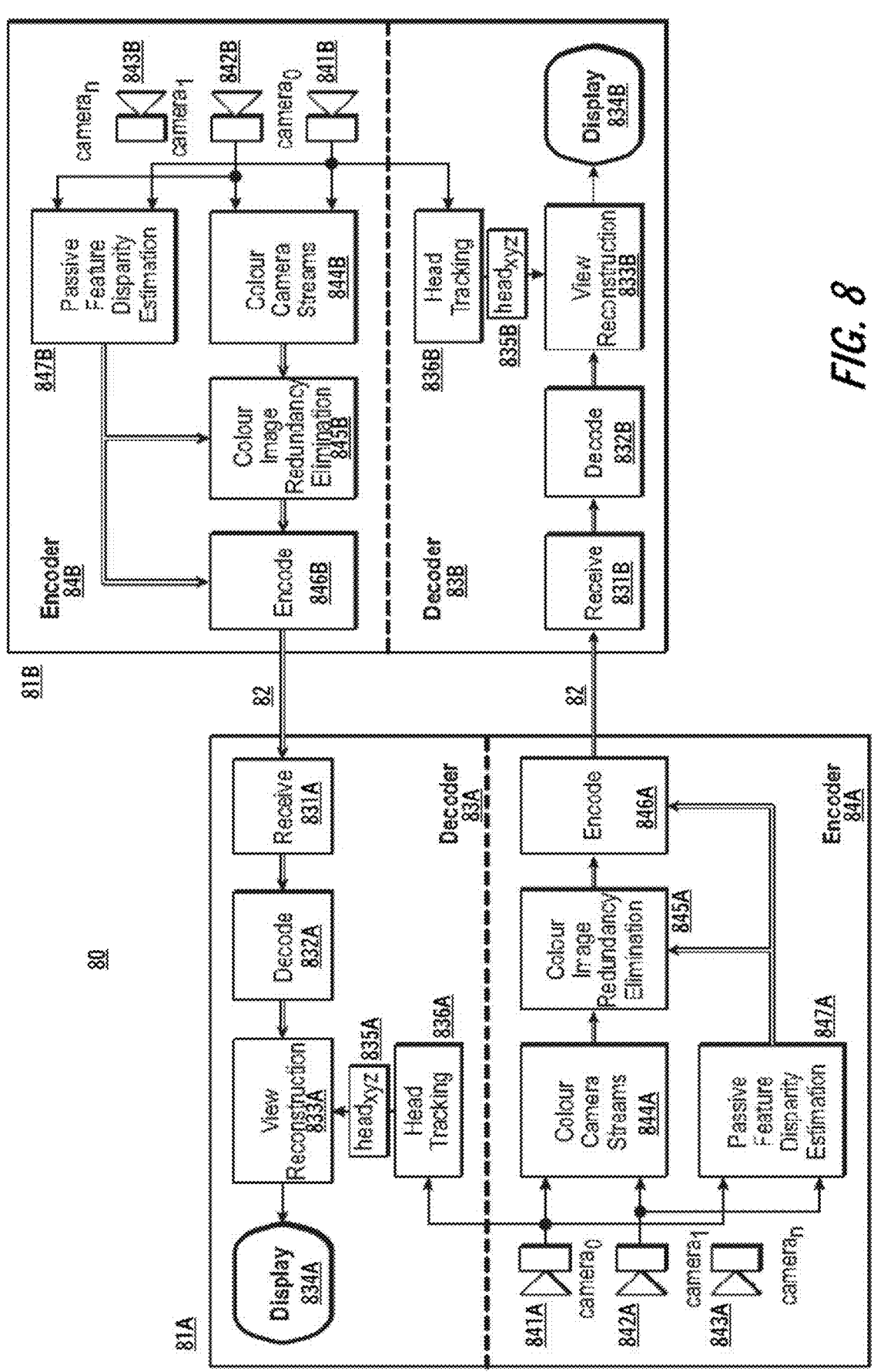
FIG. 8 is a block diagram depicting an exemplary embodi-ment of V3D-related aspects in connection with which the present invention may be practiced.

FIG. 8 is a diagram of an exemplary V3D pipeline 80 configured in accordance with the invention, for immersive communication with eye contact. The depicted pipeline is full-duplex, meaning that it allows simultaneous two-way communication in both directions.

Pipeline 80 comprises a pair of communication devices 81A-B (for example, commercially available smartphones such as iPhones) that are linked to each other through a network 82. Each communication device includes a decoder end 83A-B for receiving and decoding communications from the other device and an encoder end 84A-B for encoding and sending communications to the other device 81A-B.

The decoder end 83A-B includes the following components:

a Receive module 831A-B;

a Decode module 832A-B;

a View Reconstruction module 833A-B; and a Display 834A-B.

The View Reconstruction module 833A-B receives data 835A-B from a Head Tracking Module 836-B, which provides x-, y-, and z-coordinate data with respect to the user's head that is generated by camera$_0$ 841A-B.

The encoder end 84-B comprises a multi-camera array that includes camera$_0$ 841A-B, camera, 841A-B, and additional camera(s) 842A-B. (As noted herein, it is possible to practice various aspects of the invention using only two cameras.) The camera array provides data in the form of color camera streams 843A-B that are fed into a Color Image Redundancy Elimination module 844A-B and an Encode module. The output of the camera array is also fed into a Passive Feature Disparity Estimation module 845A-B that provides disparity estimation data to the Color Image Redundancy Elimination module 846A-B and the Encode module 847A-B. The encoded output of the device is then transmitted over network 82 to the Receive module 831A-B in the second device 81A-B.

These and other aspects of the invention are described in greater detail elsewhere herein.

Image Capture

The V3D system requires an input of images in order to capture the user and the world around the user. The V3D system can be configured to operate with a wide range of input imaging device. Some devices, such as normal color cameras, are inherently passive and thus require extensive image processing to extract depth information, whereas non-passive systems can get depth directly, although they have the disadvantages of requiring reflected IR to work, and thus do not perform well in strongly naturally lit environments or large spaces. Those skilled in the art will understand that a wide range of color cameras and other passive imaging devices, as well as non-passive image capture devices, are commercially available from a variety of manufacturers.

Color Cameras

This descriptor is intended to cover the use of any visible light camera that can feed into a system in accordance with the V3D system.

IR-Structured Light

This descriptor is intended to cover the use of visible light or infrared specific cameras coupled with an active infrared emitter that beams one of many potential patterns onto the surfaces of objects, to aid in computing distance. IR-Structured Light devices are known in the art.

IR Time of Flight

This descriptor covers the use of time-of-flight cameras that work by emitting a pulse of light and then measuring the time taken for reflected light to reach each of the camera's sensor elements. This is a more direct method of measuring depth, but has currently not reached the cost and resolution levels useful for significant consumer adoption. Using this type of sensor, in some practices of the invention the feature correspondence operation noted above could be omitted, since accurate depth information is already provided directly from the sensor.

Single Camera Over Time

The V3D system of the invention can be configured to operate with multiple cameras positioned in a fixed relative position as part of a device. It is also possible to use a single camera, by taking images over time and with accurate tracking, so that the relative position of the camera between frames can be estimated with sufficient accuracy. With sufficiently accurate positional data, feature correspondence algorithms such as those described herein could continue to be used.

View-Vector Rotated Camera Configuration to Improve Correspondence Quality

The following describes a practice of the V3D invention that relates to the positioning of the cameras within the multi-camera configuration, to significantly increase the number of valid feature correspondences between images captured in real world settings. This approach is based on three observations:

1. Users typically orient their display, tablet or phone at a rotation that is level with their eyes.

2. Many features in man-made indoor or urban environments consist of edges aligned in the three orthogonal axes (x, y, z).

3. In order to have a practical search domain, feature correspondence algorithms typically perform their search along horizontal or vertical epipolar lines in image space.

Taken together, these observations lead to the conclusion that there are often large numbers of edges for which there is no definite correspondence. This situation can be significantly improved while keeping the image processing overhead minimal, by applying a suitable rotation angle (or angular displacement) to the arrangement of the camera sensors, while also ensuring that the cameras are positioned relative to each other along epipolar lines. The amount of rotation angle can be relatively small. (See, for example, FIGS. 9, 10 and 11.)

After the images are captured in this alternative "rotated" configuration, the disparity values can either be rotated along with the images, or the reconstruction phase can be run, and the final image result rotated back to the correct orientation so that the user does not even perceive or see the rotated images.

Figure 9:
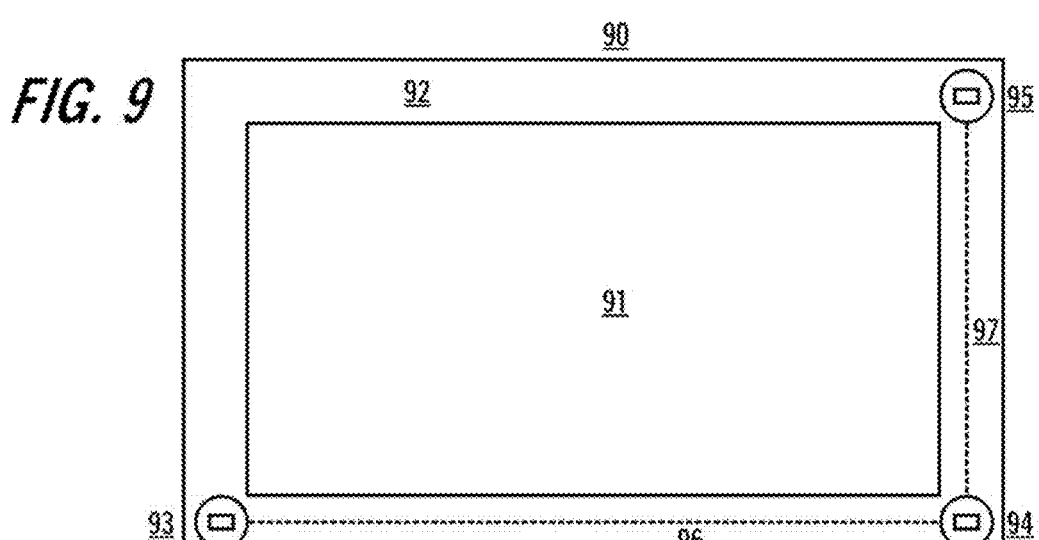
Figure 10:
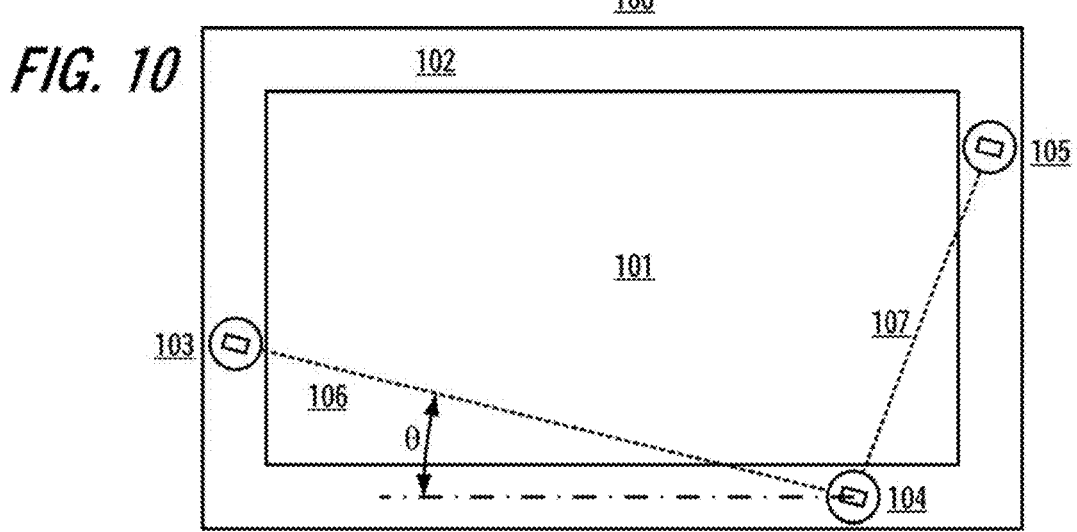
Figure 11:
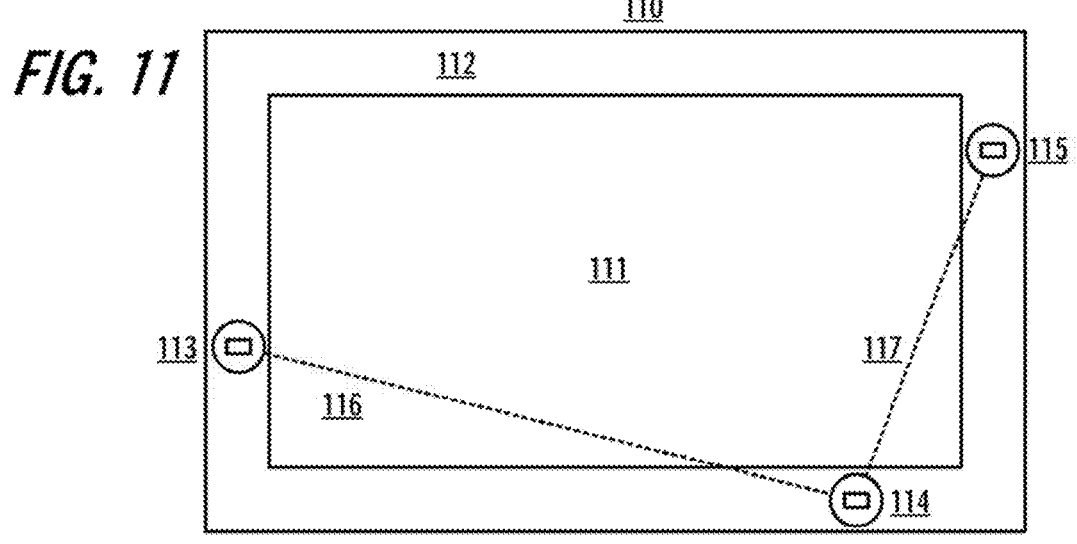

There are a variety of spatial arrangements and orientations of the sensors that can accomplish a range of rotations while still fitting within many typical device form factors. FIGS. 9, 10, and 11 show three exemplary sensor configurations 90, 100, 110.

FIG. 9 shows a handheld device 90 comprising a display screen 91 surrounded by a bezel 92. Sensors 93, 94, and 95 are located at the corners of bezel 92, and define a pair of perpendicular axes: a first axis 96 between sensors 93 and 94, and a second axis 97 between cameras 94 and 95.

FIG. 10 shows a handheld device 100 comprising display 101, bezel 102, and sensors 103, 104, 105. In FIG. 10, each of sensors 103, 104, 105 is rotated by an angle θ relative to bezel 102. The position of the sensors 103, 104, and 105 on bezel 102 has been configured so that the three sensors define a pair of perpendicular axes 106, 107.

FIG. 11 shows a handheld device 110 comprising display 111, bezel 112, and sensors 113, 114, 115. In the alternative configuration shown in FIG. 11, the sensors 113, 114, 115 are not rotated. The sensors 113, 114, 115 are positioned to define perpendicular axes 116, 117 that are angled with respect to bezel 112. The data from sensors 113, 114, 115 are then rotated in software such that the correspondence continues to be performed along the epipolar lines.

Although an exemplary practice of the V3D invention uses 3 sensors to enable vertical and horizontal cross correspondence, the methods and practices described above are also applicable in a 2-camera stereo system.

FIGS. 12 and 13 next highlight advantages of a "rotated configuration" in accordance with the invention. In particular, 12A shows a "non-rotated" device configuration 120, with sensors 121, 122, 123 located in three corners, similar to configuration 90 shown in FIG. 9. FIGS. 12B, 12C, and 12D (collectively, FIGS. 12A-12D being referred to as "FIG. 12") show the respective scene image data collected at sensors 121, 122, 123.

Sensors 121 and 122 define a horizontal axis between them, and generate a pair of images with horizontally displaced viewpoints. For certain features, e.g., features H1, H2, there is a strong correspondence (i.e., the horizontally-displaced scene data provides a high level of certainty with respect to the correspondence of these features). For other features, e.g., features H3, H4, the correspondence is weak, as shown in FIG. 12 (i.e., the horizontally-displaced scene data provides a low level of certainty with respect to the correspondence of these features).

Sensors 122 and 123 define a vertical axis that is perpendicular to the axis defined by sensors 121 and 122. Again, for certain features, e.g., feature V1 in FIG. 12, there is a strong correspondence. For other features. e.g. feature V2 in FIG. 12, the correspondence is weak.

FIG. 13A shows a device configuration 130, similar to configuration 100 shown in FIG. 10, with sensors 131, 132, 133 positioned and rotated to define an angled horizontal axis and an angled vertical axis. As shown in FIGS. 13B, 13C, and 13D, the use of an angled sensor configuration eliminates the weakly corresponding features shown in FIGS. 12B, 12C, and 12D. As shown by FIGS. 12 and 13, a rotated configuration of sensors in accordance with an exemplary practice of the invention enables strong correspondence for certain scene features where the non-rotated configuration did not.

Multi-Exposure Cycling

In accordance with the invention, during the process of calculating feature correspondence, a feature is selected in one image and then scanned for a corresponding feature in another image. During this process, there can often be several possible matches found and various methods are used to establish which match (if any) has the highest likelihood of being the correct one.

As a general fact, when the input camera(s) capture an image, a choice is made to ensure that the camera exposure settings (such as gain and shutter speed) are selected according to various heuristics, with the goal of ensuring that a specific region or the majority of the image is within the dynamic range of the sensing element. Areas that are out of this dynamic range will either get clipped (overexposed regions) or suffer from a dominance of sensor noise rather than valid image signal.

During the process of feature correspondence and image reconstruction in an exemplary practice of the V3D invention, the correspondence errors in the excessively dark or light areas of the image can cause large-scale visible errors in the image by causing the computing of radically incorrect disparity or depth estimates.

Accordingly, another practice of the invention involves dynamically adjusting the exposure of the multi-view camera system on a frame-by-frame basis in order to improve the disparity estimation in areas out of the exposed region viewed by the user. Within the context of the histogram-based disparity method of the invention, described elsewhere herein, exposures taken at darker and lighter exposure settings surrounding the visibility optimal exposure would be taken, have their disparity calculated and then get integrated in the overall pixel histograms which are being retained and converged over time. The dark and light images could be, but are not required to be, presented to the user and would serve only to improve the disparity estimation.

Another aspect of this approach, in accordance with the invention, is to analyze the variance of the disparity histograms on "dark" pixels, "mid-range" pixels and "light pixels", and use this to drive the exposure setting of the cameras, thus forming a closed loop system between the quality of the disparity estimate and the set of exposures which are requested from the input multi-view camera system. For example, if the cameras are viewing a purely indoor environment, such as an interior room, with limited dynamic range due to indirect lighting, only one exposure may be needed. If, however, the user were to (e.g.) open curtains or shades, and allow direct sunlight to enter into the room, the system would lack a strong disparity solution in those strongly lit areas and in response to the closed loop control described herein, would choose to occasionally take a reduced exposure sample on occasional video frames.

Image Rectification

An exemplary practice of the V3D system executes image rectification in real-time using the GPU hardware of the device on which it is operating, such as a conventional smartphone, to facilitate and improve an overall solution.

Typically, within a feature correspondence system, a search must be performed between two cameras arranged in a stereo configuration in order to detect the relative movement of features in the image due to parallax. This relative movement is measured in pixels and is referred to as "the disparity".

Figure 14:
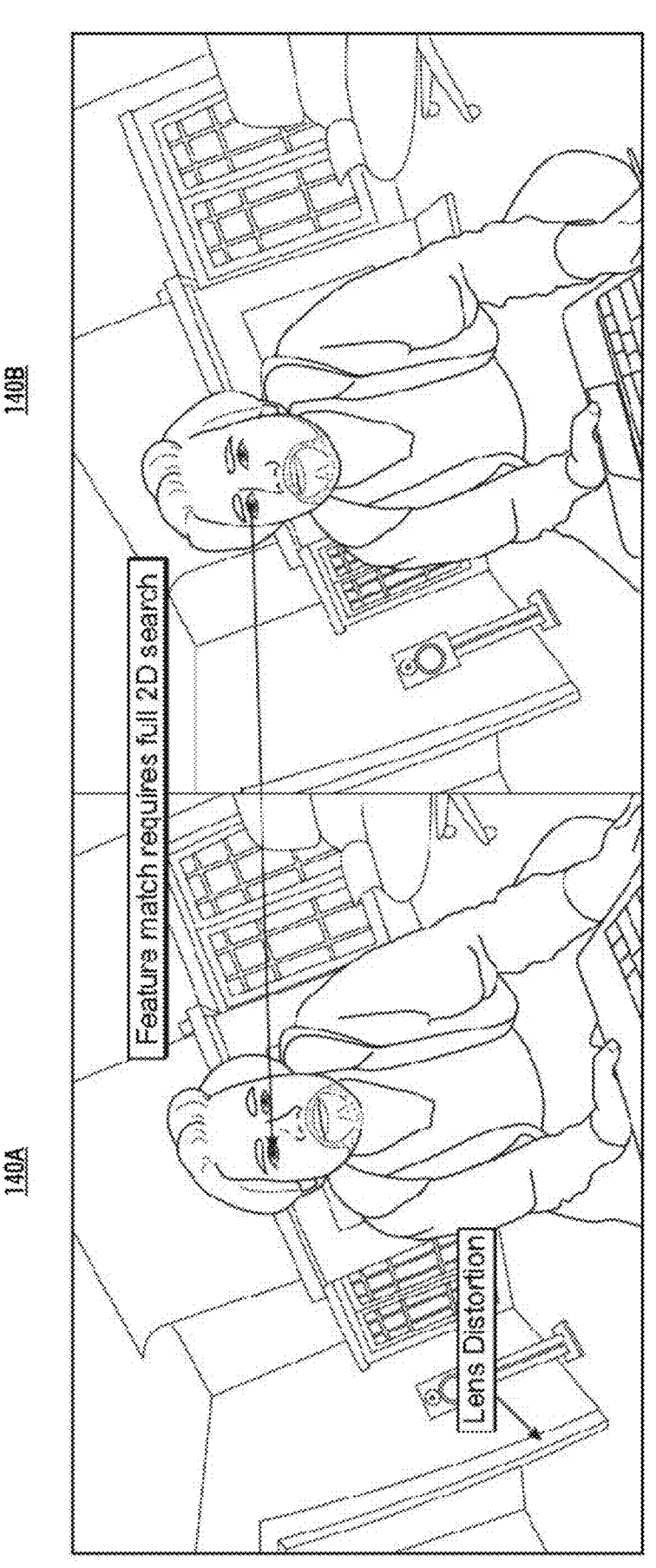

FIG. 14 shows an exemplary pair of unrectified and distorted camera (URD) source camera images 140A and 140B for left and right stereo. As shown in FIG. 14, the image pair includes a matched feature, i.e., the subject's right eye 141A, 140B. The matching feature has largely been shifted horizontally, but there is also a vertical shift because of slight misalignment of the cameras and the fact that there is a polynomial term resulting from lens distortion. The matching process can be optimized by measuring the lens distortion polynomial terms, and by inferring the affine transform required to apply to the images such that they are rectified to appear perfectly horizontally aligned and co-planar. When this is done, what would otherwise be a freeform 2D search for a feature match can now be simplified by simply searching along the same horizontal row on the source image to find the match.

Typically, this is done in one step, in which the lens distortion and then affine transform coefficients are determined and applied together to produce the corrected images. One practice of the invention, however, use a different approach, which will next be described. First, however, we define a number of terms used herein to describe this approach and the transforms used therein, as follows:

URD (Unrectified, Distorted) space: This is the image space in which the source camera images are captured. There is both polynomial distortion due to the lens shape and an affine transform that makes the image not perfectly co-planar and axis-aligned with the other stereo image. The number of URD images in the system is equal to the number of cameras in the system.

URUD (Unrectified, Undistorted) space: This is a space in which the polynomial lens distortion is removed from the image but the images remain unrectified. The number of URUD images in the system is equal to number of URD images and therefore, cameras, in the system.

RUD (Rectified, Undistorted) space: This is a space in which both the polynomial lens distortion is removed from the image and an affine transform is applied to make the image perfectly co-planar and axis aligned with the other stereo image on the respective axis. RUD always exist in pairs. As such, for example, in a 3 camera system where the cameras are arranged in a substantially L-shaped configuration (having two axes intersecting at a selected point), there would be two stereo axes, and thus 2 pairs of RUD images, and thus a total of 4 RUD images in the system.

Figure 15:
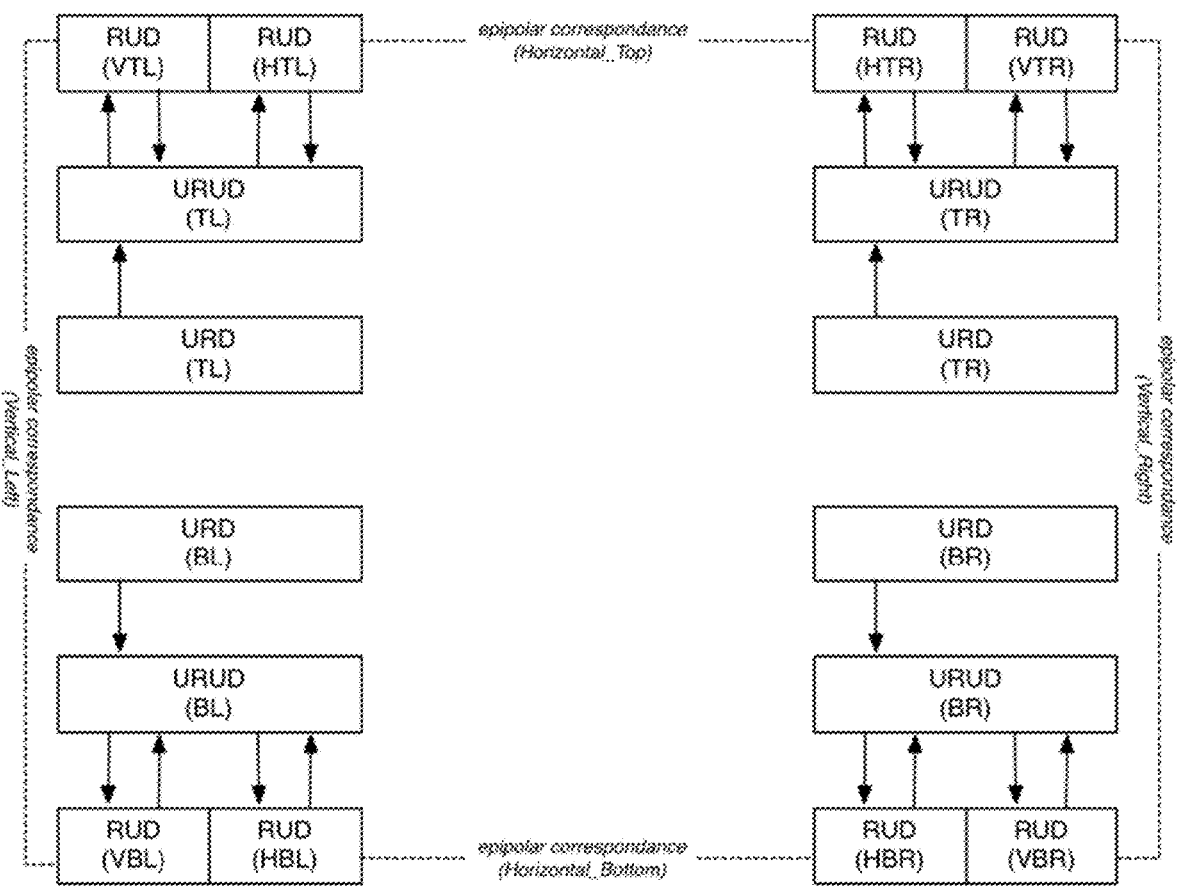

FIG. 15 is a flow diagram 150 providing various examples of possible transforms in a 4-camera V3D system. Note that there are 4 stereo axes. Diagonal axes (not shown) would also be possible.

The typical transform when sampling the source camera images in a stereo correspondence system is to transform from RUD space (the desired space for feature correspondence on a stereo axis) to URD space (the source camera images).

In an exemplary practice of the V3D invention, it is desirable to incorporate multiple stereo axes into the solution in order to compute more accurate disparity values. In order to do this, it is appropriate to combine the disparity solutions between independent stereo axes that share a common camera. As such, an exemplary practice of the invention makes substantial use of the URUD image space to connect the stereo axes disparity values together. This is a significant observation, because of the trivial invertibility of the affine transform (which is simply, for example, a 3×3 matrix). We would not be able to use the URD space to combine disparities between stereo axes because the polynomial lens distortion is not invertible, due to the problem of multiple roots and general root finding. This process of combining axes in the V3D system is further described below, in "Combining Correspondences on Additional Axes".

FIG. 16 sets forth a flow diagram 160, and FIGS. 17A-C are a series of images that illustrate the appearance and purpose of the various transforms on a single camera image.

Feature Correspondence Algorithm

The "image correspondence problem" has been the subject of computer science research for many years. However, given the recent advent of the universal availability of low cost cameras and massively parallel computing hardware (GPUs) contained in many smartphones and other common mobile devices, it is now possible to apply brute force approaches and statistically based methods to feature correspondence, involving more than just a single stereo pair of images, involving images over the time dimension and at multiple spatial frequencies, to execute feature correspondence calculations at performance levels not previously possible.

Various exemplary practices of the invention will next be described, which are novel and represent significant improvement to the quality and reliability attainable in feature correspondence. A number of these approaches, in accordance with the invention, utilize a method of representation referred to herein as "Disparity Histograms" on a per-pixel (or pixel group) basis, to integrate and make sense of collected data.

Combining Correspondences on Additional Axes

An exemplary practice of the invention addresses the following two problems:

Typical correspondence errors resulting from matching errors in a single stereo image pair.

Major correspondence errors that occur when a particular feature in one image within the stereo pair does not exist in the other image.

This practice of the invention works by extending the feature correspondence algorithm to include one or more additional axes of correspondence and integrating the results to improve the quality of the solution.

Figures 18A, 18B, 18C, 18D:
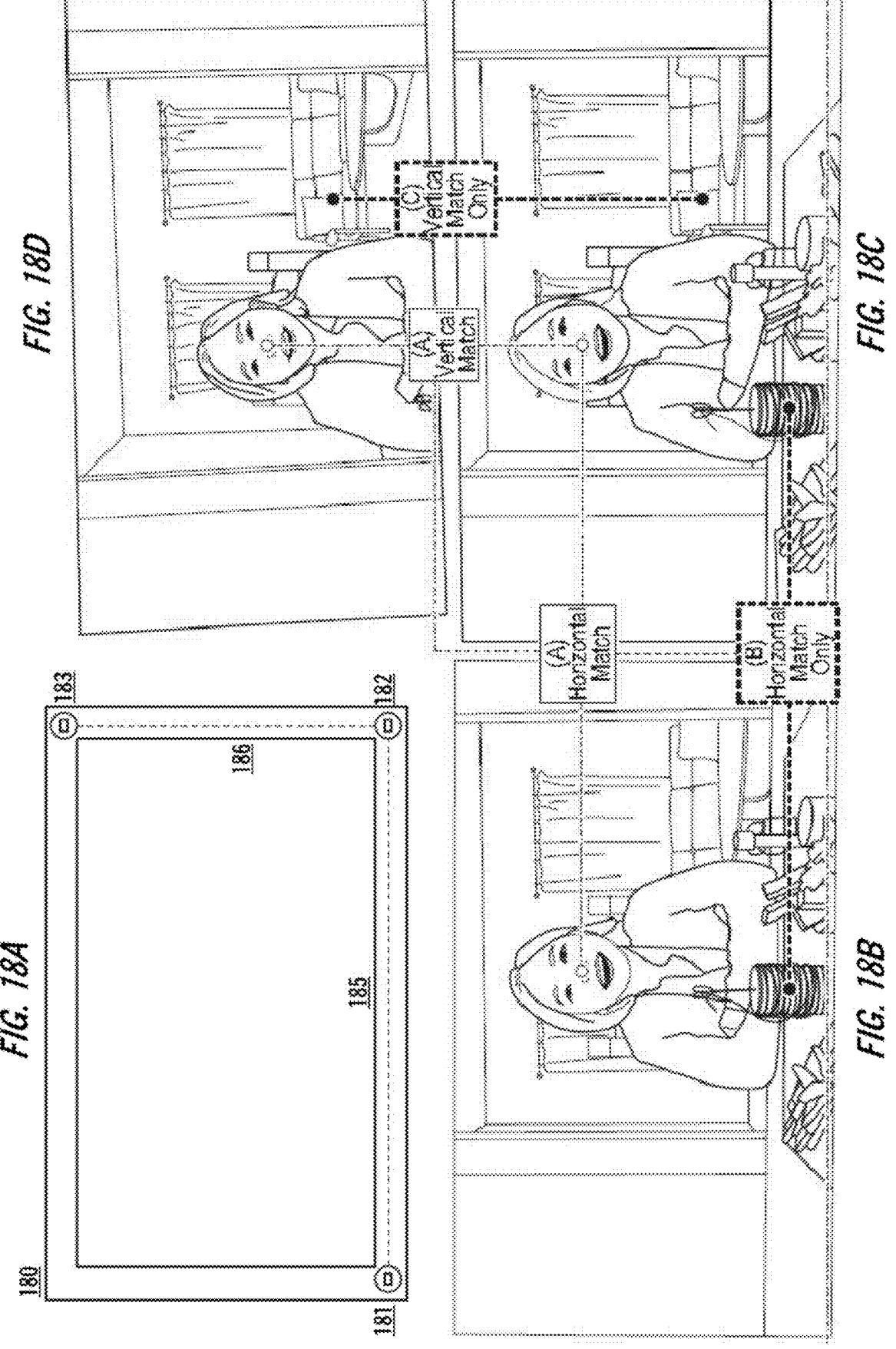

FIGS. 18A-D illustrate an example of this approach. FIG. 18A is a diagram of a sensor configuration 180 having 3 cameras 181, 182, 183 in a substantially L-shaped configuration such that a stereo pair exists on both the horizontal axis 185 and vertical axis 186, with one camera in common between the axes, similar to the configuration 90 shown in FIG. 9.

Provided the overall system contains a suitable representation to integrate the multiple disparity solutions (one such representation being the "Disparity Histograms" practice of the invention discussed herein), this configuration will allow for uncertain correspondences in one stereo pair to be either corroborated or discarded through the additional information found by performing correspondence on the other axis. In addition, certain features which have no correspondence on one axis, may find a correspondence on the other axis, allowing for a much more complete disparity solution for the overall image than would otherwise be possible.

FIGS. 18B, 18C, and 18D are depictions of three simultaneous images received respectively by sensors 181, 182, 183. The three-image set is illustrative of all the points mentioned above.

Feature (A), i.e., the human subject's nose, is found to correspond both on the horizontal stereo pair (FIGS. 18B and 18C) and the vertical stereo pair (FIGS. 18C and 18D). Having the double correspondence helps eliminate correspondence errors by improving the signal-to-noise ratio, since the likelihood of the same erroneous correspondence being found in both axes is low.

Feature (B), i.e., the spool of twine, is found to correspond only on the horizontal stereo pairs. Had the system only included a vertical pair, this feature would not have had a depth estimate because it is entirely out of view on the upper image.

Feature (C), i.e., the cushion on the couch, is only possible to correspond on the vertical axis. Had the system only included a horizontal stereo pair, the cushion would have been entirely occluded in the left image, meaning no valid disparity estimate could have been established.

An important detail is that in many cases the stereo pair on a particular axis will have undergone a calibration process such that the epipolar lines are aligned to the rows or columns of the images. Each stereo axis will have its own unique camera alignment properties and hence the coordinate systems of the features will be incompatible. In order to integrate disparity information on pixels between multiple axes, the pixels containing the disparity solutions will need to undergo coordinate transformation to a unified coordinate system. In an exemplary practice of the invention, this means that the stereo correspondence occurs in the RUD space but the resultant disparity data and disparity histograms would be stored in the URUD (Unrectified, Undistorted) coordinate system and a URUD to RUD transform would be performed to gather the per-axis disparity values.

Correspondence Refinement Over Time

This aspect of the invention involves retaining a representation of disparity in the form of the error function or, as described elsewhere herein, the disparity histogram, and continuing to integrate disparity solutions for each frame in time to converge on a better solution through additional sampling.

Filling Unknowns with Historical Data from Previous Frames

This aspect of the invention is a variation of the correspondence refinement over time aspect. In cases where a given feature is detected but for which no correspondence can be found in another camera, if there was a prior solution for that pixel from a previous frame, this can be used instead.

Histogram-Based Disparity Representation Method

This aspect of the invention provides a representation to allow multiple disparity measuring techniques to be combined to produce a higher quality estimate of image disparity, potentially even over time. It also permits a more efficient method of estimating disparity, taking into account more global context in the images, without the significant cost of large per pixel kernels and image differencing.

Most disparity estimation methods for a given pixel in an image in the stereo pair involve sliding a region of pixels (known as a kernel) surrounding the pixel in question from one image over the other in the stereo pair, and computing the difference for each pixel in the kernel, and reducing this to a scalar value for each disparity being tested.

Given a kernel of reference pixels and a kernel of pixels to be compared with the reference, a number of methods exist to produce a scalar difference between them, including the following:

1. Sum of Absolute Differences (SAD)
2. Zero-mean Sum of Absolute Differences (ZSAD)
3. Locally scaled Sum of Absolute Differences (LSAD)
4. Sum of Squared Differences (SSD)
5. Zero-mean Sum of Squared Differences (ZSSD)
6. Locally scaled Sum of Squared Differences (LSSD)
7. Normalized Cross Correlation (NCC)
8. Zero-Mean Normalized Cross Correlation (ZNCC)
9. Sum of Hamming Distances (SHD)

This calculation is repeated as the kernel is slid over the image being compared.

Figure 19:
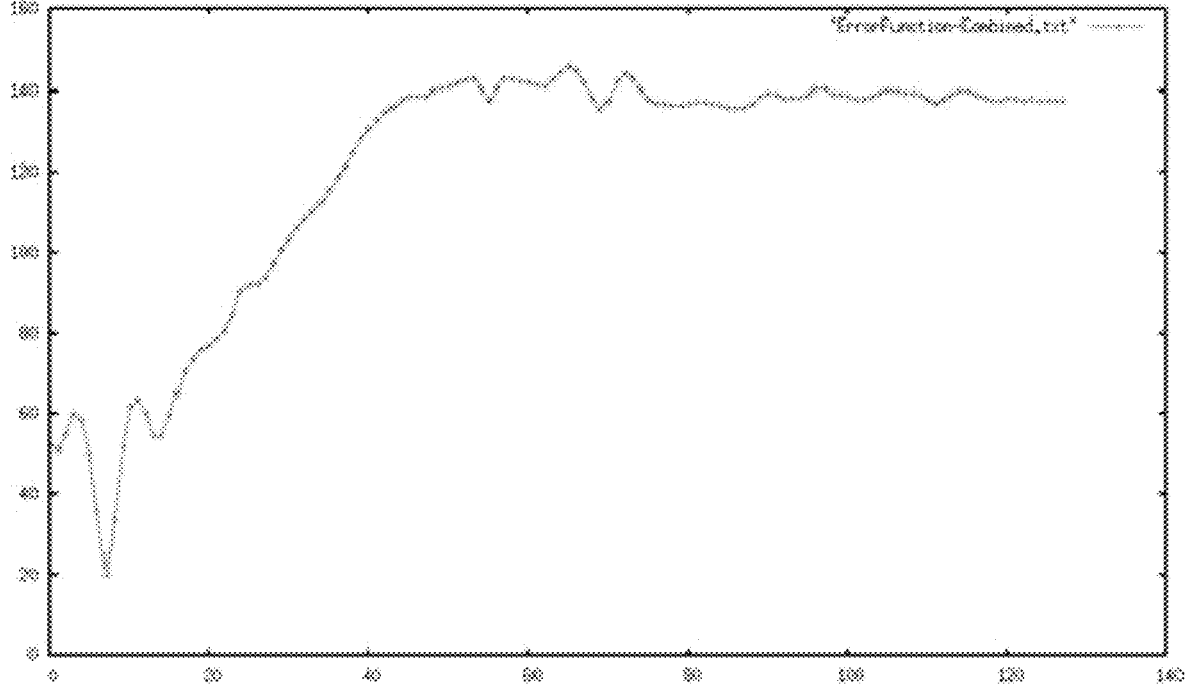
FIG. 19 is a graph in accordance with V3D-related aspects in connection with which the present invention may be practiced.

FIG. 19 is a graph 190 of cumulative error for a 5×5 block of pixels for disparity values between 0 and 128 pixels. In this example, it can be seen that there is a single global minimum that is likely to be the best solution.

In various portions of this description of the invention, reference may be made to a specific one of the image comparison methods, such as SSD (Sum of Square Differences). Those skilled in the art will understand that in many instances, others of the above-listed image comparison error measurement techniques could be used, as could others known in the art. Accordingly, this aspect of the image processing technique is referred to herein as a "Fast Dense Disparity Estimate", or "FDDE".

Used by itself, this type of approach has some problems, as follows:

Computational Overhead

Every pixel for which a disparity solution is required must perform a large number of per pixel memory access and math operations. This cost scales approximately with the square of the radius of the kernel multiplied by the number of possible disparity values to be tested for.

Non-Uniform Importance of Individual Features in the Kernel

With the exception of the normalized cross correlation methods, the error function is significantly biased based on image intensity similarity across the entire kernel. This means that subtle features with non-extreme intensity changes will fail to attain a match if they are surrounded by areas of high intensity change, since the error function will tend to "snap" to the high intensity regions. In addition, small differences in camera exposure will bias the disparity because of the "non-democratic" manner in which the optimal kernel position is chosen.

Figures 20A, 20B, 21A, 21B:
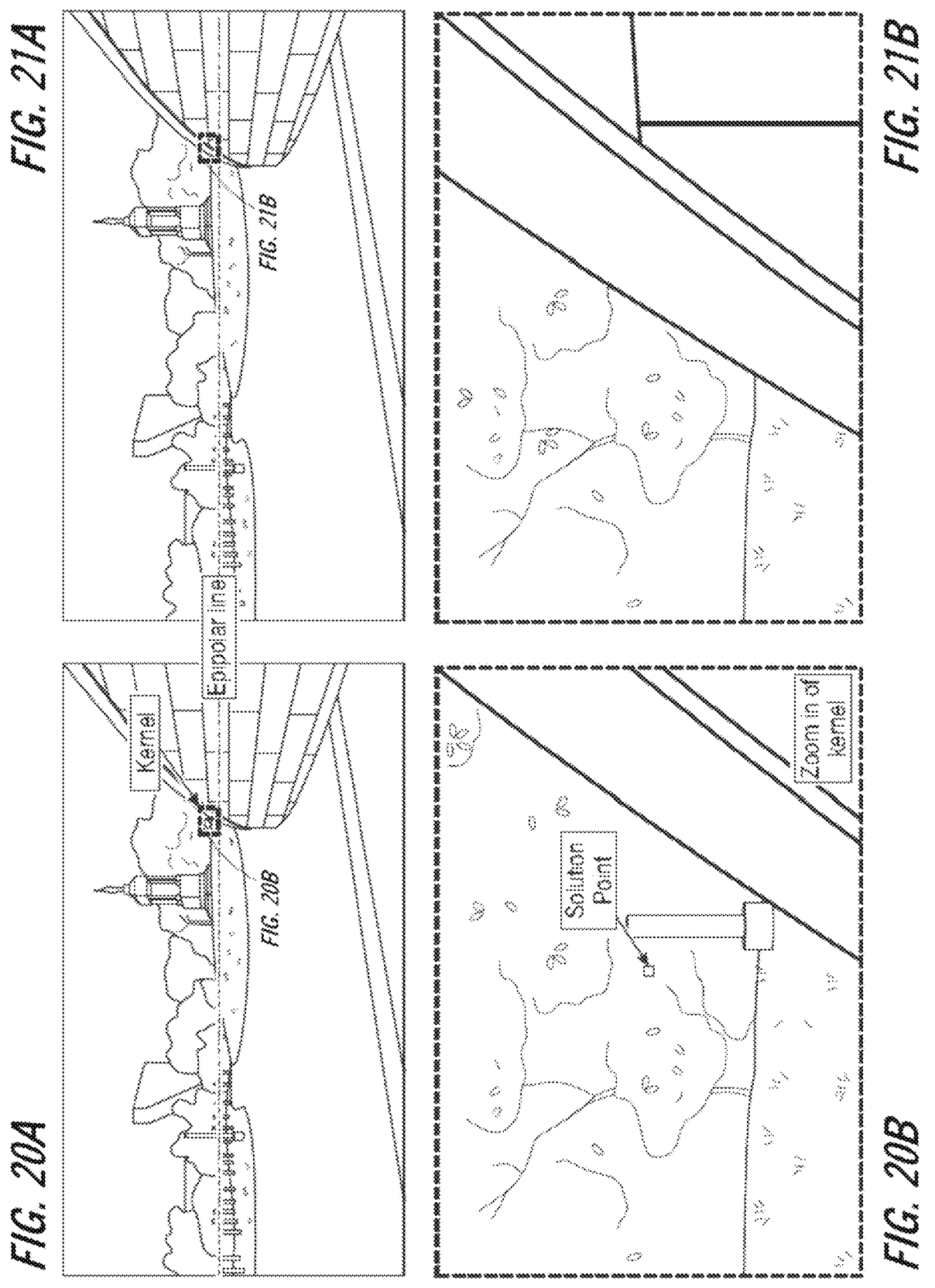

An example of this is shown in FIGS. 20A-B and 21A-B. FIGS. 20A and 20B are two horizontal stereo images. FIGS. 21A and 21B, which correspond to FIGS. 20A and 20B, show a selected kernel of pixels around the solution point for which we are trying to compute the disparity. It can be seen that for the kernel at its current size, the cumulative error function will have two minima, one representing the features that have a small disparity since they are in the image background, and those on the wall which are in the foreground and will have a larger disparity. In the ideal situation, the minima would flip from the background to the foreground disparity value as close to the edge of the wall as possible. In practice, due to the high intensity of the wall pixels, many of the background pixels snap to the disparity of the foreground, resulting in a serious quality issue forming a border near the wall.

Lack of Meaningful Units

The units of measure of "error", i.e. the Y-axis on the example graph, is unscaled and may not be compatible between multiple cameras, each with its own color and luminance response. This introduces difficulty in applying statistical methods or combining error estimates produced through other methods. For example, computing the error function from a different stereo axis would be incompatible in scale, and thus the terms could not be easily integrated to produce a better error function.

This is an instance in which the disparity histogram method of the invention becomes highly useful, as will next be described.

Operation of the Disparity Histogram Representation

One practice of the disparity histogram solution method of the invention works by maintaining a histogram showing the relative likelihood of a particular disparity being valid for a given pixel. In other words, the disparity histogram behaves as a probability density function (PDF) of disparity for a given pixel, higher values indicating a higher likelihood that the disparity range is the "truth".

Figure 22:

FIG. 22 shows an example of a typical disparity histogram for a pixel. For each pixel histogram, the x-axis indicates a particular disparity range and the scale y-axis is the number of pixels in the kernel surrounding the central pixel that are "voting" for that given disparity range.

Figure 23:
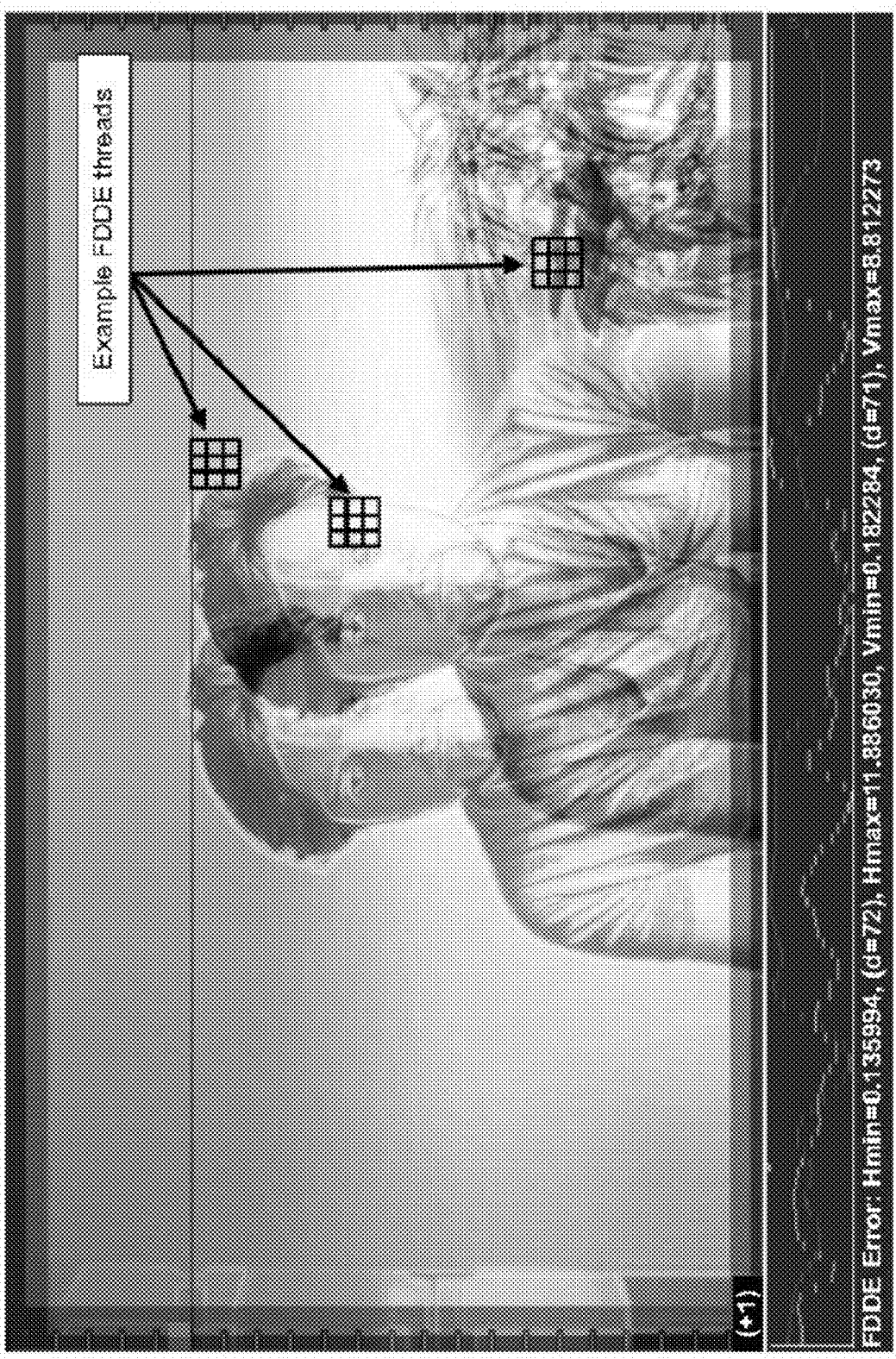
Figure 24:
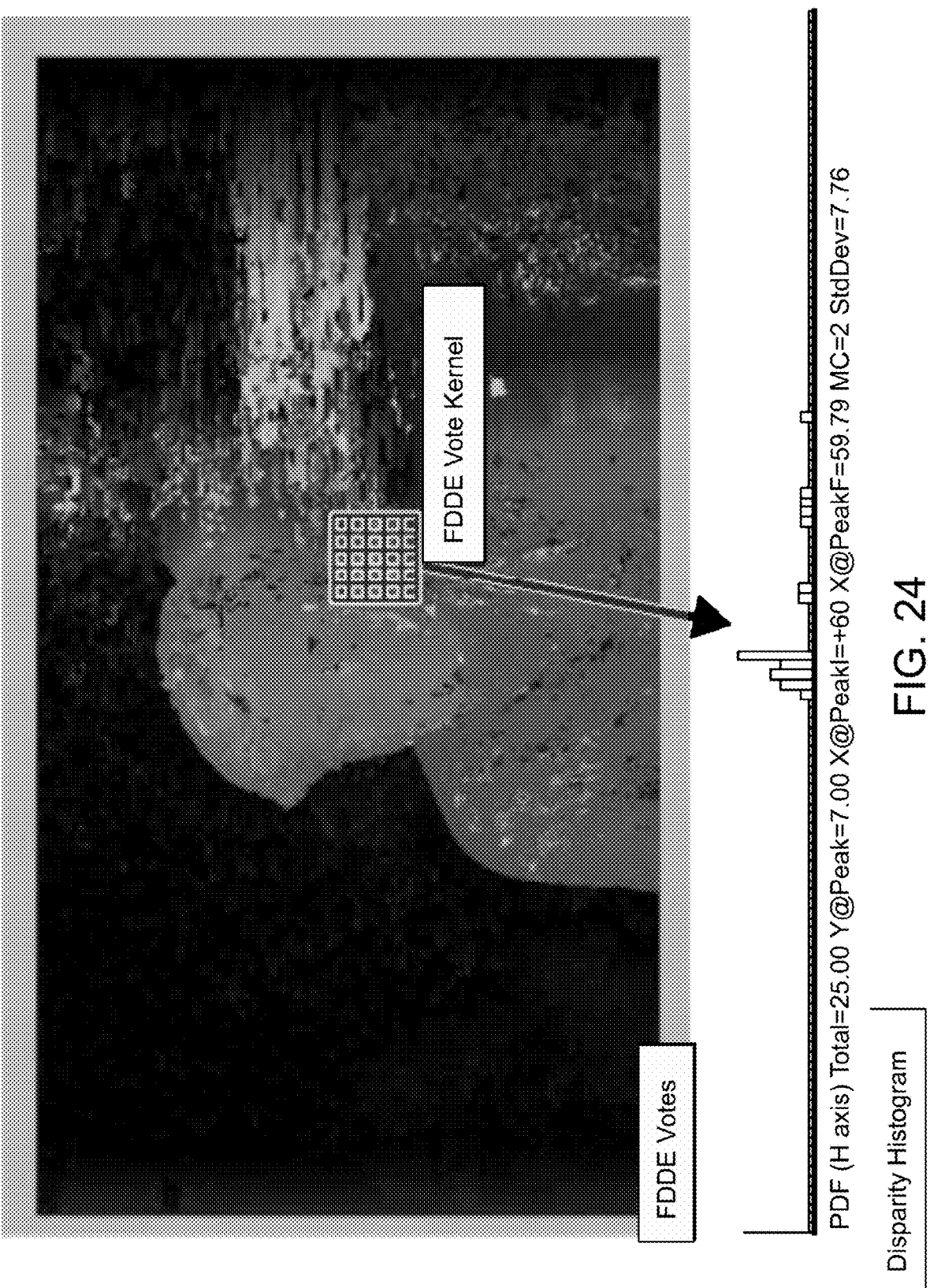

FIGS. 23 and 24 show a pair of images and associated histograms. As shown therein, the votes can be generated by using a relatively fast and low-quality estimate of disparity produced using small kernels and standard SSD type methods. According to an aspect of the invention, the SSD method is used to produce a "fast dense disparity map" (FDDE), wherein each pixel has a selected disparity that is the lowest error. Then, the algorithm would go through each pixel, accumulating into the histogram a tally of the number of votes for a given disparity in a larger kernel surrounding the pixel.

With a given disparity histogram, many forms of analysis can be performed to establish the most likely disparity for the pixel, confidence in the solution validity, and even identify cases where there are multiple highly likely solutions. For example, if there is a single dominant mode in the histogram, the x coordinate of that peak denotes the most likely disparity solution.

FIG. 25 shows an example of a bi-modal disparity histogram with 2 equally probable disparity possibilities.

FIG. 26 is a diagram of an example showing the disparity histogram and associated cumulative distribution function (CDF). The interquartile range is narrow, indicating high confidence.

FIG. 27 is a contrasting example showing a wide interquartile range in the CDF and thus a low confidence in any peak within that range.

By transforming the histogram into a cumulative distribution function (CDF), the width of the interquartile range can be established. This range can then be used to establish a confidence level in the solution. A narrow interquartile range (as in FIG. 26) indicates that the vast majority of the samples agree with the solution, whereas a wide interquartile range (as in FIG. 27) indicates that the solution confidence is low because many other disparity values could be the truth.

A count of the number of statistically significant modes in the histogram can be used to indicate "modality." For example, if there are two strong modes in the histogram (as in FIG. 25), it is highly likely that the point in question is right on the edge of a feature that demarks a background versus foreground transition in depth. This can be used to control the reconstruction later in the pipeline to control stretch versus slide (discussed in greater detail elsewhere herein).

Due to the fact that the y-axis scale is now in terms of votes for a given disparity rather than the typical error functions, the histogram is not biased by variation in image intensity at all, allowing for high quality disparity edges on depth discontinuities. In addition, this permits other methods of estimating disparity for the given pixel to be easily integrated into a combined histogram.

If we are processing multiple frames of images temporally, we can preserve the disparity histograms over time and accumulate samples into them to account for camera noise or other spurious sources of motion or error.

If there are multiple cameras, it is possible to produce fast disparity estimates for multiple independent axes and combine the histograms to produce a much more statistically robust disparity solution. With a standard error function, this would be much more difficult because the scale would make the function less compatible. With the histograms of the present invention, in contrast, everything is measured in pixel votes, meaning the results can simply be multiplied or added to allow agreeing disparity solutions to compound, and for erroneous solutions to fall into the background noise.

Using the histograms, if we find the interquartile range of the CDF to be wide in areas of a particular image intensity, this may indicate an area of poor signal to noise, i.e., underexposed to overexposed areas. Using this, we can control the camera exposures to fill in poorly sampled areas of the histograms.

Computational performance is another major benefit of the histogram based method. The SSD approach (which is an input to the histogram method) is computationally demanding due to the per pixel math and memory access for every kernel pixel for every disparity to be tested. With the histograms, a small SSD kernel is all that is needed to produce inputs to the histograms. This is highly significant, since SSD performance is proportional to the square of its kernel size multiplied by the number of disparity values being tested for. Even through the small SSD kernel output is a noisy disparity solution, the subsequent voting, which is done by a larger kernel of the pixels to produce the histograms, filters out so much of the noise that it is, in practice, better than the SSD approach, even with very large kernels. The histogram accumulation is only an addition function, and need only be done once per pixel per frame and does not increase in cost with additional disparity resolution.

Another useful practice of the invention involves testing only for a small set of disparity values with SSD, populating the histogram, and then using the histogram votes to drive further SSD testing within that range to improve disparity resolution over time.

One implementation of the invention involves each output pixel thread having a respective "private histogram" maintained in on-chip storage close to the computation units (e.g., GPUs). This private histogram can be stored such that each pixel thread will be reading and writing to the histogram on a single dedicated bank of shared local memory on a modern programmable GPU. In addition, if the maximum possible number of votes is known, multiple histogram bins can be packed into a single word of the shared local memory and accessed using bitwise operations. These details can be useful to reduce the cost of dynamic indexing into an array during the voting and the summation.

Multi-Level Histogram Voting

This practice of the invention is an extension of the disparity histogram aspect of the invention, and has proven to be an highly useful part of reducing error in the resulting disparity values, while still preserving important detail on depth discontinuities in the scene.

Errors in the disparity values can come from many sources. Multi-level disparity histograms reduce the contribution from several of these error sources, including:

1. Image sensor noise.
2. Repetitive patterns at a given image frequency.

As with the idea of combining multiple stereo axes' histogram votes into the disparity histogram for the purpose of "tie-breaking" and reducing false matches, the multi-level voting scheme applies that same concept, but across descending frequencies in the image space.

Figure 28:
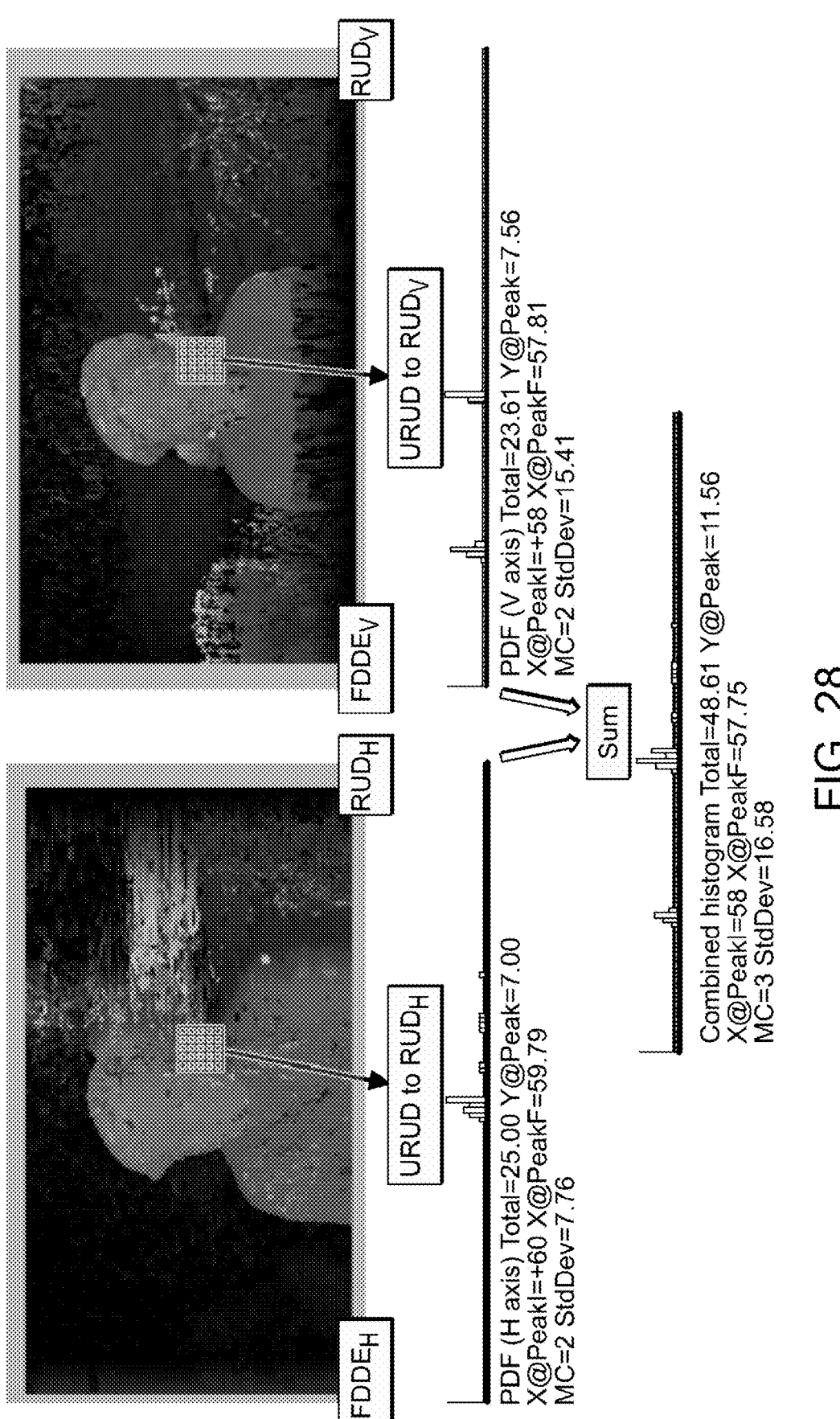
Figure 29B:
Figure 29D:
Figure 29C:
Figure 29A:
Figures 30A, 30B, 30C, 30D, 30E:
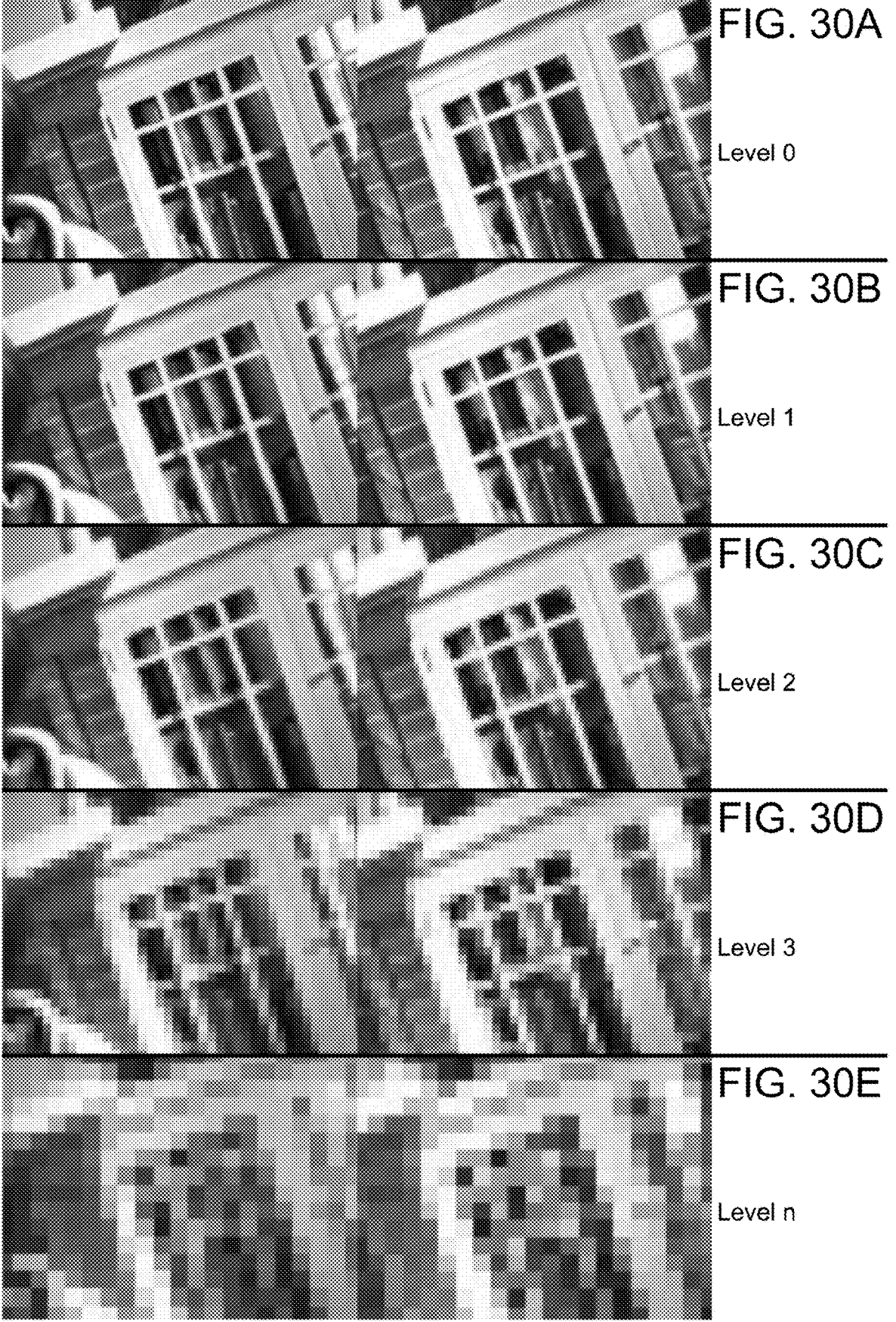

FIGS. 28A and 28B shows an example of a horizontal stereo image pair. FIGS. 28C and 28D show, respectively, the resulting disparity data before and after application of the described multi-level histogram technique.

This aspect of the invention works by performing the image pattern matching (FDDE) at several successively low-pass filtered versions of the input stereo images. The term "level" is used herein to define a level of detail in the image, where higher level numbers imply a lower level of detail. In one practice of the invention, the peak image frequencies at level[n] will be half that of level[n−1].

Many methods can be used to downsample, and such methods known in the area of image processing. Many of these methods involve taking a weighed summation of a kernel in level[n−1] to produce a pixel in level[n]. In one practice of the invention, the approach would be for the normalized kernel center position to remain the same across all of the levels.

FIGS. 30A-E are a series of exemplary left and right multi-level input images. Each level[n] is a downsampled version of level [n−1]. In the example of FIG. 30, the downsampling kernel is a 2×2 kernel with equal weights of 0.25 for each pixel. The kernel remains centered at each successive level of downsampling.

In this practice of the invention, for a given desired disparity solution at the full image resolution, the FDDE votes for every image level are included. Imagine a repetitive image feature, such as the white wooden beams on the cabinets shown in the background of the example of FIG. 30. At Level[0] (the full image resolution), several possible matches may be found by the FDDE image comparisons since each of the wooden beams looks rather similar to each other, given the limited kernel size used for the FDDE.

Figure 31:
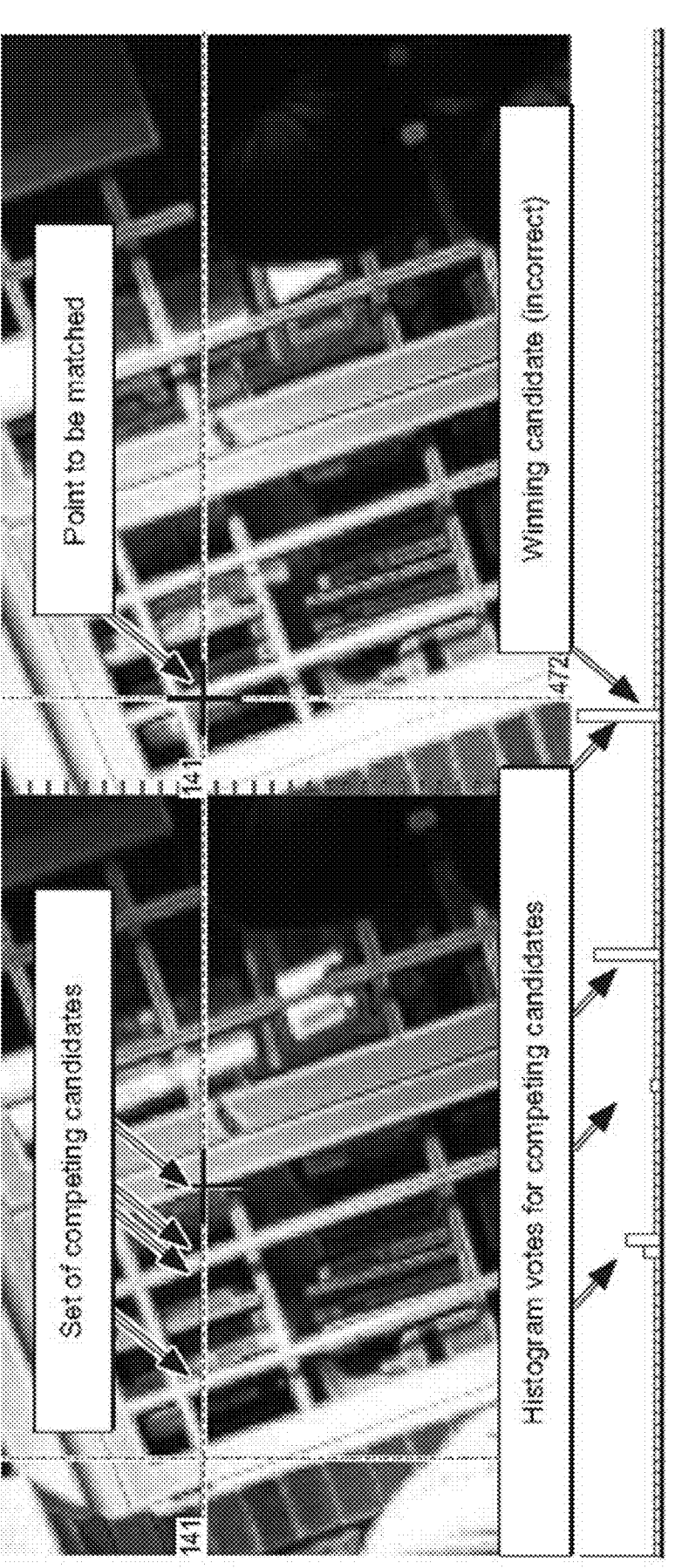

FIG. 31 depicts an example of an image pair and disparity histogram, illustrating an incorrect matching scenario and its associated disparity histogram (see the notation "Winning candidate: incorrect" in the histogram of FIG. 31).

Figure 32:
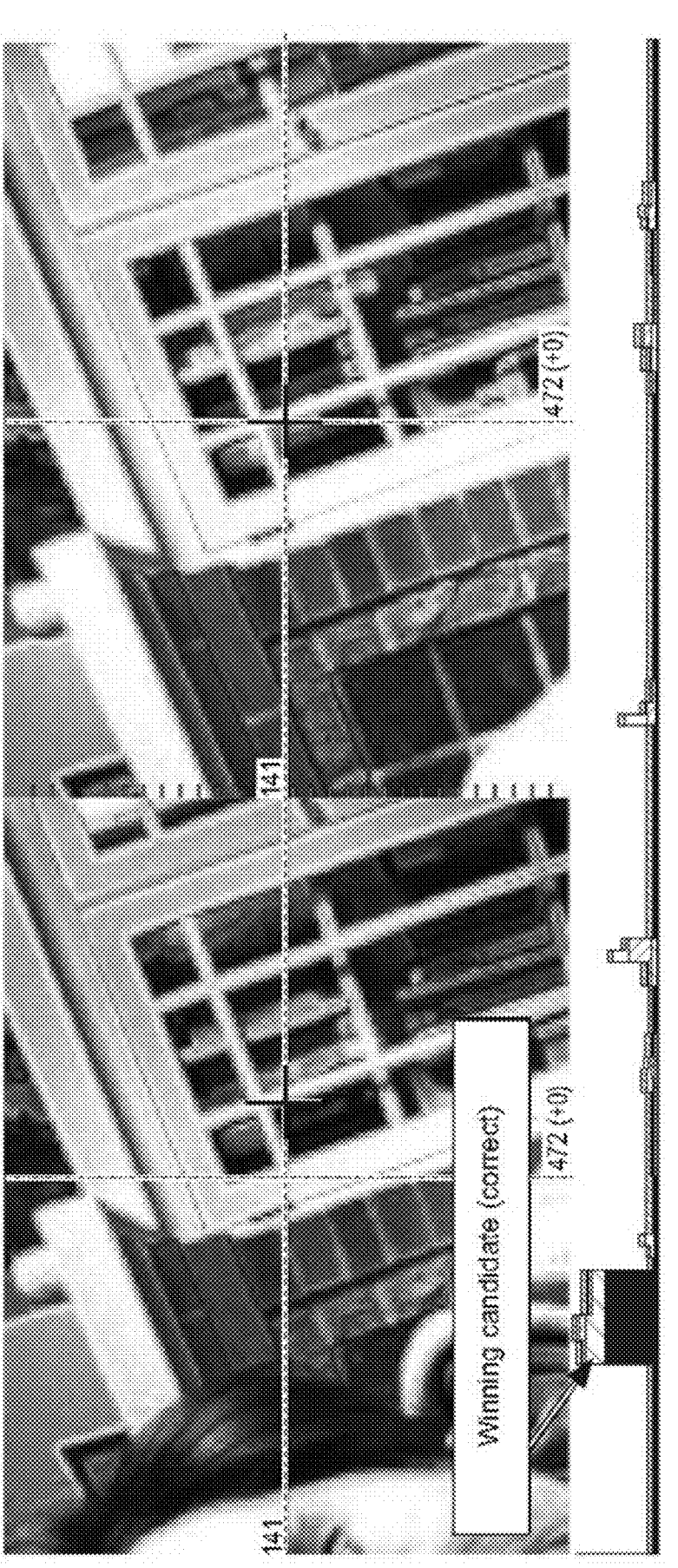

In contrast, and in accordance with an exemplary practice of the invention, FIG. 32 shows the same scenario, but with the support of 4 lower levels of FDDE votes in the histogram, resulting in a correct winning candidate (see the notation "Winning candidate: correct" in the histogram of FIG. 31). Note that the lower levels provide support for the true candidate at the higher levels. As shown in FIG. 32, if one looks at a lower level (i.e., a level characterized by reduced image resolution via low-pass filtering), the individual wooden beams shown in the image become less pronounced, and the overall form of the broader context of that image region begins to dominate the pattern matching. By combining together all the votes at each level, where there may have been multiple closely competing candidate matches at the lower levels, the higher levels will likely have fewer potential candidates, and thus cause the true matches at the lower levels to be emphasized and the erroneous matches to be suppressed. This is the "tie-breaking" effect that this practice of the invention provides, resulting in a higher probability of correct winning candidates.

Figure 33:
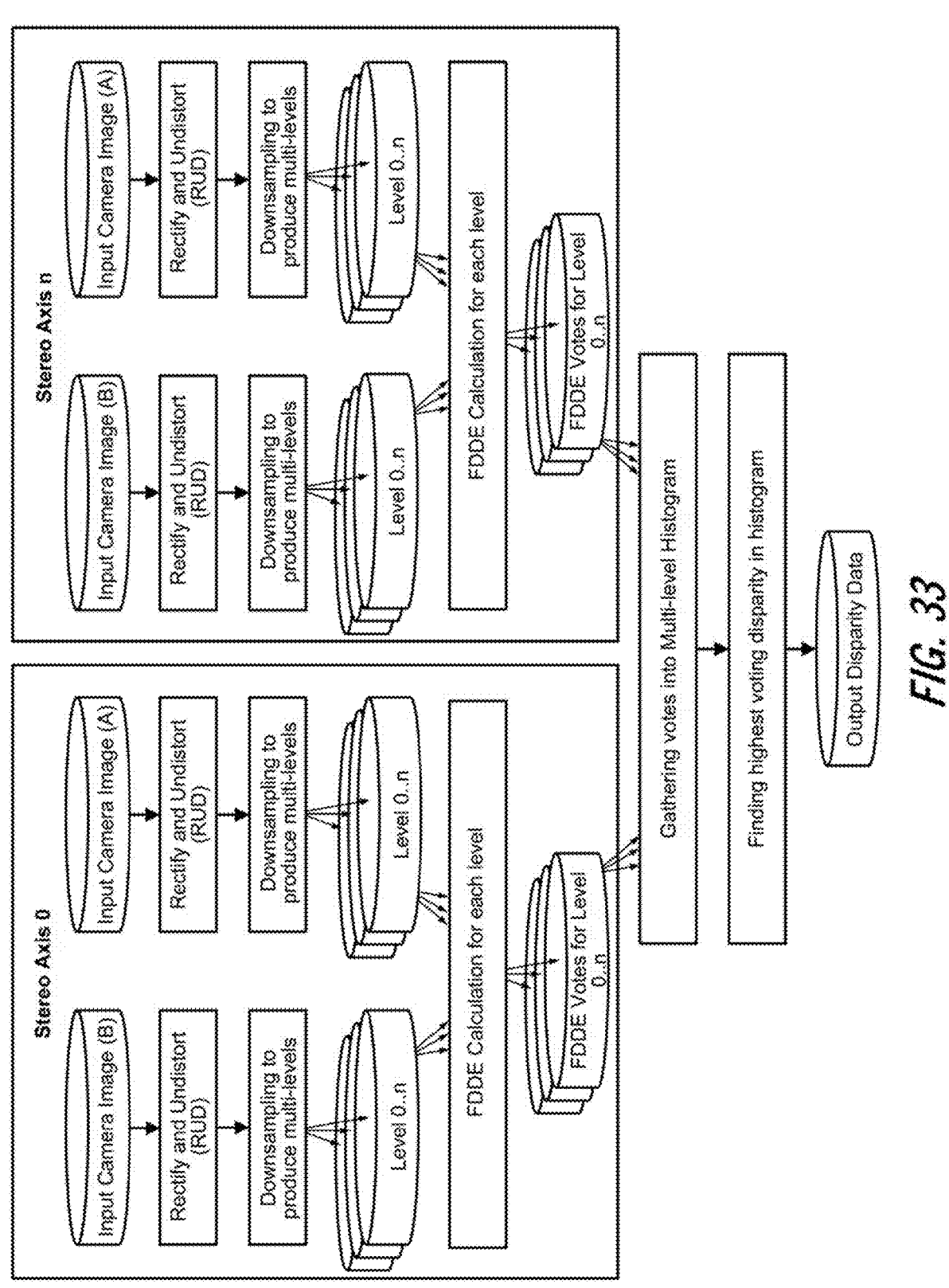

FIG. 33 is a schematic diagram of an exemplary practice of the invention. In particular, FIG. 33 depicts a processing pipeline showing the series of operations between the input camera images, through FDDE calculation and multi-level histogram voting, into a final disparity result. As shown in FIG. 33, multiple stereo axes (e.g., 0 through n) can be included into the multi-level histogram.

Having described multi-level disparity histogram representations in accordance with the invention, the following describes how the multi-level histogram is represented, and how to reliably integrate its results to locate the final, most likely disparity solution.

Representation of the Multi-Level Histogram

Figures 34, 35:
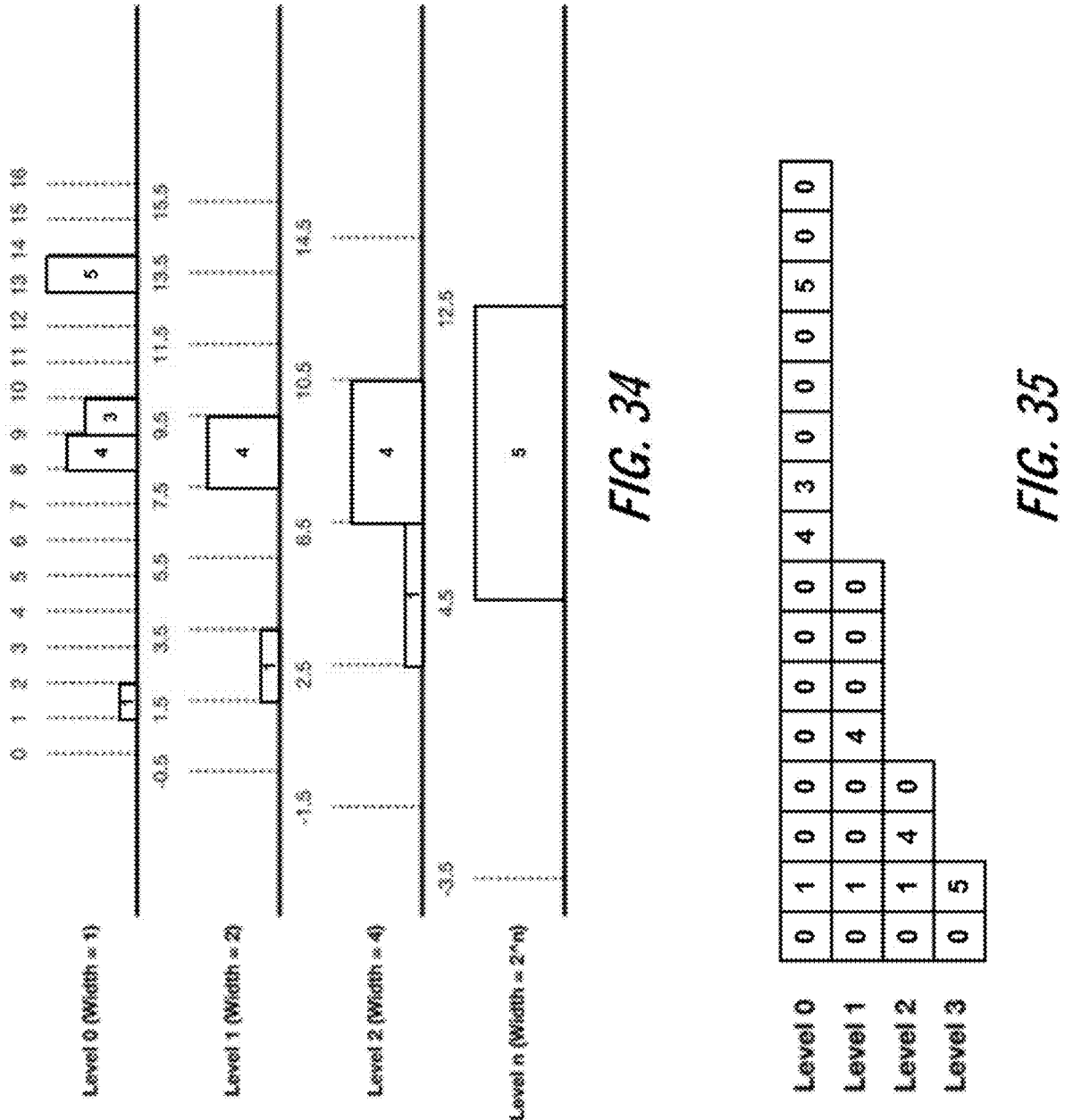

FIG. 34 shows a logical representation of the multi-level histogram after votes have been placed at each level. FIG. 35 shows a physical representation of the same multi-level histogram in numeric arrays in device memory, such as the digital memory units in a conventional smartphone architecture. In an exemplary practice of the invention, the multi-level histogram consists of a series of initially independent histograms at each level of detail. Each histogram bin in a given level represents the votes for a disparity found by the FDDE at that level. Since level[n] has a fraction the resolution as that of level[n−1], each calculated disparity value represents a disparity uncertainty range which is that same fraction as wide. For example, in FIG. 34, each level is half the resolution as the one above it. As such, the disparity uncertainty range represented by each histogram bin is twice as wide as the level before it.

Sub-Pixel Shifting of Input Images to Enable Multi-Level Histogram Integration

In an exemplary practice of the invention, a significant detail to render the multi-level histogram integration correct involves applying a sub-pixel shift to the disparity values at each level during downsampling. As shown in FIG. 34, if we look at the votes in level[0], disparity bin 8, these represent votes for disparity values 8-9. At level[1], the disparity bins are twice as wide. As such, we want to ensure that the histograms remain centered under the level above. Level[1] shows that the same bin represents 7.5 through 9.5. This half-pixel offset is highly significant, because image error can cause the disparity to be rounded to the neighbor bin and then fail to receive support from the level below.

In order to ensure that the histograms remain centered under the level above, an exemplary practice of the invention applies a half pixel shift to only one of the images in the stereo pair at each level of down sampling. This can be done inline within the weights of the filter kernel used to do the downsampling between levels. While it is possible to omit the half pixel shift and use more complex weighting during multi-level histogram summation, it is very inefficient. Performing the half pixel shift during down-sampling only involves modifying the filter weights and adding two extra taps, making it almost "free", from a computational standpoint.

Figure 36:
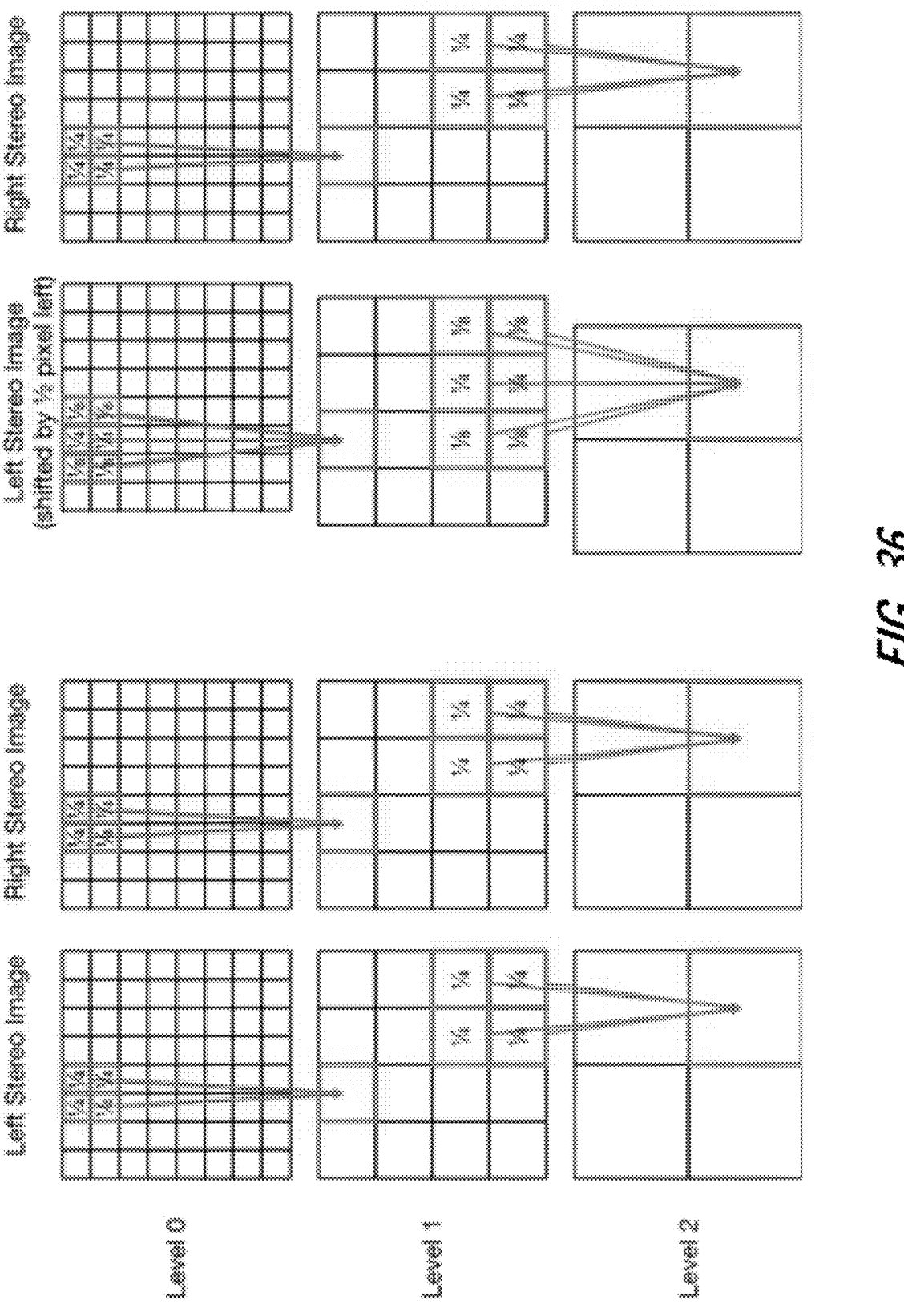

This practice of the invention is further illustrated in FIG. 36, which shows an example of per-level downsampling according to the invention, using a 2×2 box filter. On the left is illustrated a method without a half pixel shift. On the right of FIG. 36 is illustrated the modified filter with a half pixel shift, in accordance with an exemplary practice of the invention. Note that this half pixel shift should only be applied to one of the image in the stereo pair. This has the effect of disparity values remaining centered at each level in the multi-level histogram during voting, resulting in the configuration shown in FIG. 34.

Integration of the Multi-Level Histogram

Figure 37:
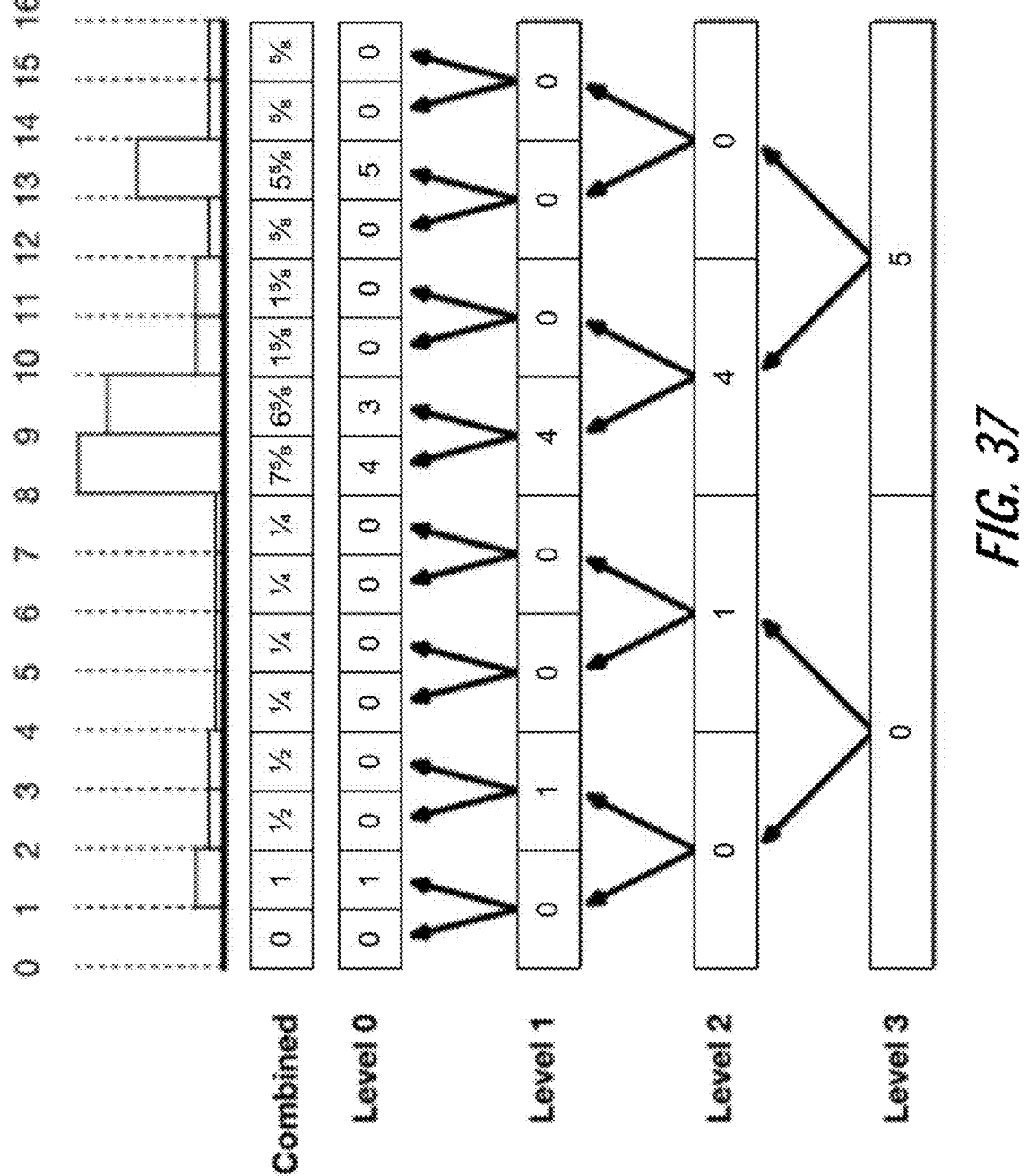

FIG. 37 illustrates an exemplary practice of the invention, showing an example of the summation of the multi-level histogram to produce a combined histogram in which the peak can be found. Provided that the correct sub-pixel shifting has been applied, the histogram integration involves performing a recursive summation across all of the levels as shown in FIG. 37. Typically, only the peak disparity index and number of votes for that peak are needed and thus the combined histogram does not need to be actually stored in memory. In addition, maintaining a summation stack can reduce summation operations and multi-level histogram memory access.

During the summation, the weighting of each level can be modified to control the amount of effect that the lower levels in the overall voting. In the example shown in FIG. 37, the current value at level[n] gets added to two of the bins above it in level[n−1] with a weight of/each.

Extraction of Sub-Pixel Disparity Information from Disparity Histograms

Figure 39:
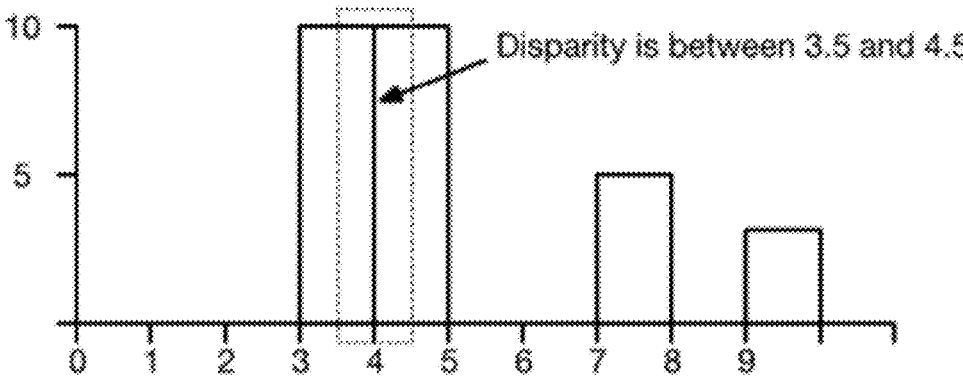
Figure 40:
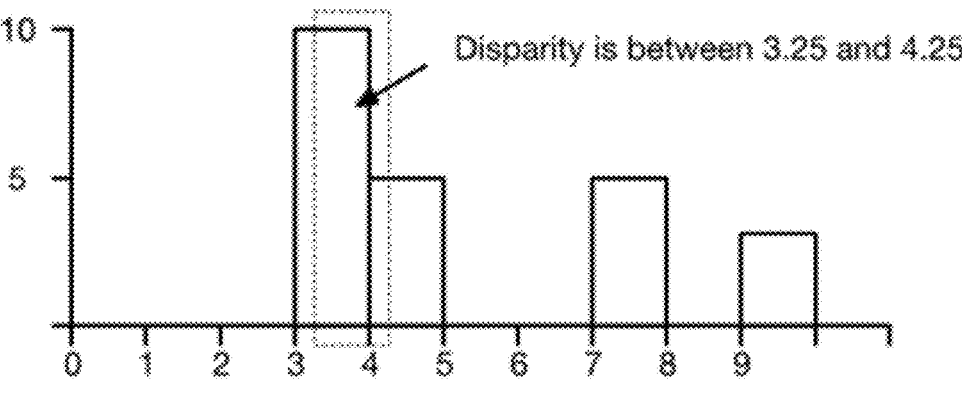

An exemplary practice of the invention, illustrated in FIGS. 39-40, builds on the disparity histograms and allows for a higher accuracy disparity estimate to be acquired without requiring any additional SSD steps to be performed, and for only a small amount of incremental math when selecting the optimal disparity from the histogram.

Figure 38:
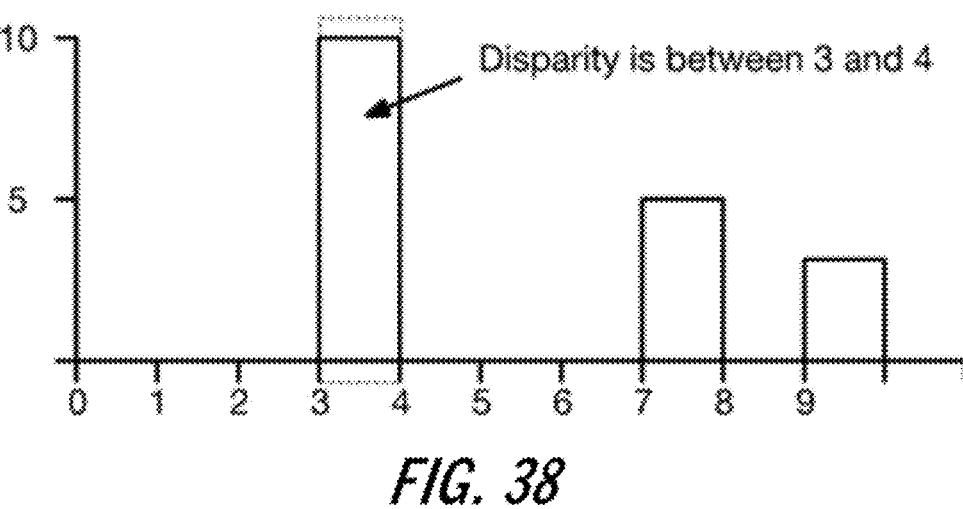

FIG. 38 is a disparity histogram for a typical pixel. In the example, there are 10 possible disparity values, each tested using SSD and then accumulated into the histogram with 10 bins. In this example, there is a clear peak in the 4th bin, which means that the disparity lies between 3 and 4 with a center point of 3.5.

FIG. 39 is a histogram in a situation in which a sub-pixel disparity solution can be inferred from the disparity histogram. We can see that an even number of votes exists in the 3rd and 4th bins. As such, we can say that the true disparity range lies between 3.5 and 4.5 with a center point of 4.0.

FIG. 40 is a histogram that reveals another case in which a sub-pixel disparity solution can be inferred. In this case, the 3rd bin is the peak with 10 votes. Its directly adjacent neighbor is at 5 votes. As such, we can state that the sub-pixel disparity is between these two and closer to the 3rd bin, ranging from 3.25 to 4.25, using the following equation:

$$SubpixelOffset = \frac{Votes_{2ndBest}}{2(Votes_{Best})}$$

Center-Weighted SSD Method

Another practice of the invention provides a further method of solving the problem where larger kernels in the SSD method tend to favor larger intensity differences with the overall kernel, rather than for the pixel being solved. This method of the invention involves applying a higher weight to the center pixel with a decreasing weight proportional to the distance of the given kernel sample from the center. By doing this, the error function minima will tend to be found closer to the valid solution for the pixel being solved.

Injective Constraint

Yet another aspect of the invention involves the use of an "injective constraint", as illustrated in FIGS. 41-45. When producing a disparity solution for an image, the goal is to produce the most correct results possible. Unfortunately, due to imperfect input data from the stereo cameras, incorrect disparity values will get computed, especially if only using the FDDE data produced via image comparison using SSD, SAD or one of the many image comparison error measurement techniques.

Figure 41:

FIG. 41 shows an exemplary pair of stereoscopic images and the disparity data resulting from the FDDE using SAD with a 3×3 kernel. Warmer colors represent closer objects. A close look at FIG. 41 reveals occasional values which look obviously incorrect. Some of the factors causing these errors include camera sensor noise, image color response differences between sensors and lack of visibility of a common feature between cameras.

In accordance with the invention, one way of reducing these errors is by applying "constraints" to the solution which reduce the set of possible solutions to a more realistic set of possibilities. As discussed elsewhere herein, solving the disparity across multiple stereo axes is a form of constraint, by using the solution on one axis to reinforce or contradict that of another axis. The disparity histograms are another form of constraint by limiting the set of possible solutions by filtering out spurious results in 2D space. Multi-level histograms constrain the solution by ensuring agreement of the solution across multiple frequencies in the image.

The injective constraint aspect of the invention uses geometric rules about how features must correspond between images in the stereo pair to eliminate false disparity solutions. It maps these geometric rules on the concept of an injective function in set theory.

In set theory there are four major categories of function type that map one set of items (the domain) onto another set (the co-domain):

1. Injective, surjective function (also known as a bijection): All elements in the co-domain are reference exactly once by elements in the domain.
2. Injective, non-surjective function: Some elements in the co-domain are references at most once by elements in the domain. This means that not all elements in the co-domain have to be referenced, but no element will be referenced more than once.
3. Non-injective, surjective function: All elements in the co-domain are referenced one or more times by elements in the domain.
4. Non-injective, non-surjective function: Some elements in the co-domain are referenced one or more times by elements in the domain. This means that not all elements in the co-domain have to be referenced.

In the context of feature correspondence, the domain and co-domain are pixels from each of the stereo cameras on an axis. The references between the sets are the disparity values. For example, if every pixel in the domain (image A) had a disparity value of "0", then this means that a perfect bijection exists between the two images, since every pixel in the domain maps to the same pixel in the co-domain.

Given the way that features in an image are shifted between the two cameras, we know that elements in the co-domain (Image B) can only shift in one direction (i.e. disparity values are >0) for diffuse features in the scene. When features exist at the same depth they will all shift together at the same rate, maintaining a bijection.

Figures 42, 43, 44, 45:
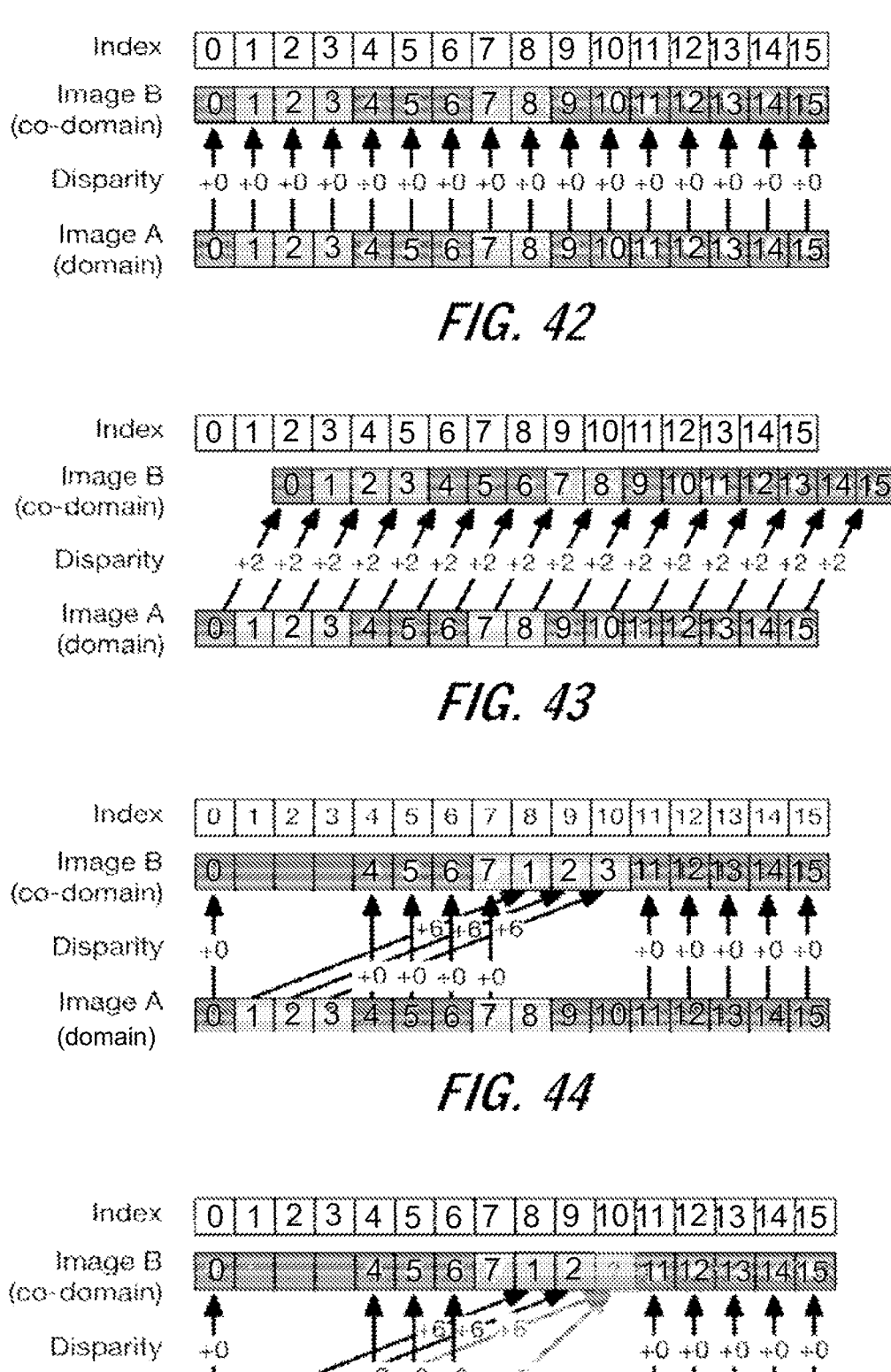

FIG. 42 shows an example of a bijection where every pixel in the domain maps to a unique pixel in the co-domain. In this case, the image features are all at infinity distance and thus do not appear to shift between the camera images.

FIG. 43 shows another example of a bijection. In this case all the image features are closer to the cameras, but are all at the same depth and hence shift together.

However, since features will exist at different depths, some features will shift more than others and will sometimes even cross over each other. In this situation, occlusions in the scene will be occurring which means that sometimes, a feature visible in image "A" will be totally occluded by another object in the image "B".

In this situation, not every feature in the co-domain image will be referenced if it was occluded in the domain image. Even still, it is impossible for a feature in the co-domain to be referenced more than one time by the domain. This means that while we cannot enforce a bijective function, we can assert that the function must be injective. This is where the name "injective constraint" is derived.

FIG. 44 shows an example of an image with a foreground and background. Note that the foreground moves substantially between images. This causes new features to be revealed in the co-domain that will have no valid reference in the domain. This is still an injective function, but not a bijection.

In accordance with the invention, now that we know we can enforce this constraint, we are able to use it as a form of error correction in the disparity solution. In an exemplary practice of the invention, a new stage would be inserted in the feature correspondence pipeline (either after the FDDE calculation but before histogram voting, or perhaps after histogram voting) that checks for violations of this constraint. By maintaining a reference count for each pixel in the co-domain and checking to ensure that the reference count never exceeds 1, we can determine that a violation exists. (See, e.g., FIG. 45, which shows an example of a detected violation of the injective constraint.)

In accordance with the invention, if such a violation is detected, there are several ways of addressing it. These approaches have different performance levels, implementation complexity and memory overheads that will suggest which are appropriate in a given situation. They include the following:

1. First come, first served: The first element in the domain to claim an element in co-domain gets priority. If a second element claims the same co-domain element, we invalidate that match and mark it as "invalid". Invalid disparities would be skipped over or interpolated across later in the pipeline.

2. Best match wins: The actual image matching error or histogram vote count are compared between the two possible candidate element in the domain against the contested element in the co-domain. The one with the best match wins.

Smallest disparity wins: During image reconstruction, typically errors caused by too small a disparity are less noticeable than errors with too high a disparity. As such, if there is contest for a given co-domain element, select the one with the smallest disparity and invalidate the others.

Seek alternative candidates: Since each disparity value is the result of selecting a minimum in the image comparison error function or histogram peak vote count, this means there may be alternative possible matches, which didn't score as well. As such, if there is a contest for a given co-domain element, select the 2nd or 3rd best candidate in that order. This approach may need to iterate several times in order to ensure that all violations are eliminated across the entire domain. If after a given number of fall back attempts, the disparity value could be set to "invalid" as described in (1). This attempt threshold would be a tradeoff between finding the ideal solution and computation time.

Figure 46:
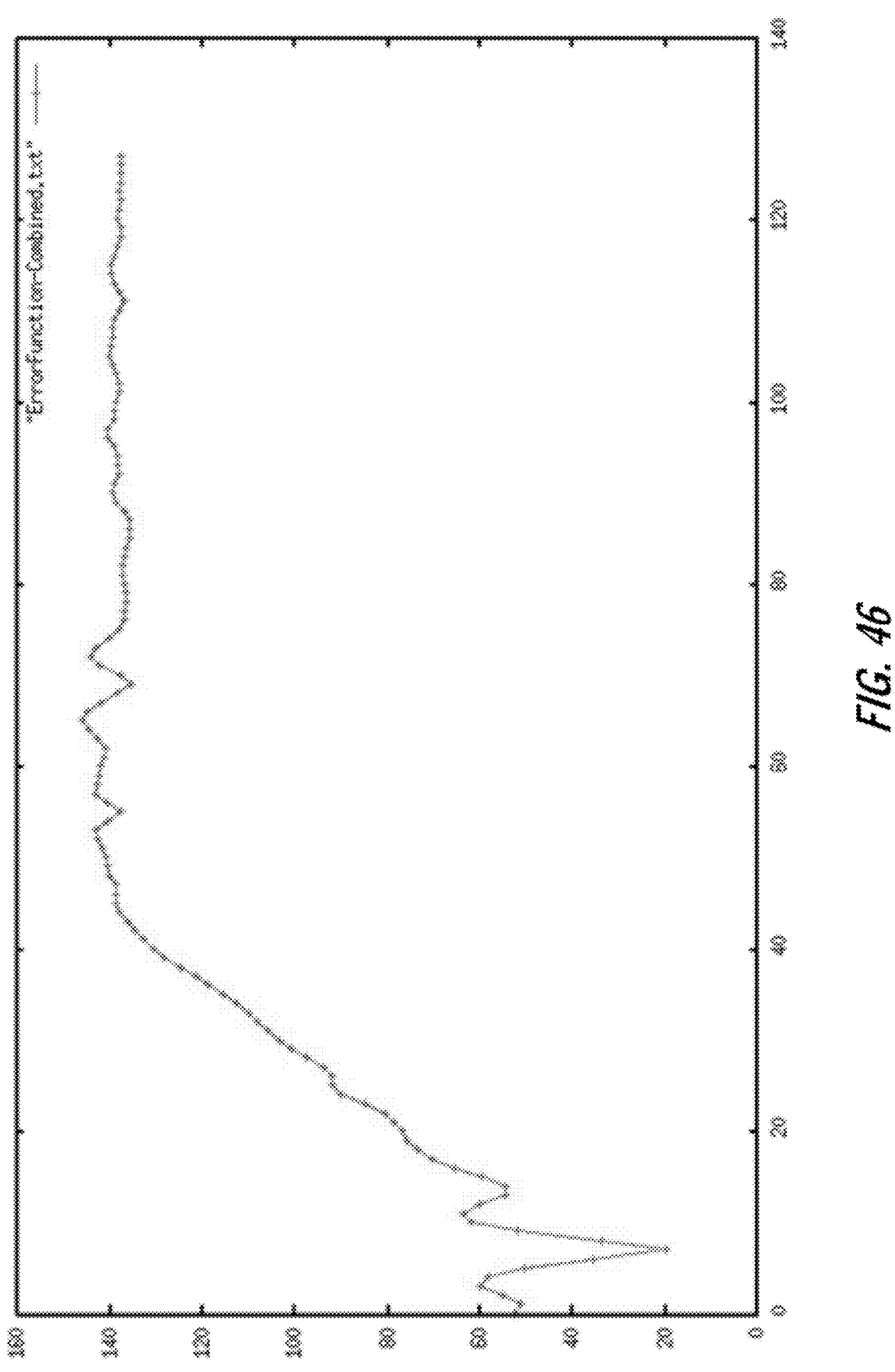
FIG. 46 is a graph in accordance with V3D-related aspects in connection with which the present invention may be practiced.

The concept of alternative match candidates is illustrated, by way of example, in FIG. 46, which shows a graph of an exemplary image comparison error function. As shown therein, in addition to the global minimum error point, there are other error minimums that could act as alternative match candidates.

The Representation Stage

Disparity and Sample Buffer Index at 2D Control Points

An exemplary practice of the invention involves the use of a disparity value and a sample buffer index at 2D control points. This aspect works by defining a data structure representing a 2D coordinate in image space and containing a disparity value, which is treated as a "pixel velocity" in screen space with respect to a given movement of the view vector.

With a strong disparity solution, that single scalar value can be modulated with a movement vector to slide around a pixel in the source image in any direction in 2D, and it will produce a credible reconstruction of 3D image movement as if it had been taken from that different location.

In addition, the control points can contain a sample buffer index that indicates which of the camera streams to take the samples from. For example, a given feature may be visible in only one of the cameras in which case we will want to change the source that the samples are taken from when reconstructing the final reconstructed image.

Not every pixel must have a control point since the movement of most pixels can be approximated by interpolating the movement of key surrounding pixels. As such, there are several methods that can be used to establish when a pixel should be given a control point. Given that the control points are used to denote an important depth change, the control points should typically be placed along edges in the image, since edges often correspond to depth changes.

Computing edges is a known technique already present in commercially available camera pipelines and image processing. Most conventional approaches are based on the use of image convolution kernels such as the Sobel filter, and its more complex variants and derivatives. These work by taking the first derivative of the image intensity to produce a gradient field indicating the rate of change of image intensity surrounding each pixel. From this a second derivative can be taken, thus locating the peaks of image intensity change and thus the edges as would be perceived by the human vision system.

Extraction of Unique Samples for Streaming Bandwidth Reduction

This aspect of the invention is based on the observation that many of the samples in the multiple camera streams are of the same feature and are thus redundant. With a valid disparity estimate, it can be calculated that a feature is either redundant or is a unique feature from a specific camera and features/samples can be flagged with a reference count of how many of the views "reference" that feature.

Compression Method for Streaming with Video

Using the reference count established above, a system in accordance with the invention can choose to only encode and transmit samples exactly one time. For example, if the system is capturing 4 camera streams to produce the disparity and control points and have produced reference counts, the system will be able to determine whether a pixel is repeated in all the camera views, or only visible in one. As such, the system need only transmit to the encoder the chunk of pixels from each camera that are actually unique. This allows for a bandwidth reduction in a video streaming session.

Head Tracking

Tracking to control modulation of disparity values Using conventional head tracking methods, a system in accordance with the invention can establish an estimate of the viewer's head or eye location and/or orientation. With this information and the disparity values acquired from feature correspondence or within the transmitted control point stream, the system can slide the pixels along the head movement vector at a rate that is proportional to the disparity. As such, the disparity forms the radius of a "sphere" of motion for a given feature.

This aspect allows a 3D reconstruction to be performed simply by warping a 2D image, provided the control points are positioned along important feature edges and have a sufficiently high quality disparity estimate. In accordance with this method of the invention, no 3D geometry in the form of polygons or higher order surfaces is required.

Tracking to Control Position of 2D Crop Box Location and Size in Reconstruction

In order to create the appearance of an invisible device display, the system of the invention must not only re-project the view from a different view origin, but must account for the fact that as the viewer moves his or her head, they only see an aperture into the virtual scene defined by the perimeter of the device display. In accordance with a practice of the invention, a shortcut to estimate this behavior is to reconstruct the synthetic view based on the view origin and then crop the 2D image and scale it up to fill the view window before presentation, the minima and maxima of the crop box being defined as a function of the viewer head location with respect to the display and the display dimensions.

Hybrid Markerless Head Tracking

An exemplary practice of the V3D invention contains a hybrid 2D/3D head detection component that combines a fast 2D head detector with the 3D disparity data from the multi-view solver to obtain an accurate viewpoint position in 3D space relative to the camera system.

Figure 47A:
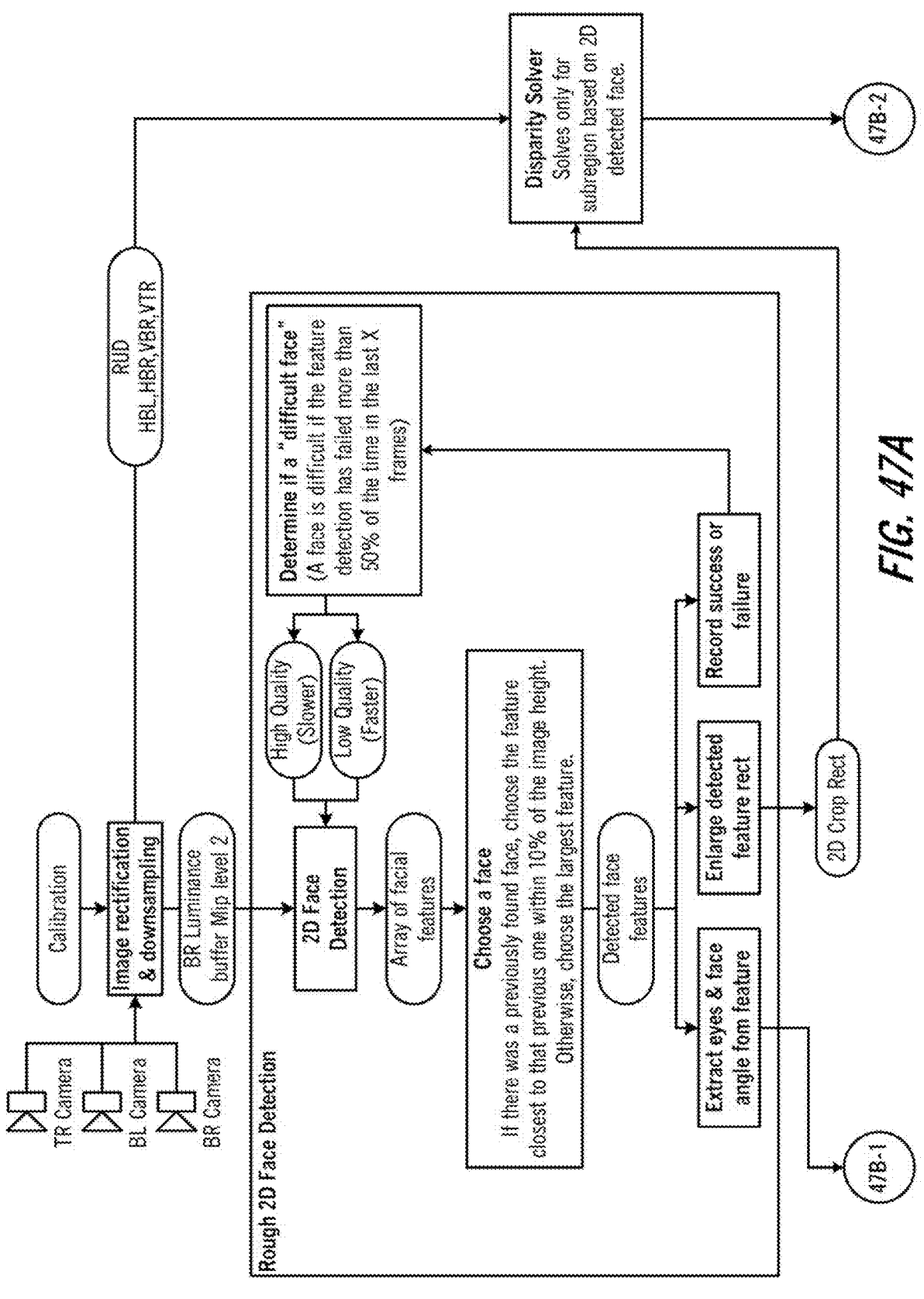

FIGS. 47A-B provide a flow diagram that illustrates the operation of the hybrid markerless head tracking system. As shown in FIGS. 47A-B, starting with an image captured by one of the color cameras, the system optionally converts to luminance and downsamples the image, and then passes it to a basic 2D facial feature detector. The 2D feature detector uses the image to extract an estimate of the head and eye position as well as the face's rotation angle relative to the image plane. These extracted 2D feature positions are extremely noisy from frame to frame which, if taken alone as a 3D viewpoint, would not be sufficiently stable for the intended purposes of the invention. Accordingly, the 2D feature detection is used as a starting estimate of a head position.

The system uses this 2D feature estimate to extract 3D points from the disparity data that exists in the same coordinate system as the original 2D image. The system first determines an average depth for the face by extracting 3D points via the disparity data for a small area located in the center of the face. This average depth is used to determine a reasonable valid depth range that would encompass the entire head.

Using the estimated center of the face, the face's rotation angle, and the depth range, the system then performs a 2D ray march to determine a best-fit rectangle that includes the head. For both the horizontal and vertical axis, the system calculates multiple vectors that are perpendicular to the axis but spaced at different intervals. For each of these vectors, the system tests the 3D points starting from outside the head and working towards the inside, to the horizontal or vertical axis. When a 3D point is encountered that falls within previously designated valid depth range, the system considers that a valid extent of the head rectangle.

From each of these ray marches along each axis, the system can determine a best-fit rectangle for the head, from which the system then extracts all 3D points that lie within this best-fit rectangle and calculates a weighted average. If the number of valid 3D points extracted from this region pass a threshold in relation to the maximum number of possible 3D points in the region, then there is designated a valid 3D head position result.

FIG. 48 is a diagram depicting this technique for calculating the disparity extraction two-dimensional rectangle (i.e., the "best-fit rectangle").

To compensate for noise in the 3D position, the system can interpolate from frame-to-frame based on the time delta that has passed since the previous frame.

Reconstruction

2D Warping Reconstruction of Specific View from Samples and Control Points

This method of the invention works by taking one or more source images and a set of control points as described previously. The control points denote "handles" on the image which we can then move around in 2D space and interpolate the pixels in between. The system can therefore slide the control points around in 2D image space proportionally to their disparity value and create the appearance of an image taken from a different 3D perspective. The following are details of how the interpolation can be accomplished in accordance with exemplary practices of the invention.

Lines

This implementation of 2D warping uses the line drawing hardware and texture filtering available on modern GPU hardware, such as in a conventional smartphone or other mobile device. It has the advantages of being easy to implement, fast to calculate, and avoiding the need to construct complex connectivity meshes between the control points in multiple dimensions.

It works by first rotating the source images and control points coordinates such that the rows or columns of pixels are parallel to the vector between the original image center and the new view vector. For purposes of this explanation, assume the view vector is aligned to image scanlines. Next, the system iterates through each scanline and goes through all the control points for that scanline. The system draws a line beginning and ending at each control point in 2D image space, but adds the disparity multiplied by the view vector magnitude with the x coordinate. The system assigns a texture coordinate to the beginning and end points that is equal to their original 2D location in the source image.

The GPU will draw the line and will interpolate the texture coordinates linearly along the line. As such, image data between the control points will be stretched linearly. Provided control points are placed on edge features, the interpolation will not be visually obvious.

After the system has drawn all the lines, the result is a re-projected image, which is then rotated back by the inverse of the rotation originally applied to align the view vector with the scanlines.

Polygons

This approach is related to the lines but works by linking control points not only along a scanline but also between scanlines. In certain cases, this may provide a higher quality interpolation than lines alone.

Stretch/Slide

This is an extension of the control points data structure and effects the way the reconstruction interpolation is performed. It helps to improve the reconstruction quality on regions of large disparity/depth change. In such regions, for example on the boundary of a foreground and background object, it is not always idea to interpolate pixels between control points, but rather to slide the foreground and background independently of each other. This will open up a void in the image, but this gets filled with samples from another camera view.

The determination of when it is appropriate to slide versus the default stretching behavior can be made by analyzing the disparity histogram and checking for multi-modal behavior. If two strong modes are present, this indicates the control point is on a boundary where it would be better to allow the foreground and background to move independently rather than interpolating depth between them.

Other practices of the invention can include a 2D crop based on head location (see the discussion above relating to head tracking), and rectification transforms for texture coordinates. Those skilled in the art will understand that the invention can be practiced in connection with conventional 2D displays, or various forms of head-mounted stereo displays (HMDs), which may include binocular headsets or lenticular displays.

Digital Processing Environment in which the Invention can be Implemented

Those skilled in the art will understand that the above described embodiments, practices and examples of the present invention can be implemented using known network, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

It should be noted that the method aspects described herein and depicted in the accompanying drawing figures can be embodied in devices, systems or computer software/program code operable in accordance with such method aspects of the invention; and that to one skilled in the technology of digital processors and computer software/program code for digital image or signal processing, the teachings of the method aspects described herein are also teachings of the configuring of devices, systems or computer software/program code operable in accordance with such method aspects of the invention.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicant has implemented various aspects and exemplary practices of V3D in connection with which the present invention may be practiced, using, among others, the following commercially available elements:

1. A 7" 1280×800 IPS display.
2. Three PointGrey Chameleon3 (CM3-U3-13S2C-CS) 1.3 Megapixel camera modules with ⅓" sensor size assembled on a polycarbonate plate with shutter synchronization circuit.
3. Sunex DSL377A-650-F/2.8 M12 wide-angle lenses.
4. An Intel Core i7-4650U processor which includes on-chip the following:
   a. An Intel HD Graphics 5000 Integrated Graphics Processing Unit; and
   b. An Intel QuickSync video encode and decode hardware pipeline.
5. OpenCL API on an Apple Mac OS X operating system to implement, in accordance with exemplary practices of the invention described herein, Image Rectification, Fast Dense Disparity Estimate(s) (FDDE) and Multi-level Disparity Histogram aspects.
6. Apple CoreVideo and VideoToolbox APIs to access QuickSync video compression hardware.
7. OpenCL and OpenGL API(s) for V3D view reconstruction in accordance with exemplary practices of the invention described herein.

Figure 49:
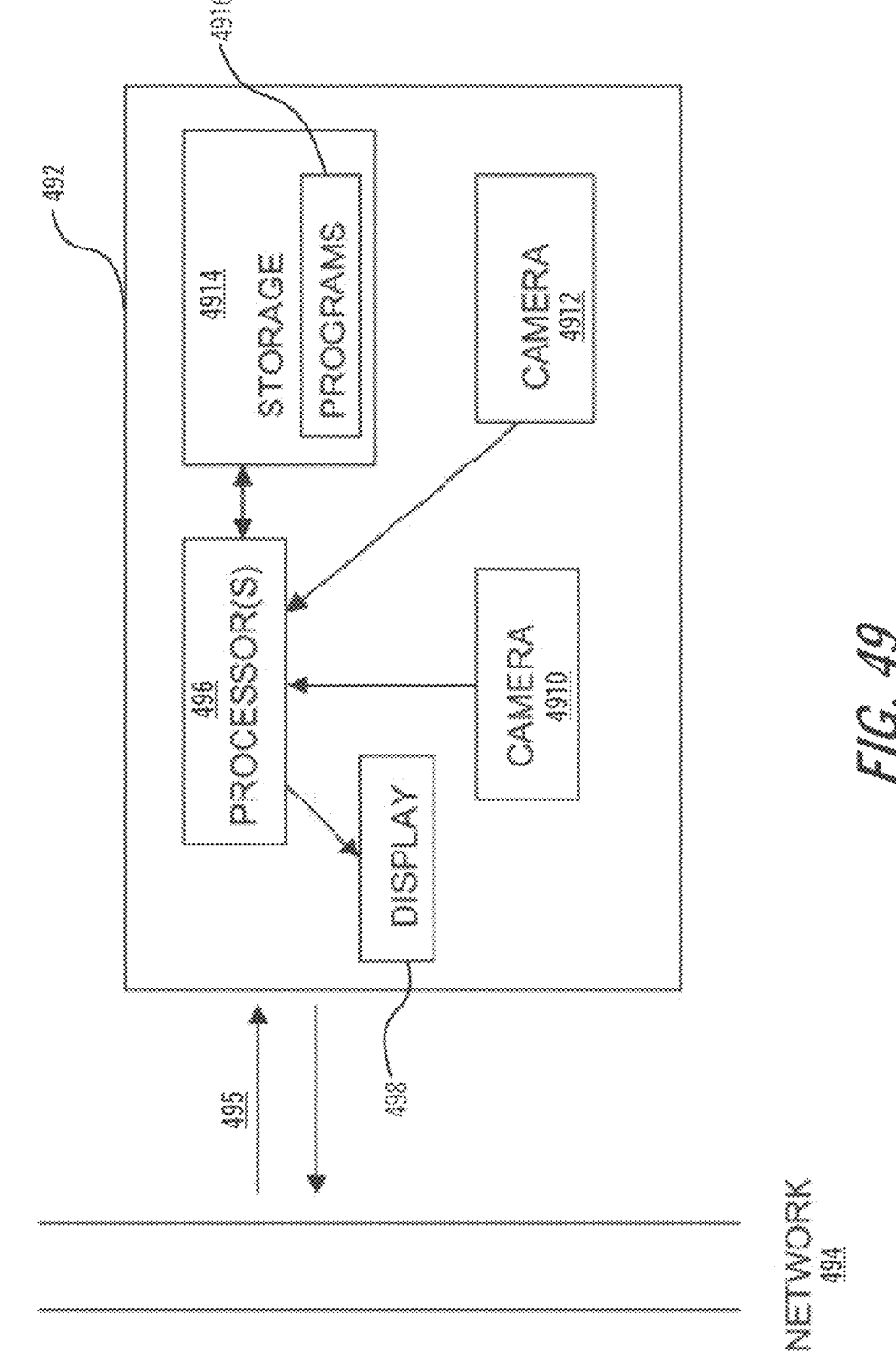
Figure 50:
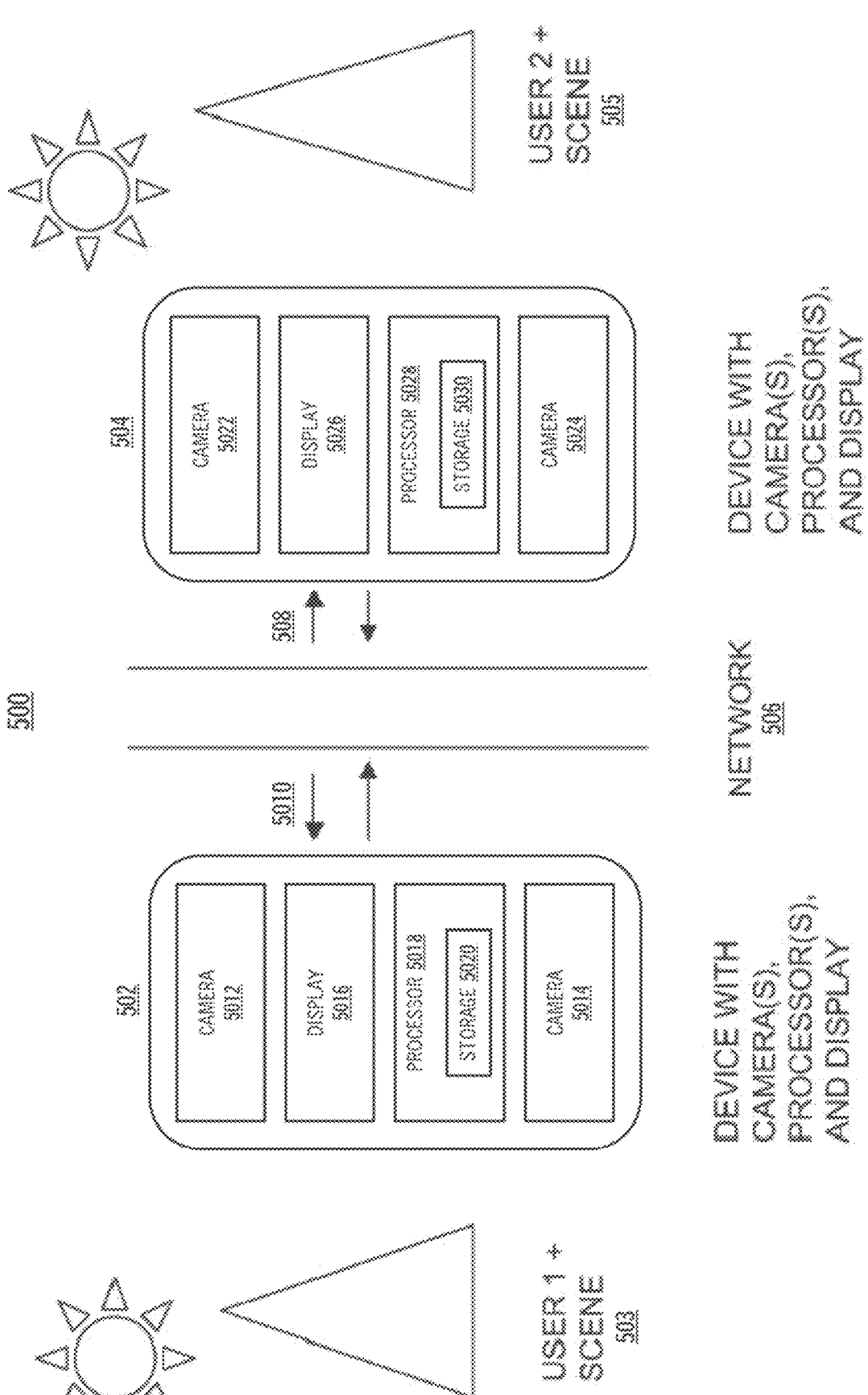
Figure 52:
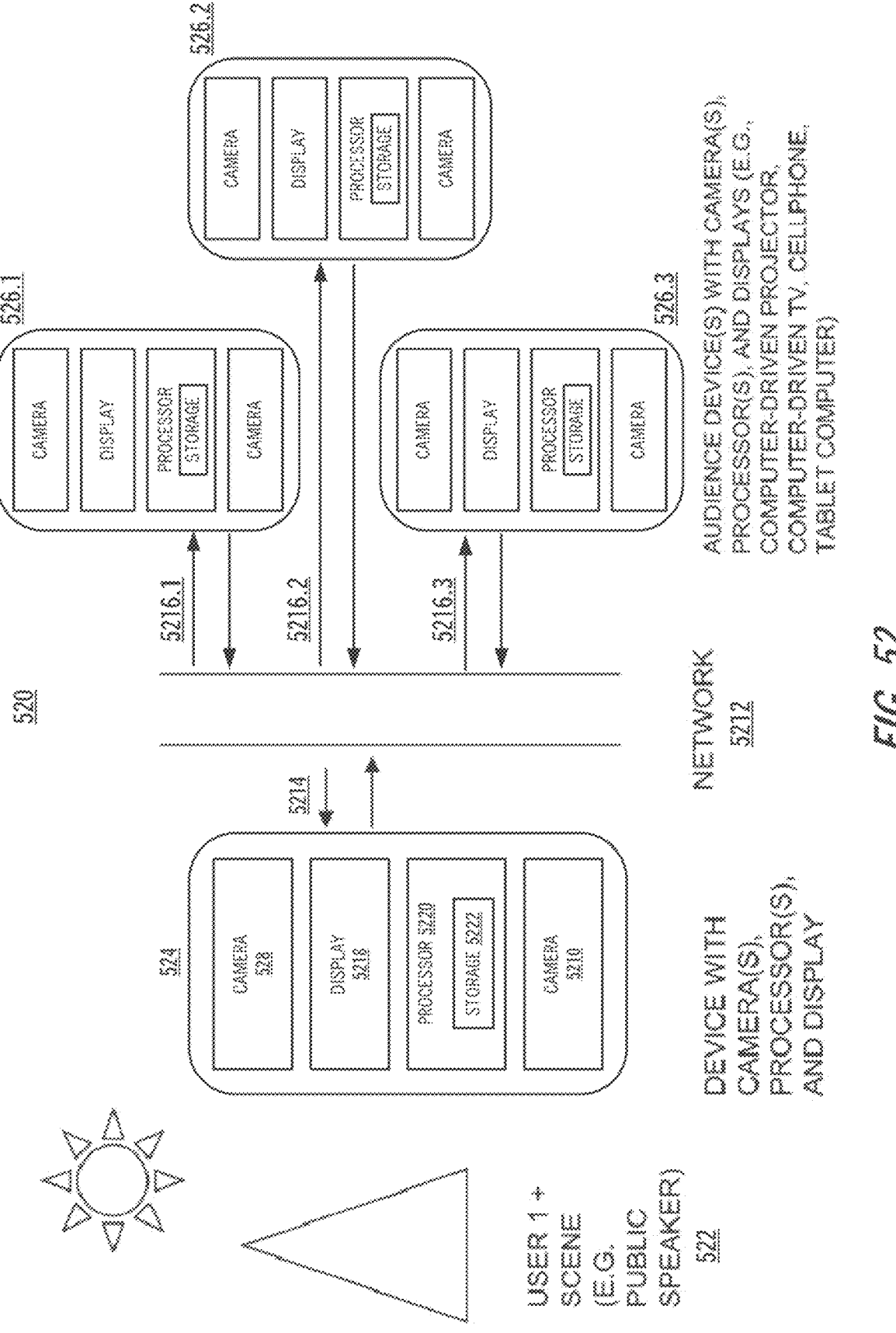
Figure 53:
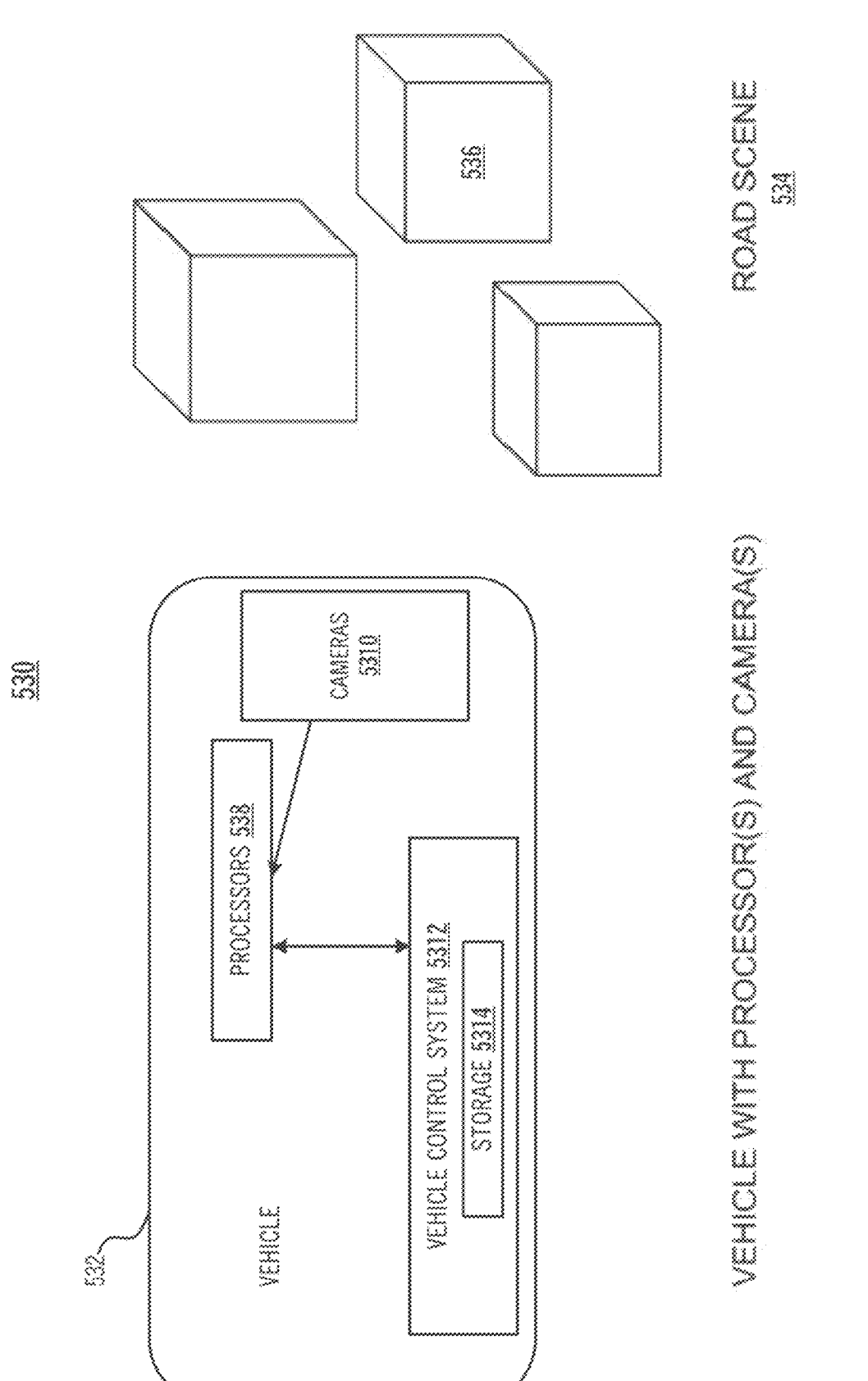
Figure 54:
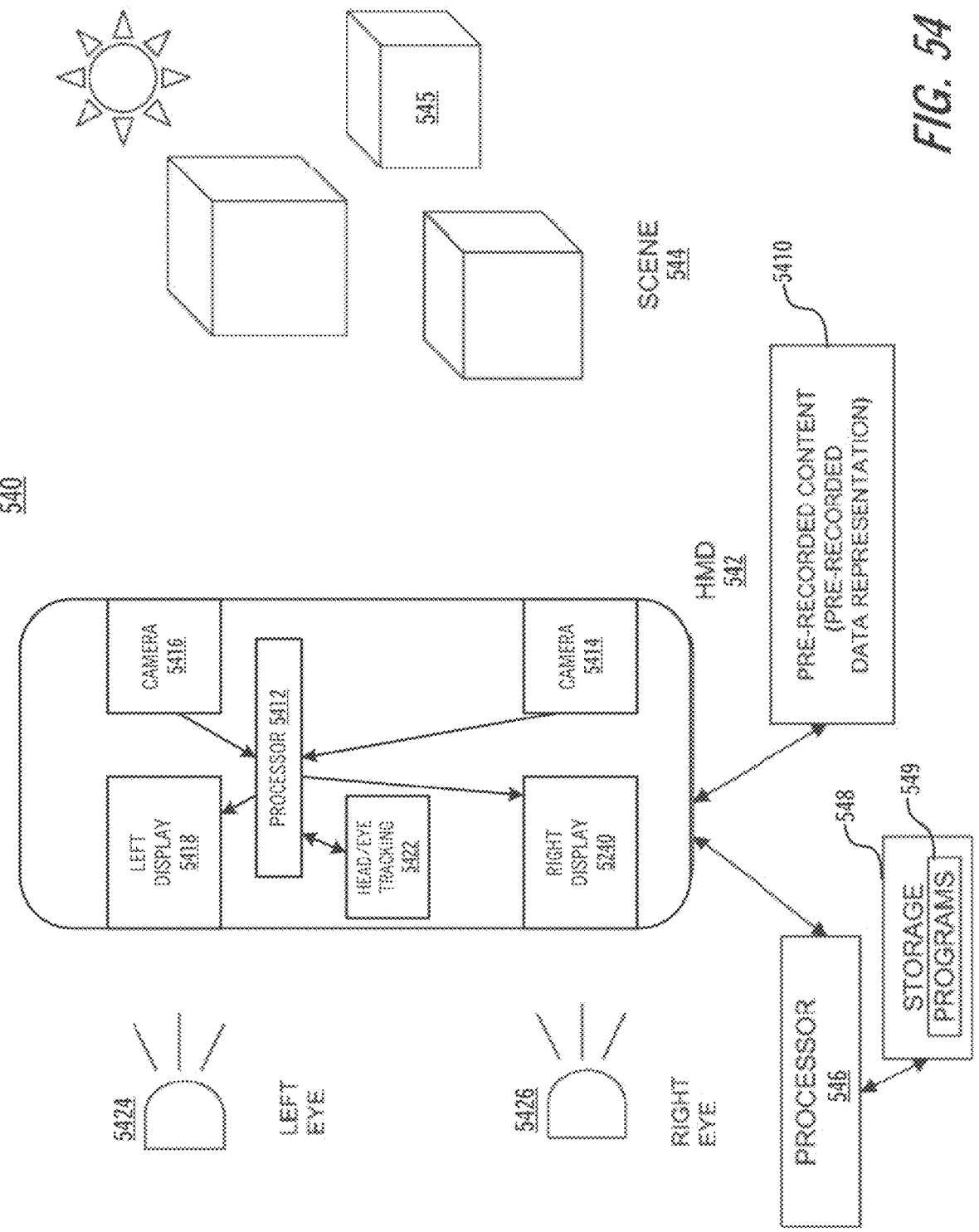

The attached schematic diagrams FIGS. 49-54 depict system aspects of V3D, including digital processing devices and architectures in which the invention can be implemented. By way of example, FIG. 49 depicts a digital processing device, such as a commercially available smartphone, in which the invention can be implemented; FIG. 50 shows a full-duplex, bi-directional practice of the invention between two users and their corresponding devices; FIG. 51 shows the use of a system in accordance with the invention to enable a first user to view a remote scene; FIG. 52 shows a one-to-many configuration in which multiple users (e.g., audience members) can view either simultaneously or asynchronously using a variety of different viewing elements in accordance with the invention: FIG. 53 shows an embodiment of the invention in connection with generating an image data stream for the control system of an autonomous or self-driving vehicle; and FIG. 54 shows the use of a head-mounted display (HMD) in connection with the invention, either in a pass-through mode to view an actual, external scene (shown on the right side of FIG. 54), or to view prerecorded image content.

Referring now to FIG. 49, the commercially available smartphone, tablet computer or other digital processing device 492 communicates with a conventional digital communications network 494 via a communications pathway 495 of known form (the collective combination of device 492, network 494 and communications pathway(s) 495 forming configuration 490), and the device 492 includes one or more digital processors 496, cameras 4910 and 4912, digital memory or storage element(s) 4914 containing, among other items, digital processor-readable and processor-executable computer program instructions (programs) 4916, and a display element 498. In accordance with known digital processing techniques, the processor 496 can execute programs 4916 to carry out various operations, including operations in accordance with the present invention.

Referring now to FIG. 50, the full-duplex, bi-directional practice of the invention between two users and their corresponding devices (collectively forming configuration 500) includes first user and scene 503, second user and scene 505, smartphones, tablet computers or other digital processing devices 502, 504, network 506 and communications pathways 508, 5010. The devices 502, 504 respectively include cameras 5012, 5014, 5022, 5024, displays 5016, 5026, processors 5018, 5028, and digital memory or storage elements 5020, 5030 (which may store processor-executable computer program instructions, and which may be separate from the processors).

The configuration 510 of FIG. 51, in accordance with the invention, for enabling a first user 514 to view a remote scene 515 containing objects 5022, includes smartphone or other digital processing device 5038, which can contain cameras 5030,5032, a display 5034, one or more processor(s) 5036 and storage 5038 (which can contain computer program instructions and which can be separate from processor 5036). Configuration 510 also includes network 5024, communications pathways 5026, 5028, remote cameras 516, 518 with a view of the remote scene 515, processor(s) 5020, and digital memory or storage element(s) 5040 (which can contain computer program instructions, and which can be separate from processor 5020).

The one-to-many configuration 520 of FIG. 52, in which multiple users (e.g., audience members) using smartphones, tablet computers or other devices 526.1, 526.2, 526.3 can view a remote scene or remote first user 522, either simultaneously or asynchronously, in accordance with the invention, includes digital processing device 524, network 5212 and communications pathways 5214, 5216.1, 5216.2, 5216.3. The smartphone or other digital processing device 524 used to capture images of the remove scene or first user 522, and the smartphones or other digital processing devices 526.1, 526.2, 526.3 used by respective viewers/audience members, include respective cameras, digital processors, digital memory or storage element(s) (which may store computer program instructions executable by the respective processor, and which may be separate from the processor), and displays.

The embodiment or configuration 530 of the invention, illustrated in FIG. 53, for generating an image data stream for the control system 5312 of an autonomous or self-driving vehicle 532, can include camera(s) 5310 having a view of scene 534 containing objects 536, processor(s) 538 (which may include or have in communication therewith digital memory or storage elements for storing data and/or processor-executable computer program instructions) in communication with vehicle control system 5312. The vehicle control system 5312 may also include digital storage or memory element(s) 5314, which may include executable program instructions, and which may be separate from vehicle control system 5312.

HMD-related embodiment or configuration 540 of the invention, illustrated in FIG. 54, can include the use of a head-mounted display (HMD) 542 in connection with the invention, either in a pass-through mode to view an actual, external scene 544 containing objects 545 (shown on the right side of FIG. 54), or to view prerecorded image content or data representation 5410. The HMD 542, which can be a purpose-built HMD or an adaptation of a smartphone or other digital processing device, can be in communication with an external processor 546, external digital memory or storage element(s) 548 that can contain computer program instructions 549, and/or in communication with a source of prerecorded content or data representation 5410. The HMD 542 shown in FIG. 54 includes cameras 5414 and 5416 which can have a view of actual scene 544; left and right displays 5418 and 5420 for respectively displaying to a human user's left and right eyes 5424 and 5426; digital processor(s) 5412, and a head/eye/face tracking element 5422. The tracking element 5422 can consist of a combination of hardware and software elements and algorithms, described in greater detail elsewhere herein, in accordance with the present invention. The processor element(s) 5412 of the HMD can also contain, or have proximate thereto, digital memory or storage elements, which may store processor-executable computer program instructions.

In each of these examples, illustrated in FIGS. 49-54, digital memory or storage elements can contain digital processor-executable computer program instructions, which, when executed by a digital processor, cause the processor to execute operations in accordance with various aspects of the present invention.

Flowcharts of Exemplary Practices of V3D Aspects

FIGS. 55-80 are flowcharts illustrating method aspects and exemplary practices of V3D in connection with which the present invention may be practiced. The methods depicted in these flowcharts are examples only; the organization, order and number of operations in the exemplary practices can be varied; and the exemplary practices and methods can be arranged or ordered differently, and include different functions, whether singly or in combination, while still being within the spirit and scope of the present invention. Items described below in parentheses are, among other aspects, optional in a given practice of the invention.

FIG. 55 is a flowchart of a V3D method 550 according to an exemplary practice of V3D aspects, including the following operations:

551: Capture images of second user;

552: Execute image rectification;

553: Execute feature correspondence, by detecting common features;

554: Generate data representation;

555: Reconstruct synthetic view of second user based on representation;

556: Use head tracking as input to reconstruction;

557: Estimate location of users head/eyes;

558: Display synthetic view to first user on display screen used by first user, and 559: Execute capturing, generating, reconstructing, and displaying such that the first user can have direct virtual eye contact with second user through first user's display screen, by reconstructing and displaying synthetic view of second user in which second user appears to be gazing directly at first user even if no camera has direct eye contact gaze vector to second user;

(Execute such that first user is provided visual impression of looking through display screen as a physical window to second user and visual scene surrounding second user, and first user is provided immersive visual experience of second user and scene surrounding the second user);

(Camera shake effects are inherently eliminated, in that capturing, detecting, generating, reconstructing and displaying are executed such that first user has virtual direct view through his display screen to second user and visual scene surrounding second user; and scale and perspective of image of second user and objects in visual scene surrounding second user are accurately represented to first user regardless of user view distance and angle).

Figure 56:
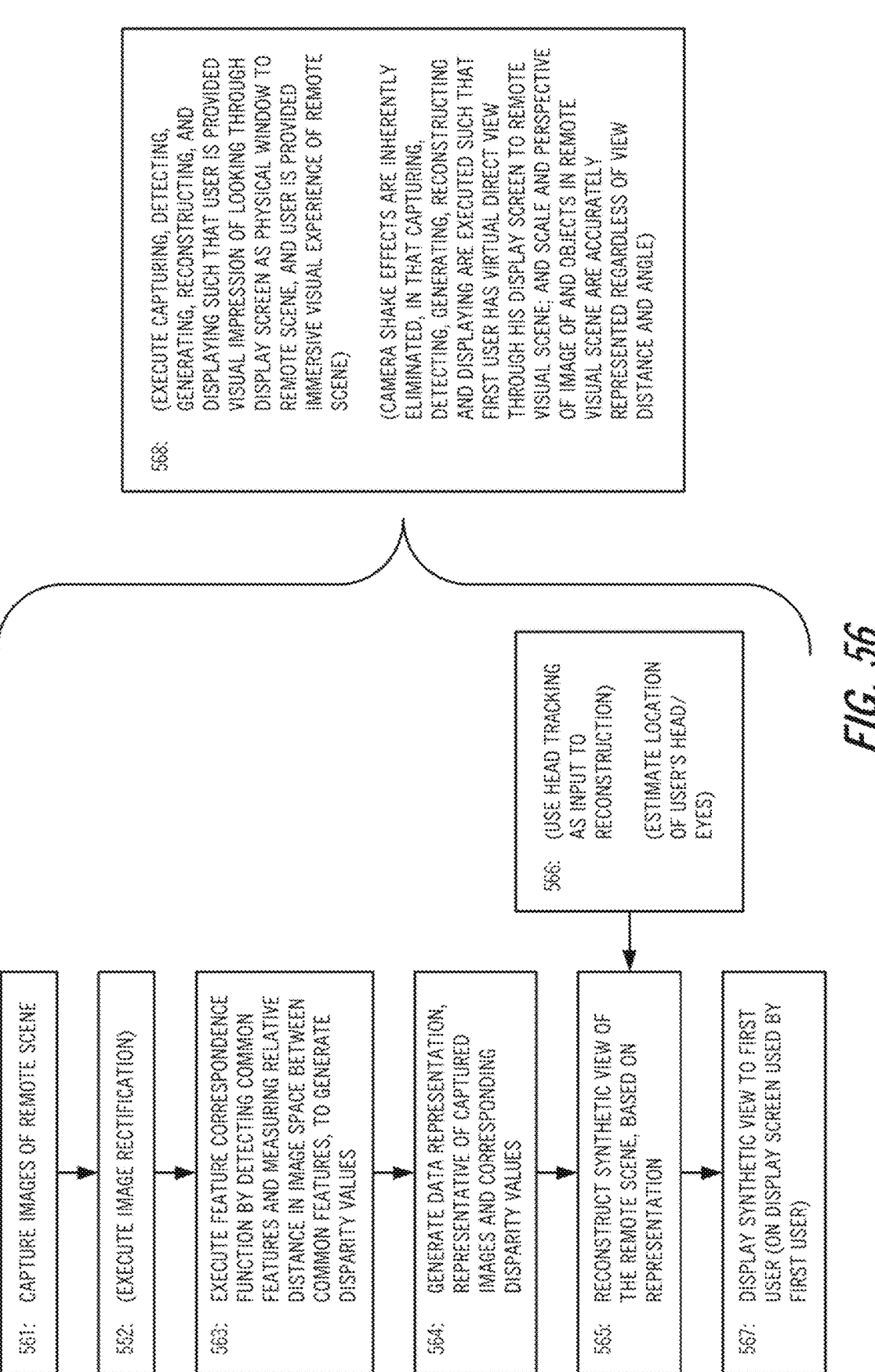

FIG. 56 is a flowchart of another V3D method 560 according to an exemplary practice of the invention, including the following operations:

561: Capture images of remote scene;

562: Execute image rectification;

563: Execute feature correspondence function by detecting common features and measuring relative distance in image space between common features, to generate disparity values;

564: Generate data representation, representative of captured images and corresponding disparity values;

565: Reconstruct synthetic view of the remote scene, based on representation;

566: Use head tracking as input to reconstruction;

567: Display synthetic view to first user (on display screen used by first user);

(Estimate location of user's head/eyes);

568: Execute capturing, detecting, generating, reconstructing, and displaying such that user is provided visual impression of looking through display screen as physical window to remote scene, and user is provided an immersive visual experience of remote scene);

(Camera shake effects are inherently eliminated, in that capturing, detecting, generating, reconstructing and displaying are executed such that first user has virtual direct view through his display screen to remote visual scene; and scale and perspective of image of and objects in remote visual scene are accurately represented regardless of view distance and angle).

FIG. 57 is a flowchart of a self-portraiture V3D method 570 according to an exemplary practice of the invention, including the following operations:

571: Capture images of user during setup time (use camera provided on or around periphery of display screen of user's handheld device with view of user's face during self-portrait setup time);

572: Generate tracking information (by estimating location of user's head or eyes relative to handheld device during setup time);

573: Generate data representation representative of captured images;

574: Reconstruct synthetic view of user, based on the generated data representation and generated tracking information;

575: Display to user the synthetic view of user (on the display screen during the setup time) (thereby enabling user, while setting up self-portrait, to selectively orient or position his gaze or head, or handheld device and its camera, with real-time visual feedback);

576: Execute capturing, estimating, generating, reconstructing and displaying such that, in self-portrait, user can appear to be looking directly into camera, even if camera does not have direct eye contact gaze vector to user.

FIG. 58 is a flowchart of a photo composition V3D method 580 according to an exemplary practice of the invention, including the following operations:

581: At photograph setup time, capture images of scene to be photographed (use camera provided on a side of user's handheld device opposite display screen side of user's device);

582: Generate tracking information (by estimating location of user's head or eyes relative to handheld device during setup time) (wherein estimating a location of the user's head or eyes relative to handheld device uses at least one camera on display side of handheld device, having a view of user's head or eyes during photograph setup time);

583: Generate data representation representative of captured images;

584: Reconstruct synthetic view of scene, based on generated data representation and generated tracking information (synthetic view reconstructed such that scale and perspective of synthetic view have selected correspondence to user's viewpoint relative to handheld device and scene);

585: Display to user the synthetic view of the scene (on display screen during setup time) (thereby enabling user, while setting up photograph, to frame scene to be photographed, with selected scale and perspective within display frame, with real-time visual feedback) (wherein user can control scale and perspective of synthetic view by changing position of handheld device relative to position of user's head).

FIG. 59 is a flowchart of an HMD-related V3D method 590 according to an exemplary practice of the invention, including the following operations:

591: Capture or generate at least two image streams;

(using at least one camera attached or mounted on or proximate to external portion or surface of HMD);

(wherein captured image streams contain images of a scene);

(wherein at least one camera is panoramic, night-vision, or thermal imaging camera);

(at least one IR TOF camera or imaging device that directly provides depth);

592: Execute feature correspondence function;

593: Generate data representation representative of captured images contained in the captured image streams;

(Representation can also be representative of disparity values or depth information);

594: Reconstruct two synthetic views, based on representation;

(use motion vector to modify respective view origins, during reconstructing, so as to produce intermediate image frames to be interposed between captured image frames in the captured image streams and interpose the intermediate image frames between the captured image frames so as to reduce apparent latency);

595: Display synthetic views to the user, via HMD;

596: (Track location/position of user's head/eyes to generate motion vector usable in reconstructing synthetic views);

597: Execute reconstructing and displaying such that each of the synthetic views has respective view origin corresponding to respective virtual camera location, wherein the respective view origins are positioned such that the respective virtual camera locations coincide with respective locations of user's left and right eyes, so as to provide user with substantially natural visual experience of perspective, binocular stereo and occlusion exemplary practices of the scene, substantially as if user were directly viewing scene without an HMD.

Figure 60:
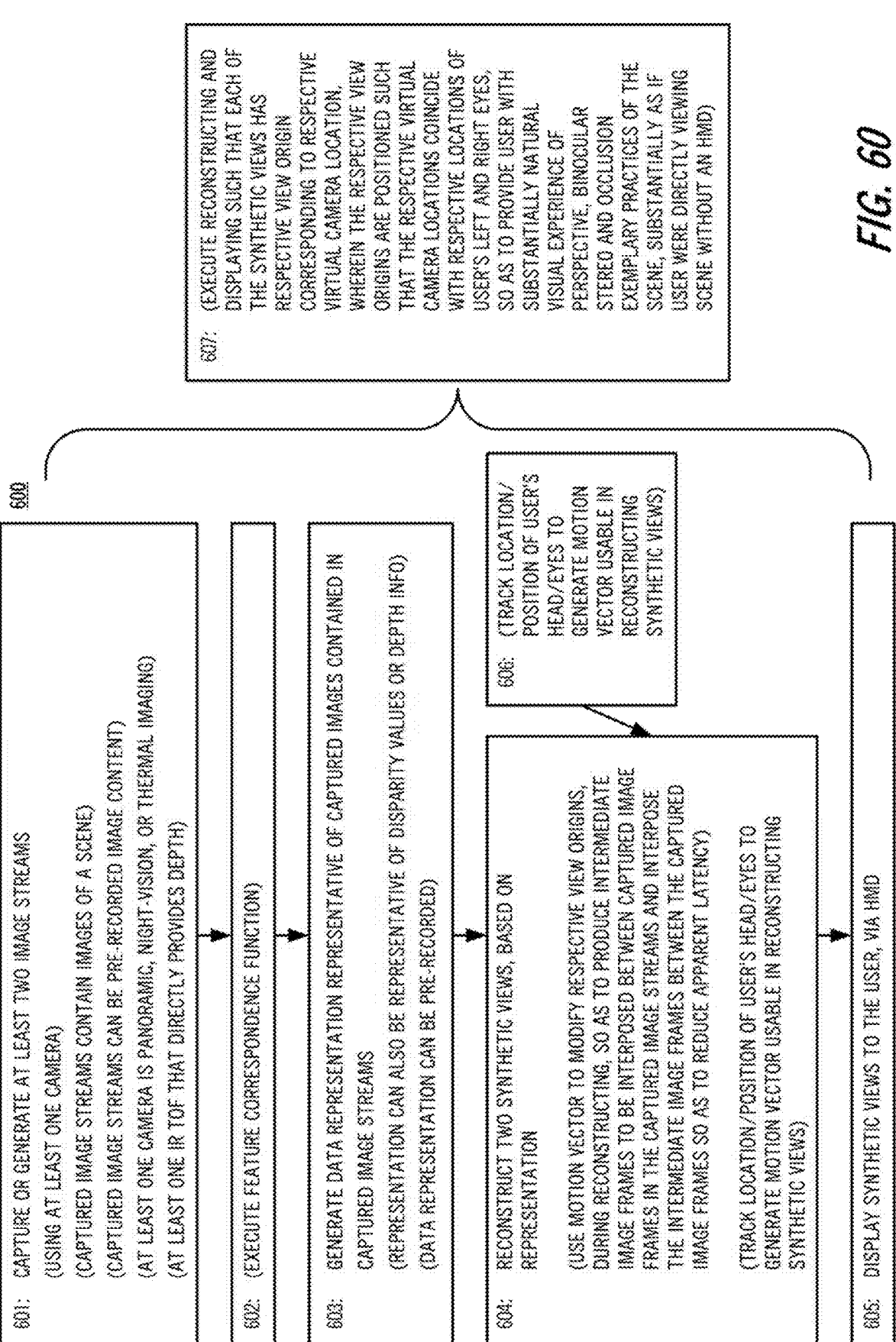

FIG. 60 is a flowchart of another HMD-related V3D method 600 according to an exemplary practice of the invention, including the following operations:

601: Capture or generate at least two image streams;
  (using at least one camera);
  (wherein captured image streams can contain images of a scene);
  (wherein captured image streams can be pre-recorded image content);
  (wherein at least one camera is panoramic, night-vision, or thermal imaging);
  (wherein at least one IR TOF that directly provides depth);
602: Execute feature correspondence function;
603: Generate data representation representative of captured images contained in captured image streams;
  (representation can also be representative of disparity values or depth information);
  (data representation can be pre-recorded);
604: Reconstruct two synthetic views, based on representation;
  (use motion vector to modify respective view origins, during reconstructing, so as to produce intermediate image frames to be interposed between captured image frames in the captured image streams and interpose the intermediate image frames between the captured image frames so as to reduce apparent latency);
  (track location/position of user's head/eyes to generate motion vector usable in reconstructing synthetic views);
605: Display synthetic views to the user, via HMD;
606: Execute reconstructing and displaying such that each of the synthetic views has respective view origin corresponding to respective virtual camera location, wherein the respective view origins are positioned such that the respective virtual camera locations coincide with respective locations of users left and right eyes, so as to provide user with substantially natural visual experience of perspective, binocular stereo and occlusion exemplary practices of the scene, substantially as if user were directly viewing scene without an HMD.

FIG. 61 is a flowchart of a vehicle control system-related method 610 according to an exemplary practice of the invention, including the following operations:

611: Capture images of scene around at least a portion of vehicle (using at least one camera having a view of scene);
612: (Execute image rectification);
613: Execute feature correspondence function;
  (by detecting common features between corresponding images captured by the at least one camera and measuring a relative distance in image space between common features, to generate disparity values);
  (detect common features between images captured by single camera over time);
  (detect common features between corresponding images captured by two or more cameras);

614: Calculate corresponding depth information based on disparity values;
  (or obtain depth information using IR TOF camera);
615: Generate from the images and corresponding depth information an image data stream for use by the vehicle control system.

FIG. 62 is a flowchart of another V3D method 620 according to an exemplary practice of the invention, which can utilize a view vector rotated camera configuration and/or a number of the following operations:

621: Execute image capture;
622: (of other user);
623: (of other user and scene surrounding other user);
624: (of remote scene);
625: (Use single camera (and detect common features between images captured over time));
626: (Use at least one color camera);
627: (Use at least one infrared structured light emitter);
628: (Use at least one camera which is an infra-red time-of-flight camera that directly provides depth information);
629: (Use at least two cameras (and detect common features between corresponding images captured by respective cameras);
6210: (Camera[s] for capturing images of the second user are located at or near the periphery or edges of a display device used by second user, display device used by second user having display screen viewable by second user and having a geometric center; synthetic view of second user corresponds to selected virtual camera location, selected virtual camera location corresponding to point at or proximate the geometric center);
6211: (Use a view vector rotated camera configuration in which the locations of first and second cameras define a line; rotate the line defined by first and second camera locations by a selected amount from selected horizontal or vertical axis to increase number of valid feature correspondences identified in typical real-world settings by feature correspondence function) (first and second cameras positioned relative to each other along epipolar lines);
6212: (Subsequent to capturing of images, rotate disparity values back to selected horizontal or vertical orientation along with captured images);
6213: (Subsequent to reconstructing of synthetic view, rotate synthetic view back to selected horizontal or vertical orientation);
6214: (Capture using exposure cycling);
6215: (Use at least three cameras arranged in substantially L-shaped configuration, such that pair of cameras is presented along first axis and second pair of cameras is presented along second axis substantially perpendicular to first axis).

FIG. 63 is a flowchart of an exposure cycling method 630 according to an exemplary practice of the invention, including the following operations:

631: Dynamically adjust exposure of camera(s) on frame-by-frame basis to improve disparity estimation in regions outside exposed region: take series of exposures, including exposures lighter than and exposures darker than a visibility-optimal exposure; calculate disparity values for each exposure; and integrate disparity values into an overall disparity solution over time, to improve disparity estimation;
632: The overall disparity solution includes a disparity histogram into which disparity values are integrated, the disparity histogram being converged over time, so as to improve disparity estimation;

633: (analyze quality of overall disparity solution on respective dark, mid-range and light pixels to generate variance information used to control exposure settings of the camera(s), thereby to form a closed loop between quality of the disparity estimate and set of exposures requested from camera(s));

634: (overall disparity solution includes disparity histogram: analyze variance of disparity histograms on respective dark, mid-range and light pixels to generate variance information used to control exposure settings of camera(s), thereby to form a closed loop between quality of disparity estimate and set of exposures requested from camera(s)).

FIG. 64 is a flowchart of an image rectification method 640 according to an exemplary practice of the invention, including the following operations:

641: Execute image rectification;

642: (to compensate for optical distortion of each camera and relative misalignment of the cameras);

643: (executing image rectification includes applying 2D image space transform);

644: (applying 2D image space transform includes using GPGPU processor running shader program).

FIGS. 65A-B show a flowchart of a feature correspondence method 650 according to an exemplary practice of the invention, which can include a number of the following operations:

651: Detect common features between corresponding images captured by the respective cameras;

652: (Detect common features between images captured by single camera over time; measure relative distance in image space between common features, to generate disparity values);

653: (Evaluate and combine vertical- and horizontal-axis correspondence information);

654: (Apply, to image pixels containing disparity solution, a coordinate transformation to a unified coordinate system (un-rectified coordinate system of the captured images));

655: Use a disparity histogram-based method of integrating data and determining correspondence: constructing disparity histogram indicating the relative probability of a given disparity value being correct for a given pixel;

656: (Disparity histogram functions as probability density function (PDF) of disparity for given pixel, in which higher values indicate higher probability of corresponding disparity range being valid for given pixel);

657: (One axis of disparity histogram indicates given disparity range; second axis of histogram indicates number of pixels in kernel surrounding central pixel in question that are voting for given disparity range);

658: (Votes indicated by disparity histogram initially generated utilizing sum of square differences [SSD] method: executing SSD method with relatively small kernel to produce fast dense disparity map in which each pixel has selected disparity that represents lowest error; then, processing plurality of pixels to accumulate into disparity histogram a tally of number of votes for given disparity in relatively larger kernel surrounding pixel in question);

659: (Transform the disparity histogram into a cumulative distribution function (CDF) from which width of corresponding interquartile range can be determined, to establish confidence level in corresponding disparity solution);

6510: (Maintain a count of number of statistically significant modes in histogram, thereby to indicate modality);

6511: (Use modality as input to reconstruction, to control application of stretch vs. slide reconstruction method)

6512: (Maintain a disparity histogram over selected time interval; and accumulate samples into histogram, to compensate for camera noise or other sources of motion or error);

6513: (Generate fast disparity estimates for multiple independent axes; then combine corresponding, respective disparity histograms to produce statistically more robust disparity solution);

6514: (Evaluate interquartile (IQ) range of CDF of given disparity histogram to produce IQ result; if IQ result is indicative of area of poor sampling signal to noise ratio, due to camera over- or underexposure, then control camera exposure based on IQ result to improve poorly sampled area of given disparity histogram);

6515: (Test for only a small set of disparity values using small-kernel SSD method to generate initial results; populate corresponding disparity histogram with initial results; then use histogram votes to drive further SSD testing within given range to improve disparity resolution over time);

6516: (Extract sub-pixel disparity information from disparity histogram: where histogram indicates a maximum-vote disparity range and an adjacent, runner-up disparity range, calculate a weighted average disparity value based on ratio between number of votes for each of the adjacent disparity ranges);

6517: (The feature correspondence function includes weighting toward a center pixel in a sum of squared differences (SSD) approach: apply higher weight to the center pixel for which a disparity solution is sought, and a lesser weight outside the center pixel, the lesser weight being proportional to distance of given kernel sample from the center);

6518: (The feature correspondence function includes optimizing generation of disparity values on GPGPU computing structures);

6519: (Refine correspondence information over time);

6520: (Retain a disparity solution over a time interval, and continue to integrate disparity solution values for each image frame over the time interval, to converge on improved disparity solution by sampling over time);

6521: (Fill unknowns in a correspondence information set with historical data obtained from previously captured images: if a given image feature is detected in an image captured by one camera, and no corresponding image feature is found in a corresponding image captured by another camera, then utilize data for a pixel corresponding to the given image feature, from a corresponding, previously captured image).

FIG. 66 is a flowchart of a method 660 for generating a data representation, according to an exemplary practice of the invention, which can include a number of the following operations:

661: Generate data structure representing 2D coordinates of control point in image space, and containing a disparity value treated as a pixel velocity in screen space with respect to a given movement of a given view vector; and utilize the disparity value in combination with movement vector to slide a pixel in a given source image in selected directions, in 2D, to enable a reconstruction of 3D image movement;

662: (Each camera generates a respective camera stream; and the data structure contains a sample buffer index, stored in association with control point coordinates, that indicates which camera stream to sample in association with given control point);

663: (Determine whether a given pixel should be assigned a control point);

664: (Assign control points along image edges: execute computations enabling identification of image edges);

665: (Flag a given image feature with a reference count indicating how many samples reference the given image feature, to differentiate a uniquely referenced image feature, and a sample corresponding to the uniquely referenced image feature, from repeatedly referenced image features; and utilize reference count, extracting unique samples, to enable reduction in bandwidth requirements);

666: (Utilize the reference count to encode and transmit a given sample exactly once, even if a pixel or image feature corresponding to the sample is repeated in multiple camera views, to enable reduction in bandwidth requirements).

FIGS. 67A-B show a flowchart of an image reconstruction method 670, according to an exemplary practice of the invention, which can include a number of the following operations:

671: Reconstruct synthetic view based on data representation and tracking information; execute 3d image reconstruction by warping 2D image, using control points: sliding given pixel along a head movement vector at a displacement rate proportional to disparity, based on tracking information and disparity values;

672: (wherein disparity values are acquired from feature correspondence function or control point data stream);

673: (Use tracking information to control 2D crop box: synthetic view is reconstructed based on view origin, and then cropped and scaled to fill user's display screen view window; define minima and maxima of crop box as function of user's head location with respect to display screen and dimensions of display screen view window);

674: (Execute 2D warping reconstruction of selected view based on selected control points: designate set of control points, respective control points corresponding to respective, selected pixels in a source image; slide control points in selected directions in 2D space, wherein the control points are slid proportionally to respective disparity values; interpolate data values for pixels between the selected pixels corresponding to the control points; to create a synthetic view of the image from a selected new perspective in 3D space);

675: (Rotate source image and control point coordinates so that rows or columns of image pixels are parallel to the vector between the original source image center and the new view vector defined by the selected new perspective);

676: (Rotate the source image and control point coordinates to align the view vector to image scanlines; iterate through each scanline and each control point for a given scanline, generating a line element beginning and ending at each control point in 2D image space, with the addition of the corresponding disparity value multiplied by the corresponding view vector magnitude with the corresponding x-axis coordinate; assign a texture coordinate to the beginning and ending points of each generated line element, equal to their respective, original 2D location in the source image; interpolate texture coordinates linearly along each line element; to create a resulting image in which image data between the control points is linearly stretched);

677: (Rotate resulting image back by the inverse of the rotation applied to align the view vector with the scanlines);

678: (Link control points between scanlines, as well as along scanlines, to create polygon elements defined by control points, across which interpolation is executed);

679: (For a given source image, selectively slide image foreground and image background independently of each other: sliding is utilized in regions of large disparity or depth change);

6710: (Determine whether to utilize sliding: evaluate disparity histogram to detect multi-modal behavior indicating that given control point is on an image boundary for which allowing foreground and background to slide independent of each other presents better solution than interpolating depth between foreground and background; disparity histogram functions as probability density function (PDF) of disparity for a given pixel, in which higher values indicate higher probability of the corresponding disparity range being valid for the given pixel);

6711: (Use at least one sample integration function table (sift), the sift including a table of sample integration functions for one or more pixels in a desired output resolution of an image to be displayed to the user; a given sample integration function maps an input view origin vector to at least one known, weighted 2D image sample location in at least one input image buffer).

FIG. 68 is a flowchart of a display method 680, according to an exemplary practice of the invention, which can include a number of the following operations:

681: Display synthetic view to user on display screen;

682: (Display synthetic view to user on a 2D display screen; update display in real-time, based on tracking information, so that display appears to the user to be a window into a 3d scene responsive to user's head or eye location;

683: (Display synthetic view to user on binocular stereo display device);

684: (Display synthetic view to user on lenticular display that enables auto-stereoscopic viewing).

FIG. 69 is a flowchart of a method 690 according to an exemplary practice of the invention, utilizing a multi-level disparity histogram, and which can also include the following:

691: Capture images of scene, using at least first and second cameras having a view of the scene, the cameras being arranged along an axis to configure a stereo camera pair having a camera pair axis;

692: Execute feature correspondence function by detecting common features between corresponding images captured by the respective cameras and measuring a relative distance in image space between the common features, to generate disparity values, the feature correspondence function including constructing a multi-level disparity histogram indicating the relative probability of a given disparity value being correct for a given pixel, and the constructing of a multi-level disparity histogram includes executing a fast dense disparity estimate (FDDE) image pattern matching operation on successively lower-frequency downsampled versions of the input stereo images, the successively lower-frequency downsampled versions constituting a set of levels of FDDE histogram votes:

692.1 Each level is assigned a level number, and each successively higher level is characterized by a lower image resolution;

692.2 (Downsampling is provided by reducing image resolution via low-pass filtering);

692.3 (Downsampling includes using a weighted summation of a kernel in level [n–1] to produce a pixel value in level [n], and the normalized kernel center position remains the same across all levels);

692.4 (For a given desired disparity solution at full image resolution, the FDDE votes for every image level are included in the disparity solution);

692.5 Maintain in a memory unit a summation stack, for executing summation operations relating to feature correspondence);

693: Generate a multi-level histogram including a set of initially independent histograms at different levels of resolution:

693.1: Each histogram bin in a given level represents votes for a disparity determined by the FDDE at that level;

693.2: Each histogram bin in a given level has an associated disparity uncertainty range, and the disparity uncertainty range represented by each histogram bin is a selected multiple wider than the disparity uncertainty range of a bin in the preceding level;

694: Apply a sub-pixel shift to the disparity values at each level during downsampling, to negate rounding error effect: apply half pixel shift to only one of the images in a stereo pair at each level of downsampling;

694.1: Apply sub-pixel shift implemented inline, within the weights of the filter kernel utilized to implement the downsampling from level to level;

695: Execute histogram integration, including executing a recursive summation across all the FDDE levels:

695.1: During summation, modify the weighting of each level to control the amplitude of the effect of lower levels in overall voting, by applying selected weighting coefficients to selected levels;

696: Infer a sub-pixel disparity solution from the disparity histogram, by calculating a sub-pixel offset based on the number of votes for the maximum vote disparity range and the number of votes for an adjacent, runner-up disparity range.

FIG. 70 is a flowchart of a method 700 according to an exemplary practice of the invention, utilizing RUD image space and including the following operations:

701: Capture images of scene, using at least first and second cameras having a view of the scene, the cameras being arranged along an axis to configure a stereo camera pair having a camera pair axis, and for each camera pair axis, execute image capture using the camera pair to generate image data;

702: Apply/execute rectification and undistorting transformations to transform the image data into RUD image space;

703: Iteratively downsample to produce multiple, successively lower resolution levels;

704: Execute FDDE calculations for each level to compile FDDE votes for each level;

705: Gather FDDE disparity range votes into a multi-level histogram;

706: Determine the highest ranked disparity range in the multi-level histogram;

707: Process the multi-level histogram disparity data to generate a final disparity result.

FIG. 71 is a flowchart of a method 710 according to an exemplary practice of the invention, utilizing an injective constraint aspect and including the following operations:

711: Capture images of a scene, using at least first and second cameras having a view of the scene, the cameras being arranged along an axis to configure a stereo camera pair;

712: Execute a feature correspondence function by detecting common features between corresponding images captured by the respective cameras and measuring a relative distance in image space between the common features, to generate disparity values, the feature correspondence function including: generating a disparity solution based on the disparity values, and applying an injective constraint to the disparity solution based on domain and co-domain, wherein the domain comprises pixels for a given image captured by the first camera and the co-domain comprises pixels for a corresponding image captured by the second camera, to enable correction of error in the disparity solution in response to violation of the injective constraint, and wherein the injective constraint is that no element in the co-domain is referenced more than once by elements in the domain.

FIG. 72 is a flowchart of a method 720 for applying an injective constraint, according to an exemplary practice of the invention, including the following operations:

721: Maintain a reference count for each pixel in the co-domain;

722: Does reference count for the pixels in the co-domain exceed "1" ?;

723: If the count exceeds "1":

724: Signal a violation and respond to the violation with a selected error correction approach.

FIG. 73 is a flowchart of a method 730 relating to error correction approaches based on injective constraint, according to an exemplary practice of the invention, including one or more of the following:

731: First-come, first-served: assign priority to the first element in the domain to claim an element in the co-domain, and if a second element in the domain claims the same co-domain element, invalidating that subsequent match and designating that subsequent match to be invalid;

732: Best match wins: compare the actual image matching error or corresponding histogram vote count between the two possible candidate elements in the domain against the contested element in the co-domain, and designate as winner the domain candidate with the best match;

733: Smallest disparity wins: if there is a contest between candidate elements in the domain for a given co-domain element, wherein each candidate element has a corresponding disparity, selecting the domain candidate with the smallest disparity and designating the others as invalid;

734: Seek alternative candidates: select and test the next best domain candidate, based on a selected criterion, and iterating the selecting and testing until the violation is eliminated or a computational time limit is reached.

FIG. 74 is a flowchart of a head/eye/face location estimation method 740 according to an exemplary practice of the invention, including the following operations:

741: Capture images of the second user, using at least one camera having a view of the second user's face;

742: Execute a feature correspondence function by detecting common features between corresponding images captured by the at least one camera and measuring a relative distance in image space between the common features, to generate disparity values;

743: Generate a data representation, representative of the captured images and the corresponding disparity values;

744: Estimate a three-dimensional (3D) location of the first user's head, face or eyes, to generate tracking information, which can include the following:

744.1: Pass a captured image of the first user, the captured image including the first user's head and face, to a two-dimensional (2D) facial feature detector that utilizes the image to generate a first estimate of head and eye location and a rotation angle of the face relative to an image plane;

744.2: Use an estimated center-of-face position, face rotation angle, and head depth range based on the first estimate, to determine a best-fit rectangle that includes the head;

744.3: Extract from the best-fit rectangle all 3D points that lie within the best-fit rectangle, and calculate therefrom a representative 3D head position;

744.4: If the number of valid 3D points extracted from the best-fit rectangle exceeds a selected threshold in relation to the maximum number of possible 3D points in the region, then signal a valid 3D head position result

745: Reconstruct a synthetic view of the second user, based on the representation, to enable a display to the first user of a synthetic view of the second user in which the second user appears to be gazing directly at the first user, including reconstructing the synthetic view based on the generated data representation and the generated tracking information.

FIG. 75 is a flowchart of a method 750 providing further optional operations relating to the 3D location estimation shown in FIG. 74, according to an exemplary practice of the invention, including the following:

751: Determine, from the first estimate of head and eye location and face rotation angle, an estimated center-of-face position;

752: Determine an average depth value for the face by extracting three-dimensional (3D) points via the disparity values for a selected, small area located around the estimated center-of-face position;

753: Utilize the average depth value to determine a depth range that is likely to encompass the entire head;

754: Utilize the estimated center-of-face position, face rotation angle, and depth range to execute a second ray march to determine a best-fit rectangle that includes the head;

755: Calculate, for both horizontal and vertical axes, vectors that are perpendicular to each respective axis but spaced at different interval;

756: For each of the calculated vectors, test the corresponding 3D points starting from a position outside the head region and working inwards, to the horizontal or vertical axis;

757: When a 3D point is encountered that falls within the determined depth range, denominate that point as a valid extent of a best-fit head rectangle;

758: From each ray march along each axis, determine a best-fit rectangle for the head, and extracting therefrom all 3D points that lie within the best-fit rectangle, and calculating therefrom a weighted average;

759: If the number of valid 3D points extracted from the best-fit rectangle exceed a selected threshold in relation to the maximum number of possible 3D points in the region, signal a valid 3D head position result.

FIG. 76 is a flowchart of optional sub-operations 760 relating to 3D location estimation, according to an exemplary practice of the invention, which can include a number of the following:

761: Downsample captured image before passing it to the 2D facial feature detector.

762: Interpolate image data from video frame to video frame, based on the time that has passed from a given video frame from a previous video frame.

763: Convert image data to luminance values.

FIG. 77 is a flowchart of a method 770 according to an exemplary practice of the invention, utilizing URUD image space and including the following operations:

771: Capture images of a scene, using at least three cameras having a view of the scene, the cameras being arranged in a substantially "1"-shaped configuration wherein a first pair of cameras is disposed along a first axis and second pair of cameras is disposed along a second axis intersecting with, but angularly displaced from, the first axis, wherein the first and second pairs of cameras share a common camera at or near the intersection of the first and second axis, so that the first and second pairs of cameras represent respective first and second independent stereo axes that share a common camera;

772: Execute a feature correspondence function by detecting common features between corresponding images captured by the at least three cameras and measuring a relative distance in image space between the common features, to generate disparity values;

773: Generate a data representation, representative of the captured images and the corresponding disparity values;

774: Utilize an unrectified, undistorted (URUD) image space to integrate disparity data for pixels between the first and second stereo axes, thereby to combine disparity data from the first and second axes, wherein the URUD space is an image space in which polynomial lens distortion has been removed from the image data but the captured image remains unrectified.

FIG. 78 is a flowchart of a method 780 relating to optional operations in RUD/URUD image space according to an exemplary practice of the invention, including the following operations:

781: Execute a stereo correspondence operation on the image data in a rectified, undistorted (RUD) image space, and storing resultant disparity data in a RUD space coordinate system;

782: Store the resultant disparity data in a URUD space coordinate system;

783: Generate disparity histograms from the disparity data in either RUD or URUD space, and store the disparity histograms in a unified URUD space coordinate system (and apply a URUD to RUD coordinate transformation to obtain per-axis disparity values).

FIG. 79 is a flowchart of a method 790 relating to private disparity histograms according to an exemplary practice of the invention, including the following operations:

791: Capture images of a scene using at least one camera having a view of the scene;

792: Execute a feature correspondence function by detecting common features between corresponding images captured by the at least one camera and measuring a relative distance in image space between the common features, to generate disparity values, using a disparity histogram method to integrate data and determine correspondence, which can include:

792.1: Construct a disparity histogram indicating the relative probability of a given disparity value being correct for a given pixel;

792.2: Optimize generation of disparity values on a GPU computing structure, by generating, in the GPU computing structure, a plurality of output pixel threads and for each output pixel thread, maintaining a private disparity histogram in a storage element associated with the GPU computing structure and physically proximate to the computation units of the GPU computing structure;

793: Generate a data representation, representative of the captured images and the corresponding disparity values.

FIG. 80 is a flowchart of a method 800 further relating to private disparity histograms according to an exemplary practice of the invention, including the following operations:

801: Store the private disparity histogram such that each pixel thread writes to and reads from the corresponding private disparity histogram on a dedicated portion of shared local memory in the GPU;

802: Organize shared local memory in the GPU at least in part into memory words; the private disparity histogram is characterized by a series of histogram bins indicating the number of votes for a given disparity range; and if a maximum possible number of votes in the private disparity histogram is known, multiple histogram bins can be packed into a single word of the shared local memory, and accessed using bitwise GPU access operations.

II. Asymmetric Communications with Viewer Position Indicators

Overview

As will next be discussed, exemplary aspects, practices and embodiments of the invention utilize two or more cameras integrated into a capturing endpoint, the cameras positioned such that they are able to capture multiple views of a physical scene, the scene typically containing one or more physically-present participants. Data derived from the camera images, and therefore containing information about the physical scene and physically-present participants, is transmitted by the capturing endpoint to at least one viewing endpoint, the viewing endpoint being used by at least one remote participant.

In an exemplary practice of the invention, a remote participant has a virtual location within the 3-dimensional space of the physical scene. A view of the physical scene, as it would be seen from the perspective of the virtual location of the remote participant, is reconstructed and displayed to the remote participant. A remote participant may move his/her/their virtual location as well as gaze orientation, thus altering the view of the physical scene that is reconstructed.

In an exemplary practice of the invention, if a remote participant is viewing the reconstructed view of the scene using a head-mounted display, at least two images of the scene will be reconstructed, corresponding to the viewpoint from each of the remote participant's eyes. Information from sensors associated with the head-mounted display, potentially including an accelerometer and/or a tracking system, may cause the virtual location or orientation of the remote participant to change in response to movements of the remote participant.

Additional information about the remote participant may also be available to the viewing endpoint; this information may include: a remote participant's speech in the form of audio, text or another modality; a remote participant's reactions or emotions, communicated deliberately as with an emoji or automatically as with a video feed of the participant's face or with a face-recognition algorithm; or any additional information the remote participant makes available deliberately (such as shared files) or automatically (such as biometric indication including pulse and/or body temperature).

Information about the remote participant, including the virtual location of a remote participant, and potentially also including the aforementioned types of information, is transmitted, by the viewing endpoint to the capturing endpoint, to be communicated to the physically present users.

In the case of a meeting with few remote participants (fewer than approximately one hundred), individualized information about each remote participant may be presented to physically-present participants on a display device connected to the capturing endpoint.

In one embodiment, the display device may comprise a matrix of lights, indicating the position of a remote participant, thereby allowing a physically-present participant to give the impression of eye-contact by looking at an illuminated light. Colored lights or blinking lights may be used to differentiate remote-participants, or to communicate additional information about the participant such as which participant is speaking, or the state of each participant.

In another embodiment, the display device may comprise one or more screens, which may display the remote-participants' face(s), or additional information the remote participants wish to share such as a computer screen or textual communication. The screens may also display indications of the positions and orientations of the remote participants.

In another embodiment, the display device may display avatars for each remote participant. The position and relative sizes of the avatars may communicate the remote participant's virtual position. The remote participant may choose to affect their avatar to communicate additional information, or the avatars may change in response to information gathered from the remote participant.

In such an example of a meeting-related practice of the invention, the audio captured by a microphone connected to the viewing endpoint may be transmitted and reproduced by a speaker connected to the capturing endpoint, or interpreted and presented as text on a display at the capturing endpoint. This aspect is substantially similar to teleconferencing systems already in broad use, and the solutions for audio arbitration such as a participant-controllable mute feature, and a feature to highlight the speaking user and make they appear prominently on a display, will also apply to this invention.

The invention may also be used to facilitate a performance with a multitude of remote participants, for example a live musical performance in which the physically-present participants are musicians or performers and the remote participants are audience members.

In such an example of a performance-related practice of the invention, a display device connected to the capturing endpoint may communicate aggregate information to the physically-present participants about the collective state of the remote participants. For example, the display device:

may indicate the density of the virtual crowd of remote participants;

may indicate objects in the physical scene that attract the gaze of large numbers of remote participants, such as a physically-present participant or performer;

may indicate the aggregate reactions or emotions of the remote participants, such as aggregate real-time distributions of approval vs. disapproval;

may indicate the average excitement level of remote participants, such as could be measured by heart rate, or by detecting applause or cheering via a viewing endpoint's microphone

A Virtual Meeting Example

Figure 81:
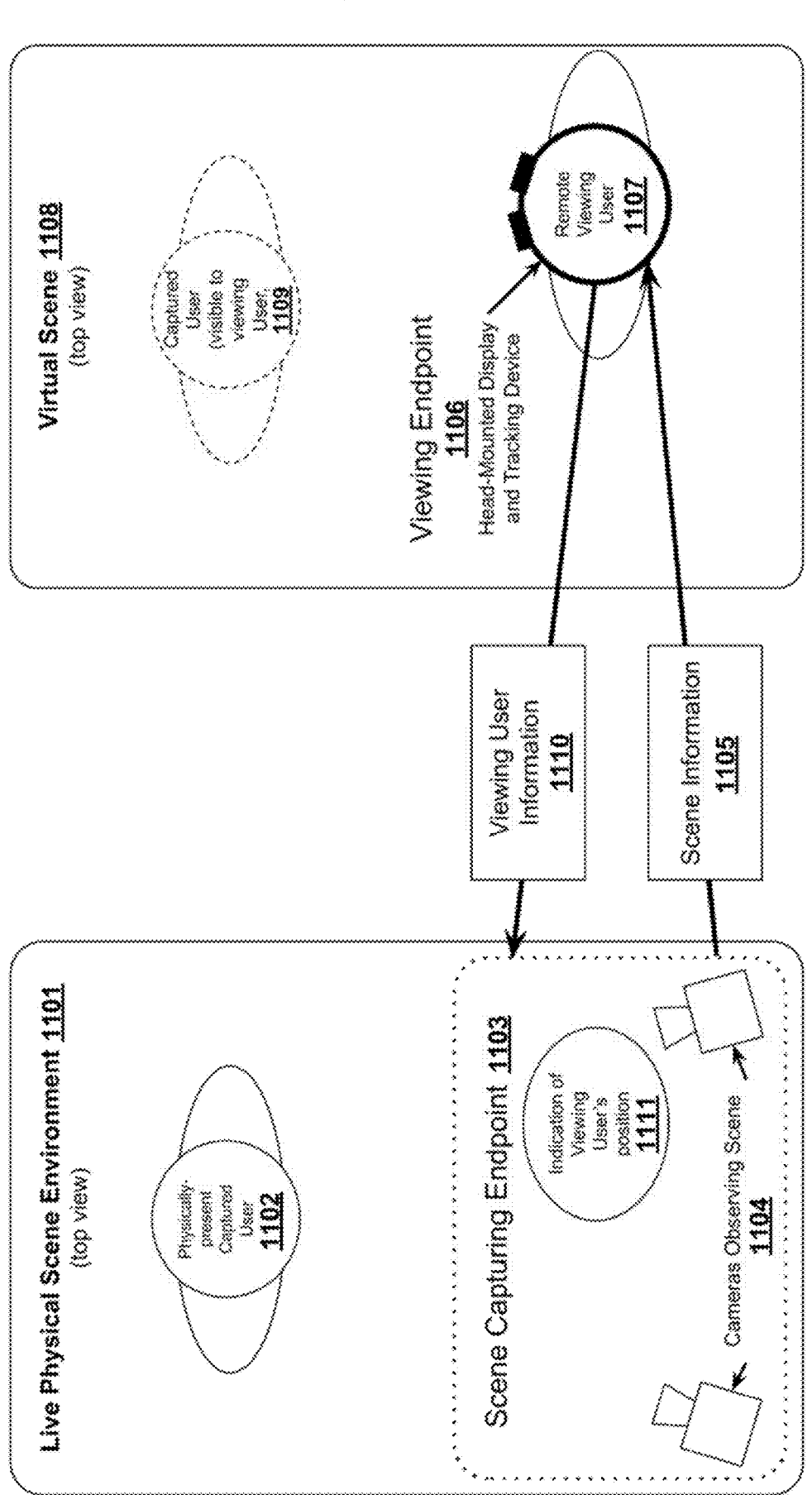
FIG. 81 is a schematic drawing depicting data-flow of an exemplary system implementing exemplary practices of the present invention, with viewer position indications.

FIG. 81 is a schematic diagram that depicts an exemplary embodiment and practice of the invention in which a remote viewing user participates in a meeting with a physically-present user in a physical scene.

As depicted in FIG. 81, the invention facilitates live real-time immersion and interaction between one or more remote participants (remote viewing user(s) 1107) and a physical scene environment 1101. The physical scene environment 1101 may include physically-present captured user(s) 1102.

Embodiments and practices of the invention can utilize two or more cameras 1104 connected or otherwise integrated with a scene capturing endpoint 1103. Data, including data derived from the camera images (scene information 1105), and therefore containing information about the physical scene and physically-present participants, is transmitted by the capturing endpoint 1103 to at least one remote viewing endpoint 1106, the viewing endpoint 1106 being used by at least one remote user or participant 1107.

The viewing endpoint 1106 provides the remote viewing user(s) 1107 with a view of the physical scene as it would appear from a virtual position (1111) in the 3-dimensional space of the physical scene. Therefore, the remote viewing user 1107 can see many aspects of the physical scene, such as objects within the scene and the scene's background. The remote viewing user(s) 1107 can therefore be said to be immersed in a virtual representation 1108 of the physical scene 1101.

Within the virtual scene 1108, the remote viewing user(s) 1107 may see a virtual representation 1109 of the physically-present user(s) 1102 as they would appear from the virtual position 1111, thus giving the appearance that the physically present user(s) 1102 are in the virtual scene 1108 from the perspective of the remote user 1107. As the remote viewing user(s) 1107 move within the virtual scene 1108, the viewpoint from which the physical scene 1101 is observed will also change, and the images shown to the remote viewing user(s) 1107 will thus change accordingly.

In addition, the viewing endpoint 1106 will transmit information about a remote user's (1107) movement to the capturing endpoint 1103. The capturing endpoint 1103 will indicate to the physically present user(s) 1102 the updated position of the remote viewing user 1107, using an indication of that position 1111 on a display connected to the capturing endpoint 1103.

This indication of position 111 allows the physically-present user(s) 1102 to interact with the remote viewing user(s) 1107 in a natural way, in spite of the fact that the remote viewing users 1107 are not directly visible to the physically present users 1102.

Example System Schematic

Figure 82:
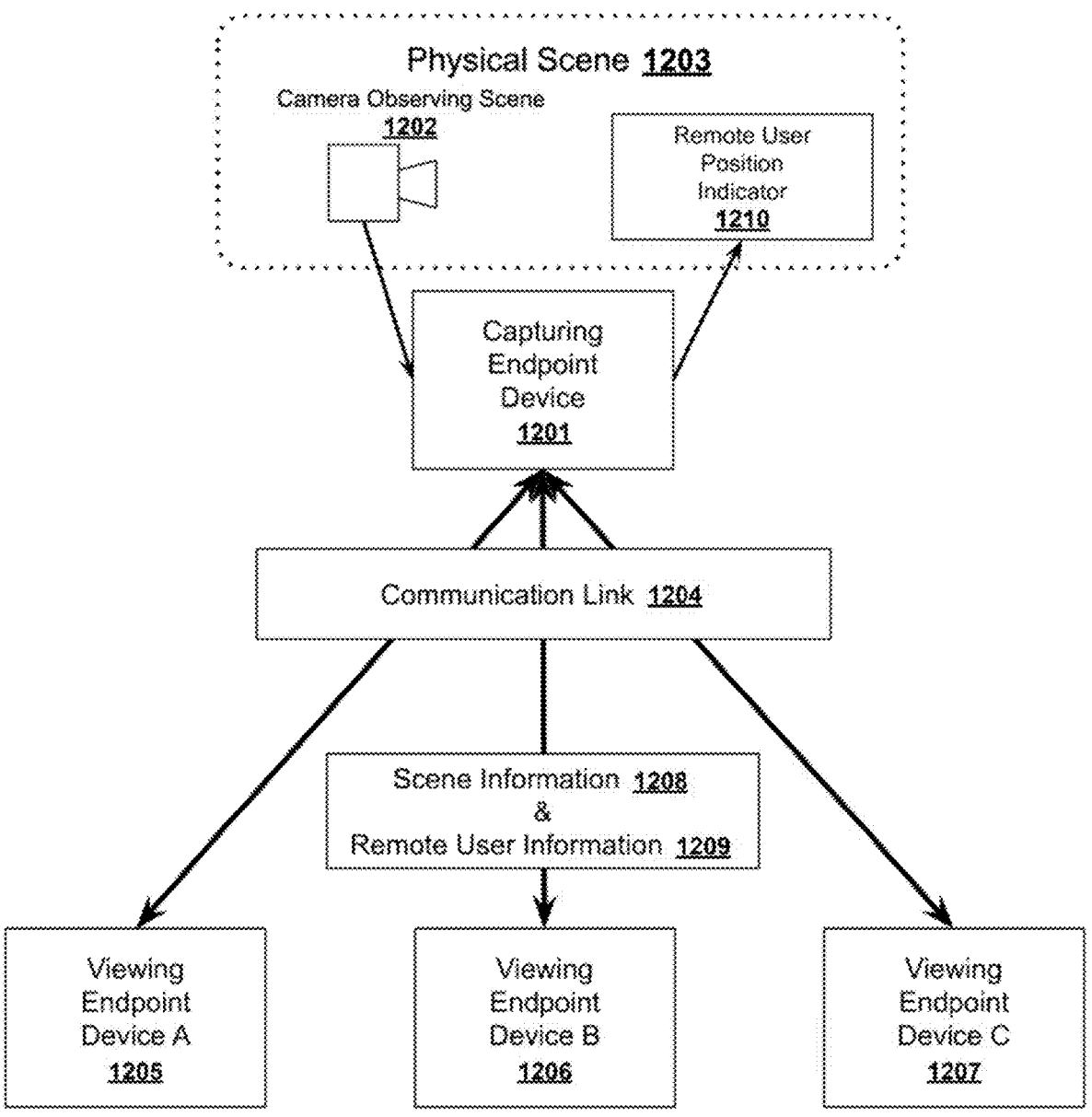
FIG. 82 is a schematic drawing depicting an exemplary system embodying the invention.

FIG. 82 is a schematic diagram depicting the data flow of a system implementing exemplary practices of the invention.

As shown in FIG. 82, an exemplary system embodying the invention comprises a capturing endpoint 1201 receiving input from two or more cameras 1202 oriented to view a physical scene 1203.

The capturing endpoint 1201 may be implemented with a general purpose computer system; or it may be implemented as specialized circuitry; or it may be implemented as a software system executing on a remotely hosted, (cloud) computation platform.

The capturing endpoint is operable to transmit scene information 1208 via communication link 1204 to one or more viewing endpoints 1205, 1206 and 1207, in the example of the system illustrated in FIG. 82. Identical scene information may be broadcast to all viewing endpoints, or individualized scene information may be sent to each viewing endpoint, or a combination of common and unique information may be sent.

The scene information 1208 may comprise camera images, or alternatively it may comprise a light-field format, from which one or more images of the physical scene 1203 may be reconstructed from the perspective of one or more virtual viewpoints. In an exemplary implementation, the scene information 1208 comprises disparity maps associated with one or more cameras 1202 capturing the physical scene 1203. The communication link 1204 may be, or may comprise, the Internet.

In another implementation, the scene information 1208 may contain reconstructed images of the physical scene 1203.

Each viewing endpoint (e.g., 1205, 1206, 1207 in FIG. 82), is associated with a virtual location in the physical scene 1203. The viewing endpoint may display one or more reconstructed images, the images representing views of the physical scene from a virtual viewpoint such that the remote user of the viewing endpoint perceives an immersive experience of the physical scene from the perspective of the associated virtual location.

If the viewing endpoint includes a head-mounted-display (HMD) having two eyepieces, then the viewing endpoint will cause the reconstruction of two views of the physical scene 1203. Similarly, if the viewing endpoint incorporates additional perspectives, such as with a holographic display, the requisite number of perspectives will be reconstructed.

A remote user interacting with a viewing endpoint 1205 may cause the viewing endpoint's respective virtual location to change. The viewing endpoint may also collect additional information from the user, including information supplied deliberately by the user, and/or information collected via additional sensors.

Sensors connected to a viewing endpoint may include any combination of at least the following: microphones, a keyboard, a 3D spatial position tracking system, a 3D orientation tracking system, an interface to another computer or smartphone, a camera to view the remote user's physical environment, a camera to view the remote user's face, a camera to view the remote user's hands, an accelerometer, a temperature sensor, a skin-condition sensor, or any other sensor that may facilitate useful communication from the remote user.

A viewing endpoint may transmit, via a communication link 1204, remote user information 1209 to the capturing endpoint 1201. Remote user information 1209 may include any information collected from sensors connected to the viewing endpoint, and/or any information supplied by a remote user to the viewing endpoint through an interface. This information may include commands, such as movement commands. Remote user information may also include data resulting from the processing of information from a user interface or from any of the connected sensors.

The viewing endpoint may be implemented with software executing on a general purpose computing device or smartphone.

The remote user information 1209 received by the capturing endpoint 1201 may be processed by the capturing endpoint and displayed to any users physically present within the physical scene 1203, via a remote user indicator 1210.

The remote user indicator 1210 may comprise any combination of display devices such as computer monitors, light-emitting-element matrices, holographic display devices, or any other device appropriate for displaying information to a user.

Other examples of practices and embodiments of the present invention can include an aggregate display of crowd density, which can include an indication of collective gaze on a physical participant.

Another example of practices and embodiments of the present invention can include tactile feedback for target of gaze, such as, for example, a vibrating element that may be worn by the physically-present participant.

Another example of practices and embodiments of the present invention can include avatars, such that remote users are visible to each other via the avatars, and able to communicate through the virtual representation of the physical space based on the avatars.

Other examples of practices and embodiments of the present invention can include embodiments that indicate parameters such as the density of observers; the intensity of applause; and/or other aggregate reactions.

Still other examples of practices and embodiments of the present invention can include two-eye reconstruction for a head-mounted display (HMD); emojis; and/or a remote-user face view.

Flowcharts of Exemplary Aspects of Invention Relating to Viewer Position Indications FIGS. 83-84B are flowcharts depicting exemplary practices of the present invention, with viewer position indications.

The methods depicted in these flowcharts are examples only; the organization, order and number of operations in the exemplary practices can be varied; and the exemplary practices and methods can be arranged or ordered differently, and include different functions, whether singly or in combination, while still being within the spirit and scope of the present invention. Items described below in parentheses ( ) are, among other aspects, optional in a given practice of the invention.

It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

All the text and respective textual elements of the accompanying flowcharts are incorporated by reference into this Detailed Description of the Invention as if set forth in their entireties in this Detailed Description of the Invention, in the respective order in which they appear in the flowcharts, while noting that the organization, order and number of operations in the exemplary practices can be varied; and the exemplary practices and methods can be arranged or ordered differently, and include different or additional functions.

Referring now to the flowcharts, FIG. 83 is a flowchart of an exemplary practice of the invention providing viewer position indications, including the following operations:

8300. Method for Providing Asymmetric Communication System:

8301: Provide a scene capturing-endpoint, the scene capturing-endpoint comprising (1) at least two cameras positioned to observe a scene from multiple perspectives; and (2) a viewer-position-indicator;

8302: Provide at least one scene viewing-endpoint, the at least one viewing-endpoint comprising (1) a display, operable to display a different view of the scene dependent upon a viewing-user's position; and (2) a tracker, operable to track the viewing-user's position;

8303: Provide a communication link operable to transmit scene information from the capturing-endpoint to a viewing-endpoint; the link being further operable to transmit user information from the viewing-endpoint to the capturing-endpoint.

FIGS. 84A-B depict further aspects of the invention relating to a viewer position indicator, including the following:

8400. Viewer Position Indicator:

(8401. Viewer-position-indicator is operable to indicate position of at least one viewing-user using at least one scene-viewing endpoint, so as to communicate the viewing-user's position to at least one user of the capturing endpoint.)

(8402. Viewing-user's position is determined based on inverse of logic to reconstruct view of scene to be displayed via the display of the scene-viewing endpoint.)

(8403. Viewer-position-indicator is operable to indicate viewing-user's virtual position within real captured scene.)

(8404. Display of viewing-endpoint comprises head-mounted-display (HMD).)

(8405. Tracker is worn on uses head and position tracked comprises users head position and orientation.)

(8406. Tracker further tracks user's eye position or gaze orientation.)

(8407. Display of viewing-endpoint comprises three-dimensional holographic display.)

(8408. Tracker comprises a camera, positioned to observe the user; and further comprises face detection logic.)

(8409. Capturing-endpoint further comprises logic to compute disparity information between pairs of cameras.)

(8410. Viewer-position-indicator comprises matrix of elements, the elements operable to activate in response to a viewing-user's virtual position.)

(8411. Elements in matrix of elements of viewer-position-indicator are operable to emit light.)

(8412. Viewer-position-indicator comprises at least one conventional display device operable to present representation of at least one viewing-user, and the representation indicates the virtual position of the at least one viewing-user.)

(8413. Representation utilizes selected representational size to indicate distance.)

(8414. Representation utilizes 3D rotation to communicate any of a viewing-user's orientation, a viewing-user's gaze, or a combination of a viewing-user's orientation and gaze.)

(8415. Representation comprises an avatar of the user of the remote viewing-endpoint.)

(8416. Viewer-position-indicator comprises at least one holographic display device.)

(8417. A first user of a first viewing-endpoint may view the virtual position of a second user, the second user using a second viewing-endpoint.)

(8418. An indicator of the virtual position of the second user is rendered within the scene as viewed by the first user.)

(8419. Second user appears as an avatar within the view of the first user.)

(8420. At least one sensor is connected to a viewing-endpoint, the at least one sensor comprising any of: a microphone, a keyboard, a 3D spatial position tracking element, a 3D orientation tracking element, an interface to a computer or smartphone, a camera operable to view the environment around the user of the remote viewing-endpoint, a camera to view the face of the user of the remote viewing-endpoint, a camera to view the hands of the user of the remote viewing-endpoint, an accelerometer, a temperature sensor, or a skin-condition sensor.)

(8421. User information transmitted from the viewing-endpoint to the capturing-endpoint comprises information collected from the at least one sensor connected to the viewing-endpoint.)

(8422. Provide an indication, to at least one user of the capturing-endpoint, of viewing user density or viewing audience size.)

(8423. Providing an indication of viewing user density or viewing audience size comprises providing an indication of collective gaze on the at least one user of the capturing-endpoint.)

(8424. Provide a tactile indication, to at least one user of the capturing endpoint, of gaze on the at least one user of the capturing endpoint.)

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method of providing an asymmetric communication system, the method comprising:

A. providing a capturing-endpoint of a scene, the capturing-endpoint comprising:

(i.) at least two cameras positioned to observe the scene from multiple perspectives; and (ii.) a viewer-position-indicator;

B. providing at least one viewing-endpoint, the at least one viewing-endpoint comprising:

(i.) a display, operable to display a different view of the scene dependent upon a viewing-user's position; and (ii.) a tracker, operable to track the viewing-user's position; and C. providing a communication link operable to transmit scene information from the capturing-endpoint to the at least one viewing-endpoint, the link being further operable to transmit user information from the at least one viewing-endpoint to the capturing-endpoint.

2. The method of claim 1 wherein the viewer-position-indicator is operable to indicate the position of at least one viewing-user using at least one viewing-endpoint, so as to communicate the viewing-user's position to at least one user of the capturing endpoint.

3. The method of claim 1 wherein a viewing-user's position is determined based on the inverse of the logic to reconstruct the view of the scene to be displayed via the display of the viewing-endpoint.

4. The method of claim 1 wherein the viewer-position-indicator is operable to indicate a viewing-user's virtual position within a real captured scene.

5. The method of claim 1 wherein the display of the viewing-endpoint comprises a head-mounted-display (HMD).

6. The method of claim 5 wherein the tracker is worn on a viewing-user's head and the position tracked comprises the viewing-user's head position and orientation.

7. The method of claim 1 wherein the tracker comprises a camera, positioned to observe the user; and further comprising face detection logic.

8. The method of claim 1 wherein the capturing-endpoint further comprises logic to compute disparity information between pairs of cameras.

9. The method of claim 1 wherein the viewer-position-indicator comprises a matrix of elements, the elements operable to activate in response to a viewing-user's virtual position and operable, when activated, to emit light.

10. The method of claim 1 wherein the viewer-position-indicator comprises at least one conventional display device operable to present a representation of at least one viewing-user, and wherein the representation indicates the virtual position of the at least one viewing-user.

11. The method of claim 10 wherein the representation utilizes selected representational size to indicate distance.

12. The method of claim 10 wherein the representation utilizes 3D rotation to communicate any of a viewing-user's orientation, a viewing-user's gaze, or a combination of a viewing-user's orientation and gaze.

13. The method of claim 10 wherein the representation comprises an avatar of the user of the remote viewing-endpoint.

14. The method of claim 1 wherein a first user of a first viewing-endpoint may view the virtual position of a second user of a second viewing-endpoint, and wherein an indicator of the virtual position of the second user is rendered within the scene as viewed by the first user.

15. The method of claim 14 wherein the second user appears as an avatar within the view of the first user.

16. The method of claim 1 wherein at least one sensor is connected to a viewing endpoint, the at least one sensor comprising any of: a microphone, a keyboard, a 3D spatial position tracking element, a 3D orientation tracking element, an interface to a computer or smartphone, a camera operable to view the environment around the user of the remote viewing-endpoint, a camera to view the face of the user of the remote viewing-endpoint, a camera to view the hands of the user of the remote viewing-endpoint, an accelerometer, a temperature sensor, or a skin-condition sensor, and wherein user information transmitted from the viewing-endpoint to the capturing endpoint comprises information collected from the at least one sensor connected to a viewing endpoint.

17. The method of claim 1 further comprising providing an indication, to at least one user of the capturing endpoint, of viewing user density or viewing audience size.

18. The method of claim 1 further comprising: providing a tactile indication, to at least one user of the capturing endpoint, of gaze on the at least one user of the capturing endpoint.

19. An asymmetric communication system comprising:

A. a capturing-endpoint of a scene, the capturing-endpoint comprising:
   (i.) at least two cameras positioned to observe the scene from multiple perspectives; and
   (ii.) a viewer-position-indicator;

B. at least one viewing-endpoint, the at least one viewing-endpoint comprising:
   (i.) a display, operable to display a different view of the scene dependent upon a viewing-user's position; and
   (ii.) a tracker, operable to track the viewing-user's position; and C. a communication link operable to transmit scene information from the capturing-endpoint to a viewing-endpoint, the link being further operable to transmit user information from the viewing-endpoint to the capturing-endpoint.

20. A program product for use with a digital processing system to enable the digital processing system to provide an asymmetric communication system, the digital processing system comprising at least one digital processor, the program product comprising digital processor-executable program instructions stored on at least one non-transitory digital processor-readable medium, which when executed in the digital processing system cause the digital processing system to:

A. enable operation of a capturing-endpoint of a scene, the capturing-endpoint comprising:
   (i.) at least two cameras positioned to observe the scene from multiple perspectives; and
   (ii.) a viewer-position-indicator;

B. enable operation of at least one viewing-endpoint, the at least one viewing-endpoint comprising:
   (i.) a display, operable to display a different view of the scene dependent upon a viewing-user's position; and
   (ii.) a tracker, operable to track the viewing-user's position; and C. provide a communication link operable to transmit scene information from the capturing-endpoint to a viewing-endpoint, the link being further operable to transmit user information from the viewing-endpoint to the capturing-endpoint.

* * * * *